(12) United States Patent
Minami et al.

(10) Patent No.: US 7,535,913 B2
(45) Date of Patent: May 19, 2009

(54) GIGABIT ETHERNET ADAPTER SUPPORTING THE ISCSI AND IPSEC PROTOCOLS

(75) Inventors: John Shigeto Minami, Honolulu, HI (US); Robin Yasu Uyeshiro, Kailua, HI (US); Michael Ward Johnson, Petaluma, CA (US); Steve Su, Honolulu, HI (US); Michael John Sebastian Smith, Palo Alto, CA (US); Addison Kwuanming Chen, Honolulu, HI (US); Mihir Shaileshbhai Doctor, Honolulu, HI (US); Daniel Leo Greenfield, Honolulu, HI (US)

(73) Assignee: NVIDIA Corporation, Santa Clara, CA (US)

( * ) Notice: Subject to any disclaimer, the term of this patent is extended or adjusted under 35 U.S.C. 154(b) by 985 days.

(21) Appl. No.: 10/456,871

(22) Filed: Jun. 5, 2003
(Under 37 CFR 1.47)

(65) Prior Publication Data
US 2004/0062267 A1     Apr. 1, 2004

Related U.S. Application Data

(60) Provisional application No. 60/386,924, filed on Jun. 6, 2002.

(51) Int. Cl.
*H04L 12/66* (2006.01)
*G06F 13/00* (2006.01)
*G06F 15/16* (2006.01)

(52) U.S. Cl. ............... 370/401; 370/466; 709/230; 710/105; 710/315

(58) Field of Classification Search ............... 370/401, 370/466; 709/230; 710/105, 315
See application file for complete search history.

(56) References Cited

U.S. PATENT DOCUMENTS

| 5,012,489 | A | 4/1991 | Burton et al. ............... 375/8 |
| 5,056,058 | A | 10/1991 | Hirata et al. ............... 364/900 |
| 5,161,193 | A | 11/1992 | Lampson et al. ............ 380/49 |
| 5,163,131 | A | 11/1992 | Row et al. .................. 395/200 |
| 5,303,344 | A | 4/1994 | Yokoyama et al. ......... 395/200 |
| 5,307,413 | A | 4/1994 | Denzer ....................... 380/49 |
| 5,426,694 | A | 6/1995 | Hebert ........................ 379/242 |
| 5,430,727 | A | 7/1995 | Callon .................... 370/85.13 |
| 5,440,551 | A | 8/1995 | Suzuki ........................ 370/60 |

(Continued)

FOREIGN PATENT DOCUMENTS

EP     1238541     3/2004

(Continued)

OTHER PUBLICATIONS

Braden R. (ISI), Borman D. (Cray Research), Partridge C. (BBN Labs); *Computing The Internet Checksum*; Network Working Group, Sep. 1998.

(Continued)

*Primary Examiner*—Alpus H Hsu
(74) *Attorney, Agent, or Firm*—Zilka-Kotab, PC

(57) ABSTRACT

The invention is embodied in a gigabit Ethernet adapter. A system according to the invention provides a compact hardware solution to handling high network communication speeds. In addition, the invention adapts to multiple communication protocols via a modular construction and design.

79 Claims, 50 Drawing Sheets

U.S. PATENT DOCUMENTS

| | | | |
|---|---|---|---|
| 5,446,726 A | 8/1995 | Rostoker et al. | 370/17 |
| 5,485,460 A | 1/1996 | Schrier et al. | 370/94.1 |
| 5,495,480 A | 2/1996 | Yoshida | 370/60 |
| 5,499,353 A | 3/1996 | Kadlec et al. | 395/445 |
| 5,513,324 A | 4/1996 | Dolin, Jr. et al. | 395/200.18 |
| 5,519,704 A | 5/1996 | Farinacci et al. | 370/85.13 |
| 5,546,453 A | 8/1996 | Hebert | 379/242 |
| 5,566,170 A | 10/1996 | Bakke et al. | 370/60 |
| 5,577,105 A | 11/1996 | Baum et al. | 379/93 |
| 5,577,172 A | 11/1996 | Vatland et al. | 395/114 |
| 5,577,237 A | 11/1996 | Lin | 395/555 |
| 5,598,410 A | 1/1997 | Stone | 370/469 |
| 5,619,650 A | 4/1997 | Bach et al. | 395/200.01 |
| 5,625,678 A | 4/1997 | Blomfield-Brown | 379/93 |
| 5,625,825 A | 4/1997 | Rostoker et al. | 395/730 |
| 5,634,015 A | 5/1997 | Chang et al. | 395/309 |
| 5,636,371 A | 6/1997 | Yu | 395/500 |
| 5,640,394 A | 6/1997 | Schrier et al. | 370/389 |
| 5,640,399 A | 6/1997 | Rostoker et al. | 370/392 |
| 5,654,962 A | 8/1997 | Rostoker et al. | 370/232 |
| 5,663,951 A | 9/1997 | Danneels et al. | 370/230 |
| 5,666,362 A | 9/1997 | Chen et al. | 370/420 |
| 5,668,809 A | 9/1997 | Rostoker et al. | 370/392 |
| 5,675,507 A | 10/1997 | Bobo, II | 364/514 R |
| 5,678,060 A | 10/1997 | Yokoyama et al. | 395/831 |
| 5,687,314 A | 11/1997 | Osman et al. | 395/200.01 |
| 5,696,899 A | 12/1997 | Kalwitz | 395/200.1 |
| 5,699,350 A | 12/1997 | Kraslavsky | 370/254 |
| 5,701,316 A | 12/1997 | Alferness et al. | 371/53 |
| 5,727,149 A | 3/1998 | Hirata et al. | 395/200.8 |
| 5,734,865 A | 3/1998 | Yu | 395/500 |
| 5,748,905 A | 5/1998 | Hauser et al. | 395/200.79 |
| 5,754,540 A | 5/1998 | Liu et al. | 370/315 |
| 5,761,281 A | 6/1998 | Baum et al. | 379/93.29 |
| 5,790,546 A | 8/1998 | Dobbins et al. | 370/400 |
| 5,790,676 A | 8/1998 | Ganesan et al. | 380/23 |
| 5,802,278 A | 9/1998 | Isfeld et al. | 395/200.02 |
| 5,802,287 A | 9/1998 | Rostoker et al. | 395/200.8 |
| 5,802,306 A | 9/1998 | Hunt | 395/200.58 |
| 5,805,816 A | 9/1998 | Picazo, Jr. et al. | 395/200.53 |
| 5,809,235 A | 9/1998 | Sharma et al. | 395/200.6 |
| 5,815,516 A | 9/1998 | Aaker et al. | 371/53 |
| 5,818,935 A | 10/1998 | Maa | 380/20 |
| 5,826,032 A | 10/1998 | Finn et al. | 395/200.66 |
| 5,838,904 A | 11/1998 | Rostoker et al. | 395/200.8 |
| 5,872,919 A | 2/1999 | Wakeland | 395/200.6 |
| 5,894,557 A | 4/1999 | Bade et al. | 395/200.58 |
| 5,909,546 A | 6/1999 | Osborne | 395/200.42 |
| 5,920,732 A | 7/1999 | Riddle | 395/876 |
| 5,935,268 A | 8/1999 | Weaver | 714/758 |
| 5,937,169 A | 8/1999 | Connery et al. | 395/200.8 |
| 5,941,988 A | 8/1999 | Bhagwat et al. | 713/201 |
| 5,943,481 A | 8/1999 | Wakeland | 395/200.6 |
| 5,963,543 A | 10/1999 | Rostoker et al. | 370/232 |
| 5,974,518 A | 10/1999 | Nogradi | 711/173 |
| 5,991,299 A | 11/1999 | Radogna et al. | 370/392 |
| 5,999,974 A | 12/1999 | Ratcliff et al. | 709/224 |
| 6,014,699 A | 1/2000 | Ratcliff et al. | 709/224 |
| 6,034,963 A | 3/2000 | Minami et al. | 370/401 |
| 6,046,980 A | 4/2000 | Packer | 370/230 |
| 6,061,742 A | 5/2000 | Stewart et al. | 709/250 |
| 6,076,115 A | 6/2000 | Sambamurthy et al. | 709/250 |
| 6,081,846 A | 6/2000 | Hyder et al. | 709/250 |
| 6,092,110 A | 7/2000 | Maria et al. | 709/225 |
| 6,092,229 A | 7/2000 | Boyle et al. | 714/748 |
| 6,098,188 A | 8/2000 | Kalmanek, Jr. et al. | 714/746 |
| 6,101,543 A | 8/2000 | Alden et al. | 709/229 |
| 6,119,195 A | 9/2000 | Ellis et al. | 710/129 |
| 6,122,670 A | 9/2000 | Bennett et al. | 709/236 |
| 6,151,625 A | 11/2000 | Swales et al. | 709/218 |
| 6,157,955 A | 12/2000 | Narad et al. | 709/228 |
| 6,172,980 B1 | 1/2001 | Flanders et al. | 370/401 |
| 6,172,990 B1 | 1/2001 | Deb et al. | 370/474 |
| 6,173,333 B1 | 1/2001 | Jolitz et al. | 709/240 |
| 6,182,228 B1 | 1/2001 | Boden et al. | 713/201 |
| 6,185,619 B1 | 2/2001 | Joffe et al. | 709/229 |
| 6,191,713 B1 | 2/2001 | Ellis et al. | 341/100 |
| 6,208,651 B1 | 3/2001 | Van Renesse et al. | 370/392 |
| 6,226,680 B1 | 5/2001 | Boucher | 709/230 |
| 6,230,193 B1 | 5/2001 | Arunkumar et al. | 709/218 |
| 6,233,626 B1 | 5/2001 | Swales et al. | 710/11 |
| 6,247,060 B1 | 6/2001 | Boucher | 709/238 |
| 6,247,068 B1 | 6/2001 | Kyle | 709/328 |
| 6,256,687 B1 | 7/2001 | Ellis et al. | 710/71 |
| 6,286,052 B1 * | 9/2001 | McCloghrie et al. | 709/238 |
| 6,334,153 B2 | 12/2001 | Boucher | 709/230 |
| 6,389,479 B1 | 5/2002 | Boucher | 709/243 |
| 6,393,487 B2 | 5/2002 | Boucher | 709/238 |
| 6,427,171 B1 | 7/2002 | Craft | 709/230 |
| 6,427,173 B1 | 7/2002 | Boucher | 709/238 |
| 6,434,620 B1 | 8/2002 | Boucher | 709/230 |
| 6,470,415 B1 | 10/2002 | Starr | 711/104 |
| 6,538,656 B1 | 3/2003 | Cheung et al. | 345/519 |
| 6,591,302 B2 | 7/2003 | Boucher | 709/230 |
| 6,622,172 B1 | 9/2003 | Tam | 709/232 |
| 6,658,480 B2 | 12/2003 | Boucher | 709/239 |
| 6,687,758 B2 | 2/2004 | Craft | 709/250 |
| 6,697,868 B2 | 2/2004 | Craft | 709/230 |
| 6,717,576 B1 | 4/2004 | Duluk et al. | 345/419 |
| 6,738,874 B2 * | 5/2004 | Zsohar | 711/157 |
| 6,751,665 B2 | 6/2004 | Philbrick | 709/224 |
| 6,757,746 B2 | 6/2004 | Boucher | 709/250 |
| 6,760,333 B1 | 7/2004 | Moody et al. | 370/395.1 |
| 6,768,774 B1 | 7/2004 | MacInnis et al. | 375/240.15 |
| 6,768,992 B1 | 7/2004 | Jolitz | 707/6 |
| 6,798,420 B1 | 9/2004 | Xie | 345/554 |
| 6,804,243 B1 | 10/2004 | Humphrey et al. | 370/395.1 |
| 6,807,581 B1 | 10/2004 | Starr | 709/250 |
| 6,853,385 B1 | 2/2005 | MacInnis et al. | 345/629 |
| 6,870,538 B2 | 3/2005 | MacInnis et al. | 345/505 |
| 6,938,092 B2 | 8/2005 | Burns | 709/230 |
| 6,941,386 B2 | 9/2005 | Craft | 709/250 |
| 6,952,409 B2 | 10/2005 | Jolitz | 370/328 |
| 6,959,007 B1 * | 10/2005 | Vogel et al. | 370/469 |
| 6,965,941 B2 | 11/2005 | Boucher | 709/230 |
| 6,975,324 B1 | 12/2005 | Valmiki et al. | 345/555 |
| 6,996,070 B2 | 2/2006 | Starr | 370/252 |
| 7,031,267 B2 * | 4/2006 | Krumel | 370/255 |
| 7,042,898 B2 | 5/2006 | Blightman | 370/463 |
| 7,062,595 B2 * | 6/2006 | Lindsay et al. | 710/315 |
| 7,149,208 B2 * | 12/2006 | Mattaway et al. | 370/352 |
| 7,260,106 B2 * | 8/2007 | Yavatkar et al. | 370/428 |
| 2001/0004354 A1 | 6/2001 | Jolitz | 370/328 |
| 2001/0021949 A1 | 9/2001 | Blightman | 709/219 |
| 2001/0023460 A1 | 9/2001 | Boucher | 709/250 |
| 2001/0025315 A1 | 9/2001 | Jolitz | 709/231 |
| 2001/0027496 A1 | 10/2001 | Boucher | 709/250 |
| 2001/0036196 A1 | 11/2001 | Brightman | 370/465 |
| 2001/0037397 A1 | 11/2001 | Boucher | 709/230 |
| 2001/0037406 A1 | 11/2001 | Philbrick | 709/250 |
| 2001/0047433 A1 | 11/2001 | Boucher | 709/250 |
| 2002/0083331 A1 * | 6/2002 | Krumel | 713/200 |
| 2002/0085562 A1 | 7/2002 | Hufferd et al. | 370/392 |
| 2002/0087732 A1 | 7/2002 | Boucher | 709/250 |
| 2002/0091844 A1 | 7/2002 | Craft | 709/230 |
| 2002/0095519 A1 | 7/2002 | Philbrick et al. | 709/250 |
| 2002/0120899 A1 | 8/2002 | Gahan et al. | 714/748 |
| 2002/0147839 A1 | 10/2002 | Boucher | 709/238 |
| 2002/0156927 A1 | 10/2002 | Boucher | 709/250 |
| 2002/0161919 A1 | 10/2002 | Boucher | 709/238 |
| 2002/0163888 A1 | 11/2002 | Grinfeld | 370/235 |
| 2003/0005142 A1 | 1/2003 | Elzur et al. | 709/232 |
| 2003/0005143 A1 | 1/2003 | Elzur et al. | 709/232 |
| 2003/0014544 A1 | 1/2003 | Pettey | 709/249 |

| | | | | |
|---|---|---|---|---|
| 2003/0014624 | A1 | 1/2003 | Maturana et al. | 713/151 |
| 2003/0016669 | A1 | 1/2003 | Pfister et al. | 370/392 |
| 2003/0031172 | A1 | 2/2003 | Grinfeld | 370/389 |
| 2003/0037237 | A1 | 2/2003 | Abgrall et al. | 713/166 |
| 2003/0046330 | A1 | 3/2003 | Hayes | 709/201 |
| 2003/0046418 | A1 | 3/2003 | Raval et al. | 709/237 |
| 2003/0056009 | A1 | 3/2003 | Mizrachi et al. | 709/245 |
| 2003/0058870 | A1 | 3/2003 | Mizrachi et al. | 370/395.52 |
| 2003/0061505 | A1 | 3/2003 | Sperry et al. | 713/200 |
| 2003/0066011 | A1 | 4/2003 | Oren | 714/758 |
| 2003/0079033 | A1 | 4/2003 | Craft | 709/230 |
| 2003/0084185 | A1 | 5/2003 | Pinkerton | 709/236 |
| 2003/0095567 | A1 | 5/2003 | Lo et al. | 370/466 |
| 2003/0108033 | A1 | 6/2003 | Raisanen et al. | 370/352 |
| 2003/0140124 | A1 | 7/2003 | Burns | 709/220 |
| 2003/0165160 | A1 | 9/2003 | Minami et al. | 370/466 |
| 2003/0167346 | A1 | 9/2003 | Craft | 709/250 |
| 2003/0200284 | A1 | 10/2003 | Philbrick | 709/219 |
| 2004/0003126 | A1 | 1/2004 | Boucher | 709/250 |
| 2004/0054813 | A1 | 3/2004 | Boucher | 709/250 |
| 2004/0062245 | A1* | 4/2004 | Sharp et al. | 370/392 |
| 2004/0062246 | A1 | 4/2004 | Boucher | 370/392 |
| 2004/0064578 | A1 | 4/2004 | Boucher | 709/236 |
| 2004/0064589 | A1 | 4/2004 | Boucher | 709/250 |
| 2004/0064590 | A1 | 4/2004 | Starr | 709/250 |
| 2004/0073703 | A1 | 4/2004 | Boucher | 709/245 |
| 2004/0078462 | A1 | 4/2004 | Philbrick | 709/224 |
| 2004/0088262 | A1 | 5/2004 | Boucher | 705/65 |
| 2004/0100952 | A1 | 5/2004 | Boucher | 370/389 |
| 2004/0111535 | A1 | 6/2004 | Boucher | 709/250 |
| 2004/0117509 | A1 | 6/2004 | Craft | 709/250 |
| 2004/0158640 | A1 | 8/2004 | Philbrick | 709/230 |
| 2004/0158793 | A1 | 8/2004 | Blightman | 714/758 |
| 2004/0240435 | A1 | 12/2004 | Boucher | 370/352 |
| 2005/0122986 | A1 | 6/2005 | Starr | 370/412 |
| 2005/0141561 | A1 | 6/2005 | Craft | 370/474 |
| 2005/0160139 | A1 | 7/2005 | Boucher | 709/203 |
| 2005/0175003 | A1 | 8/2005 | Craft | 370/389 |
| 2005/0182841 | A1 | 8/2005 | Sharp | 709/228 |
| 2005/0198198 | A1 | 9/2005 | Craft | 709/217 |
| 2005/0204058 | A1 | 9/2005 | Philbrick | 709/238 |
| 2005/0278459 | A1 | 12/2005 | Boucher | 709/250 |
| 2006/0010238 | A1 | 1/2006 | Craft | 709/227 |
| 2007/0062245 | A1 | 3/2007 | Fuller et al. | 72/413 |

FOREIGN PATENT DOCUMENTS

| | | |
|---|---|---|
| WO | WO 95/11554 | 4/1995 |
| WO | WO 98/19412 | 5/1998 |
| WO | WO 99/04343 | 1/1999 |
| WO | WO0013091 A1 | 3/2000 |
| WO | 01/28179 | 4/2001 |
| WO | WO01/45426 | 6/2001 |
| WO | 02/059757 | 8/2002 |
| WO | 02/086674 | 10/2002 |
| WO | WO 02/086674 | 10/2002 |
| WO | 03/021443 | 3/2003 |
| WO | 03/021447 | 3/2003 |
| WO | 03/021452 | 3/2003 |

OTHER PUBLICATIONS

Braden, R. (Internet Enggr. Task Force); Requirements for Internet Hosts—Communication Layers; Network Working Group, Oct. 1989.

Braden R. (ISI), Borman D. (Cray Research), Jacobson V. (LBL) ; TCP Extensions for High Performance; Network Working Group, May 1992.

Bellovin S. (AT&T Research); *Defending Against Sequence Number Attacks*; Network Working Group, May 1996.

Stevens W. (NOAO); *TCP Slow Start, Congestion Avoidance, Fast Retransit, and Fast Recovery Algorithms*; Network Working Group, Jan. 1997.

Mathis M, Mahdavi J. (PSC), Floyd S. (LBNL, Romanow A. (Sun Microsystems); *TCP Selective Acknowledgement Options*; Network Working Group, Oct. 1996.

*Internet Protocol*—Darpa Internet Program—Protocol Specification; (Prepared for Defense Advanced research Projects Agency, Arlington, VA) Info. Sci. Institute; Sep. 1981; USC, Marina del Rey, CA, USA.

*Transmission Control Protocol*—Darpa Internet Program—Protocol Specification; ; (Prepared for Defense Advanced research Projects Agency, Arlington, VA) Info. Sci. Institute; Sep. 1981; USC, Marina del Rey, CA, USA.

Chesson, Greg, "The Protocol Engine Project" Technology Focus Sep. 1987.

Chesson, Greg, "Proceedings of the Summer 1987 USENIX Conference" USENIX Association Jun. 8-12, 1987.

G. Chesson and L. Green, "XTP Protocol Engine VLSI for Real-Time LANS" EFOC/LAN Jun. 29-Jul. 1, 1968.

Stevens, Richard W., "TCP/IP Illustrated Volume" Addison-Wesley Professional Computing Series.

Abbot, Mark B., and Peterson, Larry L., "Increasing Network Throughput by Integrating Protocol Layers" IEEE 1993.

Wright, Maury, "Low-Cost Control LANs Add Automation to Homes, Autos, and Offices" EDN Jul. 20, 1992.

Preston, David J., "Internet Protocols Migrate to Silicon For Networking Devices" Electronic Design Apr. 14, 1997.

Muller, Raimund, "LON—das universelle Netzwerk" Electronik 22/1991.

Rang, Michael ad Tantawy, Ahmed, "A Design Methodology for Protocol Processors" IEEE 1995.

Banks, David and Prudence, Michael, "A High-Performance Network Architecure for a PA-RISC Workstation" IEEE Journal vol. II, No. 22 Feb. 1993.

Steenkiste, Peter, "A High-Speed Network Interface for Distributed-Memory Systems: Architecture and Applications" ACM Transactions on Computer Systems, vol. 15, No. 1, Feb. 1997.

Doumenis, Gr.A., Konstantoulakis, G.E., Reisis, D.I.and Stassinopoulos, G.I. "A Personal Computer Hosted Terminal Adapter For The Broadband Integrated Services Digital Network and Applications" National Technical University of Athens, Greece.

Womack, Lucas; Mraz, Ronald; Mendelson, Abraham, "A Study of Virtual Memory MTU Reassembly withing the PowerPC Architecture" IEEE 1997.

Steenkiste, Peter, "A Systematic Approach to Host Interface Design for High-Speed Networks" IEEE Mar. 1994.

Wittie, Larry D., Ma, Fanyuan, "A TCP/IP Communication Subsystem in Micros" IEEE 1987.

Dalton, Chris; Watson, Greg; Banks, David; Calamvokis, Costas; Edwards, Aled; Lumley, John, "Afterburner: A Network-independent card provides architectural support for high-performance protocols" IEEE Jul. 1993.

Gupta, Pankaj; McKeown, Nick, "Algorithms for Packet Classification" IEEE Network Mar./Apr. 2001.

Clark, David D.; Romkey, John; Salwen, Howard, "An Analysis of TCP Processing Overhead" IEEE 1998.

Clark, David D.; Jacobson, Van; Romkey, John; Salwen, Howard, "An Analysis of TCP Processing Overhead" IEEE Jun. 1989.

Goloi, W.K.; Behr, P. "An IPC Protocol and Its Hardware Realization For A High-Speed Distributed Multicomputer System" IEEE 1981.

Ames, Richard, "Building an Embedded Web Server from Scratch" Circuit Cellar INK Feb. 1998.

Legg, John, "Choosing and implementing an embedded TCP/IP Stack" Electronic Product Design Jan. 1999.

Orphanos, George; Birbas, Alexios; Petrellis, Nikos; Mountzouris, Ioannis; Malataras, Andreas, "Compensating for Moderate Effective Throughput at the Desktop" IEEE Communication Magazine Apr. 2000.

Yocum, Kenneth G.; Chase, Jeffrey S.; Gallatin, Andrew J.; Lebeck, Alvin R., Cut-Through Delivery in Trapeze: An Exercise in Low-Latency Messaging IEEE 1997.

Varada, S.; Yang, Y.; Evans, D., "Data and Buffer Management in ATM Systems" TranSwitch Corporation.

Bonjour, Dominique; de Hauteclocque, Gaelle; le Moal, Jacques, "Design and Application of ATM LAN/WAN Adapters" IEEE 1998.

Kim, Chan; Jun, Jong-Jun; Park, Yeong-Ho; Lee, Kyu-Ho; Kim, Hyup-Jong, "Design and Implementation of a High-Speed ATM Host Interface Controller" Electronics and Telecommunications Research Institute, Korea.

Steenkiste, Peter, "Design, Implementation, and evaluation of a Single-copy Protocol Stack" Software—Practice and Experience, vol. 28, Jun. 1998.

Meleis, Hanafy E.; Serpanos, Dimitrios, N., "Designing Communication Subsystems for High-Speed Networks" IEEE Network Jul. 1992.

Doumenis, Gr. A.; Reisis, D.I.; Stassinopoulos, G.I., "Efficient Implementation of the SAR Sublayer and the ATM Layer in High-Speed Broadband ISDN Data Terminal Adapters" IEEE 1993.

Mora, F.; Sebastia, A., "Electronic Design of a High Performance Interfacce to the SCI Network" IEEE 1998.

Eady, Fred, "Embedded Internet Part 2: TCP/IP and a 16-Bit Compiler" Embedded PC Jun. 1999.

Shivam, Piyush; Wyckoff, Pete; Panda, Dhabaleswar, "EMP: Zero-copy OS-bypass NIC-driven Gigabit Ethernet" SC2001 Nov. 2001, Denver CO, USA.

Mansour, Mohammad; Kayssi, Ayman, "FPGA-Based Internet Protocol Version 6 Router" IEEE 1998.

Smith, Jonathon M.; Traw, C. Brendan S., "Giving Applications Access to Gb/s Networking" IEEE Network Jul. 1993.

Traw, C. Brendan S.; Smith, Jonathan M., "Hardware/Software Organization of a High-Performance ATM Host Interface" IEEE 1993.

Nagata, Takahiko; Hosoda, Yamashita, Hiroyuki, "High-Performance TCP/IP/ATM Communication Board" NTT Information and Communication Systems Laboratories 1998.

Nagata, Takahiko; Hosoda, Yasuhiro; Yamahsita, Hiroyuki, "High-Performance TCP/IP/ATM Communication Boards:Driving Force for Various Multimedia Services" vol. 9 No. 6 Nov. 1997.

Jolitz, William Frederick, "High-Speed Networking: Header prediction and forward-error correction for very high-speed data transfer" Dr. Dobbs Journal, Aug. 1992.

Chiswell, Dave "Implementation Challenges for 155Mbit ATM Adapters" ISBN# 0-7803-2636-9.

Wright, Maury "Intelligent Ethernet Boards" EDN Jun. 23, 1988.

Preston, David "Intetnet Protocols Migrate to Silicon For Networking Devices" Electronic Design Apr. 14, 1997.

Ivanov-Loshkanov, V.S.; Sevast'yanov, S.F., Semenov, M.N., "Network Microprocessor Adapter" Avtmatika i Vyshislitel'naya Tekhnika vol. 17 No. 5 pp. 25-28, 1983.

Druschel, Peter; Abbot, Mark B.; Pagels, Michael A.; Peterson, Larry L., "Network Subsystem Design" IEEE Network Jul. 1993.

Huange, Jau-Hsiung; Chen, Chi-Wen, "On Performance Measurments of TCP/IP and its Device Driver" IEEE 1992.

Siegel, Martin; Williams, Mark; Robler, Georg, "Overcoming Bottlenecks in High-Speed Transport Systems" IEEE 1991.

Neufeld, Gerald W.; Ito, Mabo Robert; Goldberg, Murray; McCutcheon, Mark J.; Ritchie, Stuart, Paralleel Host Interface for an ATM Network IEEE Network Jul. 1993.

Maly, K.; Khanna, K.; Kukkamala, R.; Overstreet C.M.; Yerraballi, R.; Foundriat, E.C.; Madan, B., "Parallel TCP/IP For Multiprocessor Workstations" High Performance Netowrking, IV, 1993 IFIP.

Laskman, T.V.; Madhow, U., "Performance Analysis of Window-based Flow Control using TCP/IP:Effect of High Bandwidth Delay Products and Random Loss" High Performance Networking V. 1994 IFIP.

Ramakrishnan, K.K., "Performance Considerations in Designing Network Interfaces" IEEE Journal1993.

Camarda, P.; Pipio, F.; Piscitelli, G.; "Performance evaluating of TCP/IP implementations in end systems" IEE Proc-Computer Digital Tech. vol. 146 No. 1 Jan. 1999.

Toyoshima, Kan; Shirakawa, Kazuhiro; Hayashi, Kazuhiro, "Programmable ATM Adapter: Rapid Prototyping of Cell Processing Equipment for ATM Network" IEEE 1997.

Blumrich, Matthias A.; Dubnicku, Cezary; Felton, Edward W.; Li, Kai, "Protected, User-level DMA for the SHRIMP Network Interface" IEEE 1996.

Feldmeier, David C.; McAuley, Anthony J.; Smith, Jonathan M., Bakin, Deborah S.; Marcus, William S.; Raleigh, Thomas M., "Protocol Boosters" IEEE 1998.

Marcus, William S.; Hadzic, Ilija; McAuley, Anthony J.; Smith, Jonathan M., "Protocol Boosters: Applying Programmability to Network Infrastructures" IEEE Communications Magazine Oct. 1998.

Korablum, Deborah F., "Protocol Implementation and Other Performance Issues for Local and Metropolitan Area Networks" IEEE 1988.

Dittia, Zubin D.; Parulkar, Guru M.; Jr., Jerome R. Cox, "The APIC Approach to High Performance Network Interface Design: Protect4ed DMA and Other Techniques" IEEE 1997.

Rutsche, Erich, "The Architecture of a Gb/s Multimedia Protocol Adapter" ACM SIGCOMM Computer Communication Review.

Moldeklev, Kjersti; Klovning, Espen; Kure, Oivind, "The effect of end system hardware and software on TCP/IP throughput performance over a local ATM Network".

Kanakia, Hermant; Cheriton, David R., "The VMP Network Adapter Board (NAB) High Performance Network Communication for Multiprocessors" ACM 1988.

Chandrammenon, Grish P.; Varghese, George, "Trading Packet Headers for Packet Processing" IEEE 1996.

Nielson, Dr. Michael J.K., "TURBOchannel" IEEE 1991.

New Media News, www.newmedianews.com/02197/ts_inettuner.html.

Kelly, T. "Cheap Internet Hardware that Fits in Everything" ZDNet, www.zdnet.co.uk/news/1998/77/ns-5998.html.

Kitadeya et al. "Matsushita Launches WebTV Internet Connection Terminal" www.mei.co.jp/corp/news/official.data.dir/en981112-1/en981112-1html.

iReady Product Data Sheet, Internet Tuner.

Luijten, Ronald P., "An OC-12 ATM Switch Adapter Chipset" 1998 IEEE.

Case, "Implementing the Java Virtual Machine" Microdesign Resources, Mar. 25, 1996.

Storage Industry Networking Industry Association, "iSCSi Building Blocks for IP Storage Networking" SNIA IP Storage Forum.

International Committee for Information Technology Standards, "Development work conducted in T10-I/O Interface—Lower Level" ISO/IEC Sep. 12, 2002.

"Less Numerical Algorithms", Ch. 20.

Wayner, "Sun Gambles on Java Chips" Byte, Nov. 1996.

Office Action Summary from U.S. Appl. No. 10/131,118 which was mailed on Apr. 24, 2007.

Office Action Summary from U.S. Appl. No. 10/741,972 which was mailed on May 2, 2007.

European Supplemental Search Report from application No. 03727427 Mailed on Aug. 20, 2008.

Henriksson T. et al., "VLSI Implementation Of CRC-32 For 10 Gigabit Ethernet", Electronics, Circuits and Systems, 2001, ICECS 2001. The 8th IEEE International Conference on Sep. 2-5, 2001.

Deepakumara J. et al., "FPGA Implementation Of MD5 Hash Algorithm" Electrical And Computer Engineering, 2001. Canadian Conference On May 13-16, 2001.

Preston J.V. et al., "FPGA Macros Simplify State Machine Design" Electronic Design, Penton Media, Cleveland, OH, US, vol. 42, No. 25, Dec. 5, 1994.

Riddoch D. et al., "Distributed Computing With The Clan Network" Local Computer Networks, 2002. Proceedings LCN 2002. 27th Annual IEEE Conference on Nov. 6-8, 2002.

Yong Kyu Kang et al., "An Efficient implementation of Hash Function Processor For IPSEC" ASIC, 2002. Proceedings. 2002 IEEE Asia-Pacific Conference on Aug. 6-8, 2002.

* cited by examiner

| KIND 0x2 | LENGTH 0x4 | MSS |
|---|---|---|
| 1 BYTE | 1 BYTE | 2 BYTES |

FIG. 30

| KIND 0x1 | KIND 0x3 | LENGTH 0x3 | SHIFT COUNT |
|---|---|---|---|
| 1 BYTE | 1 BYTE | 1 BYTE | 1 BYTE |
| (NOP) | (WINDOW SCALING OPTION) | | |

FIG. 31

| KIND 0x1 | KIND 0x1 | KIND 0x8 | LENGTH 0xA | TIMESTAMP VALUE | TIMESTAMP ECHO REPLY |
|---|---|---|---|---|---|
| 1 BYTE | 1 BYTE | 1 BYTE | 1 BYTE | 4 BYTES | 4 BYTES |
| (NOP) | (NOP) | (TIMESTAMP OPTION) | | | |

FIG. 32

| KIND 0x1 | KIND 0x1 | KIND 0x4 | LENGTH 0x2 |
|---|---|---|---|
| 1 BYTE | 1 BYTE | 1 BYTE | 1 BYTE |
| (NOP) | (NOP) | (SACK PERMITTED) | |

FIG. 33

| KIND 0x1 | KIND 0x1 | KIND 0x5 | LENGTH 0xA | LEFT EDGE OF 1ST BLOCK | RIGHT EDGE OF 1ST BLOCK |
|---|---|---|---|---|---|
| 1 BYTE | 1 BYTE | 1 BYTE | 1 BYTE | 4 BYTES | 4 BYTES |
| (NOP) | (NOP) | (SACK OPTION) | | | |

FIG. 34

| | | |
|---|---|---|
| BLOCK 0 | | 0x0000 |
| | | 0x01FF |
| BLOCK 1 | | 0x0200 |
| | | 0x03FF |
| BLOCK 2 | | 0x0400 |
| | | 0x05FF |
| BLOCK 3 | | 0x0600 |
| | | 0x07FF |
| BLOCK 4 | | 0x0800 |
| | | 0x09FF |
| BLOCK 5 | | 0x0A00 |
| | | 0x0BFF |
| BLOCK 6 | | 0x0C00 |
| | | 0x0DFF |
| (NOT USED) | | 0x0E00 |
| | | 0x0FFB |
| | 0x0C00 | 0x0FFC |
| 0x0A00 | 0x0800 | 0x0FFD |
| 0x0600 | 0x0400 | 0x0FFE |
| 0x0200 | 0x0000 | 0x0FFF |

FIG. 39

| Address | Section | Size |
|---|---|---|
| 0x123FF – 0x10000 | RX MEM BLOCK ALLOCATION TABLES | 12K BYTES |
| 0x0FFFF – 0x0DC00 | TX MEM BLOCK ALLOCATION TABLES | 72K BYTES |
| 0x0DBFF – 0x0D800 | SA ENTRIES ALLOCATION TABLE | 8K BYTES |
| 0x0D7FF – 0x09800 | SERVER PORT INFORMATION | 128K BYTES |
| 0x097FF – 0x09600 | TIME WAIT ALLOC TABLE | 4K BYTES |
| 0x095FF – 0x09400 | RX TO TX FIFO | 4K BYTES |
| 0x093FF – 0x09000 | SOCKET DATA AVAILABLE BITMAP | 8K BYTES |
| 0x08FFF – 0x08C00 | ESTABLISHED CONTROL BLOCK ALLOCATION TABLE | 8K BYTES |
| 0x08BFF – 0x08800 | SOURCE PORT USAGE TABLE | 8K BYTES |
| 0x087FF – 0x08400 | UDP SOURCE PORT USAGE TABLE | 8K BYTES |
| 0x083FF – 0x08000 | TCP PORT AUTHORIZATION TABLE | 8K BYTES |
| 0x07FFF – 0x00000 | HALF OPEN CONTROL BLOCKS | 256K BYTES |

◄— 64 BITS —►

*FIG. 46*

| | 31 | 28 | | 24 | 20 | 16 | 12 | 8 | 4 | 0 |
|---|---|---|---|---|---|---|---|---|---|---|
| 0-L | | X SV | X BV | X TV | | | | XA_ALG | XA | SA VERSION | SA TYPE | XV |
| 0-H | | | | | | | LV | | | | |
| 1-L | | | | | | | | | | | |
| 1-H | TX AH TRANSPORT SPI NUMBER [31:0] ||||||||||
| 2-L | | | | | | | | | | | |
| 2-H | TX AH TRANSPORT BYTE LEFT[31:0] ||||||||||
| 3-L | TX AH TRANSPORT SEQ NUMBER [31:0] ||||||||||
| 3-H | TX TRANSPORT SEQ NUMBER [63:32] ||||||||||
| 4-L | | | | | | | | | | | |
| 4-H | TX AH TRANSPORT EXPIRY TIMESTAMP [31:0] ||||||||||
| 5-L | TX AH TRANSPORT AUTHORIZATION KEY [31:0] ||||||||||
| 5-H | TX AH TRANSPORT AUTHORIZATION KEY [63:32] ||||||||||
| 6-L | TX AH TRANSPORT AUTHORIZATION KEY [95:64] ||||||||||
| 6-H | TX AH TRANSPORT AUTHORIZATION KEY [127:96] ||||||||||
| 7-L | TX AH TRANSPORT AUTHORIZATION KEY [159:128] ||||||||||
| 7-H | | | | | | | | | | | |

*FIG. 57*

| | 31 | 28 | 24 | 20 | 16 | 12 | 8 | 4 | 0 |
|---|---|---|---|---|---|---|---|---|---|
| 0-L | | XSV XBV XTV | | | LV | XA_ALG | XA | SA VERSION | SA TYPE | XV |
| 0-H | | | | | | | | | |
| 1-L | TX DESTINATION IP ADDRESS [31:0] | | | | | | | | |
| 1-H | TX AH TUNNEL SPI NUMBER [31:0] | | | | | | | | |
| 2-L | TX AH TUNNEL BYTE LEFT [31:0] | | | | | | | | |
| 2-H | TX TUNNEL SEQ NUMBER [31:0] | | | | | | | | |
| 3-L | TX TUNNEL SEQ NUMBER [63:32] | | | | | | | | |
| 3-H | TX SOURCE IP ADDRESS [31:0] | | | | | | | | |
| 4-L | TX AH TUNNEL EXPIRY TIMESTAMP [31:0] | | | | | | | | |
| 4-H | TX AH TUNNEL AUTHORIZATION KEY [31:0] | | | | | | | | |
| 5-L | TX AH TUNNEL AUTHORIZATION KEY [63:32] | | | | | | | | |
| 5-H | TX AH TUNNEL AUTHORIZATION KEY [95:64] | | | | | | | | |
| 6-L | TX AH TUNNEL AUTHORIZATION KEY [127:96] | | | | | | | | |
| 6-H | TX AH TUNNEL AUTHORIZATION KEY [159:128] | | | | | | | | |
| 7-L | | | | | | | | | |
| 7-H | | | | | | | | | |

FIG. 58

| | 31 | 28 | 24 | 20 | 16 | 12 | 8 | 4 | 0 |
|---|---|---|---|---|---|---|---|---|---|
| 0-L | LINK TO TRANSPORT ESP-2 SA [15:0] | | | | LV | XA_ALG | XA | SA VERSION | SA TYPE | XV |
| 0-H | XSV | XBV | XTV | | | | | | |
| 1-L | TX DESTINATION IP ADDRESS [31:0] | | | | | | | | |
| 1-H | TX ESP TUNNEL SPI NUMBER [31:0] | | | | | | | | |
| 2-L | TX ESP TUNNEL BYTE LEFT [31:0] | | | | | | | | |
| 2-H | TX ESP TUNNEL SEQ NUMBER [31:0] | | | | | | | | |
| 3-L | TX ESP TUNNEL SEQ NUMBER [63:32] | | | | | | | | |
| 3-H | TX SOURCE IP ADDRESS [31:0] | | | | | | | | |
| 4-L | TX ESP TUNNEL EXPIRY TIMESTAMP [31:0] | | | | | | | | |
| 4-H | TX ESP TUNNEL AUTHORIZATION KEY [31:0] | | | | | | | | |
| 5-L | TX ESP TUNNEL AUTHORIZATION KEY [63:32] | | | | | | | | |
| 5-H | TX ESP TUNNEL AUTHORIZATION KEY [95:64] | | | | | | | | |
| 6-L | TX ESP TUNNEL AUTHORIZATION KEY [127:96] | | | | | | | | |
| 6-H | TX ESP TUNNEL AUTHORIZATION KEY [159:128] | | | | | | | | |
| 7-L | | | | | | | | | |
| 7-H | | | | | | | | | |

*FIG. 59*

| 31 | 28 | | | 24 | 20 | 16 | 12 | 8 | 4 | 0 | |
|---|---|---|---|---|---|---|---|---|---|---|---|
| | | X SV | X BV | X TV | LINK TO TRANSPORT ESP-2 SA [15:0] | LV | XA_ALG | XA | SA VERSION | SA TYPE | XV | 0-L<br>0-H |
| TX ESP TRANSPORT SPI NUMBER [31:0] ||||||||||| 1-L<br>1-H |
| TX ESP TRANSPORT BYTE LEFT [31:0] ||||||||||| 2-L<br>2-H |
| TX ESP TRANSPORT SEQ NUMBER [31:0] ||||||||||| 3-L<br>3-H |
| TX ESP TRANSPORT SEQ NUMBER [63:32] ||||||||||| 4-L<br>4-H |
| TX ESP TRANSPORT TIMESTOP [31:0] ||||||||||| 5-L<br>5-H |
| TX ESP TRANSPORT AUTHORIZATION KEY [31:0] ||||||||||| |
| TX ESP TRANSPORT AUTHORIZATION KEY [63:32] ||||||||||| |
| TX ESP TRANSPORT AUTHORIZATION KEY [95:64] ||||||||||| |
| TX ESP TRANSPORT AUTHORIZATION KEY [127:96] ||||||||||| |
| TX ESP TRANSPORT AUTHORIZATION KEY [159:128] ||||||||||| 7-L<br>7-H |

*FIG. 60*

| 31 | 28 | 24 | 20 | 16 | 12 | 8 | 4 | 0 | |
|---|---|---|---|---|---|---|---|---|---|
| | | | | | XE_ALG | XE | SA VERSION | SA TYPE | XV | 0-L |
| | | | | LV | TX ESP TRANSPORT ENCRYPTION KEY [31:0] | | | | 0-H |
| | | | | | TX ESP TRANSPORT ENCRYPTION KEY [63:32] | | | | 1-L |
| | | | | | TX ESP TRANSPORT ENCRYPTION KEY [95:64] | | | | 1-H |
| | | | | | TX ESP TRANSPORT ENCRYPTION KEY [127:96] | | | | 2-L |
| | | | | | TX ESP TRANSPORT ENCRYPTION KEY [159:128] | | | | 2-H |
| | | | | | TX ESP TRANSPORT ENCRYPTION KEY [191:160] | | | | 3-L |
| | | | | | | | | | 3-H |
| | | | | | | | | | 4-L |
| | | | | | | | | | 4-H |
| | | | | | | | | | 5-L |
| | | | | | | | | | 5-H |
| | | | | | | | | | 6-L |
| | | | | | | | | | 6-H |
| | | | | | | | | | 7-L |
| | | | | | | | | | 7-H |

| | 0 | 4 | 8 | 12 | 16 | 20 | 24 | 28 | 31 |
|---|---|---|---|---|---|---|---|---|---|
| | XV | SA TYPE | SA VERSION | XE | XE_ALG | LV | | | |
| 0-L | TX ESP TUNNEL ENCRYPTION KEY [31:0] | | | | | | | | |
| 0-H | TX ESP TUNNEL ENCRYPTION KEY [63:32] | | | | | | | | |
| 1-L | TX ESP TUNNEL ENCRYPTION KEY [95:64] | | | | | | | | |
| 1-H | TX ESP TUNNEL ENCRYPTION KEY [127:96] | | | | | | | | |
| 2-L | TX ESP TUNNEL ENCRYPTION KEY [159:128] | | | | | | | | |
| 2-H | TX ESP TUNNEL ENCRYPTION KEY [191:160] | | | | | | | | |
| 3-L | | | | | | | | | |
| 3-H | | | | | | | | | |
| 4-L | | | | | | | | | |
| 4-H | | | | | | | | | |
| 5-L | | | | | | | | | |
| 5-H | | | | | | | | | |
| 6-L | | | | | | | | | |
| 6-H | | | | | | | | | |
| 7-L | | | | | | | | | |
| 7-H | | | | | | | | | |

*FIG. 63*

| | 31 | | | | | 24 | | 20 | 16 | | 12 | 8 | 4 | | 0 |
|---|---|---|---|---|---|---|---|---|---|---|---|---|---|---|---|
| 0-L | R AR | R SV | R BV | R TV | R DC | R SC | R TR | | | LV | RA_ALG | RA | SA VERSION | SA TYPE | RV |
| 0-H | | | | | | | | | | | | | | | |
| 1-L | SA HASH [31:0] | | | | | | | | | | | | | | |
| 1-H | RX AH SPI NUMBER [31:0] | | | | | | | | | | | | | | |
| 2-L | RX AH BYTES LEFT [31:0] | | | | | | | | | | | | | | |
| 2-H | RX AH SEQ NUMBER [31:0] | | | | | | | | | | | | | | |
| 3-L | RX AH SEQUENCE BITMAP [31:0] | | | | | | | | | | | | | | |
| 3-H | RX AH SEQUENCE BITMAP [63:32] | | | | | | | | | | | | | | |
| 4-L | RX AH EXPIRY TIMESTAMP [31:0] | | | | | | | | | | | | | | |
| 4-H | RX AH AUTHORIZATION KEY [31:0] | | | | | | | | | | | | | | |
| 5-L | RX AH AUTHORIZATION KEY [63:32] | | | | | | | | | | | | | | |
| 5-H | RX AH AUTHORIZATION KEY [95:64] | | | | | | | | | | | | | | |
| 6-L | RX AH AUTHORIZATION KEY [127:96] | | | | | | | | | | | | | | |
| 6-H | RX AH AUTHORIZATION KEY [159:128] | | | | | | | | | | | | | | |
| 7-L | | | | | | | | | | | | | | | |
| 7-H | DESTINATION IP ADDRESS [31:0] | | | | | | | | | | | | | | |

FIG. 64

| 31 | | | | 28 | | 24 | 20 | 16 | 12 | 8 | 4 | 0 |
|---|---|---|---|---|---|---|---|---|---|---|---|---|
| | R AR | R SV | R BV | R TV | R DC | R SC | R TR | LINK TO RX ESP-2 SA [15:0] | LV | RA_ALG | XE | SA VERSION | SA TYPE | RV | 0-L / 0-H
| SA HASH [31:0] ||||||||||||| 1-L
| RX ESP SPI NUMBER [31:0] ||||||||||||| 1-H
| RX ESP BYTES LEFT [31:0] ||||||||||||| 2-L
| RX ESP SEQ NUMBER [31:0] ||||||||||||| 2-H
| RX ESP SEQUENCE BITMAP [31:0] ||||||||||||| 3-L
| RX ESP SEQUENCE BITMAP [63:32] ||||||||||||| 3-H
| RX ESP EXPIRY TIMESTAMP [31:0] ||||||||||||| 4-L
| RX ESP ENCRYPTION KEY [31:0] ||||||||||||| 4-H
| RX ESP ENCRYPTION KEY [63:32] ||||||||||||| 5-L
| RX ESP ENCRYPTION KEY [95:64] ||||||||||||| 5-H
| RX ESP ENCRYPTION KEY [127:96] ||||||||||||| 6-L
| RX ESP ENCRYPTION KEY [159:128] ||||||||||||| 6-H
| RX ESP ENCRYPTION KEY [191:160] ||||||||||||| 7-L
| DESTINATION IP ADDRESS [31:0] ||||||||||||| 7-H

*FIG. 65*

GIGABIT ETHERNET ADAPTER SUPPORTING THE ISCSI AND IPSEC PROTOCOLS

CROSS REFERENCE TO RELATED APPLICATIONS

This Application claims benefit of U.S. application Ser. No. 10/131,118 filed on Apr. 23, 2002, and U.S. Provisional Patent Application Ser. No. 60/386,924, filed on Jun. 6, 2002.

BACKGROUND OF THE INVENTION

1. Technical Field

The invention relates to telecommunications. More particularly, the invention relates to a method and apparatus for processing data in connection with communication protocols that are used to send and receive data.

2. Description of the Prior Art

Computer networks necessitate the provision of various communication protocols to transmit and receive data. Typically, a computer network comprises a system of devices such as computers, printers and other computer peripherals, communicatively connected together. Data are transferred between each of these devices through data packets which are communicated through the network using a communication protocol standard. Many different protocol standards are in current use today. Examples of popular protocols are Internet Protocol (IP), Internetwork Packet Exchange (IPX), Sequenced Packet Exchange (SPX), Transmission Control Protocol (TCP), and Point to Point Protocol (PPP). Each network device contains a combination of hardware and software that translates protocols and processes data.

An example is a computer attached to a Local Area Network (LAN) system, wherein a network device uses hardware to handle the Link Layer protocol, and software to handle the Network, Transport, and Communication Protocols and information data handling. The network device normally implements the one Link Layer protocol in hardware, limiting the attached computer to only that particular LAN protocol. The higher protocols, e.g. Network, Transport, and Communication protocols, along with the Data handlers, are implemented as software programs which process the data once they are passed through the network device hardware into system memory. The advantage to this implementation is that it allows a general purpose device such as the computer to be used in many different network setups and support any arbitrary network application that may be needed. The result of this implementation, however, is that the system requires a high processor overhead, a large amount of system memory, complicated configuration setup on the part of the computer user to coordinate the different software protocol and data handlers communicating to the computer's Operating System (O.S.) and computer and network hardware.

This high overhead required in processing time is demonstrated in U.S. Pat. No. 5,485,460 issued to Schrier et al on Jan. 16, 1996, which teaches a method of operating multiple software protocol stacks implementing the same protocol on a device. This type of implementation is used in Disk Operating System (DOS) based machines running Microsoft Windows. During normal operation, once the hardware verifies the transport or link layer protocol, the resulting data packet is sent to a software layer which determines the packets frame format and strips any specific frame headers. The packet is then sent to different protocol stacks where it is evaluated for the specific protocol. However, the packet may be sent to several protocols stacks before it is accepted or rejected. The time lag created by software protocol stacks prevent audio and video transmissions to be processed in real-time; the data must be buffered before playback. It is evident that the amount of processing overhead required to process a protocol is very high and extremely cumbersome and lends itself to applications with a powerful Central Processing Unit (CPU) and a large amount of memory.

Consumer products that do not fit in the traditional models of a network device are entering the market. A few examples of these products are pagers, cellular phones, game machines, smart telephones, and televisions. Most of these products have small footprints, eight-bit controllers, limited memory or require a very limited form factor. Consumer products such as these are simplistic and require low cost and low power consumption. The previously mentioned protocol implementations require too much hardware and processor power to meet these requirements. The complexity of such implementations are difficult to incorporate into consumer products in a cost effective way. If network access can be simplified such that it may be easily manufactured on a low-cost, low-power, and small form-factor device, these products can access network services, such as the Internet.

Communications networks use protocols to transmit and receive data. Typically, a communications network comprises a collection of network devices, also called nodes, such as computers, printers, storage devices, and other computer peripherals, communicatively connected together. Data is transferred between each of these network devices using data packets that are transmitted through the communications network using a protocol. Many different protocols are in current use today. Examples of popular protocols include the Internet Protocol (IP), Internetwork Packet Exchange (IPX) protocol, Sequenced Packet Exchange (SPX) protocol, Transmission Control Protocol (TCP), Point-to-Point Protocol (PPP) and other similar new protocols that are under development. A network device contains a combination of hardware and software that processes protocols and data packets.

In 1978, the International Standards Organization (ISO), a standards setting body, created a network reference model known as the Open System Interconnection (OSI) model. The OSI model includes seven conceptual layers: 1) The Physical (PHY) layer that defines the physical components connecting the network device to the network; 2) The Data Link layer that controls the movement of data in discrete forms known as frames that contain data packets; 3) The Network layer that builds data packets following a specific protocol; 4) The Transport layer that ensures reliable delivery of data packets; 5) The Session layer that allows for two way communications between network devices; 6) The Presentation layer that controls the manner of representing the data and ensures that the data is in correct form; and 7) The Application layer that provides file sharing, message handling, printing and so on. Sometimes the Session and Presentation layers are omitted from this model. For an explanation of how modern communications networks and the Internet relate to the ISO seven-layer model see, for example, chapter 11 of the text "Internetworking with TCP/IP" by Douglas E. Comer (volume 1, fourth edition, ISBN 0201633469) and Chapter 1 of the text "TCP/IP Illustrated" by W. Richard Stevens (volume 1, ISBN 0130183806).

An example of a network device is a computer attached to a Local Area Network (LAN), wherein the network device uses hardware in a host computer to handle the Physical and Data Link layers, and uses software running on the host computer to handle the Network, Transport, Session, Presentation and Application layers. The Network, Transport, Session, and Presentation layers, are implemented using protocol-processing software, also called protocol stacks. The Application layer is implemented using application software that process the data once the data is passed through the network-device hardware and protocol-processing software. The advantage to this software-based protocol processing implementation is that it allows a general-purpose computer to be used in many different types of communications networks and supports any applications that may be needed. The result of this software-based protocol processing implementation, however, is that the overhead of the protocol-processing software, running on the Central Processing Unit (CPU) of the host computer, to process the Network, Transport, Session and Presentation layers is very high. A software-based protocol processing implementation also requires a large amount of memory on the host computer, because data must be copied and moved as the software processes it. The high overhead required by protocol-processing software is demonstrated in U.S. Pat. No. 5,485,460 issued to Schrier et al. on Jan. 16, 1996, which teaches a method of operating multiple software protocol stacks. This type of software-based protocol processing implementation is used, for example, in computers running Microsoft Windows.

During normal operation of a network device, the network-device hardware extracts the data packets that are then sent to the protocol-processing software in the host computer. The protocol-processing software runs on the host computer, and this host computer is not optimized for the tasks to be performed by the protocol-processing software. The combination of protocol-processing software and a general-purpose host computer is not optimized for protocol processing and this leads to performance limitations. Performance limitations in protocol processing, such as the time lag created by the execution of protocol-processing software, is deleterious and may prevent, for example, audio and video transmissions from being processed in real-time or prevent the full speed and capacity of the communications network from being used. It is evident that the amount of host-computer CPU overhead required to process a protocol is very high and extremely cumbersome and requires the use of the CPU and a large amount of memory in the host computer.

New consumer and industrial products that do not fit in the traditional models of a network device are entering the market and, at the same time, network speed continues to increase. Examples of these consumer products include Internet-enabled cell phones, Internet-enabled TVs, and Internet appliances. Examples of industrial products include network interface cards (NICs), Internet routers, Internet switches, and Internet storage servers. Software-based protocol processing implementations are too inefficient to meet the requirements of these new consumer and industrial products. Software-based protocol processing implementations are difficult to incorporate into consumer products in a cost effective way because of their complexity. Software-based protocol processing implementations are difficult to implement in high-speed industrial products because of the processing power required. If protocol processing can be simplified and optimized such that it may be easily manufactured on a low-cost, low-power, high-performance, integrated, and small form-factor device, these consumer and industrial products can read and write data on any communications network, such as the Internet.

A hardware-based, as opposed to software-based, protocol processing implementation, an Internet tuner, is described in J. Minami; R. Koyama; M. Johnson; M. Shinohara; T. Poff; D. Burkes; *Multiple network protocol encoder/decoder and data processor*, U.S. Pat. No. 6,034,963 (Mar. 7, 2000) (the '963 patent). This Internet tuner provides a core technology for processing protocols.

It would be advantageous to provide a gigabit Ethernet adapter that provides a hardware solution to high network communication speeds. It would further be advantageous to provide a gigabit Ethernet adapter that adapts to multiple communication protocols.

SUMMARY OF THE INVENTION

The invention is embodied in a gigabit Ethernet adapter. A system according to the invention provides a compact hardware solution to handling high network communication speeds. In addition, the invention adapts to multiple communication protocols via a modular construction and design. A presently preferred embodiment of the invention provides an integrated network adapter for decoding and encoding network protocols and processing data. The network adapter comprises a hardwired data path for processing streaming data; a hardwired data path for receiving and transmitting packets and for encoding and decoding packets; a plurality of parallel, hardwired protocol state machines; wherein each protocol state machine is optimized for a specific network protocol; and wherein said protocol state machines execute in parallel; and means for scheduling shared resources based on traffic.

BRIEF DESCRIPTION OF THE DRAWINGS

FIG. 30 shows a format of an option according to the invention;

FIG. 31 shows a format of another option according to the invention;

FIG. 32 shows a format of another option according to the invention;

FIGS. 33 and 34 show formats of further options according to the invention;

FIG. 39 is an M1 memory map according to the invention;

FIG. 46 default settings according to the invention;

FIG. 57 shows TX AH Transport SA Block Format according to the invention;

FIG. 58 shows TX ESP-1 Transport SA Block Format according to the invention;

FIG. 59 shows TX ESP-2 Transport SA Block Format according to the invention;

FIG. 60 shows TX AH Tunnel SA Block Format according to the invention;

FIG. 61 shows TX AH Tunnel SA Block Format according to the invention;

FIG. 62 shows TX ESP-2 Tunnel SA Block Format according to the invention;

FIG. 63 shows RX AH SA Block Format according to the invention;

FIG. 64 shows RX ESP-1 SA Block Format according to the invention;

FIG. 65 shows RX ESP-2 SA Block Format according to the invention;

DETAILED DESCRIPTION OF THE INVENTION

Figure 1:
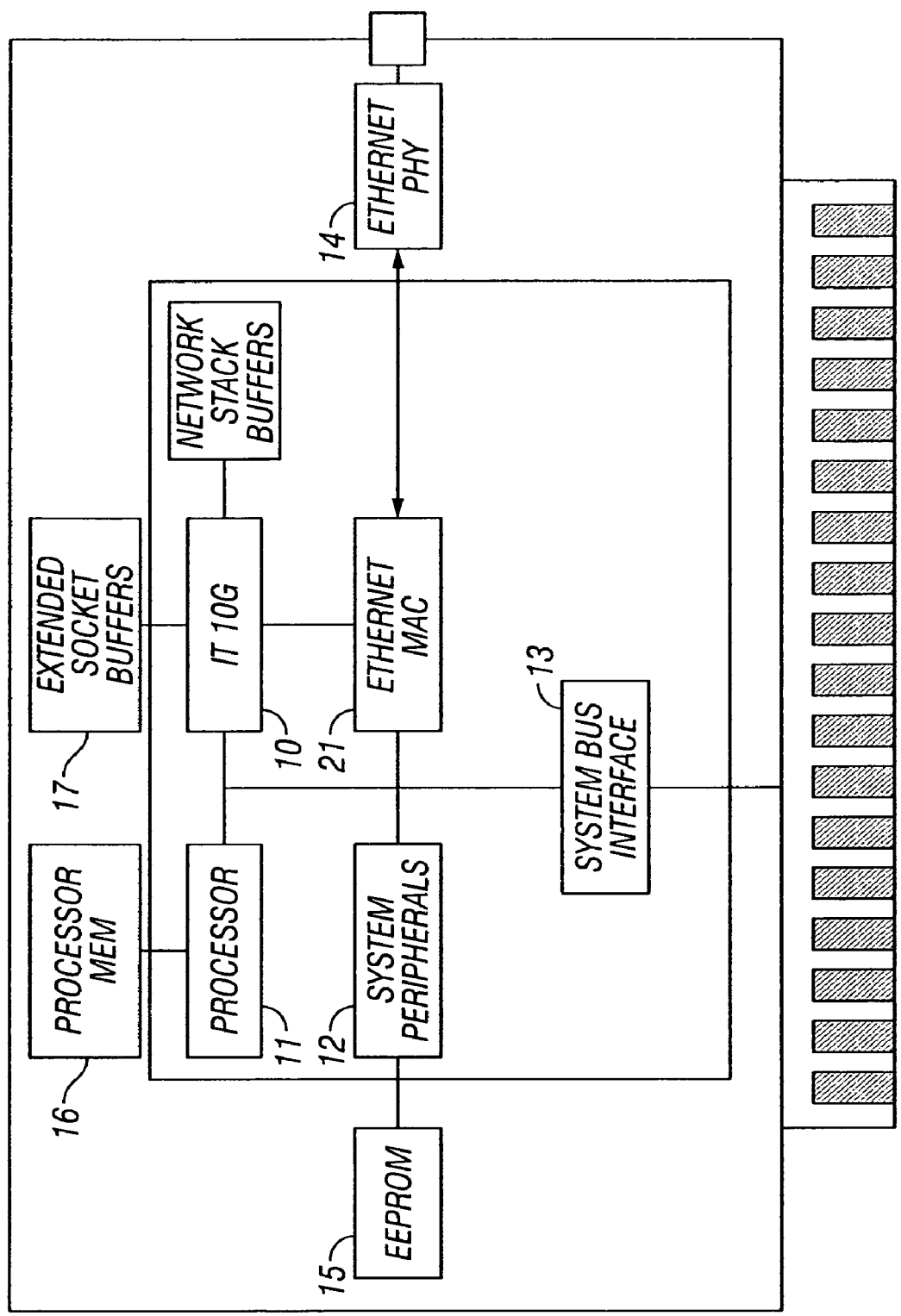
FIG. 1 is a block schematic diagram of a NIC Card Implementation according to the invention.

The invention is embodied in a gigabit Ethernet adapter. A system according to the invention provides a compact hardware solution to handling high network communication speeds. In addition, the invention adapts to multiple communication protocols via a modular construction and design.

Introduction

General Description

The invention comprises an architecture to be used in a high-speed hardware network stack (hereafter referred to as the IT10G). The description herein defines the data paths and flows, registers, theory of applications, and timings. Combined with other system blocks, the IT10G provides the core for line speed TCP/IP processing.

Definitions

As used herein, the following terms shall have the corresponding meaning:10 Gbps 10 Gigabit (10,000,000,000 bits per second)

ACK Acknowledgment
AH Authentication Header
AHS Additional Header Segment
ARP Address Resolution Protocol
BHS Basic Header Segment
CB Control Block
CPU Central Processing Unit
CRC Cyclic Redundancy Check
DAV Data Available
DDR Double Data Rate
DIX Digital Intel Xerox
DMA Direct Memory Access
DOS Denial of Service
DRAMDynamic RAM
EEPROM Electrically Erasable PROM
ESP Encapsulating Security Payload
FCIP Fiber Channel over IP
FIFO First-In First-Out FIM Fixed Interval Marker
FIN Finish
Gb Gigabit (1,000,000,000 bits per second)
HDMA Host DMA
HO Half Open
HR Host Retransmit
HSU Header Storage Unit
IB Instruction Block
ICMP Internet Control Message Protocol
ID Identification
IGMP Internet Group Management Protocol
IP Internet Protocol
IPsec IP Security
IPX Internet Packet Exchange
IQ Instruction Block Queue
iSCSI Internet Small Computer System Interface
ISN Initial Sequence Number
LAN Local Area Network
LDMA Local DMA
LIP Local IP Address
LL Linked List
LP Local Port
LSB Least-Significant Byte
LUT Look-Up Table
MAC Media Access Controller
MCB CB Memory
MDL Memory Descriptor List
MIB Management Information Base
MII Media Independent Interface
MPLS Multiprotocol Label Switching
MRX Receive Memory
MSB Most-Significant Bit
MSS Maximum Segment Size
MTU Maximum Transmission Unit
MTX TX Memory
NAT Network Address Translation
NIC Network Interface Card
NS Network Stack
OR OR Logic Function
PDU Protocol Data Unit
PIP Peer IP Address
PP Peer Port
PROM Programmable ROM
PSH Push
PV Pointer Valid
QoS Quality of Service
RAM Random Access Memory
RARP Reverse Address Resolution Protocol
Rcv Receive
RDMA Remote DMA
ROM Read-Only Memory
RST Reset
RT Round Trip
RTO Retransmission Timeout
RTT Round-Trip Time
RX Receive
SA Security Association
SB Status Blocks
SEQ Sequence
SM Status Message
SNMP Simple Network Management Protocol
SPI Security Parameter Index
Stagen Status Generator
SYN Synchronization
TCP Transport Control Protocol
TOE Transport Offload Engine
TOS Type of Service
TTL Time to Live
TW Time Wait
TX Transmit
UDP User Datagram Protocol
URG Urgent
VLAN Virtual LAN
VSOCK Virtual Socket
WS Window Scaling
XMTCTL Transmit Control
XOR Exclusive-OR Application Overview Overview As bandwidth continues to increase, the ability to process TCP/IP communications becomes more of an overhead for system processors. Many sources state that as Ethernet rates reach the gigabit per second (Gbps) rate, that TCP/IP protocol processing will consume close to 100% of the host computer's CPU bandwidth, and when the rates increase further to 10 Gbps, that the entire TCP/IP protocol processing must be off-loaded to dedicated sub-systems. The herein described IT10G implements TCP and IP, along with related protocols including, for example, ARP, RARP, and IP host routing, as a series of state machines. The IT 10G core forms an accelerator or engine, also known as a Transport Offload Engine (TOE). The IT10G core uses no processor or software, although hooks are provided so that a connected on-chip processor can handle be used to extend the features of the network stack.

Sample Applications

An example usage of the IT10G core is an Intelligent Network Interface Card (NIC). In a typical application, the NIC is plugged into a computer server and natively processes TCP/UDP/IP packets.

FIG. 1 is a block schematic diagram of a NIC Implementation of the invention. In FIG. 1, the IT 10G core 10 is combined with a processor 11, system peripherals 12, and a system bus interface 13 into a single-chip NIC controller. The single-chip NIC controller is integrated with an Ethernet PHY 14, combined with a configuration EEPROM 15, and optional external memory for the network stack to form a low chip count NIC. The processor memory 16 (both ROM and RAM) may be internal to the integrated chip or reside externally. Another usage for the IT 10G is to function as the interface for network attached devices, such as storage units, printers, cameras, and so forth. In these cases, a custom application socket (or interface) 17 can be designed into the IT 10G to process layer 6 and 7 protocols and to facilitate data movement specific for that application. Examples include custom data paths for streaming media, bulk data movements, and protocols such as iSCSI and FCIP.

Figure 2:
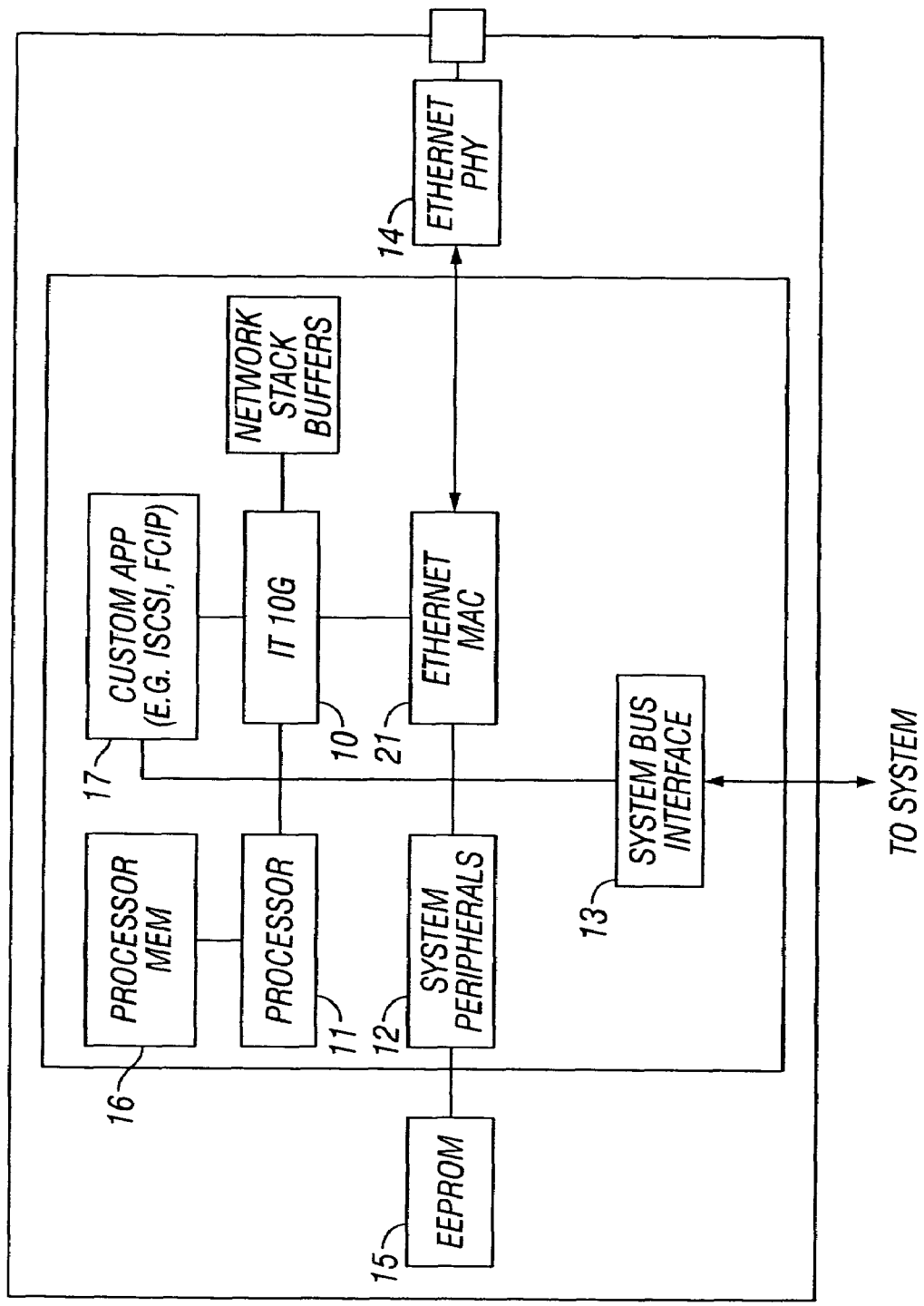
FIG. 2 is a block schematic diagram of an Interface for Network Attached Device according to the invention.

FIG. 2 is a block schematic diagram of an Interface for Network Attached Device according to the invention. Although the IT 10G is designed to support line speed processing at 10 Gbps rates, the same architecture and logic may also be used at lower speeds. In these cases, the only difference is in the Ethernet MAC 21 and PHY 14. Advantages of using this architecture at slower line speeds include lower power consumption, for example.

The Challenge

The challenge for high-speed bandwidths is in processing TCP/IP packets at wire line speeds. This is shown in the following table.

TABLE 1

Processing Power Requirements

| Rate | Bytes/sec | Packets/sec[1] | Instr/sec[2] |
|---|---|---|---|
| 10 Mbps | 1,000,000 | 2,000 | 2 MIPs |
| 100 Mbps | 10,000,000 | 20,000 | 20 MIPs |
| 1 Gbps | 100,000,000 | 200,000 | 200 MIPs |
| 10 Gbps | 1,000,000,000 | 2,000,000 | 2 GIPs |

Notes:
[1]This assumes an average packet size of 500 bytes
[2]This assumes 500 instruction overhead per packet and 1 instruction per byte The figures in the above table are very conservative, and do not take into account, for example, the full duplex nature of networking. If full-duplex operation is factored in, then the processing power requirements can easily double. In any case, it is apparent that starting at the gigabit level, the processing overhead of TCP/IP becomes a major drain on host computer processing power and that another solution is needed.

Bandwidth Limitation

The IT10G addresses the limitation of host computer processing power by various architecture implementations. These include the following features:

- On the fly (streaming) processing of incoming and outgoing data
- Ultra wide datapaths (64 bits in the current implementation)
- Parallel execution of protocol state machines
- Intelligent scheduling of shared resources
- Minimized memory copying

System Overview

Overview

This section describes the top level of the preferred embodiment. It provides a block level description of the system as well as a theory of operation for different data paths and transfer types.

Figure 3:
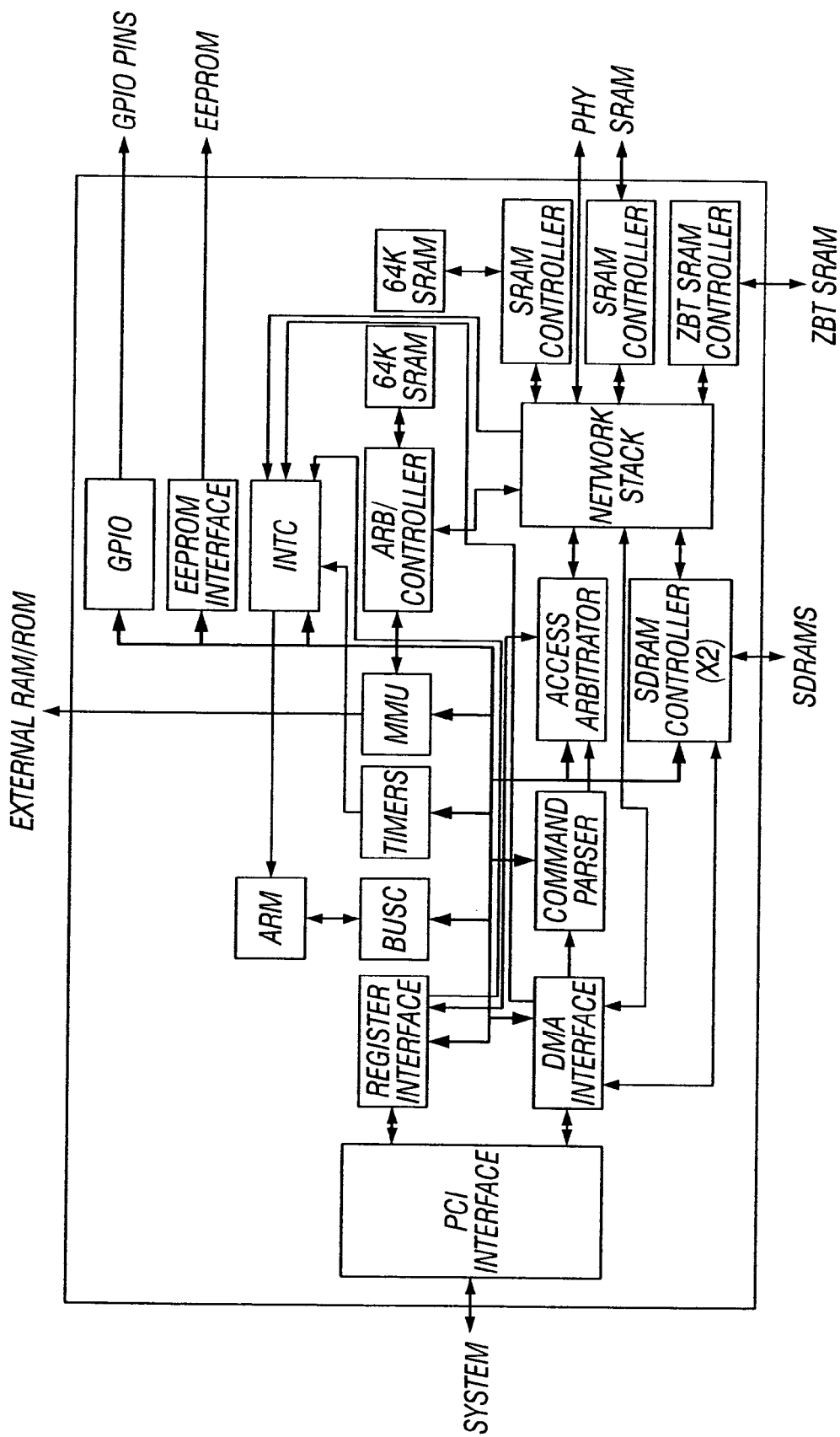
FIG. 3 is a block level diagram of a system according to the invention.

This embodiment of the invention incorporates the IT10G network stack and combines it with a processor core, and system components to provide a complete networking subsystem for different applications. A block level diagram for the system is shown in FIG. 3.

Clock Requirements

The presently preferred embodiment of the invention is a chip that is designed to operate with different clock domains. The following table lists all clock domains for both 1 Gbps and 10 Gbps operations.

TABLE 2

Clock Domains

| Domain | Symbol | 1 Gb (Mhz) | 10 Gb (MHz) | Notes |
|---|---|---|---|---|
| MAC | $CLK_{MAC}$ | 125 | 125 | |
| System Clock | $CLK_{CORE}$ | 20 | 200 | This clock serves the network stack and the on-chip processor core |
| System Interface | $CLK_{SYS}$ | 66/133 | 133 | PCI 64/66 or PCI-X 133 is used for 1 Gbps. PCI-Express is used for 10 Gbps. |

Protocol Processor

Overview

This section provides an overview of the internal Protocol processor.

Processor Core

The herein described chip uses an internal (or on-chip) processor for programmability and flexibility. This processor is also furnished with all the peripherals needed to complete a working system. Under normal operating conditions, the on-chip processor controls the network stack.

Memory Architecture

The on-chip processor has the capability to address up to 4 GBytes of memory. Within this address space are located all of its peripherals, its RAM, ROM, and the network stack.

Network Stack Architecture

Overview

Figure 4:
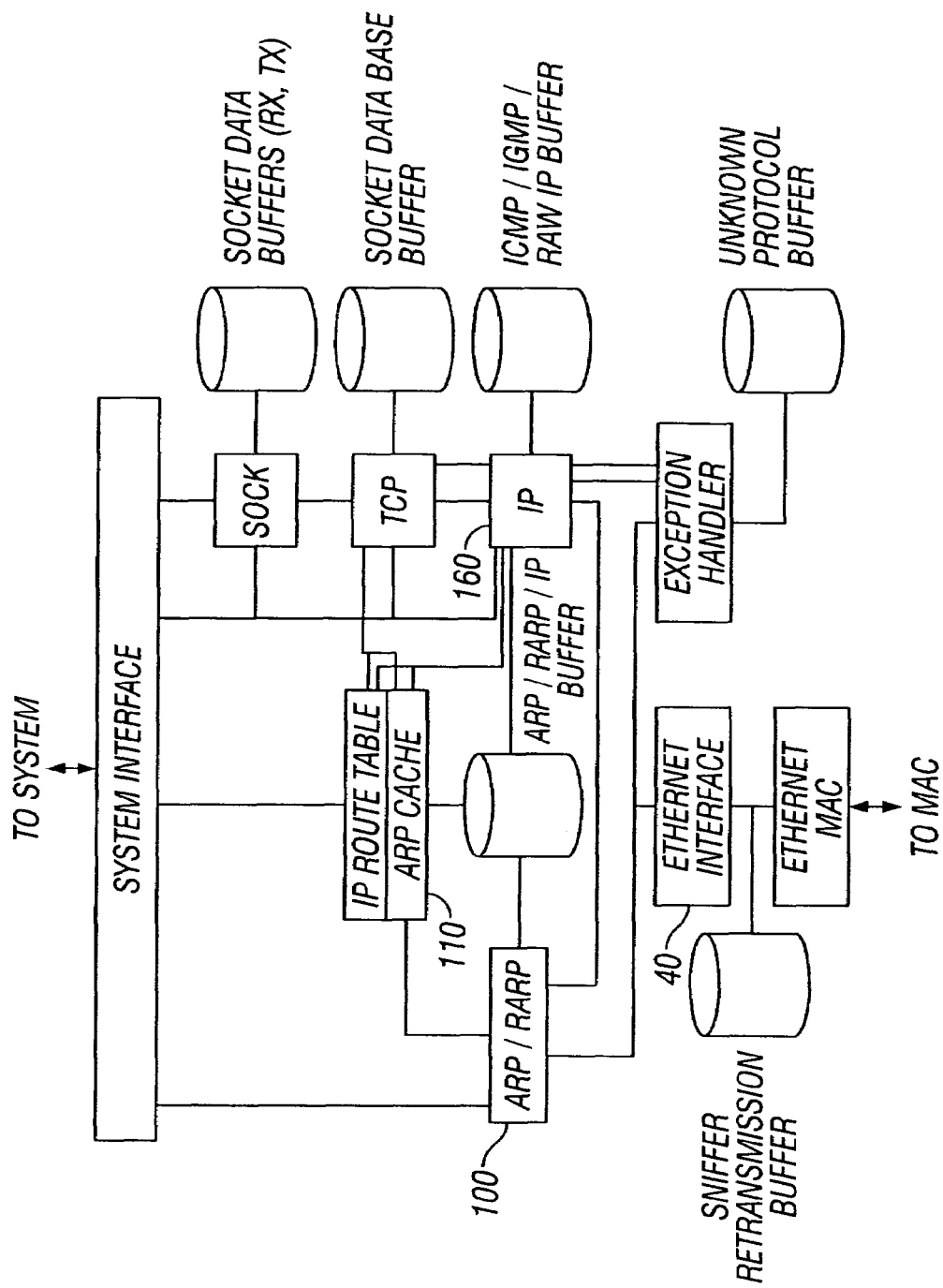
FIG. 4 is a high level block diagram for a gigabit Ethernet adapter according to the invention.

This section overviews the IT 10G architecture. Subsequent sections herein go into detail on individual modules. The IT10G takes the hardware protocol processing function of a network stack, and adds enhancements that enable it to scale up to 10 Gbps rates. The major additions to previous versions are widening of the data paths, parallel execution of state machines, and intelligent scheduling of shared resources. In addition, other protocols previously not supported are added with support for protocols such as RARP, ICMP, and IGMP. FIG. 4 is a high level block diagram for the IT 10G.

Theory of Operation

TCP/UDP Socket Initialization

Prior to transferring any data using the IT 10G, a socket connection must be initialized. This can be done either by using commands blocks or by programming up the TCP socket registers directly. Properties that must be programmed for every socket include the Destination IP address, Destination Port number, and type of connection (TCP or UDP, Server or Client, for example). Optional parameters include such settings as a QoS level, Source Port, TTL, and TOS setting. Once these parameters have been entered, the socket may be activated. In the case of UDP sockets, data can start to be transmitted or received immediately. For TCP clients, a socket connection must first be established, and for TCP servers a SYN packet must be received from a client, and then a socket connection established. All these operations may be performed completely by the IT 10G hardware.

Transmission of Packets

When TCP packets need to be transmitted, the application running on the host computer first writes the data to a socket (either a fixed socket or virtual socket—virtual sockets are supported by the IT 10G architecture). If the current send buffer is empty, then a partial running checksum is kept as the data is being written to memory. The partial checksum is used as the starting seed for checksum calculations, and alleviates the need for the TCP layers in the IT 10G network stack to read through the data again prior to sending data out. Data can be written to the socket buffer in either 32-bit or 64-bit chunks. Up to four valid_byte signals are used to indicate which bytes are valid. Data should be packed when writing to the socket buffers, with only the last word having possible invalid bytes. This stage also applies to UDP packets for which there is an option of not calculating the data checksum.

Once all the data has been written, the SEND command can be issued by the application running on the host computer. At this point, the TCP/UDP engine calculates the packet length, checksums and builds the TCP/IP header. This TCP/IP header is pre-pended to the socket data section. The buffer pointer for the packet, along with the sockets QoS level is then put on the transmission queue.

The transmission scheduler looks at all sockets that have pending packets and selects the packet with the highest QoS level. This transmission scheduler looks at all types of packets that need transmission. These packets may include TCP, UDP, ICMP, ARP, RARP, and raw packets, for example. A minimum-bandwidth algorithm is used to make sure that no socket is completely starved. When a socket packet is selected for transmission, the socket buffer pointer is passed to the MAC TX Interface. The MAC TX Interface is responsible for reading the data from the socket buffer and sending the data to the MAC. A buffer is used to store the outgoing packet in case it needs to be retransmitted due to Ethernet collisions or for other reasons. Once the packet data is sent from the original socket buffer, then that data buffer is freed. When a valid transmit status is received back from the MAC, the data buffer is flushed, and the next packet can then be sent. If an invalid transmission status is received from the MAC, then the last packet stored in the data buffer is retransmitted.

Reception of Packets

When a packet is received from the MAC, the Ethernet header is parsed to determine if the packet is destined for this network stack. The MAC address filter may be programmed to accept a unicast addresses, unicast addresses that fall within a programmed mask, broadcast addresses, or multicast addresses. In addition, the encapsulating protocol is also determined. If the 16-bit TYPE field in the Ethernet header indicates an ARP (0x0806) or RARP (0x0835) packet, then the ARP/RARP module is enabled to further process the packet. If the TYPE field decodes to IPv4 (0x0800), then the IP module is enabled to process the packet further. A complete list of example supported TYPE fields is shown in the following table. If the TYPE field decodes to any other value, the packet may optionally be routed to a buffer and the host computer notified that an unknown Ethernet packet has been received. In this last case, the application may read the packet, and determine the proper course of action. With this construction of the datapath any protocol not directly supported in hardware, such as IPX for example, may be indirectly supported by the IT10G.

TABLE 3

Supported Ethernet TYPE Field Values

| TYPE Field | Description |
| --- | --- |
| 0x0800 | IPv4 Packet |
| 0x0806 | ARP Packet |
| 0x8035 | RARP Packet |
| 0x8100 | VLAN Tagged Packets |
| 0x8847 | MPLS Unicast Packets |
| 0x8848 | MPLS Multicast Packets |

Note:
IPv6 packets are handled as exceptions at the Ethernet layer.

ARP/RARP Packets

If the received packet is an ARP or RARP packet, then the ARP/RARP module is enabled. It examines the OP field in the packet and determines if it is a request or a reply. If it is a request, then an outside entity is polling for information. If the address that is being polled is for the IT 10G, then a reply_req is sent to the ARP/RARP reply module. If the packet received is an ARP or RARP reply, then the results, i.e. the MAC and IP addresses, are sent to the ARP/RARP request module.

In an alternative embodiment the ARP and/or RARP functions are handled in the host computer using dedicated and optimized hardware in the IT10G to route ARP/RARP packets to the host via the exception path.

IP Packets

If the received packet is an IP packet, then the IP module is enabled. The IP module first examines the version field in the IP header to determine if the received packet is an IPv4 packet.

The IP module parses the embedded protocol of the received packet. Depending on what protocol is decoded, the received packet is sent to the appropriate module. Protocols supported directly by hardware in the current embodiment include TCP and UDP, for example. Other protocols, such as RDMA, may be supported by other optimized processing modules. All unknown protocols are processed using the exception handler.

TCP Packets

If a TCP packet is received by the IT 10G, then the socket information is parsed, and the corresponding socket enabled. The state information of the socket is retrieved, and based on the type of packet received, the socket state is updated accordingly. The data payload of the packet (if applicable) is stored in the socket data buffer. If an ACK packet needs to be generated, the TCP state module generates the ACK packet and schedules the ACK packet for transmission. If a TCP packet is received that does not correlate to an open socket, then the TCP state module generates a RST packet and the RST packet is scheduled for transmission.

UDP Packets

If a UDP packet is received, then the socket information is parsed, and the data stored in the socket receive data buffer. If no open socket exists, then the UDP packet is silently discarded.

In an alternative embodiment UDP packets may be handled by the host computer using the exception handler.

Network Stack Registers

The hardware network stack of the IT 10G is configured to appear as a peripheral to the on-chip processor. The base address for the network stack is programmed via the on-chip processor's NS_Base_Add register. This architecture allows the on-chip processor to put the network stack at various locations in its memory or I/O space.

Ethernet MAC Interface

Overview

The following discussion describes the Ethernet MAC interface module. The function of the Ethernet MAC interface module is to abstract the Ethernet MAC from the core of the IT10G. This allows the IT 10G network stack core to be coupled to different speed MACs and/or MACs from various sources without changing the IT10G core architecture, for example. This section describes the interface requirements for communication with the IT10G core.

Module I/Os

Figure 5:
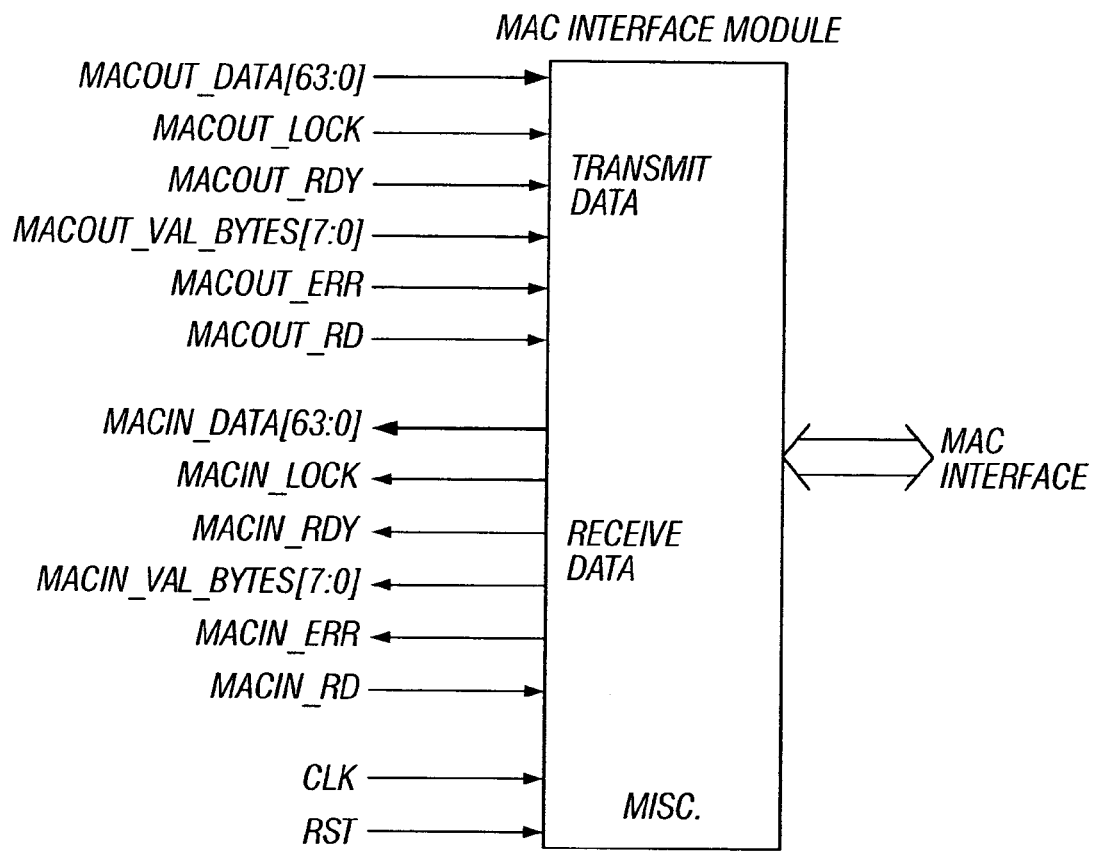
FIG. 5 is a block schematic diagram that depicts the I/Os used in a MAC Interface module according to the invention.

FIG. 5 is a block schematic diagram that depicts the I/Os used in MAC Interface module.

Ethernet Interface

Overview

Figure 6:
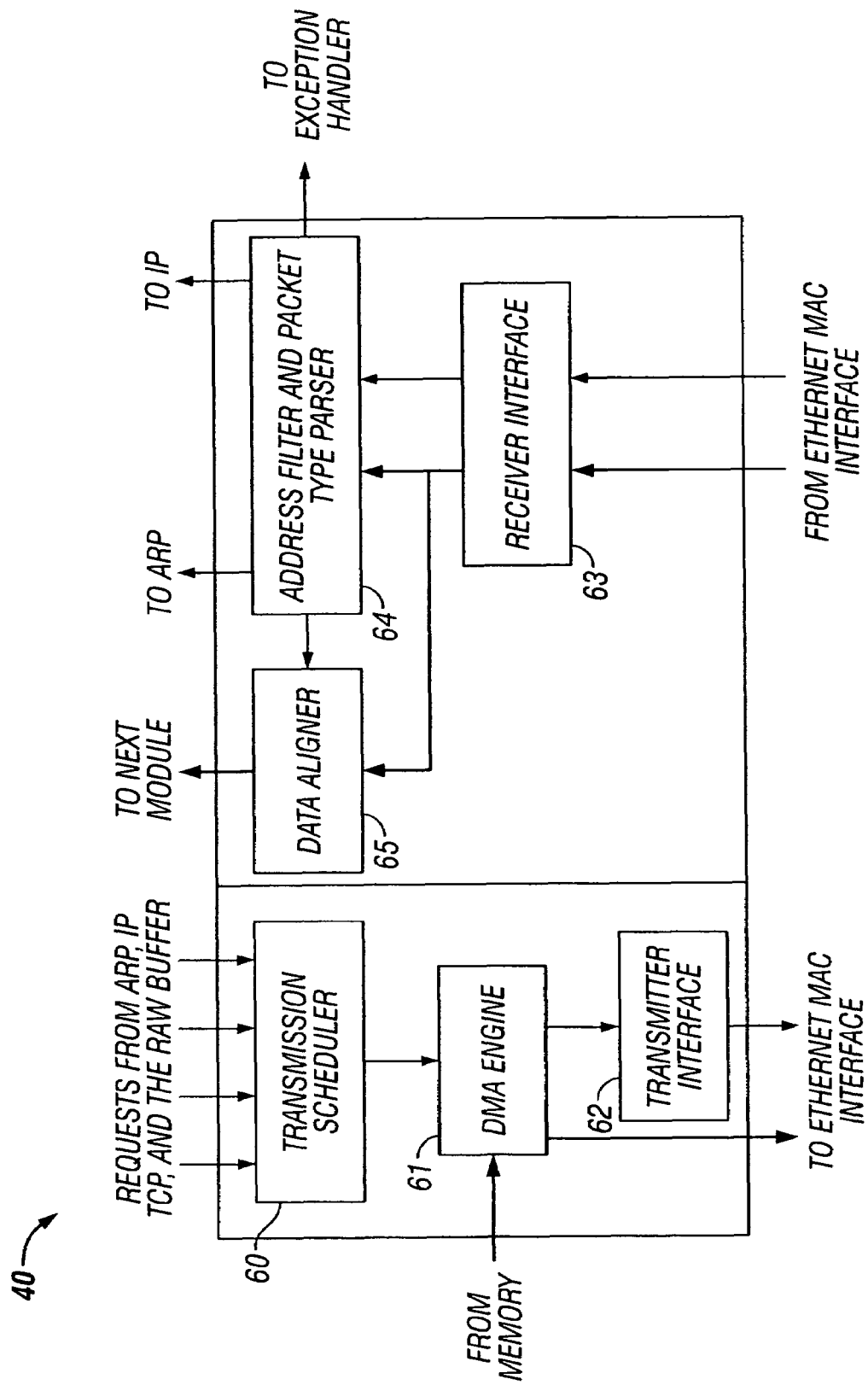
FIG. 6 is a block schematic diagram of an Ethernet Interface according to the invention.

This section describes the Ethernet Interface module. The Ethernet interface module communicates with the Ethernet MAC interface at the lower end, and to blocks such as the ARP, and IP modules on the upper end. The Ethernet interface module handles data for both the receive and transmit paths. On the transmit side, the Ethernet interface module is responsible for scheduling packets for transmission, setting up DMA channels for transmission, and communicating with the Ethernet MAC interface transmit signals. On the receive side, the Ethernet interface module is responsible for parsing the Ethernet header, determining if the packet should be received based upon address filter settings, enabling the next encapsulated protocol based upon the TYPE field in the packet header, and aligning the data so that it starts on a 64-bit boundary for the upper layer protocols. FIG. 6 is a block schematic diagram of the Ethernet Interface 40.

Sub Module Block Descriptions

Transmission Scheduler

The Transmission Scheduler block 60 is responsible for taking transmission requests from the ARP, IP, TCP, and Raw transmission modules, and determining which packet should be sent next. The Transmission Scheduler determines transmission order by comparing QoS levels for each transmission request. Along with the QoS level, each transmission request contains a pointer to the starting memory block for a packet, along with a packet length. The transmission scheduler has the capability to be programmed to weigh the transmission priority of certain packet types more heavily than others. For example, a QoS level of five from the TCP module can be made to count for more than a level five request from the IP module. The Transmission Scheduler allows multiple modules to operate in parallel and shared fashion that depends on transmit data traffic. The following is the algorithm currently used to determine packet scheduling.

Check to see that no packet channel has reached the starved state. This is a programmable level, per channel type, i.e. TCP, IP, ARP, and Raw buffers, that states how many times a channel is passed over before the scheduler over-rides the QoS level and the packet is sent out. If two or more packets have reached the starved state at the same time, then the channel with the higher weighting is given priority. The other packet is then scheduled to be sent next. If the packets have the same priority weighting they are sent out one after the other according to the following order; TCP/UDP then ARP then IP then Raw Ethernet.

If no channel has a packet in the starved state, then the channel with the highest combined QoS level and channel weighting is sent.

If only one channel has a packet to be sent, it is sent immediately.

Once a packet channel has been selected for transmission, the channel memory pointer, packet length, and type are passed to the DMA engine. The DMA engine in turn signals back to the transmission scheduler when the transfer has been completed. At this point the scheduler sends the packet parameters to the DMA engine.

DMA Engine

The DMA Engine 61 receives packet parameters from the transmission scheduler. Packet parameters include packet type, packet length, and starting memory pointer. The DMA engine uses the packet length to determine how many data bytes to transfer from memory. The packet type indicates to the DMA engine from which memory buffer to retrieve the data, and the starting memory pointer indicates from where to start reading data. The DMA engine needs to understand how big each of the memory blocks used in the channel packet is because an outgoing packet may span multiple memory blocks. The DMA engine receives data 64 bits at a time from the memory controllers and passes data 64 bits at a time to the transmitter interface.

Transmitter Interface

The Transmitter Interface 62 takes the output from the DMA engine and generates the macout_lock, macout_rdy, macout_eof, and macout_val_byte signals for the Ethernet MAC interface. The 64 bit macout_data bus connects directly from the DMA Engine to the Ethernet MAC Interface.

Receiver Interface

The Receiver Interface 63 is responsible for interfacing with the Ethernet MAC interface. The Receiver Interface takes data in and presents the data along with state count information to the Address Filter and Packet Type Parser block.

Address Filter and Packet Type Parser

The Address Filter and Packet Type Parser 64 parses the Ethernet header and performs two major functions:

Determine if the packet is for the local network stack

Parse the encapsulated packet type to determine where to send the rest of the packet.

Address Filtering

The network stack can be programmed with the following filter options:

Accept a programmed unicast address

Accept broadcast packets

Accept multicast packets

Accept addresses within a range specified by a netmask

Promiscuous mode (accepts all packets)

These parameters are all settable by the host computer via registers.

Packet Types Supported

The following packet types are known by the IT10G hardware and are natively supported:

IPv4 packets with type=0x8000

ARP packets with type=0x0806

RARP packets with type=0x8035

The packet type parser also handles the case where an 802.3 length parameter is included in the TYPE field. This case is detected when the value is equal to or less then 1500 (decimal). When this condition is detected, the type parser sends the encapsulated packet to both the ARP and IP receive modules, along with asserting an 802_frame signal so that each subsequent module realizes that it must decode the packet with the knowledge that it may not be really meant for that module.

Note: IPv6 packets are treated as exception packets by the Ethernet layer.

Figure 7:
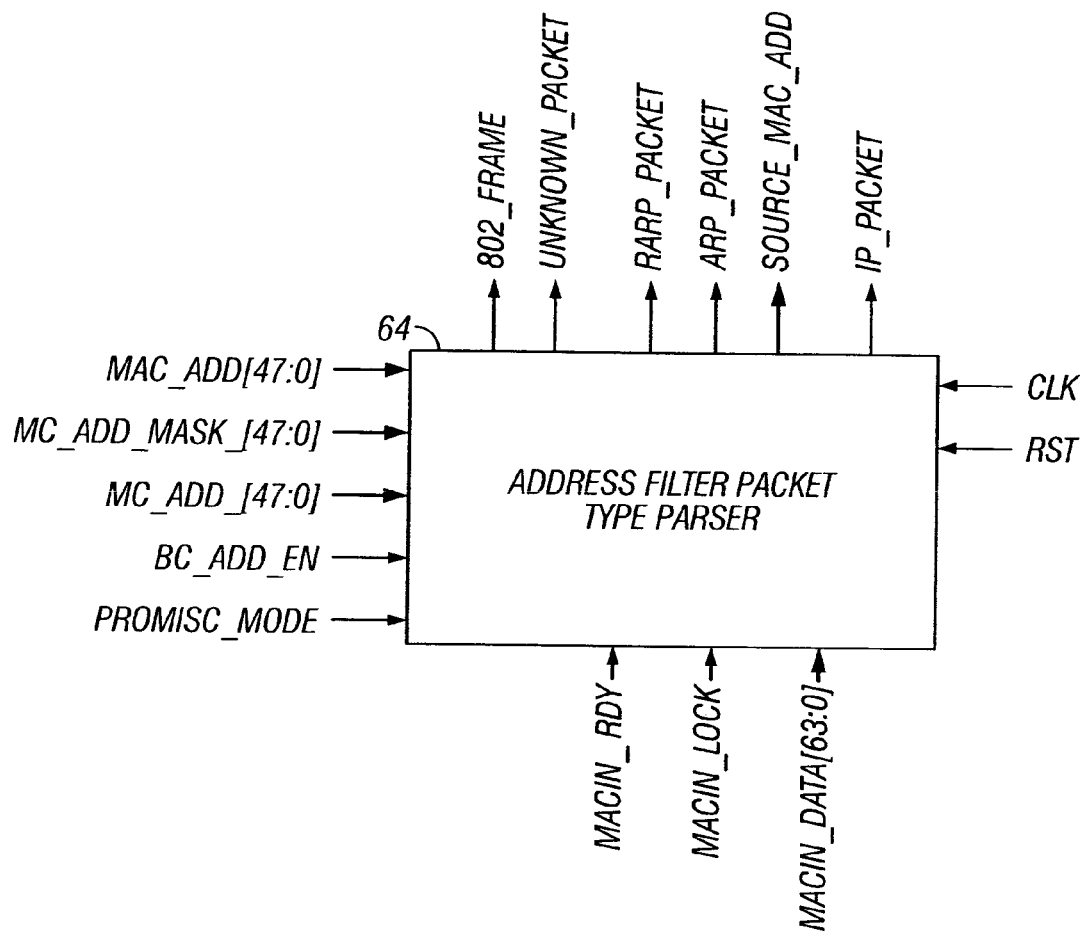
FIG. 7 is a block schematic diagram of an Address Filter and Packet Type Parser module according to the invention.
Figure 8:
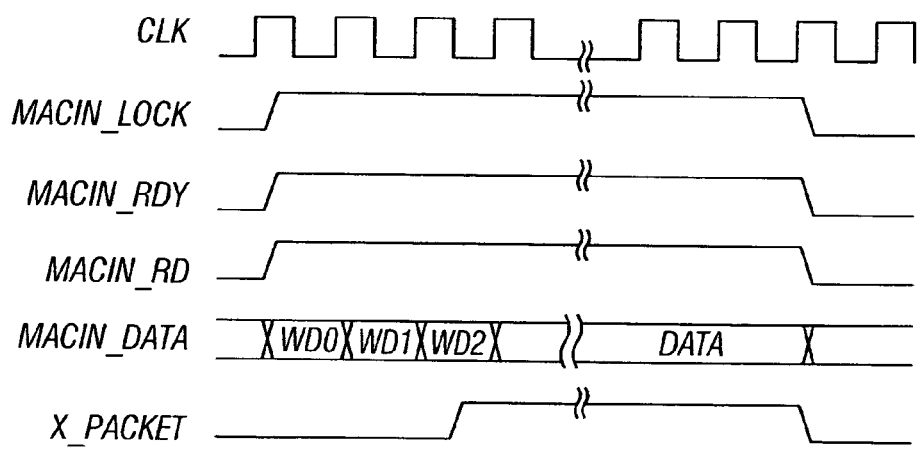
FIG. 8 is a timing diagram that shows Address Filter and Packet Type Parser module operation according to the invention.

FIG. 7 is a block schematic diagram of an Address Filter and Packet Type Parser module, and FIG. 8 is a timing diagram that shows Address Filter and Packet Type Parser module operation. For I/O timing, the signals that indicate the packet types remain asserted until the macin_lock signal that corresponds to that packet has been de-asserted. All_packet signals also only trigger if the destination MAC address is acceptable.

If the Address Filter and Packet Type Parser module parses a packet that it does not understand, and if the unsupported type feature is enabled, then the packet is routed to the Exception Handler for storage and further processing.

Data Aligner

Figure 9:
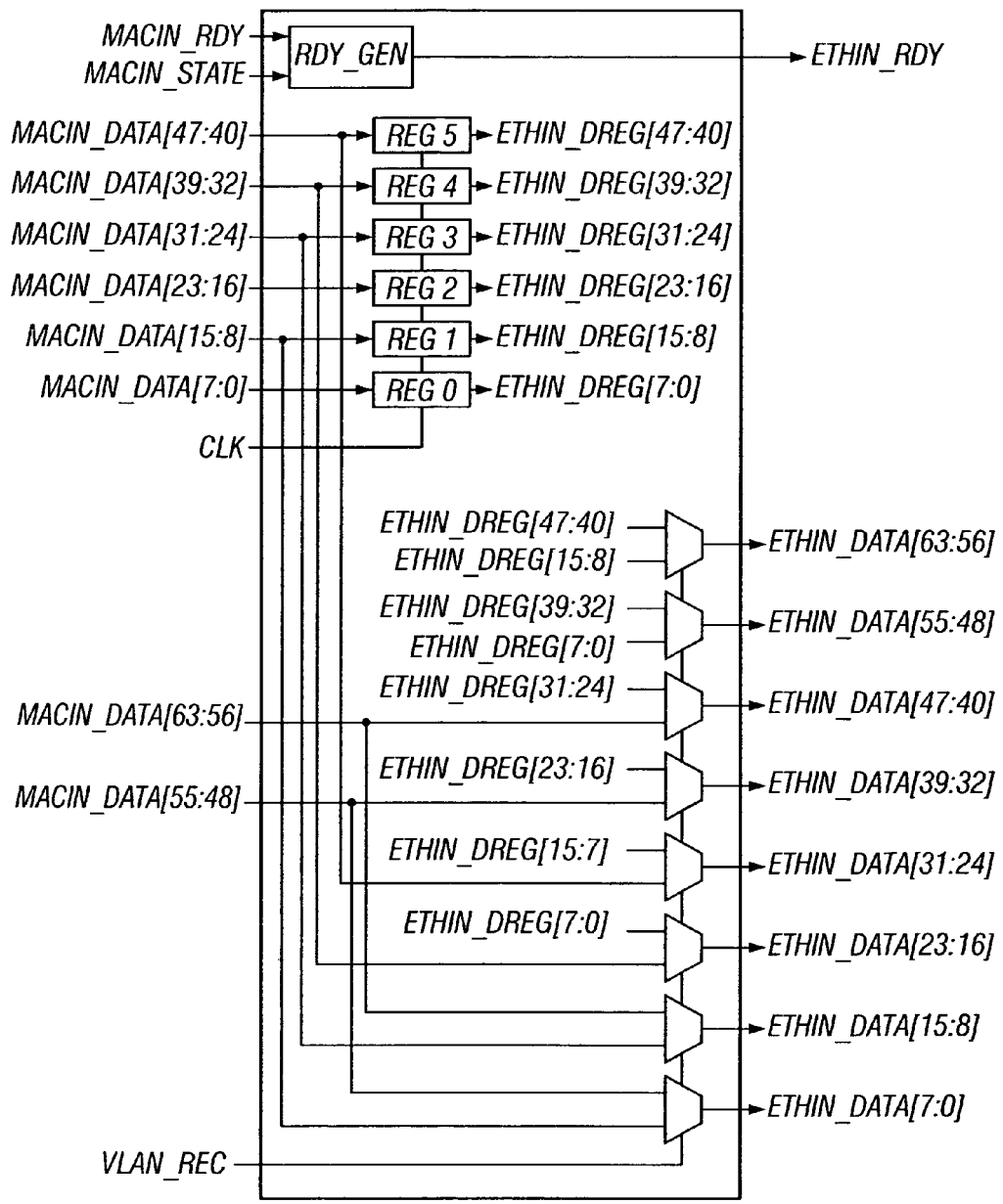
FIG. 9 is a block schematic diagram of a Data Aligner Module according to the invention.

The Data Aligner 65 is responsible for aligning data bytes for the following layers of packet processing. The Data Aligner is needed because the Ethernet header is not an even multiple of 64 bits. Depending on whether VLAN tags are present or not, the data aligner re-orients the 64-bit data so that to the upper processing layers, the data is MSB justified. This way the payload section of the Ethernet frame is always aligned on an even 64-bit boundary. The Data Aligner is also responsible for generating the ready signal to the next layers. The ready signal goes active two or three ready cycles after macin_rdy gets asserted. FIG. 9 is a block schematic diagram of an implementation Data Aligner Module.

Ethernet Packet Formats

The IT10G accepts both 802.3(SNAP) and DIX format packets from the network, but only transmits packets in DIX format. Furthermore, when 802.3 packets are received, they are first translated into DIX format, and then processed by the Ethernet filter. Therefore, all Ethernet exception packets are stored in DIX format.

ARP Protocol and ARP Cache Modules

Overview

The following discussion details the ARP Protocol and ARP Cache modules. In one embodiment of the IT10G architecture, the ARP protocol module also supports the RARP protocol, but does not include the ARP cache itself. Because each module capable of transmitting a packet queries the ARP cache ahead of time, this common resource is separated from this ARP module. The ARP Protocol and ARP Cache module may send updates to the ARP cache based upon packet types received.

ARP Feature List:
Able to respond to ARP requests by generating ARP replies
Able to generate ARP requests in response to the ARP cache
Able to provide ARP replies for multiple IP addresses (multi-homed host/ARP proxy)
Able to generate targeted (unicast) ARP requests
Filters out illegal addresses
Passes aligned ARP data up to the processor
Capable of performing a gratuitous ARP
CPU may bypass automatic ARP reply generation, dumping ARP data into the exception handler
CPU may generate custom ARP replies (when in bypass mode)
Variable priority of ARP packets, depending on network conditions RARP Feature List:
Request an IP address
Request a specific IP address
RARP requests are handed off to the exception handler
Handles irregular RARP replies
Passes aligned RARP data up to the processor
CPU may generate custom RARP requests and replies ARP Cache Features:
Dynamic ARP table size
Automatically updated ARP entry information
Interrupt when sender's hardware address changes
Capable of promiscuous collection of ARP data
Duplicate IP address detection and interrupt generation
ARP request capability via the ARP module
Support for static ARP entries
Option for enabling static ARP entries to be replaced by dynamic ARP data
Support for ARP proxying
Configurable expiration time for ARP entries (The CPU may be either the host computer CPU or the on-chip processor in this context.)

ARP Module Block Diagram

Figure 10:
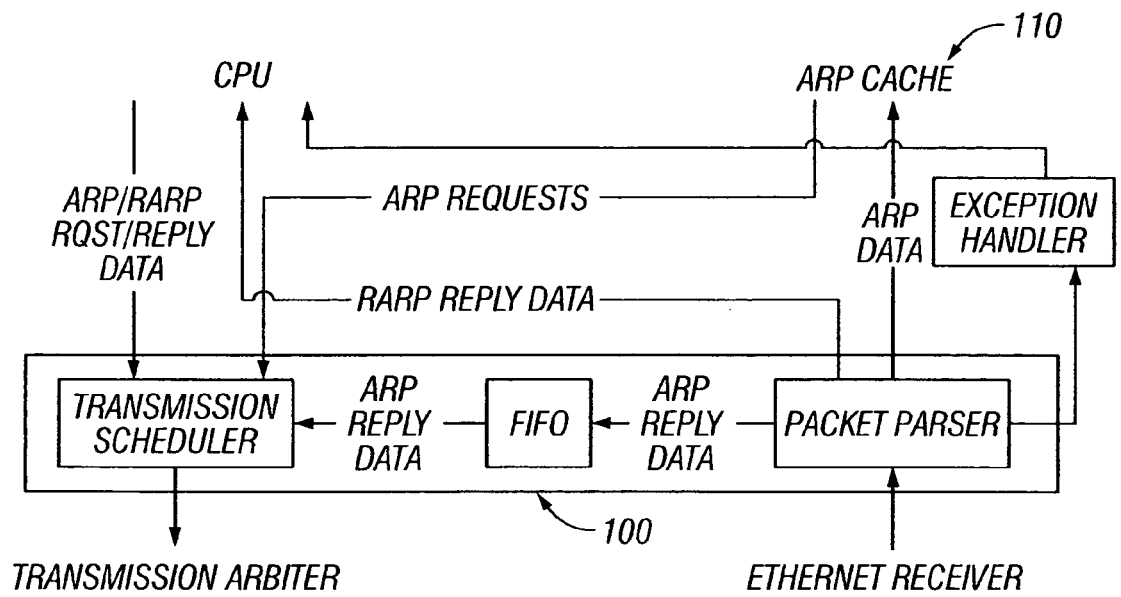
FIG. 10 is a block schematic diagram of an ARP Module according to the invention.

FIG. 10 is a block schematic diagram of one implementation of an ARP Module Block.

ARP Cache Module Block Diagram

Figure 11:
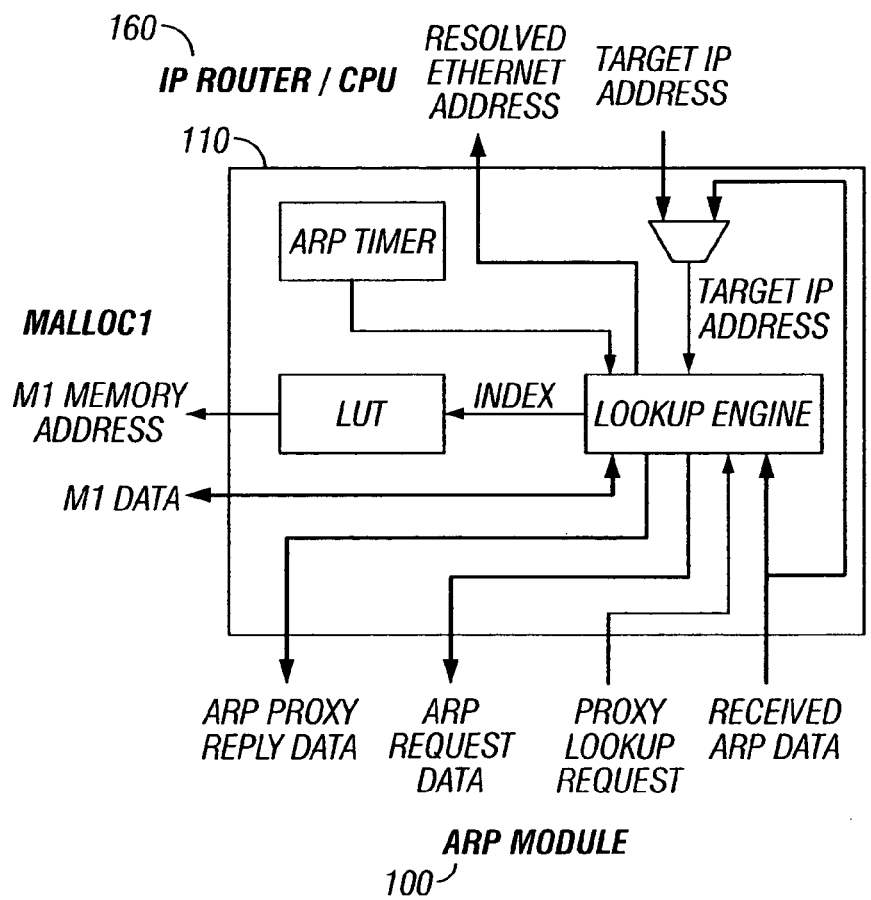
FIG. 11 is a block schematic diagram of an ARP Cache according to the invention.

FIG. 11 is a block schematic diagram of one implementation of an ARP Cache Block.

ARP Module Theory of Operations

Parsing Packets

The ARP module 100 only processes ARP and RARP packets. The module waits for a ready signal received from Ethernet receive module. When that signal is received, the frametype of the incoming Ethernet frame is checked. If the frametype is not ARP/RARP, the packet is ignored. Otherwise, the module begins parsing.

Data is read from the Ethernet interface in 64-bit words. An ARP packet takes up 3.5 words. The first word of an ARP-type packet contains mostly static information. The first 48 bits of the first word of an ARP-type packet contain the Hardware Type, Protocol Type, Hardware Address Length, and Protocol Address Length. These received values are compared with the values expected for ARP requests for IPv4 over Ethernet. If the received values do not match, the data is passed to the exception handler for further processing. Otherwise, the ARP module continues with parsing. The last 16 bits of the first word of an ARP-type packet contain the opcode. The ARP module stores the opcode and checks if it is valid, i.e. 1, 2 or 4. If the opcode is invalid, the data is passed to the exception handler for further processing. Otherwise, the ARP module continues with parsing.

The second word of an ARP-type packet contains the Source Ethernet Address and half of the Source IP Address. The ARP module stores the first 48 bits into the Source Ethernet Address register. Then the ARP module checks if this field is a valid Source Ethernet Address. The address should not be same as the address of the IT 10G network stack. If the source address is invalid, the packet is discarded. The last 16 bits of the packet are then stored in the upper half of the Source IP Address register.

The third word of an ARP-type packet contains the second half of the Source IP Address and the Target Ethernet Address. The ARP module stores the first 16 bits in the lower half of the Source IP Address register, and checks if this stored value is a valid Source IP Address. The address should not be same as that of the IT10G hardware, or the broadcast address. Also, the source address should be in the same subnet. The ARP module discards the packet if the source address is invalid. If the packet is an ARP/RARP reply, compare the Target Hardware Address with my Ethernet address. If the address does not match, the ARP module discards the packet. Otherwise the ARP module continues with parsing.

Only the first 32 bits of the last word of an ARP-type packet contain data (the Target IP Address). The ARP module stores the Target IP Address in a register. If the packet is an ARP packet (as opposed to ARP request or RARP packet), compare the Target IP Address with my IP address. If the addresses do not match, discard this packet. Otherwise, if this packet is an ARP request, generate an ARP reply. If this is a RARP reply, pass the assigned IP address to the RARP handler.

Once all the address data have been validated, the source addresses are passed to the ARP Cache.

Transmitting Packets

The ARP module may receive requests for transmitting packets from three sources: the ARP Cache 110 (ARP requests), internally from the parser/FIFO buffer (for ARP replies), and from the system controller or host computer (for custom ARP/RARP packets). Because of this situation, a type of priority-queue is necessary for scheduling the transmission or ARP/RARP packets.

Transmission requests are placed in the queue in a first-come first-served order, except when two or more entities want to transmit. In that case, the next request placed in the queue depends on its priority. RARP requests normally have the highest priority, followed by ARP requests. ARP replies usually have the lowest priority. Using priority allows resources to be shared depending on data traffic.

There is one condition where ARP replies have the highest priority. This occurs when ARP reply FIFO buffer is filled. When the FIFO buffer is filled, incoming ARP requests begin to be discarded, therefore ARP replies should have the highest priority at that point to avoid forcing retransmissions of ARP requests.

When the transmission queue is full, no more requests may be made until one or more transmission requests have been fulfilled (and removed from the queue). When the ARP module detects a full queue, it requests an increase in priority from the transmission arbiter. Because there should be only two conditions for the queue, full or not full, this request signal may be a single bit.

Figure 12:
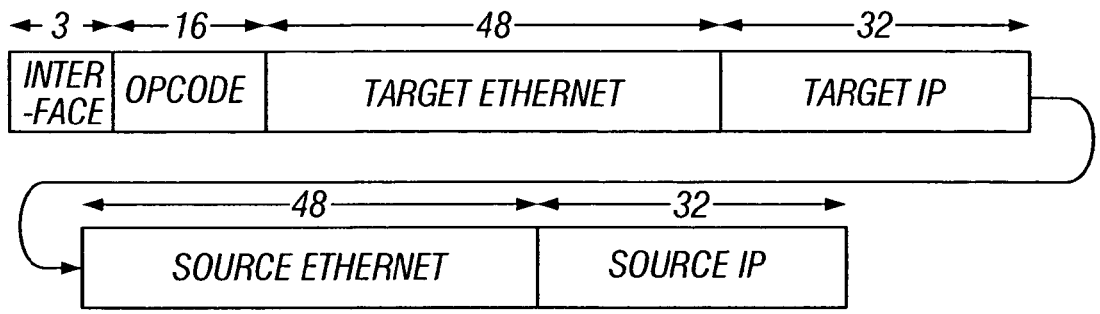
FIG. 12 shows a Transmission Queue Entry Format according to the invention.

When the transmission arbiter allows the ARP module to transmit, ARP/RARP packets are generated dynamically depending on the type of packet to be sent. The type of packet is determined by the opcode, which is stored with each entry in the queue. FIG. 12 shows a Transmission Queue Entry Format.

Bypass Mode

The ARP module has the option of bypassing the automatic processing of incoming packet data. When a bypass flag is set, incoming ARP/RARP data are transferred to the exception handler buffer. The CPU then accesses the buffer, and processes the data. When in bypass mode, the CPU may generate ARP replies on its own, passing data to the transmission scheduler. The fields that can be customized in outgoing ARP/RARP packets are: the source IP address, the source Ethernet address, the target IP address, and the opcode. All other fields match the standard values used in ARP/RARP packets for IPv4 over Ethernet, and the source Ethernet address is set to that of the Ethernet interface. (The CPU may be either the host computer or the on-chip processor in this context.)

Note: If it is necessary to modify these other ARP/RARP fields, the CPU must generate a raw Ethernet frame itself.

ARP Cache Theory of Operation

Adding Entries to the ARP Cache

ARP entries are created when receiving targeted ARP requests and replies (dynamic), or when requested by the CPU (static). (The CPU may be either the host computer or the on-chip processor in this context.) Dynamic entries are ARP entries that are created when an ARP request or reply is received for one of the interface IP addresses. Dynamic entries exist for a limited time as specified by the user or application program running on the host computer; typically five to 15 minutes. Static entries are ARP entries that are created by the user and do not normally expire.

New ARP data come from two sources: the CPU via the ARP registers and the ARP packet parser. When both sources request to add an ARP entry at the same time the dynamic ARP entries have priority, because it is necessary to process incoming ARP data as quickly as possible.

Figure 13:
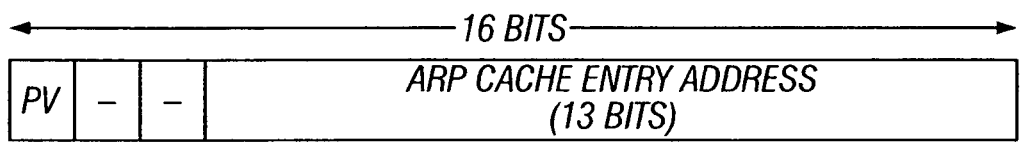
FIG. 13 shows a Lookup Table Entry Format according to the invention.

Once an ARP data source has been selected, we need to determine where in IT 10G hardware memory the ARP entry is to be stored. To do this we use a lookup table (LUT) to map a given IP address to a location in memory. The lookup table contains 256 entries. Each entry is 16 bits wide and contains a memory pointer and a pointer valid (PV) bit. The PV bit is used determine if the pointer is pointing to a valid address, i.e. the starting address of a memory block allocated by the ARP cache. FIG. 13 shows a Lookup Table Entry Format.

To determine from where in the LUT we need to retrieve the pointer, we use an 8-bit index. The index is taken from the last octet of a 32-bit IP address. The reason for using the last octet is that in a local area network (LAN) this is the portion of the IP address that varies the most between hosts.

Once we determine which slot in the LUT to use, we check to see if there is a valid pointer contained in that slot (PV="1"). If there is a valid pointer, that means there is a block of memory allocated for this index, and the target IP address may be found in that block. At this point, the block of memory being pointed to is retrieved and the target IP address is searched for. If the LUT does not contain a valid pointer in this slot, then memory must be allocated from an internal memory, malloc1. Once the memory has been allocated the address of the first word of the allocated memory is stored in the pointer field of the LUT entry.

Figure 14:
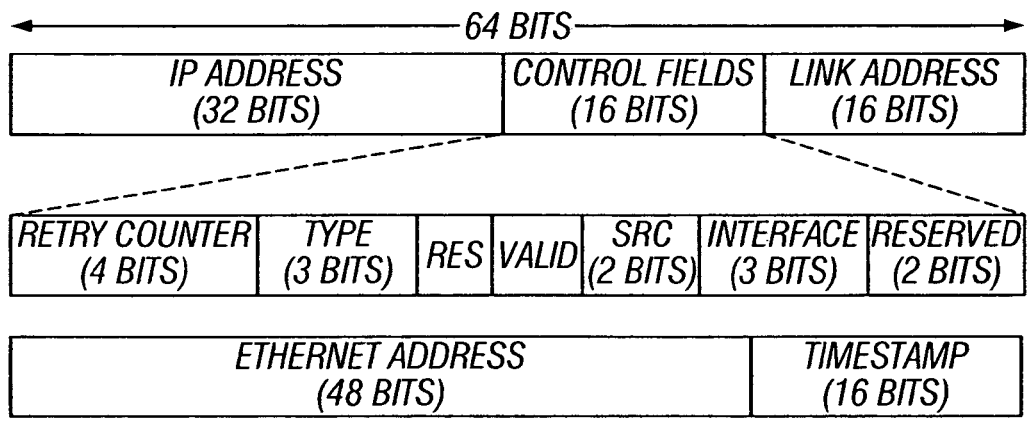
FIG. 14 shows an ARP Cache Entry Format according to the invention.

After allocating memory and storing the pointer in the LUT, we need to store the necessary ARP data. This ARP data includes the IP address, necessary for determining if this is the correct entry during cache lookups. Also used is a set of control fields. The retry counter is used to keep track of the number of ARP request attempts performed for a given IP address. The type field indicates the type of cache entry (000=dynamic entry; 001=static entry; 010=proxy entry; 011=ARP check entry). The resolved flag indicates that this IP address has been successfully resolved to an Ethernet address. The valid flag indicates that this ARP entry contains valid data. Note: an entry may be valid and unresolved while the initial ARP request is being performed. The src field indicates the source of the ARP entry (00=dynamically added, 01=system interface, 10=IP router, and 11=both system interface and IP router). The interface field allows the use of multiple Ethernet interfaces, but defaults to a single interface (0). Following the controls fields is the link address that points to the following ARP entry. The most significant bit (MSB) of the link address is actually a flag, link_valid. The link_valid bit indicates that there is another ARP entry following this one. The last two fields are the Ethernet address to which the IP address has been resolved, and the timestamp. The timestamp indicates when the ARP entry was created, and is used to determine if the entry has expired. FIG. 14 shows an example of the ARP Cache Entry Format In LANs with more than 256 hosts or with multiple subnets, collisions between different IP addresses may occur in the LUT. In other words, more than one IP address may map to the same LUT index. This would be due to more than one host having a given value in the last octet of its IP address. To deal with collisions, the ARP cache uses chaining., which we describe next.

When performing a lookup in the LUT, and an entry is found to already exist in that slot, we retrieve the ARP entry that is being pointed to from memory. We examine IP address in the ARP entry and compare it to the target IP address. If the IP addresses match then we can simply update the entry. However, if the addresses do not match, then we look at the Link_Valid flag and the last 16 bits of ARP entry. The last 16 bits contain a link address pointing to another ARP entry that maps to the same LUT index. If the Link_Valid bit is asserted, then we retrieve the ARP entry pointed to in the Link Address field. Again the IP address in the entry is compared with the target IP address. If there is a match then the entry is updated, otherwise the lookup process continues (following the links in the chain) until a match is found or the Link_Valid bit is not asserted.

When the end of a chain is reached and a match has not been found, a new ARP entry is created. Creating a new ARP entry may require the allocation of memory by the malloc1 memory controller. Each block of memory is 128 bytes in size. Thus, each block can accommodate 8 ARP entries. If the end of a block has been reached, then a new memory block must be requested from malloc1.

As previously mentioned, the user (or application running on the host computer) has the option of creating static or permanent ARP entries. The user may have the option of allowing dynamic ARP data to replace static entries. In other words, when ARP data are received for an IP address that already has a static ARP entry created for it, that static entry may be replaced with the received data. The benefit of this arranegment is that static entries may become outdated and allowing dynamic data to overwrite static data may result in a more current ARP table. This update capability may be disabled if the user is confident that IP-to-Ethernet address mappings will remain constant, e.g. storing the IP and Ethernet addresses of a router interface. The user may also choose to preserve static entries to minimize the number of ARP broadcasts on a LAN. Note: ARP proxy entries can never be overwritten by dynamic ARP data.

Looking Up Entries in the Cache

Looking up entries in the ARP cache follows a process similar to that for creating ARP entries. Lookups begin by using the LUT to determine if memory has been allocated for a given index. If memory has been allocated, the memory is searched until either the entry is found (a cache hit occurs), or an entry with the link_valid flag set to zero (a cache miss) is encountered.

If a cache miss occurs, an ARP request is generated. This involves creating a new ARP entry in the cache, and a new LUT entry if necessary. In the new ARP entry, the target IP address is stored, the resolved bit is set to zero and the valid bit is set to one. The request counter is set to zero as well. The entry is then time stamped and an ARP request is passed to the ARP module. If a reply is not received after one second, then the request counter is incremented and another request is sent. After sending three requests and receiving no replies, attempts to resolve the target IP are abandoned. Note: the retry interval and number of request retries are user-configurable.

Figure 15:
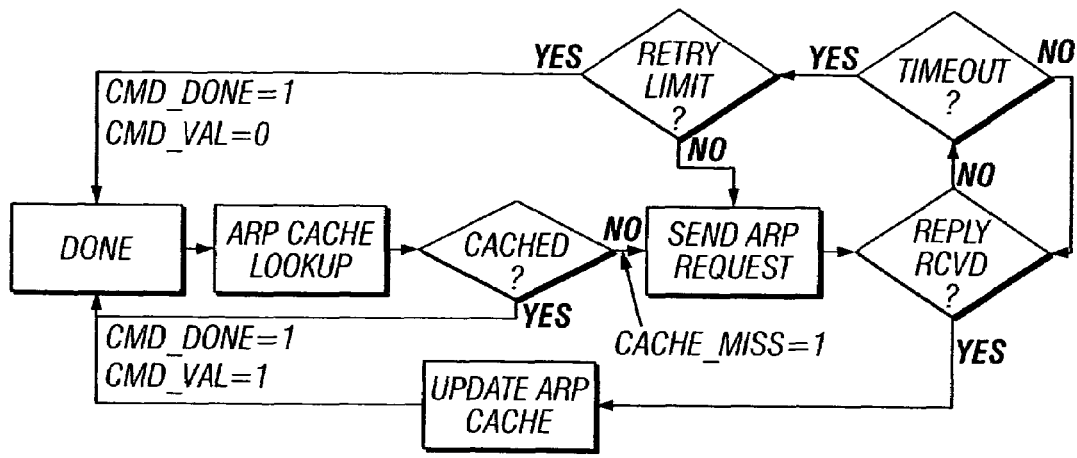
FIG. 15 is a flow diagram that shows the ARP Lookup Process according to the invention.

When a cache miss occurs, the requesting module is notified of the miss. This allows the CPU or IP router the opportunity to decide to wait for an ARP reply for the current target IP address, or to begin a new lookup for another IP address and place the current IP address at the back of the queue. This helps to minimize the impact of a cache miss on establishing multiple connections. FIG. 15 is a flow diagram that shows the ARP Lookup Process.

If a matching entry is found (cache hit) then the resolved Ethernet address is returned to the module requesting the ARP lookup. Otherwise if, the target IP address was not found in the cache, and all ARP request attempts have timed out, the requesting module is notified that the target IP address could not be resolved.

Note: if an ARP lookup request from the IP router fails, the router must wait a minimum of 20 seconds before initiating another lookup for that address.

Cache Initialization

When the ARP cache is initialized several components are reset. The lookup table (LUT) is cleared, by setting all the PV bits to zero. All memory currently in use is de-allocated and released back to the malloc1 memory controller. The ARP expiration timer is also set to zero.

During the initialization period, no ARP requests are generated. Also, any attempts to create ARP entries from the CPU (static entries), or from received ARP data (dynamic entries) are ignored or discarded.

Expiring ARP Entries

Dynamic ARP entries may only exist in the ARP cache for a limited amount of time. This is to prevent any IP-to-Ethernet address mappings from becoming stale. Outdated address mappings could occur if a LAN uses DHCP to assign IP addresses or if the Ethernet interface on a device is changed during a communications session.

To keep track of the time, a 16-bit counter is used. Operating with a clock frequency of 1 Hz the counter is used to track the number of seconds that have passed. Each ARP entry contains a 16-bit timestamp taken from this counter. This timestamp is taken when an IP address is successfully resolved.

ARP entry expiration occurs when the ARP cache is idle, i.e. no requests or lookups are currently being processed. At this time, an 8-bit counter is used to cycle through and search the LUT. Each slot in the LUT is checked to see if it contains a valid pointer. If a pointer is valid, the memory block pointed to is retrieved. Then, each entry within that block is checked to see if the difference between its timestamp and the current time is greater than or equal to the maximum lifetime of an ARP entry. If other memory blocks are chained off the first memory block, the entries contained in those blocks are also checked. Once all the entries associated with a given LUT index have been checked, then the next LUT slot is checked.

If an entry is found to have expired, the valid bit in the entry is set to zero. If there are no other entries within the same memory block, then the block is de-allocated and returned to malloc1. If the block being de-allocated is the only block associated with a given LUT slot, the PV bit in that slot is also set to zero.

Performing ARP Proxying

The ARP cache supports proxy ARP entries. ARP proxying is used when this device acts as a router for LAN traffic, or there are devices on the LAN that are unable to respond to ARP queries.

With ARP proxying enabled, the ARP module passes requests for IP addresses that do not belong to the host up to the ARP cache. The ARP cache then does a lookup to search for the target IP address. If it finds a match, it checks the type field of the ARP entry to determine if it is a proxy entry. If it is a proxy entry, the ARP cache passes the corresponding Ethernet address back to the ARP module. The ARP module then generates an ARP reply using the Ethernet address found in the proxy entry as the source Ethernet address. Note: ARP proxy lookups occur only for incoming ARP requests.

Detection of Duplicate IP Addresses (ARP Check)

When the system (host computer plus IT 10G hardware) initially connects to a network, the user or application running on the host computer should perform a gratuitous ARP request to test if any other device on the network is using one of the IP addresses assigned to its interface. If two devices on the same LAN use the same IP address, this could result in problems with routing packets for the two hosts. A gratuitous ARP request is a request for the host's own IP address. If no replies are received for the queries, then it can be assumed that no other host on the LAN is using our IP address.

An ARP check is initiated in a manner similar to that of performing an ARP lookup. The only difference is that the cache is discarded once the gratuitous ARP request has been completed. If no replies are received, the entry is removed. If a reply is received, an interrupt is generated to notify the host computer that the IP address is in use by another device on the LAN, and the entry is removed from the cache.

Cache Access Priorities

Different tasks have different priorities in terms of access to the ARP cache memory. Proxy entry lookups have the highest priority due to the need for rapid responses to ARP requests. Second in priority is adding dynamic entries to the cache; incoming ARP packets may be received at a very high rate and must be processed as quickly as possible to avoid retransmissions. ARP lookups from the IP router have the next highest priority, followed by lookups by the host computer. The manual creation of ARP entries has the second lowest priority. Expiring cache entries has the lowest priority and is performed whenever the cache is not processing an ARP lookup or creating a new entry.

IP Module

Overview

The IT 10G natively supports IPv4 packets with automatic parsing for all types of received packets.

IP Module Block Diagram

Figure 16:
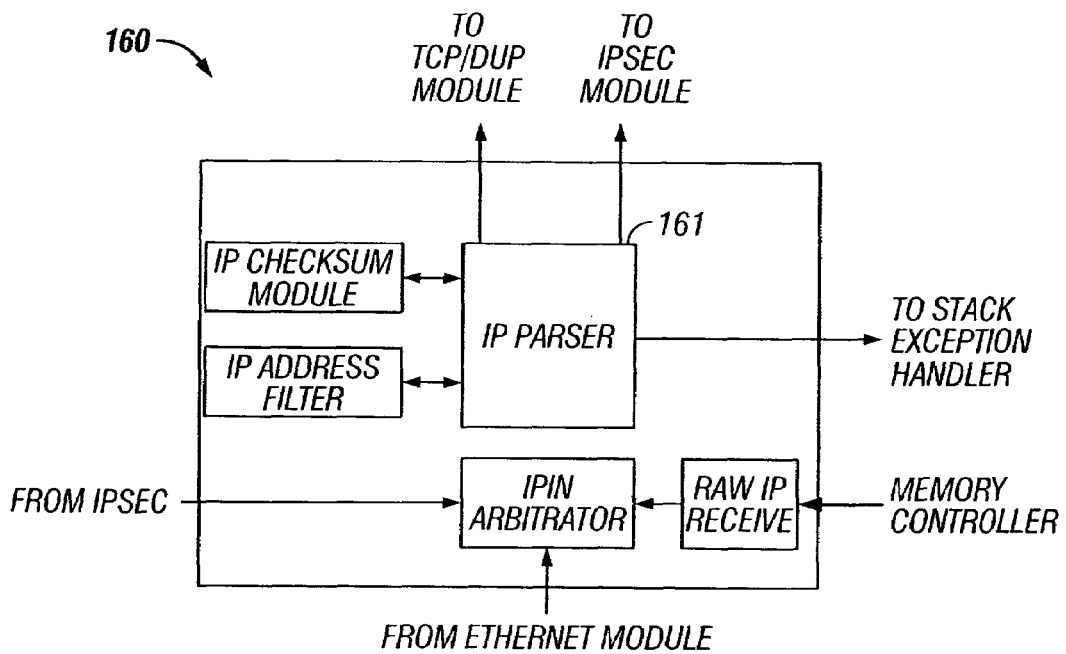
FIG. 16 is a block schematic diagram of an IP Module according to the invention.

FIG. 16 is a block schematic diagram of one implementation of an IP Module Block.

IP Sub Module Descriptions

IP Parser

The IP Parser module 161 is responsible for parsing received IP packets and determining where to send the packet. Each received IP packet can be sent to either the TCP/UDP module or the exception handler.

IP Header Field Parsing

IP Version

Only IPv4 are accepted and parsed by the IP module, therefore this field must be 0x4 to be processed. If an IPv6 packet is detected, it is handled as an exception and processed by the Exception Handler. Any packet having a version that is less then 0x4 is considered malformed (illegal) and the packet is dropped.

IP Header Length

The IP Header Length field is used to determine if any IP options are present. This field must be greater then or equal to five. If it is less, the packet is considered malformed and dropped.

IP TOS

This field is not parsed or kept for received packets.

Packet Len

This field is used to determine the total number of bytes in the received packet, and is used to indicate to the next level protocol where the end of its data section is. All data bytes received after this count expires and before the ip_packet signal de-asserts are assumed to be padding bytes and are silently discarded.

Packet ID, Flags, and Fragmentation Offset

These fields are used for defragmenting packets. Fragmented IP packets may be handled by dedicated hardware or may be treated as exceptions and processed by the Exception Handler.

TTL

This field is not parsed or kept for received packets.

PROT

This field is used to determine the next encapsulated protocol. The following protocols are fully supported (or partially supported in alternative embodiments) in hardware:

TABLE 4

Supported Protocol Field Decodes

| Hex value | Protocol |
|---|---|
| 0x06 | TCP |
| 0x11 | UDP |

If any other protocol is received, and if the unsupport_prot feature is enabled, then the packet may be sent to the host computer. A protocol filter may be enabled to selectively receive certain protocols. Otherwise, the packet is silently discarded.

Checksum

This field is not parsed or kept. It is used just to make sure the checksum is correct. If the checksum turns out bad, then the bad_checksum signal, which goes to all the next layers is asserted. It stays asserted until it is acknowledged.

Source IP Address

This field is parsed and sent to the TCP/UDP layers.

Destination IP Address

This field is parsed and checked against valid IP addresses that the local stack should be responding to. This may take more then one clock cycle, in which case the parsing should continue. If the packet turns out to be misdirected, then the bad_ip_add signal is asserted. It stays asserted until it is acknowledged.

IP ID Generation Algorithm

Figure 17:
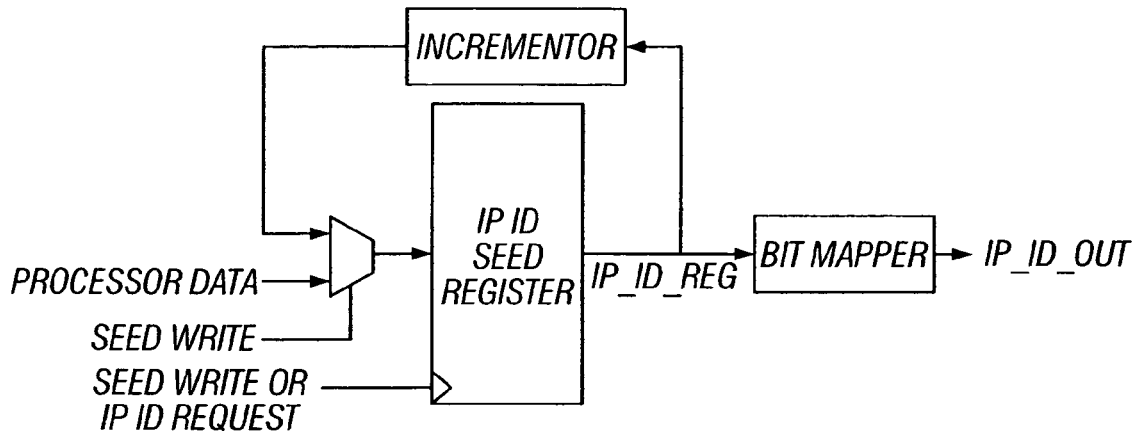
FIG. 17 is a block diagram of an ID generator according to the invention.

The on-chip processor can set the IP ID seed value by writing any 16-bit value to the IP_ID_Start register. The ID generator takes this value and does a mapping of the 16 bits to generate the IP ID used by different requestors. The on-chip processor, TCP module, and ICMP echo reply generator can all request an IP ID. A block diagram of one implementation of the ID generator is shown in the FIG. 17.

The IP ID Seed register is incremented every time a new IP ID is requested. The Bit Mapper block rearranges the IP_ID_Reg value such that the IP_ID_Out bus is not a simple incrementing value.

IP Injector Module

Figure 18:
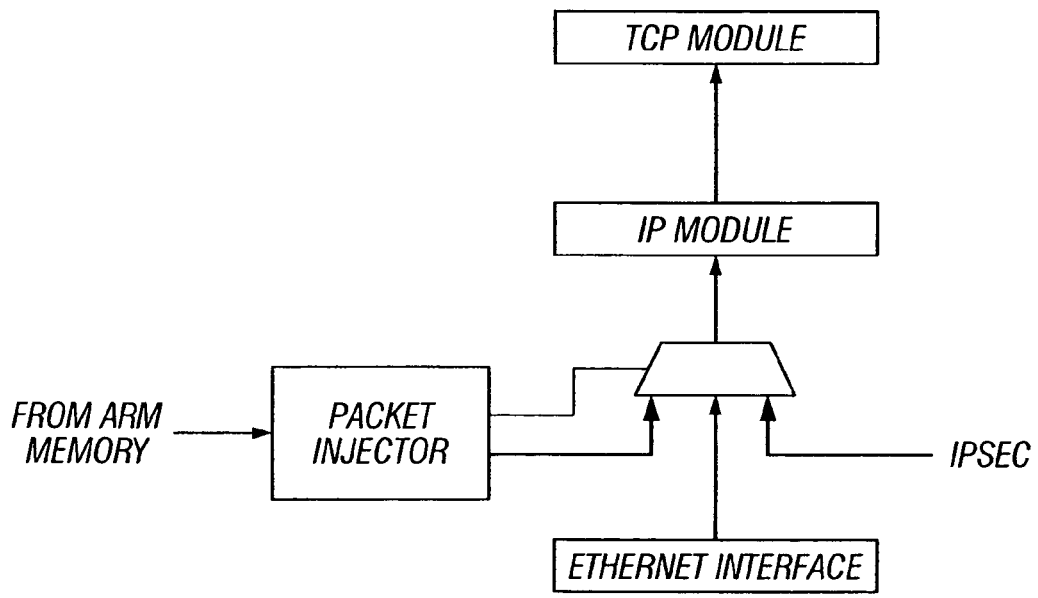
FIG. 18 is a block diagram depicting the data flow with an Injector according to the invention.

The IP injector module is used to inject packets from the on-chip processor into the IP and TCP modules. The IP injector control registers are located in the IP module register space, and these registers are programmed by the on-chip processor. A block diagram depicting the data flow of the IP Injector is shown in FIG. 18.

As can be seen, the IP Injector is capable of inserting data below the IP module. To use IP Injection, the on-chip processor programs the IP Injectior module with the starting address in its memory of where the packet resides, the length of the packet, and the source MAC address. The injector module generates an interrupt when it has completed transmitting the packet from the on-chip processor's memory into the stack.

TCP/UDP Module

Overview

This section describes the TCP module, which handles the TCP and UDP transport protocols. The TCP module is split into four main sections; the Socket Transmit Interface, the TCP Transmit Interface, the TCP Receive Interface, and the Socket Receive Interface.

Feature List

The following is a list of TCP features in the IT10G:

| 64K Socket Support | TCP Out Of Order Support |
| Slow Start | Fast Retransmission/Fast Recovery |
| Selectable Nagle Algorithm | Window Scaling |
| Selective ACKs (SACK) | Protection against wrapped seq numbers (PAWS) |
| Time Stamp Support | Keep Alive Timers |

Window Scaling

The IT 10 G supports Window Scaling. Window scaling is an extension that expands the definition of the TCP window to 32 bits. It is defined in RFC1323 section 2 (see http://www.rfc-editor.org/rfc/rfc1323.txt). The window scale operation is based on three variables. One is the SL_Win_En bit of TCP_Control1 (this enables window scale), two is the sliding window scale bits in TCP_Control3 (this sets the scaling factor), and finally the WCLAMP parameter determines what the value to be scaled is.

Without the SL_Win_En bit the hardware will not try to negotiate window scaling via the TCP Window scale option during the TCP 3-way handshake.

TCP Dump Mode

TCP dump mode is an IT 10G hardware mode that allows support for widely used diagnostic programs such as TCPdump and other packet monitoring programs.

When TCP dump mode is enabled all received packets are sent as exceptions to the host and all outgoing TCP/UDP packets coming from the hardware stack are looped back as exception packets.

A driver would make copies of these packets for the network monitor and re-inject rx packets and sending TX packets as raw Ethernet frames.

Host ACK Mode

Host ACK mode is a IT 10G hardware mode that only sends a TCP ACK when the host computer has received the data from a TCP segment. Host ACK mode waits for the DMA of the MTX buffer that contains the data segment to complete before sending the ACK. Host ACK mode provides for additional data integrity in the case that data may be corrupted as it is passed between host computer and the integrated network adapter or vice versa.

Timestamps

The IT 10G provides support for Timestamps. Timestamps are an enhancement to TCP defined in RFC1323 (see http://www.rfc-editor.org/rfc/rfc1323.txt). Timestamps allow TCP to better calculate the RTT (Round Trip Time) measurement and are also used to support PAWS (Protect Against Wrapped Sequences.)

PAWS

PAWS (Protect Against Wrapped Sequences) is defined in RFC1323 (see http://www.rfc-editor.org/rfc/rfc1323.txt). PAWS protects against old duplicate segments corrupting TCP connections, which is an important feature for high-speed links.

TCP Host Retransmit Mode

TCP host retransmit mode allows the retransmission of data directly out of the host's memory buffers instead out of buffers located in three integrated network adapter. This permits the amount of memory required by the integrated network adapter to be reduced.

Initial Sequence Number Generation

The initial sequence number generator needs to be secure. RFC1948 points out the weakness in the original initial sequence number specification in RFC793 and recommends several replacement methods. The integrated network adapter uses an optimized method that works according to RFC1948 but is efficient to implement in hardware.

Dual Stack Mode

Dual stack mode allows the hardware TCP/IP stack integrated into the network adapter to work in cooperation and in conjunction with a software TCP/IP stack in the host computer.

Dual stack mode allows the integrated network adapter to support the co-existence of a software stack running in parallel using the same IP address(es) as the integrated network adapter.

Dual stack mode requires two basic hardware functions in the integrated network adapter. The first hardware function is the SYN status message mode. In the SYN status message mode any received SYN will generate a status message back to the host computer, and the SYN/ACK is not generated by the integrated network adapter hardware until the host computer sends the proper instruction block back to the integrated network adapter hardware. If the SYN status message mode is not enabled on integrated network adapter, then SYN/ACKs are generated automatically by the integrated network adapter and SYN received status messages are not generated.

The second hardware function required by dual stack mode is the suppression of RST messages from the integrated network adapter hardware when a TCP packet is received that doesn't match the integrated network adapter control block database. In this case, instead of automatically generating a RST the integrated network adapter hardware should send the packet to the host computer as an exception packet to allow the software TCP/IP stack in the host computer to handle this packet as an exception packet.

IP ID Splitting

IP (Internet Protocol) ID (Internet Identification) splitting is part of the dual stack support package. IP ID splitting allows the host computer and the integrated network adapter to share an IP address without overlapping IP ID's. When IP ID splitting is turned off the integrated network adapter uses the full 16 bit ID range (0-255). When IP ID splitting is turned on, bit [15] of the IP ID is forced to a 1 allowing the host computer software TCP/IP stack to use half of the IP ID range (i.e. the integrated network adapter will use 128-255 while the host computer software TCP/IP stack can use 0-127 for IP ID).

Custom Filtering

There are several places in the hardware that have custom filters that can be used to restrict, accept or take special action on certain types of packets. Ethernet filtering can take the following attributes:

Accept a programmed uni-cast address
Accept broadcast packets
Accept multicast packets
Accept addresses within a range specified by a netmask
Promiscuous mode (accepts all packets)
VLAN Support VLAN support consists of several optimized hardware elements. One hardware element, strips the incoming packets of their VLAN headers, a second optimized hardware element generates VLAN tagged outbound packets, a third optimized hardware element generates VLAN parameters from incoming SYN frames, and a fourth optimized hardware element passes VLAN tag information for exception packets and UDP packets.

Jumbo Frame Support

Jumbo frames are larger than the normal 1500-byte sized Ethernet frames. Jumbo frames less of the network bandwidth to be used for header information, which allows increased data throughput in the network. The Integrated network adapter uses optimized hardware to support jumbo frames of up to nine kbytes.

SNMP Support

SNMP is a form of upper-level protocol that allows statistics of network and hardware adapter performance to be monitored remotely.

MIB Support

The integrated network adapter contains optimized hardware support for many statistics counters. These statistics counters are defined by a standard management information base (MIB). Each of these SNMP MIB counters track events that occur in the network and in the integrated network adapter (packets received, transmitted, dropped and so forth).

Memory Checking

Memory error checking and correction (ECC) is similar to parity checking. However, where parity checking can only detect single-bit errors, ECC can detect and correct a single-bit memory errors and detect double-bit errors.

Single-bit errors are the most common and are characterized by a single bit of data being incorrect when reading a complete byte or word. A multi-bit error is the result of more than one bit being in error within the same byte or word.

ECC memory uses extra bits to store an encrypted ECC code with the data. When the data is written to memory, the ECC code is also stored. When the data is read back, the stored ECC code is compared to the ECC code which would have been generated when the data was written. If the ECC codes don't match we can determine which bit in the data is in error. The bit in error is "flipped" and the memory controller releases the corrected data. Errors are corrected "on-the-fly," and corrected data is not placed back in memory. If the same corrupt data is read again, the correction process is repeated.

The Integrated network adapter allows ECC to be programmed and selected in a flexible manner to protect both packet data and control information within the adapter.

Legacy Mode

Legacy modes allows all network traffic to be sent to the host computer regardless of traffic type. These modes allow the integrated network adapter to operate as if the hardware TCP/IP stack were not present in the adapter, a mode often referred to as a dumb NIC (network interface card).

IP Fragmentation

Reassembly of IP fragmented packets does not have handled by the integrated network adapter. The IP fragmented packets passed up as exception packets and reassembled in the driver then "re-injected" via the IP injection mode back into the integrated network adapter.

IP Injection

The IP injection mode allows IP packets (for example re-assembled IP fragments or IPsec packets) to be injected into the hardware TCP/IP stack in the integrated network adapter.

The injection control registers are used to inject an IP packet into the hardware TCP/IP stack within the integrated network adapter. The injection control registers feature allow the host computer to control the injection and inject an IP packet into the hardware TCP/IP stack within the integrated network adapter. The injection control registers thus allow the injection of SYN, IPSec or other packet into the integrated network adapter. The injection control registers are also part of the TCP dump mode functionality.

NAT, IP masquerading, and port forwarding

NAT, IP masquerading, and port forwarding are supported in the integrated network adapter via port range registers that forward all packets of a specified type UDP or TCP that fall in a programmable range of ports to the exception path. The port registers enable certain ranges of ports to be used for network control operations such as NAT, IP masquerading, and port forwarding.

Multiple IP Addresses

The integrated network adapter hardware supports up to 16 ranges of IP addresses that it can respond to as its own IP address. These address ranges are accessible as IP address base with a mask. This allows an IP address to be extended to a range of IP addresses. This allows the integrated network adapter to perform multi-homing or the ability to respond to multiple IP addresses.

IP Debug Mode

When a test and control bit is enabled in the integrated network adapter, all IP packets are sent as exceptions to the host computer. This mode is designed for diagnostic purposes.

Time Wait State

Time wait is the final state of a passive mode TCP connection, the time wait state and it's operation are described in RFC793, see http://www.rfc-editor.org/rfc/rfc793.txt Virtual Sockets The integrated network adapter hardware supports a variable number of sockets or connections; the current implementation supports up to 645535 sockets.

Integrated network adapter that provides optimized hardware support (which is integrated with TOE) for transfer of connections between adapter and host computer When the integrated network adapter hardware accepts a connection that equals it's maximum capacity the next SYN is passed up to the host as an exception packet so the host will be able to handle this connection. Note that in this case for the host to open up this connection we need to set the hardware to use part of the dual stack mode that allows TCP packets that don't match the hardware's database to be passed up to the host as an exception packet instead of replying with a RST.

Time to Live

TTL or time to live is an IP address parameter that limits the life of an IP packet on the network to a number of hops (a hop is a jump across a layer 3 device such as a router). The integrated network adapter hardware sets this value for outgoing frames to limit the time to live of the transmitted packet. See RFC791 section Time To Live at http://www.faqs.org/rfcs/rfc791.html for more information.

Keepalive

Keepalive is an enhanced function of TCP described in RFC1122 section 4.2.3.6. See http://www.faqs.org/rfcs/rfc1122.html. Keep alive allows an idle TCP connection to stay connected and not time out by periodically sending a keep alive packet across the link.

ToS

TOS or type of service is an IP address parameter that can be used by routers to prioritize the IP packet. The TOS parameter needs to be adjustable at a system and socket layer. On transmit the integrated network adapter hardware sets TOS via several registers. See RFC791 section Type of Service at http:f/www.faqs.org/rfcs/rfc791.html for more information.

QoS

The integrated network adapter hardware supports four transmit queues to allow QoS for transmitted data. Each socket can be assigned a QoS value. This value also can be used to map onto VLAN priority levels.

A summary of the transmit operation is as follows. The TCP transmit data flow starts with the Socket Query module, which goes through the transmit data available Bit table looking for entries that have their Transmit Data Available bits set. When it finds such an entry, then the Socket Query module puts that entry into one of the four queues according to the socket's User Priority level. Sockets with priority level 7 or 6 will get put into Queue List 3, levels 5 and 4 will get put into Queue List 2, levels 3 and 2 will get put into Queue List 1, and levels 1 and 0 will get put into Queue List 0.

These QoS features using priority queues allow parallel use of multiple hardware modules depending on transmit traffic.

Failover

Failover between network adapters is supported by NO_SYN mode. NO_SYN mode allows a socket to be created without trying to initiate a connection. This allows a socket and all its related data structures in the integrated network adapter hardware to be created without creating a connection. The NO_SYN mode allows the support of failover from another card or connection migration from a software TCP/IP stack to the integrated network adapter.

Top Level Block Diagram

Figure 19:
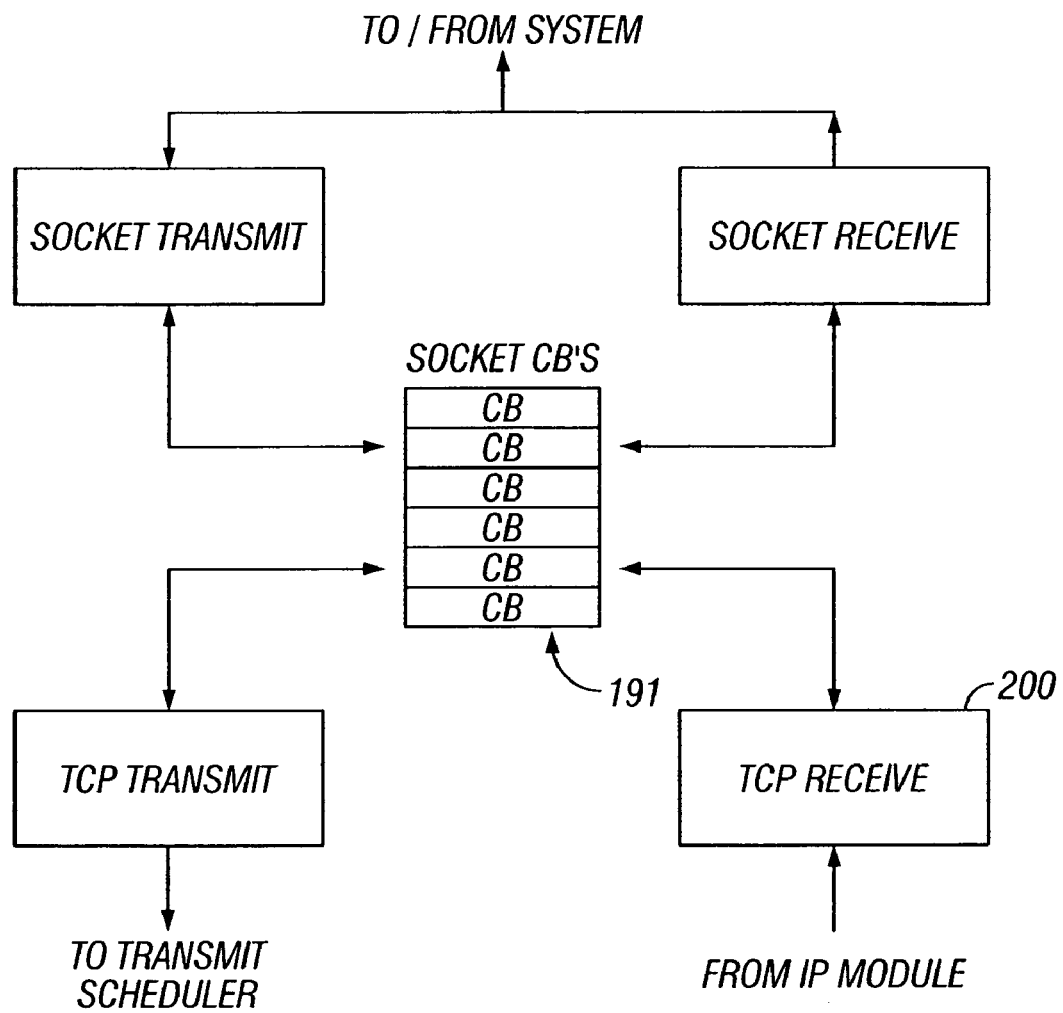
FIG. 19 is a top-level block diagram for the TCP module according to the invention.

FIG. 19 depicts the top-level block diagram of one implementation of the TCP module. The Socket Control Blocks (CBs) 191 contain the information, state, and parameter settings that are unique to each socket connection, and form the most important or key part of the virtual socket (VSOCK) architecture. A locking mechanism is installed such that while one module is operating on a CB, no other module can be operating on it.

TCP Receive Sub Module

Figure 20:
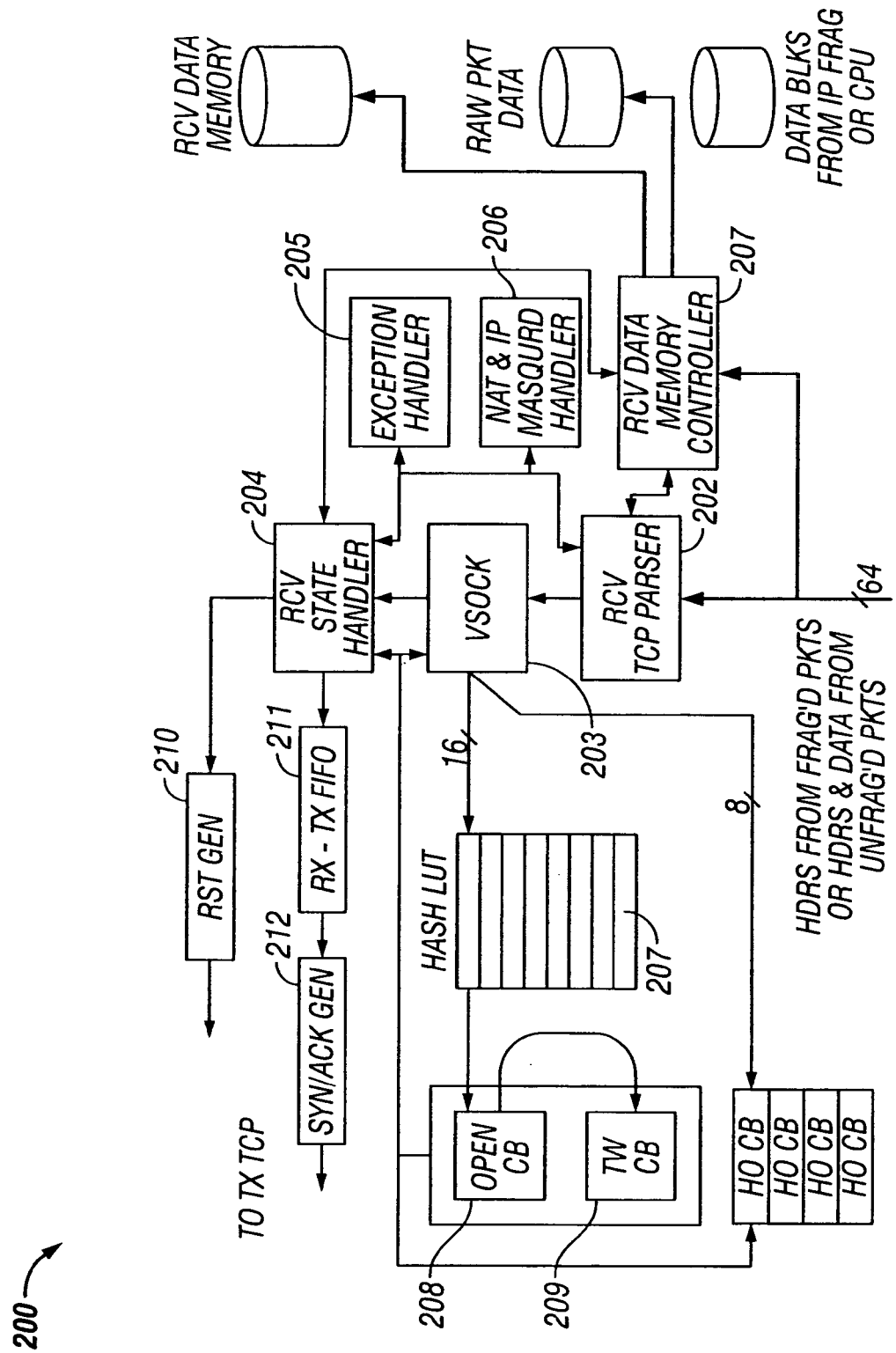
FIG. 20 depicts a TCP Receive data flow according to the invention.

FIG. 20 depicts the TCP Receive 200 data flow.

Overview

For normal IP traffic, a packet is received via the 64-bit TCP Rx data path. The packet header goes to the TCP Parser module, and the packet data is routed to the Rcv Data Memory Controller 201. For IP fragmented traffic, data is received via memory blocks while header information is received via the normal path. This allows the memory blocks from IP fragmentation to look similar to the data blocks written by the Rcv Data Memory Controller. CPU data also use the memory blocks to inject received data via the Rcv Data Memory Controller. This architecture gives maximum flexibility in handling normal and fragmented traffic, which allows performance to be optimized for normal traffic while still supporting fragmented traffic.

The Rcv TCP Parser 202 is responsible for parsing the header information and passing parameters to the VSOCK 203 and Rcv State Handler 204. If the Rcv TCP Parser does not know what to do with the data, it passes it to the Exception Handler 205. In addition, the Rcv TCP Parser can also be programmed to send all data to the Exception Handler.

The VSOCK module takes the local and remote IP and port addresses and returns a pointer to a Control Block.

The NAT & IP Masquerading module 206 determines if the received packet is a NAT or IP Masquerading packet. If it is, the packet is passed up to the Host System in a raw (complete packet) format.

The Rcv State Handler keeps track of the state of each connection and updates its Control Block, accordingly.

Rcv TCP Parser

The Rcv TCP Parser registers and sends packet header information to the other modules in the TCP receive portion of the IT 10G network stack. The Rcv TCP Parser module also contains the registers needed to inject data in the Rcv stream from the CPU (the on-chip processor or host computer). The CPU must setup a memory block, then program the Rcv TCP Parser registers with the information. The Rcv TCP Parser creates a partial checksum of the TCP header, adds this partial checksum it to the partial checksum from the Rcv Data Memory Controller, and compares the resulting complete checksum to the checksum in the TCP header. For a fragmented packet, the Rcv TCP Parser checks the checksum in the TCP header against the checksum sent by the IP Fragmentation in the last fragment.

Note: the IP module must set the IP Fragmentation bits and insert the First Mem Block Pointer, Last Mem Block Pointer, Index, and Partial Checksum into the data stream of the appropriate packet fragment. Also, TCP Rcv needs the IP protocol information to calculate the pseudo header.

Rcv Data Memory Controller

The Rcv Data Memory Controller transfers data from the 64-bit bus between the IP and TCP modules to Data Memory Blocks in Rx DRAM. There are two modes of transfer. Normal mode is used to store TCP data into Memory Blocks. Raw mode is used to store entire packets into Memory Blocks. Raw mode is used for NAT/IP Masquerading. For exception handling, Normal mode is used along with registers to transfer CB data to the CPU.

VSOCK

The VSOCK module is passed the local and remote IP and port addresses from the packet, and returns the socket Open or TIME_WAIT (TW) Control Block (CB) pointer to the Rcv State Handler. VSOCK performs a hash calculation on the IP and port addresses and generates a hash value that serves as an index into the Open/TW CB Look-Up Table (LUT) 207. The LUT entry at that location holds a pointer to an Open 208 or TW 209 Control Block.

The pointer from the Open/TW CB LUT points to the first Control Block of a linked list of zero or more CBs, each with different IP and port addresses, but which result in the same hash number (resulting from hash collisions). VSOCK goes down this chain, comparing the packet IP and port addresses to the entries in the chained CBs, until a match is found or the end of the chain is reached. If a match is found, a pointer to the CB is passed to the Rcv State Handler. If the end of the chain is reached, VSOCK informs the TCP Parser of the error.

The chain of CBs connected to the Open/TW CB LUT entry contains Open CBs and TIME_WAIT CBs. The Open CBs are first in the chain. There is a maximum number of Open CBs, as determined by RcvTCPMaxOpenCBperChain. TW CBs are chained after the Open CBs. There is also a maximum number of TW CBs per chain. An Open CB is created when the three-way handshake completes, and a HO CB is moved to the Open CBs by the Rcv State Handler. A TW CB is created from an Open CB by the Rcv State Handler when the last ACK is sent in the FIN sequence. If there is no more room in either case, an error is returned to the Rcv State Handler.

Figure 21:
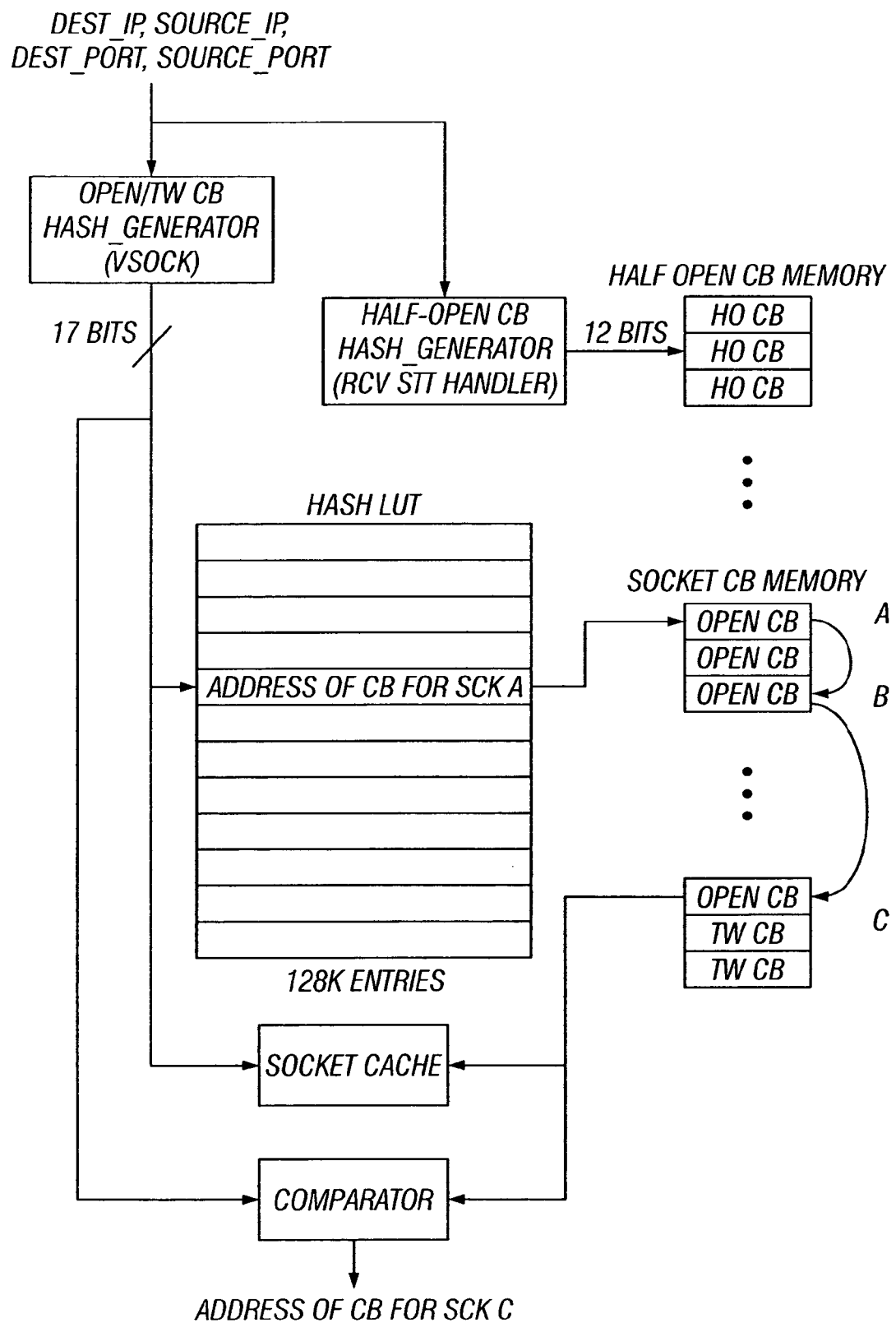
FIG. 21 shows a VSOCK/Rcv State Handler Control Block Search Resolution Flow according to the invention.

A CB cache for Open CBs is implemented for Open CBs further than a preset number of links from the LUT entry. A bit in the CB is set when it is in the Cache. The Cache is searched in parallel to the hash/LUT operations. FIG. 21 shows the VSOCK/Rcv State Handler Control Block Search Resolution Flow.

Rcv State Handler

If a SYN is received, an 12-bit hash is performed in addition to invoking VSOCK (which performs a 17-bit hash and searches for an Open or TIME_WAIT Control Block), and the destination port is checked against an Authorized Port List. If the port is allowed and VSOCK does not find a matching Open/TW CB, the hash result is used as an index into the HO CB Table. If VSOCK finds a matching Open or TIME_WAIT CB, a Dup CB error may be sent to the host computer and the SYN is dropped. If there is already an entry in the HO CB Table with different IP and Port addresses, the new packet info overwrites the old information. This allows resources to be conserved in SYN flood Denial of Service (DOS) attack. Overwriting eliminates the need for aging the HO CB Table. Connections that have already been SYN/ACKed could be silently dropped. The pointer to the CB is passed to the Rcv State Handler. Only connections that have been opened by the remote side (local side receives SYN, not SYN/ACK) are entered in the HO CB Table. Connections opened by the local side are tracked by Open CBs.

If an ACK is received, a 12-bit hash is performed and VSOCK is invoked. If there is a hit in the HO CB via the 12-bit hash, but VSOCK does not find an Open or TW CB and if the sequence and ack numbers are valid, then the three-way handshake for the connection is complete, and the CB is transferred to the Open CB table by the Rcv State Handler. If VSOCK does find an Open or TW CB, but there is no match with the 12-bit hash, then the ACK is checked for valid sequence and ACK numbers by the Rcv State Handler, as well as for duplicate ACKs.

Once the VSOCK module finds the right socket CB, then other pertinent information is read and updated by the Receive State Handler. TCP data are stored into large (2k bytes) or small (128 bytes) memory buffers. A single segment may span memory buffers. If one size of buffer runs out, the other size is used. When data are received for a given socket, its Data_Avail bit in the socket Hash LUT is also set.

If the Rcv State Handler determines that a RST packet is needed, then the Rcv State Handler forwards the appropriate parameters to the RST generator 210. If a SYN/ACK or ACK is needed, the Rcv State Handler sends the CB handle to the RX to TX FIFO buffer 211.

RST Generator

The RST Generator takes the MAC address, the four socket parameters, and sequence number received in the packet that needs a RST response, and builds a RST packet. The RST Generator first requests a block from MTX memory in which to build the packet. Because RST packets are always 40 bytes long, these packets fits in any size MTX block. The RST generator always requests the smallest block available, normally a 128 byte block. RST packets have their IP ID fixed at 0x0000 and their DF bit set in the IP header (do not fragment bit).

After the RST Generator builds the RST packet, the RST Generator stores the starting address of the MTX block containing the RST packet in a RST transmit queue. This queue is built in M1 memory. A block of M1 memory is requested and used until it is full. The last entry in each M1 block points to the address of the next M1 block to be used. Therefore, the RST queue can grow dynamically. The RST generator accesses M1 memory 32 bits at a time because MTX block addresses are only 26 bits. This queue length can grow as much as M1 memory is available. If no more memory is available for the queue, then the RST generator silently discards RST packet requests from the RCV State Handler. This has the network affect akin to dropping the RST packet in transmission. Because the connection is non-existent anyway, this does not have a serious affect on performance.

Figure 22:
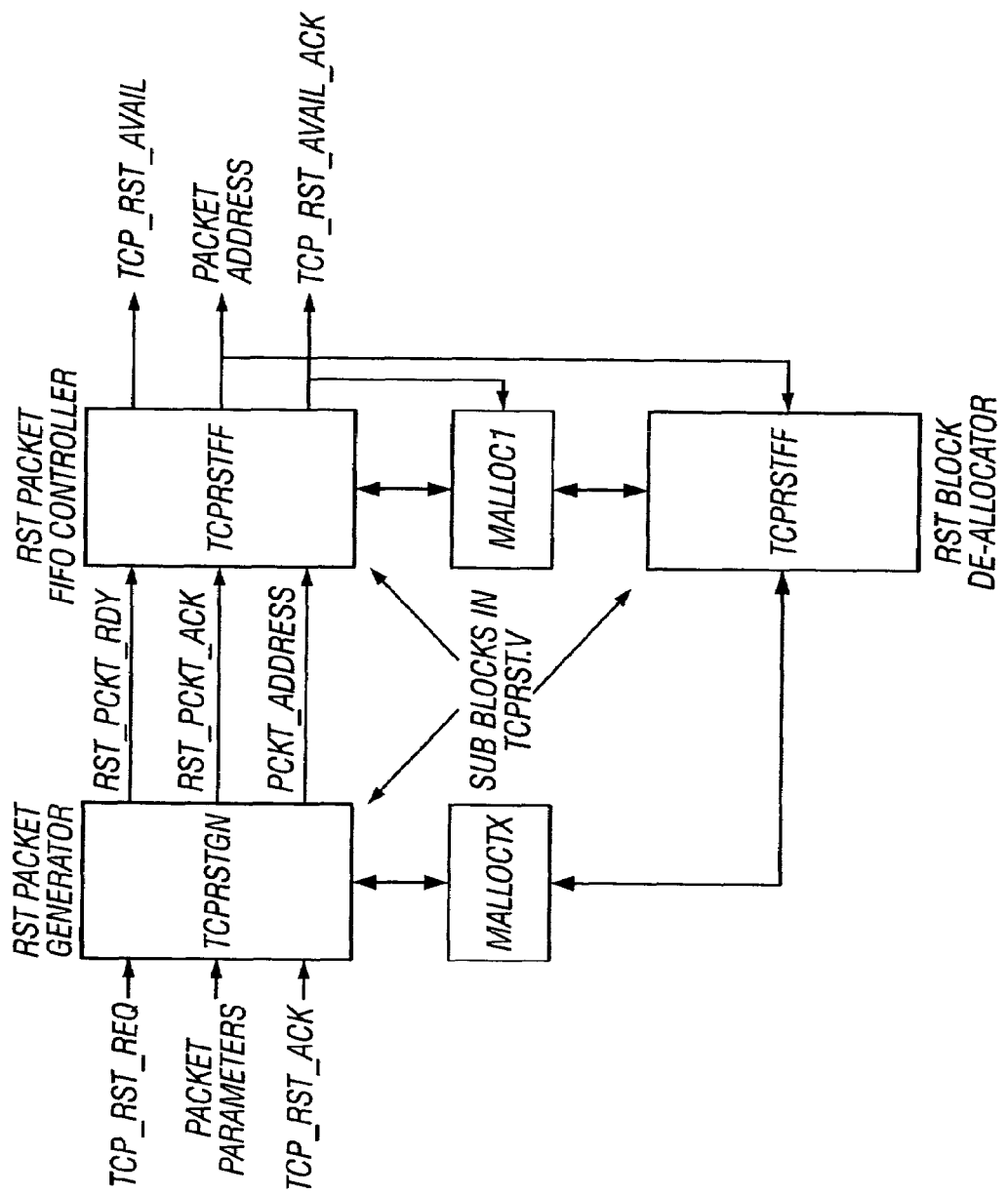
FIG. 22 shows a basic data flow according to the invention.

The output of the RST transmission queue is fed to the TCP Transmit Packet scheduler. When the transmit scheduler indicates back to the RST generator that the RST packet has been sent, then the MTX block that was being used for that RST packet is released. When all the entries in a M1 memory block are sent, and the link address to the next M1 block has been read, then the M1 memory block is released. The basic data flow is depicted in the FIG. 22.

RX to TX FIFO Buffer

The RX to Tx FIFO Buffer is used to queue SYN/ACK and ACKs that the RCV State Handler determines need to be sent in response to packets received. The RCV State handler passes the following information into the RX to Tx FIFO Buffer:

The CB Address containing the socket information (16 bits)

The CB type (2 bits; 00=Half-Open, 01=Open, 10=Time_Wait)

The Message type to be sent (1 bit, 0=SYN/ACK, 1=ACK)

Each RX to Tx FIFO Buffer entry is four bytes long and is stored in the miscellaneous memory buffer. Currently, this buffer is allocated 4K bytes, which provides a RX to TX FIFO Buffer depth of 1K entries. The output of the RX to Tx FIFO Buffer is fed to the SYN/ACK Generator.

SYN/ACK Generator

The SYN/ACK Generator 212 takes information output from the RX to TX FIFO Buffer, and looks up the other pertinent information from the specified CB, either Half-Open, Open, or Time_Wait, and then builds the desired packet, either a SYN/ACK or ACK. The SYN/ACK Generator first requests a block from MTX memory in which to build the packet. Because SYN/ACK and ACK packets are always 40 bytes long, these packets always fit in any size MTX block. The SYN/ACK generator always requests the smallest block available, normally a 128 byte block.

After the SYN/ACK generator builds the SYN/ACK or ACK packet, the SYN/ACK Generator puts the starting MTX block address into a 16-deep queue that then feeds the TCP Transmit Packet scheduler. If the RX to TX FIFO Buffer passes a programmable high watermark, then the Transmit Packet scheduler is notified of the situation and increases the sending priority of these packets.

NAT and IP Masquerading

The NAT and IP Masquerading block 206 works in parallel with the VSOCK module. The NAT and IP Masquerading block decodes the incoming packet to see if it is in the pre-specified NAT or IP Masquerading port range. If it is, then a signaling mechanism is used to indicate to the VSOCK block that it is a NAT packet. When this occurs, then entire packet is stored as is in the receive memory buffer. The packet, in turn, is transferred to the host system at some point. The driver in the host system is then responsible for performing routing functions, replacing header parameters and sending it to the proper network interface.

Exception Handler

The Exception Handler sends packets to the host computer that are not handled by the IT10G core.

Support Circuits rset Generation

A rst signal is generated from the top-levl rset signal synchronously.

tcp_in_rd Generation tcp_in_rd is used to freeze the input data from IP. This is asserted when a DRAM write request is not granted immediately. It also occurs if the DRAM runs out of small or large memory blocks.

Word Counter

The word counter, word_cnt[12:0], is zero at reset and at software reset. It increments when tcp_in_rd is active and ip_in_eof is not. It is zero during the first word of ip_in_data [63:0], one during the second, etc. It goes to zero on the first word after ip_in_eof and remains zero between valid ip_in_data words.

Memory Block Control Circuit

Reserve Memory Blocks

The Memory Block Control Circuit keeps a small and a large memory block available for use at all times. This assures that there is little delay when data must be written into a memory block. The Memory Block Control Circuit also performs the block requests in parallel with the data writes. These reserve memory blocks are initialized out of reset.

Initialization and Memory Block Size Selection

Parameters for the TCP or UDP segment are initialized. The size of the memory block to be used is determined by the TCP length info from IP and the TCP header length information from the Parser. If the data size (TCP length-TCP header length) fits into a small memory block, the reserve small memory block is used, and another small memory block is requested to refill the reserve. Otherwise, the reserve large memory block is used, and another large memory block is requested to refill the reserve. If a small memory block is not available, a large memory block is used. However, if a large memory block is needed but not available, small memory blocks are not used.

Writing Aligned TCP Data to Memory Block

Data in a TCP packet is aligned if there are an odd number of option half-words (each 32 bits wide) in the TCP header, resulting in data that starts on a 64-bit boundary. If the TCP packet data is aligned, the TCP packet data may be placed directly into the Memory Blocks as the data is sent from the IP block. The address of the first block for the segment is sent to the TCP State Machine. A count is kept of the space remaining in the block, as well as the data left in the TCP segment. A record must also be kept if a Memory Block has already been filled. When the end of the TCP segment is reached, if a previous block was filled, then that block must be linked to the current block. Also, the link in the current block header is cleared, and the data length and running checksum of the data is written to the block header. The data length is a function of the number of bytes in the last 64-bit word, as determined by the bits in ip_in_bytes_val. If the block runs out of room before the end of the TCP segment, then the data length and running checksum are written to the block header, and a flag is set indicating that a block has been finished. The remaining data in the TCP segment is used to determine whether the large or small reserve memory block is used. The same rules as in the earlier description are used if a block size runs out. The address of the last memory block must be sent to the TCP State Machine.

Writing Unaligned TCP Data to Memory Block

If the data in the TCP segment is unaligned (ip_in_data[63:0] contains data that go into two different memory block writes) then there must be an extra cycle at the beginning to store the first lo 32-bit half-word from the IP block, so that the data can be written as the high 32-bit half-word in the Memory Block. The high 32-bit half-word in the next bus cycle from the IP block is written as the low 32-bit half-word in the same cycle as the stored half-word. The counts and checksum calculations must also be adjusted to handle this situation. Otherwise, unaligned data is handled in the same way as aligned data, with the same termination cases as already described.

Writing UDP Data to Memory Block

UDP data is always aligned, so UDP data is handled in the same way as TCP aligned data. The same termination cases apply.

Checksum Calculation

The checksum is calculated as described in RFC 1071. In the Checksum Calculation block, the checksum is only calculated on the data. The Parser calculates the header checksum, and the TCP State Machine combines the two checksums and decides what to do with a packet with a checksum error.

Parsing Of Fixed Header Fields

Word Counter

The word counter, word_cnt[12:0], is zero at reset and at software reset. The counter increments when tcp_in_rd is active and ip_in_eof is not. The counter is zero during the first word of ip_in_data[63:0], one during the second, etc. The counter goes to zero on the first word after ip_in_eof and remains zero between valid ip_in_data words.

Latches for remote_ip_add[31:0] and local_ip_indx[3:0]

These latches are zero at reset and software reset. remote_ip_add is latched from src_ip_add[31:0] when src_ip_add_valid, ip_in_dav, and tcporudp_packet are asserted. Local_ip_indx is latched from dest_ip_index[3:0] when dest_ip_index_valid, ip_in_dav, and tcporudp_packet are asserted. Both are valid until reloaded at the next packet.

TABLE 5

Fields Latched vs. Word Count

| Word Count | Latched Fields |
|---|---|
| 0000 | rx_remote_port, rx_local_port, rx_tcp_seq_num, rx_udp_length, rx_udp_checksum |
| 0001 | rx_tcp_ack_num, rx_tcp_header_len (5), rx_tcp_urgent_flg, rx_tcp_ack_flg, rx_tcp_push_flg, rx_tcp_reset_flg, rx_tcp_syn_flg, rx_tcp_final_flg, rx_tcp_window_siz |
| 0002 | rx_tcp_checksum, rx_tcp_urgent_ptr |

Note: fields are cleared or initialized (in parentheses) on reset and on first word from IP
Note: latches are also qualified by tcp_packet, udp_packet & ip_in_dav Checksums, Error Checks and Parsing of Optional Header Fields Checksums The RFC 1071 checksum is calculated on the header as defined in the header length field, along with the pseudo header comprising the IP source address, the IP destination address (not index), the 8-bit type field with 8-bit leading zeros (=0006 hex), and the TCP length.

Header Length Check

Once the rx_tcp_hdr_len field is parsed (Word Count >0001), the rx_tcp_hdr_len field can be checked. The rx_tcp_hdr_len field cannot be less than five or more than MAX_HDR_LEN, which is set to ten. If so, the error_rx_tcp_hdr_len signal is asserted and remains so until the start of the next packet.

TCP Length Check

The IP Payload Length from IP is checked. The IP Payload Length cannot be less than 20 bytes (used when rx_tcp_header_len is not yet valid) and cannot be less than the rx_tcp_header len. If so, the error_rx_tcp_len signal is asserted and remains so until the start of the next packet.

Parsing Of Optional Header Fields

Fields are cleared on reset and on first word from the IP block. Only the Timestamp (10 bytes+padding), MSS (4 bytes), and Window Scale (3 bytes+padding) are searched out. There can only be 20 bytes of options, so header length can only be 10 32-bit half-words (Word Count=0004).

Options are parsed in a straightforward manner. Options start from the second half of word count=2 and are 32-bit aligned. The first byte of the option identifies the option type.

If the Timestamp option is detected, the rx_tcp_timestamp, rx_tcp_tx_echo, and rx_tcp_timestamp_val are loaded.

If the MSS option is detected, rx_tcp_remote_mss and rx_tcp_remote_mss_val are loaded.

If the Window Scale option is detected, rx_tcp_remote_win_scl and rx_tcp_rem_win_scl_val are loaded.

These stay valid until the beginning of the next packet.

Socket Receive Sub Module

Figure 23:
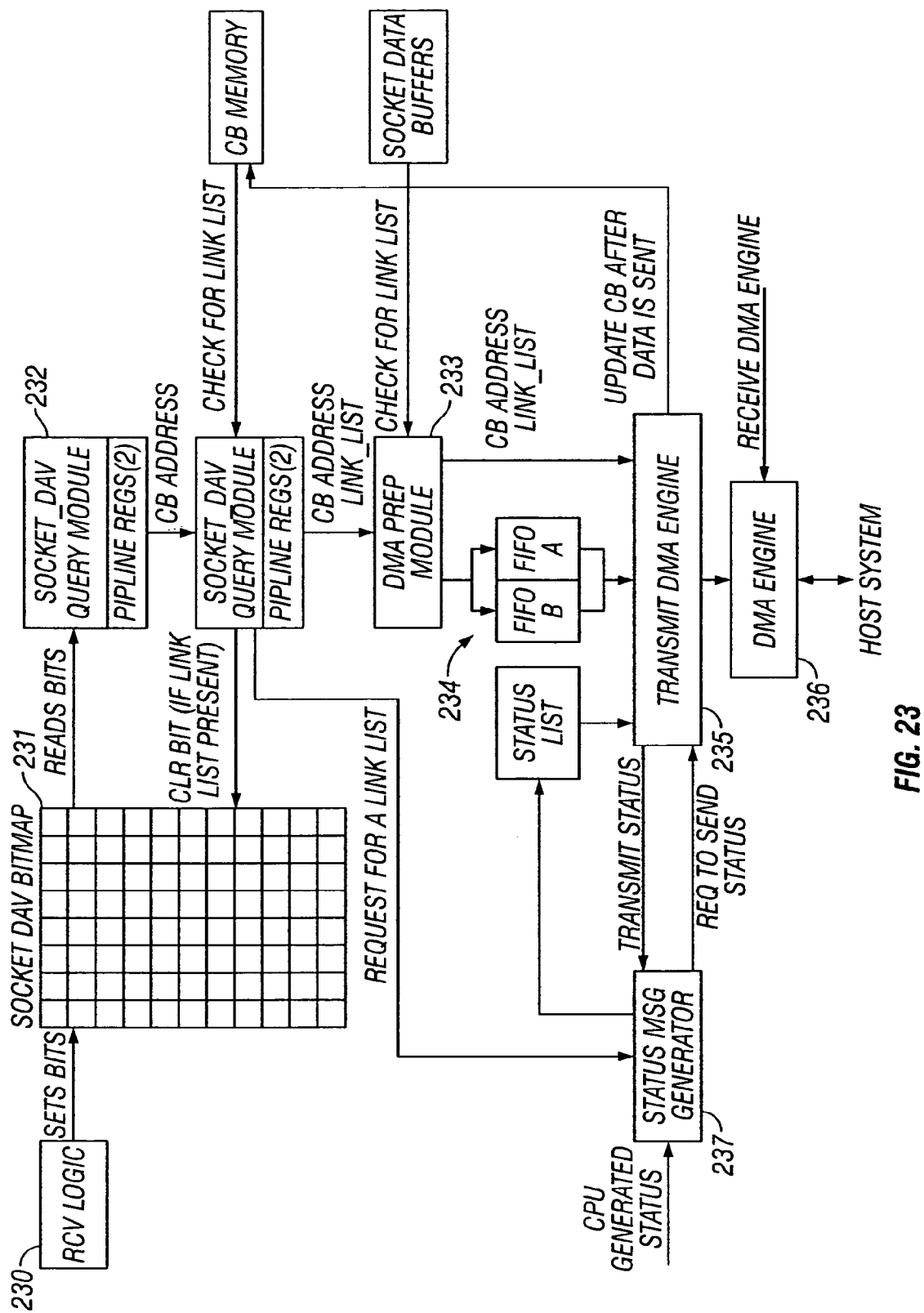
FIG. 23 shows a Socket Receive Data Flow according to the invention.

The Socket Receive Submodule handles the interface between the IT10G and the system (host computer) for received data. FIG. 23 shows the Socket Receive Data Flow.

The Socket Receive Submodule process starts with the receive logic 230 setting a bit in the Socket Receive DAV bitmap table 231. The Socket Receive DAV bitmap table has a bit associated with each of the 64K sockets (therefore the table is 8K bytes). By knowing the location of the CB, the appropriate bit is set.

The Socket_DAV Query module 232 is a block that is continuously scanning the Socket Receive DAV bitmap table. When the Socket_DAV Query module comes across a set bit, it generates the corresponding CB address, and checks the CB structure to see if the CB structure contains a valid link_list block. A valid link_list block consists of a 64-bit memory address, and a 16 bit length. If the CB does have a valid link_list block, then the CB address, and the link_list information is passed to the DMA Prep module 233 via a two-stage pipeline register pair. The Socket_DAV module also clears the CB's corresponding bit at that time. If the CB does not contain a valid link_list block, then a status message is generated for the socket informing the host that data is available for the socket, but no valid transfer block information exists for that socket. In this case, the corresponding bit in the bitmap table is not cleared yet. The CB can also be updated in this case to that we know we have already sent out a status message to the host asking for a link_list block. This step is necessary so that we do not send multiple status messages for the same CB.

If a valid link_list block exists, then the next step is that the CB and transfer information is sent to the DMA prep module. The DMA prep module is responsible for reading the data from the socket data buffer and transferring the data into one of 2 ping-pong transfer FIFO buffers 234 for the DMA engine. When this data transfer is complete, the DMA prep module sends a request to the Transmit DMA engine 235 that there is data to be transferred. The link_list info is also passed to the Transmit DMA engine.

When the Transmit DMA engine gets a request from the DMA prep module, the Transmit DMA engine signals to the main DMA engine 236 that we wish to perform a DMA transfer to the host. When we are granted the bus, the DMA engine reads data out of the ping pong buffers and sends them to the host computer. When the DMA transfer is complete, the CB for the socket is updated, and a status message generated indicating that the data has been sent to the host computer.

The Status message generator 237 is the module that is responsible for generating the status messages, and writing the status messages into a status message block of memory (1K bytes). Status message generation requests may come from the Transmit DMA engine, the Socket DAV Query module, or the CPU.

Socket Transmit Sub Module

Figure 24:
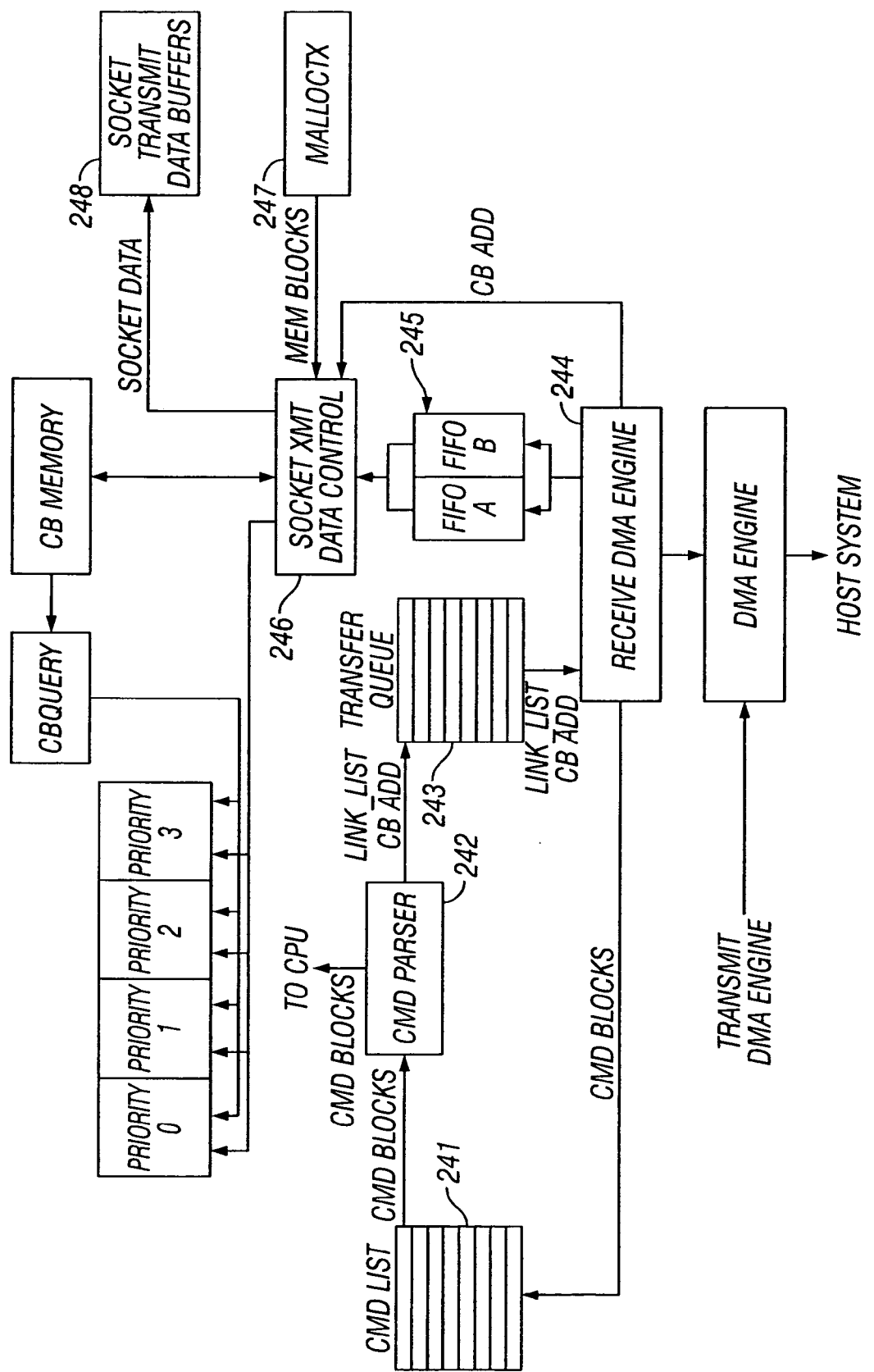
FIG. 24 shows a Socket Transmit Flow according to the invention.

The Socket Transmit Submodule handles the interface between the IT10G and the system for transmitting data. FIG. 24 shows the Socket Transmit flow.

The Socket Transmit flow starts with the reception of a command block list from the host. The command block list is received via a DMA transfer, and placed into the Command List 241. From here blocks are extracted and parsed by the Command Parser module 242. Commands that are understood by the parser are executed and those that are not understood are sent to the on-chip processor.

If the command is to transfer data, then the link_list information is extracted from the command block, along with the CB address, and placed on a Transfer Queue 243.

The Receive DMA engine 244 takes entries off this Transfer Queue and executes the data transfer from host computer memory. Data is placed into a pair of ping-pong FIFO buffers 245. The CB address associated with the data just received, is passed to the Socket Xmt Data Control module 246.

The Socket Xmt Data Control module takes data from the ping-pong FIFO buffers and places the data into the Transmit Socket Data memory 248. The Socket Xmt Data Control module retrieves block addresses from the malloctx memory allocator 247. The Socket Xmt Data Control module also queries the socket CB for the priority level of the socket. When all the data has been transferred to the data buffer, the Socket Xmt Data Control module puts the CB address into one of the four priority queues. The Socket Xmt Control module also updates the socket CB with the new data transmit count information.

When data is transferred from the DMA receive FIFO buffers into socket data memory, a running checksum is performed at that time. The checksums are calculated on a per block basis. This helps cuts down on transmission latencies later as data need not then be read again.

CB LUT

Overview

The TCP receive logic uses a LUT to find open socket connections. The LUT is 128K deep by 18 bits.

CB LUT to DRAM Interface

This section describes the interface between the miscmem module and the NS DDR Arbitration module. It describes the data flow, lists interface signals, and details the timing required.

Data Flow

The CB LUT only performs single read and write accesses to the data DRAM. In the present implementation the DRAM is external, but the memory could alternatively be provided on-chip. The DRAM access is in DWORDs. Because each LUT entry is only 18 bits, only the bottom 18 bits of the DWORD are passed to the CB LUT memory interface.

TCP Transmit Sub Module

Overview

Figure 25:
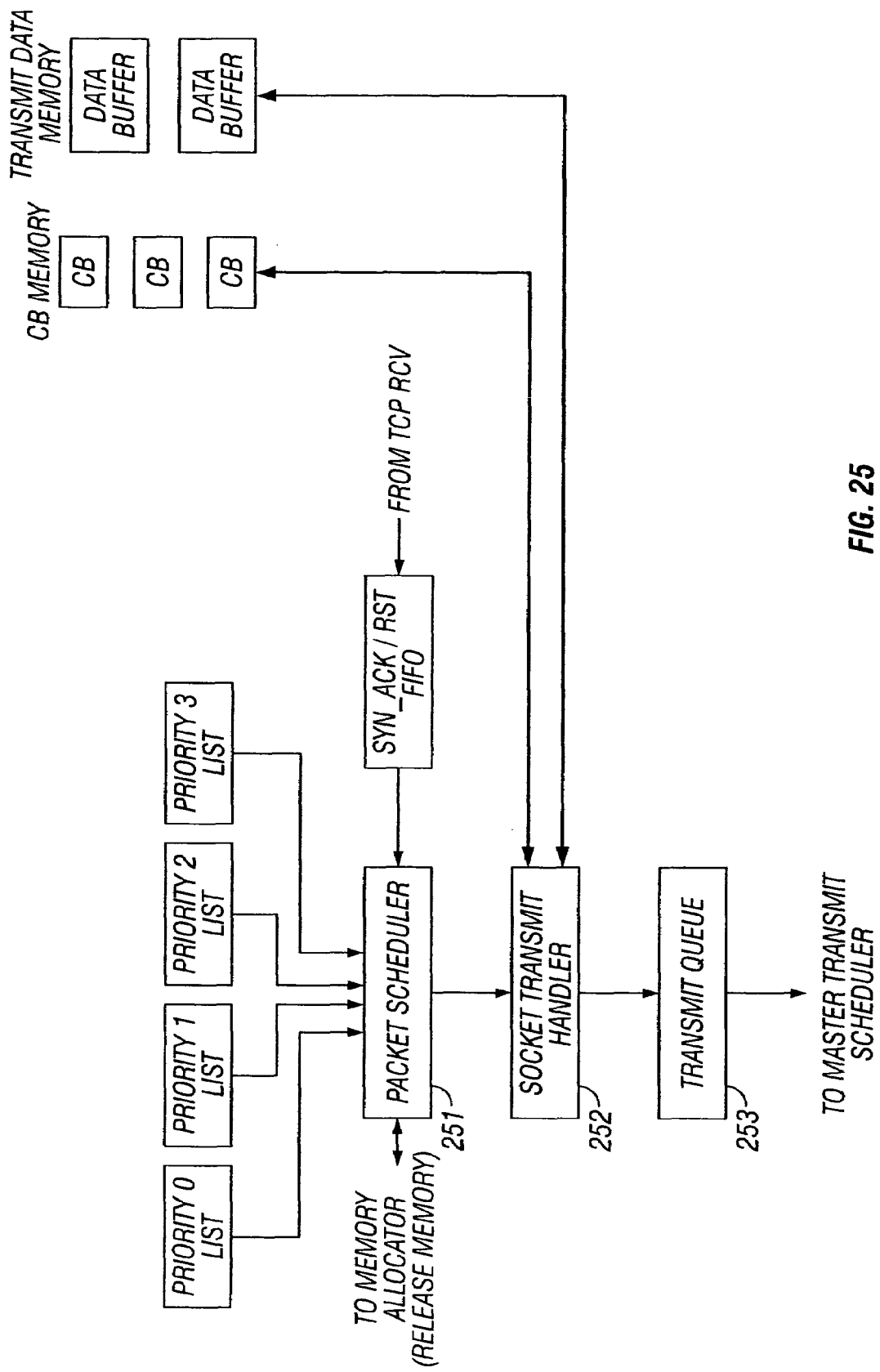
FIG. 25 shows a data flow according to the invention.

The TCP Transmit Sub Module module is responsible for determining which socket should be serviced next for data transmission, and for updating the socket CB blocks accordingly. The data flow is depicted in FIG. 25.

The TCP transmit data flow starts with the Socket Query module. The Socket Query module scans the XMT_DAV Bit table looking for entries that have their Transmit Data Available bits set. When the Socket Query module finds a Transmit Data Available bit that is set, then the the Socket Query module puts that entry into one of the four queues according to the socket's User_Priority level. Sockets with priority level 7 or 6 are put into Queue List 3, levels 5 and 4 are put into Queue List 2, levels 3 and 2 are put into Queue List 1, and levels 1 and 0 are put into Queue List 0.

These lists all feed a Packet Scheduler 251. The Packet Scheduler is responsible for pulling packets off. of the priority cues in a non-starvation manner. The Packet Scheduler also arbitrates between sending data packets out, as well as SYN_ACK and RST packets that were generated from the Half-Open support module.

When the Packet Scheduler determines which packet to send out next, the Packet Scheduler forwards this information to the Socket transmit Handler 252. The Socket transmit Handler module reads the socket CB information, generates the packet headers, updates the CBs, and sends the packet transmit information to the Transmit queue 253. All packet headers are generated in separate memory buffers which are then pre-pended to the data buffers. This also applies if the data to be sent start in the middle of a data buffer. In this case, the point from the packet header data buffer points to the first byte of data to be sent. A locking mechanism is used so that this module does not modify the same socket CB that another module may be operating simultaneously.

The Transmit Queue is responsible for queuing data packet to be sent to the master transmission arbitrator.

Packet Scheduler

Figure 26:
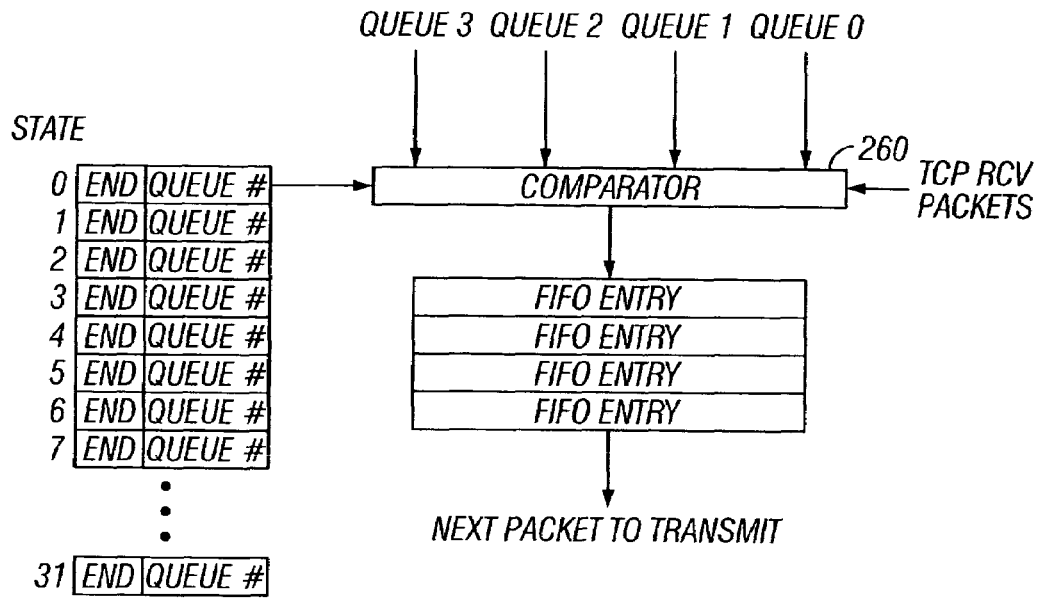
FIG. 26 shows a block diagram of a module according to the invention.

The Packet Scheduler is responsible for determining which packet is sent out next. A block diagram of one implementation this module is shown in FIG. 26.

The packet scheduling process starts by the Comparator 260 taking the queue number that is in the current state and seeing if there is anything in that queue to be sent. The queue number can represent one of the Queue lists or a TCP Rcv Packet. If there is a packet of that type waiting, then its entry is pulled and scheduled as the next transmitted packet. If there is no packet in that queue, then the state counter is incremented and the next queue state checked. This continues until a queue number matches a queue list (or TCP Rcv packet) that has a packet ready for transmission, or the end bit in the state entry is set. If the end bit is set, then the state counter resets back to zero (0).

The queue arbitration sequence is programmable. An application can set the queue arbitration sequence by first setting the Queue_State register to 0x00 and then writing the Queue number and end bit to the Queue_Entry register. There are two built-in arbitration sequences which can be set by asserting either the Flat or Steep bits in the Queue_State register.

Flat Sequence

The Flat Sequence is the default sequence state that the Scheduler uses after any reset. The Flat Sequence can also be set by writing the seq_prog field in the TSequence register to 01. The sequence is shown below:

3-2-3-2-3-X-1-3-2-3-X-2-3-1-3-X-2-3-2-3-0-X
<repeat>

Where 3,2,1, and 0 are the respective Queue lists and X are packets from the TCP Rcv logic. Under this scheme each list has the following bandwidth allocation:

TABLE 6

Flat Sequence Bandwidth

| List | % of Bandwidth |
|---|---|
| 3 | 49.0 |
| 2 | 27.3 |
| 1 | 9.1 |
| 0 | 4.5 |
| X | 18.2 |

Steep Sequence

An alternative to the preprogrammed Flat Sequence is the Steep sequence. The Steep sequence weights the higher priority queues more, and is useful where many high priority applications are running simultaneously. The Steep sequence is set by writing the seq_prog field in the TSequence register to 10. The Steep sequence is shown below:

3-3-2-3-3-2-X-3-3-1 -3-3-2-3-X-3-2-3-3-1 -3-3-X-2-3-3-2-3-3-0-X

The percentage bandwidths for this sequence are as follows:

TABLE 7

Steep Sequence Bandwidth

| List | % of Bandwidth |
|---|---|
| 3 | 58.1 |
| 2 | 19.4 |

TABLE 7-continued

Steep Sequence Bandwidth

| List | % of Bandwidth |
|---|---|
| 1 | 6.4 |
| 0 | 3.2 |
| X | 12.9 |

The use of the packet scheduler allows the sharing of hardware modules and resources depending on receive data traffic.

Hash Algorithm

The Hash algorithm used combines the socket's local and peer ports, and local and peer IP addresses to form a single 17 bit Hash value. The hash algorithm is designed to be simple thereby yielding single clock cycle results, as well as being spread spectrum enough to minimize Hash LUT collisions. The equation of the Hash is as follows:

LP=Local Port
PP=Peer Port
LIP=Local IP Address
PIP=Peer IP Address $$Hash[16:0]=\{(\{LP[7:0], LP[15:8]\} \wedge PP), 1'b0\} \wedge \{1'b0, ((LIP[15:8] \wedge LIP[7:0]) \wedge (PIP[15:8] \wedge PIP[7:0]))\};$$

Figure 27:
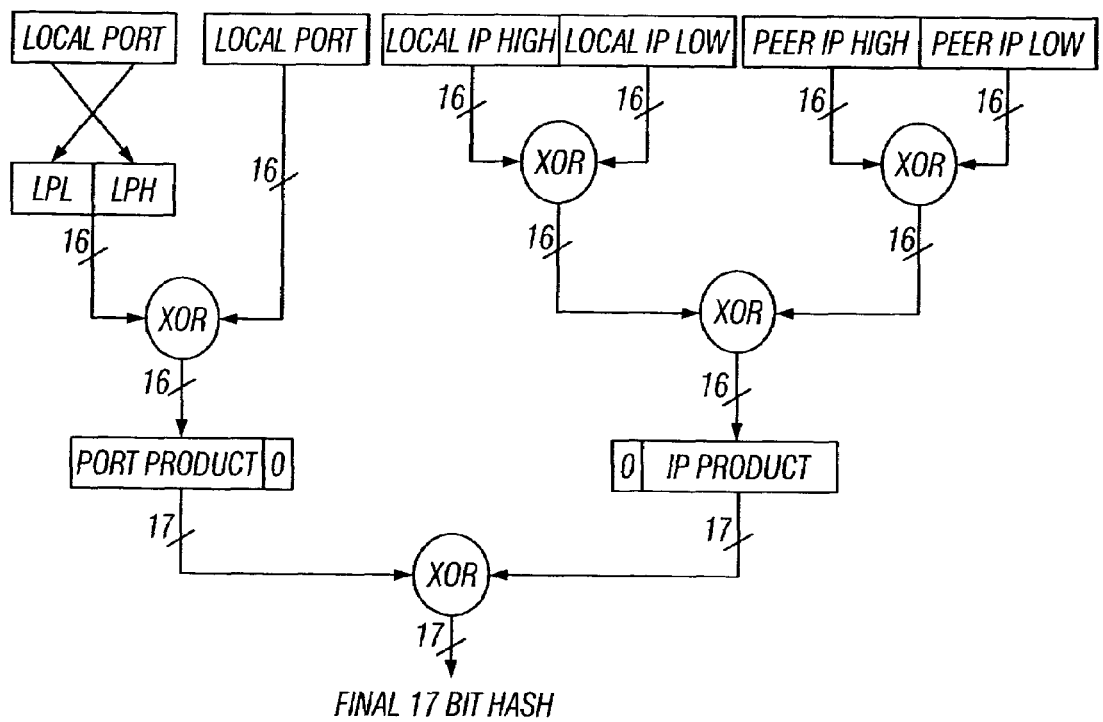
FIG. 27 shows an algorithm according to the invention.

The following are the steps that are performed for the Hash:
The bytes of the local port are swapped.
The new byte swapped local port is XOR'ed with the Peer Port to form a 16 bit Port Product.
The MSB of the Local IP address is XOR'ed with the LSB of the Local IP address.
The MSB of the Peer IP address is XOR'ed with the LSB of the Peer IP address
The two IP address products are XOR'ed to form an IP Word Product.
The Port Product is shifted left by one bit and filled with a 0 to form a 17 bit value.
The IP Word Product is appended with a leading 0 to form a 17-bit product.
The new 17 bit Port Product and IP Word Product are XOR'ed to form the final Hash value This Hash algorithm is depicted in FIG. 27.
The following is an example of the Hash algorithm.
LP=1024
PP=0080
LIP=45.C3.E0.19
PIP=23.D2.3F.A1

Port Product=0x2410 ^ 0x0080=0x2490

IP Product=(0x45C3 ^ 0xE019) ^ (0x23D2 ^ 0x3FA1)=0xA5DA ^ 0x1C73=0xB9A9

Final Hash={0x2490, 0} ^ {0, 0x79A9}=0x04920 ^ 0x0B9A9=0x0F089

For the Half Open control block LUT, a 12-bit Hash is used. This 12-bit Hash value is derived from the equation above as follows:

$$Hash12[11:0]=Hash17[16:5] \wedge Hash17[11:0];$$

where Hash 17 is the previously defined equation.
ISN Algorithm
Theory of Operation
The ISN algorithm used in the IT10G is similar to the algorithm described in RFC1948 and incorporates a 4-microsecond based timer, a random boot value settable by the host system, and the four socket parameters (ports and IP addresses). The function has the following form:

$$ISN = Timer + F(boot\_value, src\_ip, dest\_ip, src\_port, dest\_port)$$

Where Timer is the 4-microsecond based 32-bit up counter. The F( ) function is based on a function FC( ), which is defined as follows:

$$FC\ (hv32, data32) = [(prev32 << 8) \wedge (prev32 >> 7)] \wedge data32$$

Initially, the value of hv32 is set to the random boot_value from the system (host computer). Then, for each ISN requested, hv32 is calculated as follows:

hv32=FC (prev32, src_ip)
hv32=FC (prev32, dest_ip)v
hv32=FC (prev32, {src_port, dest_port})

Figure 28:
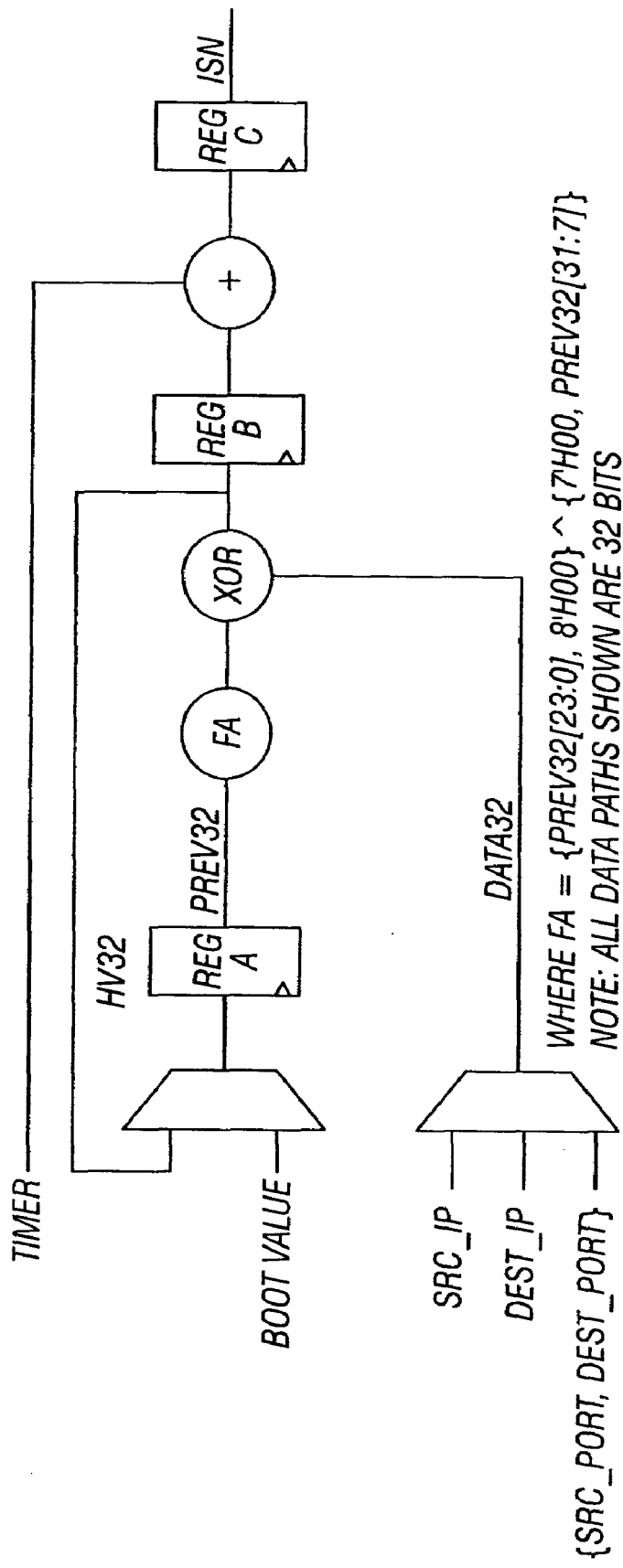
FIG. 28 is a block diagram for the entire algorithm shown in FIG. 27.

A block diagram for the entire algorithm is shown in FIG. 28.

The current architecture takes four clock cycles to compute an ISN. In the first cycle, the source IP address (src_ip) is fed through to generate hv32. In the second clock cycle, the destination IP address is fed through, and in the third clock cycle, the port information is fed through. The fourth clock cycle is used to add the final function value with the incrementing timer value. Note also that reg A, and reg B are not clocked on the fourth clock cycle.

Test Mode

An ISN test mode is provided as a way to set the ISN to a given number for diagnostic purposes. This test mode is used as follows:

Write 0x00 to 0x1A06 (TCP TX Read Index Register)
Write bits [7:0] of the ISN to 0x1A07
Write 0x01 to 0x1A06
Write bits [15:8] of the ISN to 0x1A07
Write 0x02 to 0x1A06
Write bits [23:16] of the ISN to 0x1A07
Write 0x03 to 0x1A06
Write bits [31:24] of the ISN to 0x1A07
Write 0x04 to 0x1A06
Write any value to 0x1A07 (enables the test mode)

The write in step #10 above enables the ISN test mode. The ISN now specified is used the next time an ISN is requested. To clear the test mode, write 0x05 to 0x1A06 and then write any value to 0x1A07.

Socket Control Block Structures

Overview

Socket control blocks or CBs contain the working information for each socket, and reside in the CB memory space. CBs contain all the state information, memory pointers, configuration settings, and timer settings for a socket. These parameters may be updated by various TCP sub-modules. A locking mechanism ensures that only one sub-module can modify a socket CB at a time. The IT10G uses a different CB structure for sockets that are in the half-open state, the established state, and the closing states.

Established Socket Main TCP/UDP CB Structure

The following table lists all fields in the main TCP CB structure in memory for established sockets. There is also an annex TCP CB structure that is defined below.

TABLE 8

Established TCP Socket Main CB Structure

| | 31 28 | 24 | 20 | 16 | 12 | 8 | 4 | 0 |
|---|---|---|---|---|---|---|---|---|
| 0 | colspan Remote IP address [31:0] |||||||| 
| 1 | Remote Port [15:0] |||| Local Port [15:0] ||||
| 2 | IP Index [3:0] | ConnState [3:0] | AX SA TS WS ZW AR CF CV | RD | CBVer [2:0] | CB Interface [3:0] | SY ST SR KA/U | DF VL RE AD |
| 3 | ACK Number [31:0] ||||||||
| 4 | SEQ Number [31:0] ||||||||
| 5 | Keep Alive Time || LWinScale [3:0] | RWinScale [3:0] | Remote MSS [15:0] |||
| 6 | PA | Priority | VID [11:0] || Remote MAC Address [47:32] |||
| 7 | Remote MAC Address [31:0] ||||||||
| 8 | Local IP Address [31:0] ||||||||
| 9 | RX ACK Number [31:0] ||||||||
| A | Congestion Window (cwnd) [31:0] ||||||||
| B | HA | SS | Sock Type | MI | RX Ending Mem Block Pointer [25:0] ||||
| C | AB | IPSEC Mode[3:0] | HD | | RX Start Mem Block Pointer [25:0] ||||
| D | HR | AS | DA RO RV | TP | Next TX Mem Block Pointer [25:0] ||||
| E | MSS_S | Silly Window Size [29:0] |||||||
| F | RX DMA Count [15:0] |||| Host Buffer Offset [15:0] ||||

TABLE 8-continued

| | | | | | | | | | | |
|---|---|---|---|---|---|---|---|---|---|---|
| 10 | Window Clamp [31:0] ||||||||||
| 11 | Link List Address [31:0] ||||||||||
| 12 | RX DMA Count [23:16] ||| Link List Entries [7:0] ||||| Transfer Threshold [15:0] |||
| 13 | K | DupAck [2:0] || etries/Probes [3:0] | TX Data Avail [23:0] ||||||
| 14 | Socket Channel [7:0] ||| SX | /// | FX | DA | UM | UC | TW | Next CB Link [15:0] |
| 15 | RX Window Size [15:0] |||||| IP TTL [7:0] ||| IP TOS [7:0] |
| 16 | RX Timestamp/Timed Seq Number [31:0] ||||||||||
| 17 | Smooth Mean Dev. (D) [31:0] ||||||||||
| 18 | Slow Start Threshold (ssthresh) ||||||||||
| 19 | Smooth RTT (A) [31:0] ||||||||||
| 1A | Retransmission Timeout (RTO) [31:0] ||||||||||
| 1B | Retransmission Timestamp [31:0] ||||||||||
| 1C | TX Left SACK [31:0] ||||||||||
| 1D | TX Right SACK [31:0] ||||||||||
| 1E | RX Left SACK [31:0] ||||||||||
| 1F | RX Right SACK [31:0] ||||||||||

Established Socket Main CB Field Definitions

Remote IP Address (Address 0x00, 32 bits)

This 32-bit field represents the remote IP address for the connection. For client sockets, this field is set by the application. For server sockets, this field is filled in by the IP address received in the SYN packet or the IP address in the received UDP packet.

Remote Port (Address 0x01 [31:16], 16 bits)

This field represents the remote port number for the connection. For client sockets, this field is always specified by the application. For server sockets, this field is always filled in with the port number received in the SYN or UDP packet.

Local Port (Address 0x01 [15:0], 16 bits)

This field represents the local port number for the connection. For client sockets, this field can either be specified by the application or automatically generated by the network stack. For server sockets, this field is always specified by the application.

IP Index (Address 0x02 [31:28], 4 bits)

This field represents the index in the network stacks IP address table for the IP address of the host interface for the socket, and is filled in by the network stack hardware.

ConnState (Address 0x02 [27:24], 4 bits)

This field indicates the current state of the connection, and decodes as follows:

TABLE 9

Socket State Decode Table

| State | Description |
|---|---|
| 0x0 | Closed |
| 0x1 | Listen |
| 0x2 | SYN Received |
| 0x3 | SYN Sent |
| 0x4 | Established (Server) |
| 0x5 | Close Wait |
| 0x6 | Last ACK |
| 0x7 | FIN Wait 1 |
| 0x8 | FIN Wait 2 |
| 0x9 | Closing |
| 0xA | Time Wait (Open CB) |
| 0xB | Time Wait (TW CB) |

AX (Address 0x02 [23], 1 bit)

This bit indicates that the Received ACK Status Message mode is enabled. In this mode, when an ACK is received that acknowledges all outstanding data, a status message is generated. This mode is used in conjunction with the Nagle Algorithm.

SA (Address 0x02 [22], 1 bit)

This bit indicates that the Selective ACK option (SACK) should be used with this socket (0=Do not use SACK, 1=Use SACK).

TS (Address 0x02 [21], 1 bit)

This bit indicates that the Timestamp option should be used with this socket (0=Do not use timestamp option, 1=Use timestamp option).

WS (Address 0x02 [20], 1 bit)

This flag indicates that the Sliding Window option has been successfully negotiated for the TCP socket (0=Do not use WS option, 1=WS option enabled). This bit is not used for UDP sockets.

ZW (Address 0x02 [19], 1 bit)

This bit indicates that the socket's peer window is 0x0000, and that the socket is in the zero-window probe state.

AR (Address 0x02 [18], 1 bit)

This bit is set when an ACK packet is to be transmitted on a particular socket. It is cleared when the ACK packet has been transmitted.

CF (Address 0x02 [17], 1 bit)

This bit indicates that the current CB is in the RX to TX FIFO Buffer queue so it cannot be depreciated yet. Once the ACK for the socket is transmitted, the TCP transmit block moves the Open CB to a Time_Wait CB.

CV (Address 0x02 [16], 1 bit)

This bit indicates that the CB contains valid information. Prior to deprecating any CB, this bit is always cleared.

RD (Address 0x02 [15], 1 bit)

This bit indicates that the CB retransmission time expired, but it was unable to be queued for retransmission due to the priority queue being full. When the CB poller comes across this bit being asserted in a CB, then it disregards the retransmission time field and processes the CB for retransmission. This bit is cleared when the CB has been put into the priority sending queue.

CBVer (Address 0x02 [14:12], 3 bits)

These bit indicate the version of CB, and is mainly used by the on-chip processor so that it can differentiate types of CBs in future hardware versions. This field is currently defined as 0x1.

CB Interface (Address 0x02 [11:8], 4 bits)

These bit are used to specify a particular physical interface for the socket and is used in multiport architectures. For single-port architectures, this field should be left at 0x0.

SY (Address 0x02 [7], 1 bit)

These bit indicates that the socket received a SYN packet while in the TW state. If this bit is set and we then receive a RST on the socket and the kill_tw_mode is set to 0x00, then the CB is deprecated immediately.

ST (Address 0x02 [6], 1 bit)

This bit indicates that the TX Left and Right SACK fields are valid. When the TCP receive logic notices a hole in the received data, the TCP receive logic puts the hole starting and ending addresses into the TX Left and Right SACK fields and sets this bit to indicate that the next transmitted packet should include the SACK option. When a packet is transmitted that included these parameters, this bit is cleared.

SR (Address 0x02 [5], 1 bit)

This bit indicates that the RX Left and Right SACK fields are valid. When the TCP receive logic receives a SACK option, the TCP receive logic puts the first pair of SACK values into the RX Left and Right SACK fields, and sets this bit to indicate to the TCP transmitter that this section needs to be retransmitted. When the section is retransmitted, this bit is cleared.

KA (Address 0x02 [4], 1 bit)

For TCP sockets, this bit indicates that the keep alive timer should be used with this socket (0=don't use the keep alive timer, 1=use the keep alive timer). For UDP sockets, this bit indicates whether the checksum should be checked or not (1=enable checksums, 0=ignore checksums).

DF (Address 0x02 [3], 1 bit)

This bit represents the state of the DF bit in the IP header for the socket. When this bit is set, the packet is not fragmented by any hop. This bit is used for path MTU discovery.

VL (Address 0x02 [2], 1 bit)

This bit indicates whether VLAN tags are included in the outgoing Ethernet frames or not. If this bit is asserted, then 4 bytes of VLAN tag information made up by cb_tx_vlan_priority and cb_tx_vid, and the VLAN tag identification (fixed value) are included following the Ethernet Address fields.

RE (Address 0x02 [1], 1 bit, TCP CB's)

This flag is used to indicate a timeout condition, and that a retransmission is required. It is cleared when the data is retransmitted. This bit is only defined for TCP CBs.

UP (Address 0x02 [1], 1 bit, UDP CB's)

This flag is used to indicate whether the UDP port was dynamically allocated or pre-specified. If it is dynamically allocated, then it is de-allocated when the CB is deprecated. Otherwise if it is pre-specified, then no port action is done when the CB is deprecated. This bit is only defined for UDP CBs.

AD (Address 0x02 [0], 1 bit)

This bit indicates that an ACK is queued for delayed ACK transmission on the socket. This bit is set in the TCP RX logic, and cleared when the ACK is queued by the CB Poller for transmission.

TX ACK Number (Address 0x03, 32 bits)

This is the running ACK number for TCP connections. It represents the expected SEQ number in received TCP PSH packets. When a TCP data packet is received, then SYN number is checked against this number. If it matches or if the SEQ number received+the length of the packet covers this number, then the data is accepted. This number is updated automatically by the network stack, and is not used for UDP connections.

SEQ Number (Address 0x4, 32 bits)

This is the running SEQ number for TCP connections. It represents the SEQ number to be used in TCP packets, and is updated by the network stack automatically. This field is not used for UDP sockets.

Keep Alive Time 0x05 [31:24], 8 bits)

This field represents the time in the future when the keep alive trigger is asserted. This time is reset every time a packet is sent on the socket or a pure ACK packet is received. The time is represented here in units of minutes.

LWinScale (Address 0x05 [23:20], 4 bits)

This field represents the local sliding window scale factor that is used for the connection. Valid values are from 0x00 to 0x0E.

RWinScale (Address 0x05 [19:16], 4 bits)

This field represents the sliding window scale factor as requested by the remote end in the TCP SYN packet. Valid values are from 0x00 to 0x0E.

Remote MSS (Address 0x05 [15:0], 16 bits)

This field represents the MSS that received in the SYN packet for TCP connections. It indicates the largest packet size that the remote end can accept. If no MSS option was received, then this field defaults to 536 (0x0218). This field is not used for UDP connections.

PA (Address 0x06 [31], 1 bit)

This bit is used to indicate that the port for the CB was auto allocated. If this bit is set, then when the time comes to deprecate the CB, this bit is examined to determine if the port needs to be de-allocated.

Priority (Address 0x06 [30:28], 3 bits)

This field represents the user priority level used for the VLAN tag. This field also represents the service level for the socket during transmission scheduling. The higher the number, the higher the priority (7 is the highest, and 0 is the lowest). The default value for this field is 0x0, and it is settable by software.

VID (Address 0x06 [27:16], 12 bits)

This field represents the VLAN Identification used in VLAN tag frames. The default value for this field is 0x000, and is settable by software. For connections initiated from a peer, this field is set by the VID received in the opening SYN packet.

Remote MAC Address (Addresses 0x06 [15:0]-0x07, 48 bits total)

These fields represent the destination MAC address for packets being transmitted on this socket. When the socket is first established, the ARP cache are queried for this address. After it is resolved, the address is stored here so that further ARP cache queries are avoided. If the CB is created as a server socket, then this address is taken from the destination MAC address contained in the SYN packet. Bits [47:32] of the address are stored in CB address 0x6.

Local IP Address (Address 0x08, 32 bits)

This field represents the local IP address for the socket connection. For client sockets, this field is specified by the application. For server sockets, this field is filled in when the CB is transitioned from Half Open to Open.

RX ACK Number (Address 0x09, 32 bits)

This field represents the latest ACK number received from the peer for this socket. It is used to determine if any retries are needed on a socket. Note that this may be a different number then the sequence number that is used in transmitted packets.

Congestion Window (cwnd) (Address 0x0A [31:0], 32 bits)

This field keeps track of the cwnd parameter. The cwnd parameter is used for the congestion avoidance and slow start algorithms, and is initialized to one MSS.

HA (Host ACK) (Address 0x0B [31], 1 bit)

This bit indicates that the Host_ACK mode is active for this socket. In this mode, data ACKs are triggered by the host, and are not sent automatically when the data is received.

SS (RX DAV Status Sent) (Address 0x0B [30], 1 bit)

This bit indicates that an RX DAV status message for the CB has been sent to the on-chip processor. The bit clears when the data are DMA'ed to the host.

Sock Type (Address 0x0B [29:27], 3 bits)

This field indicates the type of socket represented by the control block according to the following table.

TABLE 10

Socket Type Decode Table

| Sock Type | Description |
|---|---|
| 000 | Reserved |
| 001 | UDP (Normal) |
| 010 | TCP Client |
| 101 | UDP (Raw) |
| 110 | TCP Server |

All other decodes not show are reserved for future use. In UDP Raw mode, the application is presented with the remote IP address and the UDP header information along with the UDP data. In UDP Normal Mode, only the data portion is presented to the application.

MI (Address 0x0B [26], 1 bit)

This bit is used to indicate that no data are currently in the sockets receive memory block.

RX Ending Mem Block Pointer (Address 0x0B [25:0], 26 bits)

This field represents the address of the last MRX buffer that received data was written into. It is used to link the next memory block that is used for the socket.

RX Start Mem Block Pointer (Address 0x0C [25:0], 26 bits)

This field represents the address of the next MRX buffer to be sent to the host.

HD (Address 0x0C [26], 1 bit)

This bit indicates that there is data left to be DMA'ed to the host and that the RX DMA status message has not been sent yet. The TCP RX logic sets this bit when it schedules an RX DMA operation, and is cleared by the TCP RX logic when it requests an RX DMA done status message. This bit is used to facilitate the FIN vs. Status message timing issue.

IPSEC Mode (Address 0x0C [30:27], 4 bits)

These bits indicate the IPSEC modes enabled for transmitted packets on this socket connection. The decodes are shown in the following table.

TABLE 11

IPSEC Modes

| IPSEC Mode Bit | Description |
|---|---|
| 0 | Tunnel AH |
| 1 | Tunnel ESP |

TABLE 11-continued

IPSEC Modes

| IPSEC Mode Bit | Description |
|---|---|
| 2 | Transport AH |
| 3 | Transport ESP |

If none of the bits are set, then no IPSEC is used on the socket.

AB (ACK Req Pending) (Address 0x0C [31], 1 bit)

This bit indicates that an ACK request from the TCP receive logic to the TCP transmit logic is pending. It is set when a TCP data packet is received, and is cleared when the ACK for the data is sent. If another data packet is received while this bit is still set, then another ACK is not requested but the Received ACK number is updated.

HR (Host Retransmit Socket) (Address 0x0D [30], 1 bit)

This bit indicates that this socket is an iSCSI application.

AS (Address 0x0D [30], 1 bit)

This bit indicates that this socket is an on-chip processor socket application.

DA (Address 0x0D [29], 1 bit)

This bit indicates that we have done a retransmission due to duplicate ACKs. It is set when the retransmitted packet is sent. It clears when we get an ACK that advances the received ACK pointer. When we do get an ACK for new data after a duplicate ACK retransmission, we set cwnd=ssthresh (part of the fast recovery algorithm). This bit is used in conjunction with the DS bit in word 0x14. We need two bits because the retransmission of the missing segment is only done once.

R0 (Address 0x0D [28], 1 bit)

This bit indicates that the Retransmission Time field is valid (0=invalid, 1=valid).

RV (Address 0x0D [27], 1 bit)

This bit indicates that the Retransmission Time field is valid (0=invalid, 1=valid).

TP (Address 0x0D [26], 1 bit)

This bit indicates that a packet being timed is currently in transit. It is only used if the RTO option is not enabled.

Next TX Mem Block Pointer (Address 0x0D [25:0], 26 bits)

This field represents the address of the next MTX buffer to be transmitted.

MSS_S (2 bits, Word 0x0E [31:30])

These bits are used to specify the MSS size to be used in the SYN packet. Available settings are as follows:

TABLE 12

MSS Size Settings

| MSS Size | Selection |
|---|---|
| 00 | Default MSS (based on local/nonlocal setting) |
| 01 | 2048 |
| 10 | MSS Setting 1 (registers 0x1AC0–0x1AC1) |
| 11 | MSS Setting 2 (registers 0x1AC2–0x1AC3) |

Silly Window Size (Address 0x0E [29:0], 30 bits)

This field represents the running window size as kept tracked by the TCP RX hardware. This window keeps the actual window size, and it is only transferred to the real window when it is more then an MSS greater.

RX DMA Count (Address 0x0F [31:16], Address 0x12 [31:24] 24 bits)

This field represents number of bytes transmitted via RX DMA to the host since the last RX DMA status message. The MSB of the count is stored in Address 0x12.

Host Buffer Offset Pointer (Address 0x0F [15:0], 16 bits)

This field represents the offset into the current Host memory buffer that the RX DMA is using.

Window Clamp (Address 0x10 [31:0], 32 bits)

This field represents the maximum advertised window allowed for the socket connection.

RX Link List Address (Address 0x11 [31:0], 32 bits)

This is the on-chip processor memory address of the RX Link list used for RX DMA operations.

RX Transfer Limit (Address 0x12 [15:0], 16 bits)

This is the transfer limit for RX DMA transfers. A RX DMA status message is generated when this limit is reached. For CBs that require a status message after each DMA transfer, this limit should be set to 0x0001.

RX Link List Entries (Address 0x12 [23:16], 8 bits)

This is the number of entries in the RX DMA Link List.

K (keep alive triggered) (Address 0x13 [31], 1 bit)

This bit is used to indicate that the current CB is in the keepalive state. The bit is set when the keepalive timer expires for the CB, and is either cleared when the CB is de-allocated, due to the keepalive finding that the other side has gone away (died), or by TCP-RX when it receives a response to the keepalive probe (an ACK packet).

DupAck (Address 0x13 [30:28], 3 bits)

This field keeps track of how many duplicate ACKs were received. This parameter is used for the fast retransmission algorithm.

Retries/Probes (Address 0x13, [27:24], 4 bits)

This field keeps track of how many retries were sent out for a particular packet. It is also used to keep track of the number of number of Window probes sent. The latter number is needed so that the proper window probe transmission interval can be used.

TX Data Avail (Address 0x13 [23:0], 24 bits)

This field represents the total amount of data available to be transmitted on the socket.

Socket Channel Number (Address 0x14 [31:24], 8 bits)

This is the socket channel number. When status messages are sent back to the host, this channel specifies which queue to be used.

SX (Address 0x14 [23], 1 bit)

This bit indicates that a SACK retransmit is needed. It is set by the retrans module and cleared when the SACK retrans is sent out.

FX (Address 0x14 [20], 1 bit)

This bit indicates that a FIN packet has been sent out on this socket. It is set by the TCP TX logic.

DA (Address 0x14 [19], 1 bit)

This bit indicates that the socket is in a duplicate ACK state. This bit is set when the duplicate ACK threshold is reached. It is cleared when the peer ACKs new data.

UM (Address 0x14 [18], 1 bit)

This bit indicates that the Peer's advertised window has exceeded twice the MSS. If this bit is set then data is stored in MTX at a maximum of the MSS size. If the bit is not set, then data is stored at a maximum of one-quarter the MSS.

UC (Address 0x14 [17], 1 bit)

This bit indicates that the type of control block in the Next CB Link field is a UDP CB.

TW (Address 0x14 [16], 1 bit)

This bit indicates that the type of control block in the Next CB Link field is a TW CB.

Next CB Link (Address 0x14 [15:0], 16 bits)

This field represents the CB memory address of the next linked CB. This CB would have the same Hash value as this socket. The VSOCK submodule fills this field in when it links CBs with the same Hash value.

RX Window Size (Address 0x15 [31:16], 16 bits)

This field represents the advertised window of the remote end unadjusted by the sliding window scale factor.

IP TTL (Address 0x15 [15:8], 8 bits)

This field represents the TTL to be used in the IP header for the socket.

IP TOS (Address 0x15 [7:0], 8 bits)

This field represents the TOS field setting used in the IP header for the socket connection. It is an optional parameter that may be set by the application. If no TOS parameter is specified, then this field defaults to 0x00.

RX Timestamp/Timed Seq Number (Address 0x16, 32 bits)

When timing one segment at a time, then this field is used to store the sequence number of the packet being timed. When an ACK is received that covers this sequence number, then the RTT can be derived for the packet. The timestamp for when this packet was transmitted is stored in the Local Timestamp of Last Transmission field. When the timestamp option is enabled, this field is used to store the timestamp received in TCP packets.

Smooth Mean Dev. (Address 0x17, 32 bits)

This field represents the smoothed mean deviation in round trip time measurements as calculated using the Van Jacobson algorithm specified in RFC 793.

Slow Start Threshold (ssthresh) (Address 0x18, 32 bits)

This field keeps track of the ssthresh parameter. The ssthresh parameter is used for the congestion avoidance algorithms, and is initialized to 0x0000FFFF.

Smooth RTT (Address 0x19, 32 bits)

This field represents the smoothed round trip time value as calculated using the Van Jacobson algorithm specified in RFC 793.

Retransmission Timestamp (Address 0x1B, 16 bits)

This field is used to represent the time in the future of when a retransmission is necessary on the socket.

TX Left SACK (Address 0x1C, 32 bits)

This field represents the sequence number of the first (lowest sequence number) byte of the first island of out-of-sequence received data after the in-sequence data.

TX Right SACK (Address 0x1D, 32 bits)

This field represents one the plus the sequence number of the last (highest sequence number) byte of the first island of out-of-sequence received data after the in-sequence data.

RX Left SACK (Address 0x1E, 32 bits)

This field represents the sequence number of the first byte of the first island of out-of-sequence data reported by the SACK option of a received packet.

RX Right SACK (Address 0x1F, 32 bits)

This field represents one plus the sequence number of the last byte of the first island of out-of-sequence data reported by the SACK option of a received packet.

Established Socket Annex CB Structure

The following table lists all fields in the annex CB structure in memory for established sockets.

TABLE 13

Established Socket Annex CB Structure

| | | | | | | | | | | | |
|---|---|---|---|---|---|---|---|---|---|---|---|
| 0 | SACK Block Count [7:0] | | | | | TX Left SACK Mem Add [23:0] | | | | | |
| 1 | SACK Block Count [15:8] | | | | | TX Right SACK Mem Add [23:0] | | | | | |
| 2 3 | RX Bytes Received [63:0] | | | | | | | | | | |
| 4 5 | TX Bytes Received [63:0] | | | | | | | | | | |
| 6 | iS | MD | DS | NU | CH | | MDL Transfer Length [15:0] | | | | |
| 7 | IPSEC Hash [31:0] | | | | | | | | | | |
| 8 | Last UnACK'ed Seq [31:0] | | | | | | | | | | |
| 9 | iSCSI FIM Interval [15:0] | | | | | MDL Transfer Length [15:0] | | | | | |
| A | iSCSI CRC Seed [31:0] | | | | | | | | | | |
| B | MRX Buffers [15:0] | | | | | | FE | IPSEC Overhead [7:0] | | | |
| C | Zero Window Timestamp [7:0] | | OT | RM | RP | FP | LD | DP | SV | SM | DAV Buffer Length [15:0] |
| D | TX Tunnel ESP Handle [15:0] | | | | | TX Tunnel AH Handle [15:0] | | | | | |
| E | TX Transport ESP Handle [15:0] | | | | | TX Transport AH Handle [15:0] | | | | | |
| F | | | SBVal | | iSCSI Byte 2 [7:0] | | iSCSI Byte 1 [7:0] | | iSCSI Byte 0 [7:0] | | |
| 10 | Local MSS [15:0] | | | | | Max RX Window [15:0] | | | | | |
| 11 | Last cwnd Update [31:0] | | | | | | | | | | |
| 12 | | | | | | | | | | DX | DMA ID [3:0] |
| 13–1F | | | | | | | | | | | |

Established Socket Annex CB Field Definitions

RX Left SACK Mem Add (Address 0x0 [23:0], 24 bits)

This field represents the first address of the first MRX memory block of the linked list of blocks for the SACK island.

RX Right SACK Mem Add (Address 0x1 [23:0], 24 bits)

This field represents the first address of the last MRX memory block of the linked list of blocks for the SACK island.

SACK Block Count (Addresses 0x0-0x1 [31:24], 16 bits)

This field represents the number of memory blocks used by the socket.

RX Bytes Written (Address 0x2-0x3, 64 bits)

This field represents the total number of bytes written to MRX memory for the socket. The least significant word is stored in address 0x2 and the most significant word is stored in address 0x3.

TX Bytes Transmitted (Address 0x4-0x5, 64 bits)

This field represents the total number of bytes transmitted on the socket. The least significant word is stored in address 0x4 and the most significant word is stored in address 0x5.

iS (Address 0x6 [31], 1 bit)

This bit indicates that CB is being used as an iSCSI socket.

MD (Address 0x6 [30], 1 bit)

This bit indicates that CB is using MDLs for the received buffer list.

DS (Address 0x6 [29], 1 bit)

This bit indicates that we have received a Duplicate ACK on the socket. It is set by the logic that processes the duplicate ACKs. If a duplicate ACK is received, and this bit is already set, then the missing segment is not retransmitted. It is used in conjunction with the DA bit in word 0x0D of the main Open CB structure. The state table for these two bits are as follows:

TABLE 14

DS/DA Bit State Table

| DS | DA | State |
|---|---|---|
| 0 | 0 | No Duplicate ACKs received on the socket yet. |
| 1 | 0 | Duplicate ACK received but missing segment not sent yet |
| 1 | 1 | Duplicate ACK received and missing segment retransmitted |
| 1 | 0 | Illegal condition | iSCSI Seed Not Updated (IN) (Address 0x6 [28], 1 bit)

This bit is set by the davscan module when an iSCSI memory block is being processed and is cleared when the seed for that block has been saved. The bit is asserted by the hardware to indicate to the host that its local copy of the CRC seed is not updated. When the host wants to reset the CRC seed, it needs to first probe this bit. If the bit is asserted, then it needs to set the Seed_Clrd_by_Host bit in the socket. The hardware clears this bit when it has updated its local copy of the CRC seed with the new value written by the host.

iSCSI Seed Cleared By Host (CH) (Address 0x6 [27], 1 bit)

This bit is set by the host when it writes a new value to the iSCSI seed in the CB AND the IN bit is set. When the davscan module sees that this bit is set, it clears the iSCSI seed and this bit in the CB.

MDL Transfer Length (Address 0x6 [15:0], 16 bits)

This field is used to indicate how long the MDL DMA transfer should be. It is usually the same length as reported in the RX_DAV status message that generated the RX_MDL IB.

IPSEC Hash (Address 0x7 [31:0], 31 bits)

This field represents the hash value for all the SA entries used for the socket connection.

Last UnACK'ed Sequence Number (Address 0x8, 32 bits)

This field represents the last unACK'ed sequence number from the peer. This value is used for Timestamp storing calculations.

iSCSI FIM Interval (Address 0x9 [31:16], 16 bits)

This field represents the FIM interval for the iSCSI connection. It is stored as the number of bytes.

iSCSI FIM Offset (Address 0x9 [15:0], 16 bits)

This field represents the number of bytes until the next FIM insertion.

iSCSI CRC Seed (Address 0xA, 32 bits)

This field represents the CRC seed for received iSCSI data.

IPSEC Overhead (Address 0xB [7:0], 8 bits)

This field represents the overhead in terns of number of double words (four bytes) that the IPSEC headers (and extra IP header) takes up in a packet. This information is used when determining how much data can be put into a packet.

iSCSI FIM Enable [FE] (Address 0xB [8], 1 bit)

This bit indicates whether FIM support is needed on the CB (0=FM disabled, 1=FIM enabled).

MRX Buffers (Address 0xB [31:16], 16 bits)

This field represents the number of MRX buffers currently being used by the socket. When this number reaches the MRX buffer limit (global setting), then no more data packets are accepted on the socket.

DAV Buffer Length (Address 0xC [15:0], 16 bits)

This field indicates the length of the buffer to be used for the DAV status message.

RX Send FIN Status Message [SM] (Address 0xC [16], 1 bit)

This bit indicates that an RX FIN Received status message should be sent for the CB.

RX Send DAV Status Message [SV] (Address 0xC [17], 1 bit)

This bit indicates that an RX DAV status message should be sent for the CB.

RX DMA Status Message Pending [DP] (Address 0xC [18], 1 bit)

This bit indicates that an RX DMA done status message is pending on the CB.

Last DMA [LD] (Address 0xC [19], 1 bit)

This bit indicates that the last DMA for a host buffer segment is being sent. Upon completion of this DMA, an RX DMA status message is generated.

FIN Status Message Pending [FP] (Address 0xC [20], 1 bit)

This bit indicates that a FIN status message is pending. It is set when there are data left in MRX memory but no DMA is currently in progress. It is cleared when the DMA starts and the SV bit sets.

Reset Pending [RP] (Address 0xC [21], 1 bit)

This bit indicates that a reset status message is pending, and it should be sent after the RX DMA status message. It is set when there are data left in MRX memory but no DMA is currently in progress. It is cleared when the DMA starts and the SV bit sets.

Send Reset Message [RM] (Address 0xC [22], 1 bit)

This bit indicates that a RST packet was received and is only used between the tcprxsta and davscan modules.

Open to TW [OT] (Address 0xC [23], 1 bit)

This bit indicates that the socket has transitioned to the timewait state and that the open to timewait transfer process is complete. This bit is set by davscan and read by rxcbupd.v Zero Window Timestamp (Address 0xC [31:24], 16 bits)

This field indicates the timestamp in the future of when to send the next zero window probe.

TX Tunnel AH Handle (Address 0xD [15:0], 16 bits)

This field represents the TX Tunnel AH SA (Security Association) handle associated with the socket.

TX Tunnel ESP Handle (Address 0xD [31:16], 16 bits)

This field represents the TX Tunnel ESP SA (Security Association) handle associated with the socket.

TX Transport AH Handle (Address 0xE [15:0], 16 bits)

This field represents the TX Transport AH SA (Security Association) handle associated with the socket.

TX Transport ESP Handle (Address 0xE [31:16], 16 bits)

This field represents the TX Transport ESP SA (Security Association) handle associated with the socket.

iSCSI Bytes 0-1-2 (Address 0xF [23:0], 8 bits each)

These bytes represent the non-aligned bytes for iSCSI CRC calculations.

SBVal (Address 0xF [25:24], 2 bits)

This field is used to indicate which of the iSCSI Bytes[2:0] are valid.

Max RX Window (Address 0x10 [15:0], 16 bits)

This field represents the maximum window advertised by the peer. It is used to determine what parameter to use for the MTX data packing limit.

Local MSS (Address 0x10 [31:16], 16 bits)

This field represents the local MSS value used in the SYN or SYN/ACK packet. It is used for window size adjustments.

Last CWND Update (Address 0x11 [31:16], 16 bits)

This field represents the last timestamp that the cwnd was updated this information is used to increment the cwnd when it is greater then the ssthresh.

DMA ID (Address 0x12 [3:0], 4 bits)

This field represents the DMA ID for the CB. This field is incremented everytime a TCP TX DMA is requested. When the xmtcbwr module finishes packing a DMA transfer, and if the DMA ID matches what is in the CB, then the DMA_Pending bit is cleared (by xmtcbwr).

DMA Pending (Address 0x12 [4], 1 bit)

This field indicates that TX DMA is pending on this socket. This bit is set by sockregs when it requests a TX DMA, and is cleared by xmtcbwr.v. when the TX DMA ID just processed matches the TX_DMA ID in the CB.

Combined CB Structure

In CB memory, the socket CB's are stored as one contiguous memory block. The format is shown in the following table.

TABLE 15

Combined CB Structure

| | 31 28 | 24 | 20 | 16 | 12 | 8 | 4 | 0 |
|---|---|---|---|---|---|---|---|---|
| 0 | Remote IP address [31 0] ||||||||
| 1 | Remote Port [15 0] |||| Local Port [15 0] ||||
| 2 | IP Index [3:0] | Conn State [3:0] | AX SA TS WS | ZW AR CF CV | RD CBVer [2:0] | CB Interface [3:0] | SY ST SR KA/U | DF VL RE AD |
| 3 | ACK Number [31:0] ||||||||
| 4 | SEQ Number [31:0] ||||||||
| 5 | Keep Alive Time | LWinScal [3:0] || RWinScal [3:0] | Remote MSS [15:0] ||||
| 6 | PA Priority | VID [11:0] ||| Remote MAC Address [47:32] |||
| 7 | Remote MAC Address [31:0] ||||||||
| 8 | Local IP Address [31:0] ||||||||
| 9 | RX ACK Number [31:0] ||||||||
| A | Congestion Window (cwnd) [31:0] ||||||||
| B | HA SS | Sock Type | MI | RX Ending Mem Block Pointer [25:0] |||||
| C | AB | IPSEC Mode [3:0] | HD | RX Start Mem Block Pointer [25:0] |||||
| D | HR AS | DA RD | RV | TP | Next TX Mem Block Pointer [25:0] ||||
| E | MSS_S | Silly Window Size [29:0] |||||||
| F | RX DMA Count [15:0] |||| Host Buffer Offset [15:0] ||||

| | | | | | | | | |
|---|---|---|---|---|---|---|---|---|
| 10 | Window Clamp [31 0] ||||||||
| 11 | Link List Address [31:0] ||||||||
| 12 | RX DMA Count [23:16] ||| Link List Entries [7:0] | Transfer Thrshold [15:0] ||||
| 13 | K | DupAck [2:0] | entries/Probes [3:0] || TX Data Avail [23:0] ||||
| 14 | Socket Channel [17:0] ||| /// | FX DA UM UC | TW | Next CB Link [15:0] ||
| 15 | RX Window Size [15:0] |||| IP TTL [7:0] || IP TOS [7:0] ||
| 16 | RX Timestamp / Timed Saq Number [31:0] ||||||||
| 17 | Smooth Mean Dev. (D) [31:0] ||||||||
| 18 | Slow Start Threshold (ssthresh) ||||||||
| 19 | Smooth RTT (A) [31:0] ||||||||
| 1A | Retransmission Timeout (RTO) [31:0] ||||||||
| 1B | Retransmission Timestamp [31:0] ||||||||
| 1C | TX Left SACK [31:0] ||||||||
| 1D | TX Right SACK [31:0] ||||||||
| 1E | RX Left SACK [31:0] ||||||||
| 1F | RX Right SACK [31:0] ||||||||

TABLE 15-continued

| | | | | | | | | | | | | | |
|---|---|---|---|---|---|---|---|---|---|---|---|---|---|
| 20 | SACK Block Count [7:0] | | | | | | | | TX Left SACK Mem Add [23:0] | | | | |
| 21 | SACK Block Count [15:8] | | | | | | | | TX Right SAC Mem Add [23:0] | | | | |
| 22 | RX Bytes Received [63:0] | | | | | | | | | | | | |
| 23 | | | | | | | | | | | | | |
| 24 | TX Bytes Recieved [63:0] | | | | | | | | | | | | |
| 25 | | | | | | | | | | | | | |
| 26 | IS | MD | DS | NU | CH | | | | MDL Transfer Lenght [15:0] | | | | |
| 27 | IPSEC Hash [31:0] | | | | | | | | | | | | |
| 28 | Lash UnACK'ed Seq [31:0] | | | | | | | | | | | | |
| 29 | iSCSI FIM Interval [15:0] | | | | | | | | iSCSI FIM Offset [15:0] | | | | |
| 2A | iSCSI CRC Seed [31:0] | | | | | | | | | | | | |
| 2B | MRX Buffers [15:0] | | | | | | | | | FE | IPSEC Overhead [7:0] | | |
| 2C | Zero Window Timestamp [7:0] | OT | RM | RP | FP | LD | DP | SV | SM | DAV Buffer Length [15:0] | | | |
| 2D | TX Tunnel ESP Handle [15:0] | | | | | | | | TX Tunnel AH Handle [15:0] | | | | |
| 2E | TX Transport ESP Handle [15:0] | | | | | | | | TX Transport AH Handle [15:0] | | | | |
| 2F | | SBVal | | iSCSL Byte 2 [7:0] | | | | | iSCSL Byte 1 [7:0] | | | iSCSL Byte 0 [7:0] | |
| 30 | Local MSS [15:0] | | | | | | | | Max RX Window [15:0] | | | | |
| 31 | Last cwnd Update [31:0] | | | | | | | | | | | | |

| | |
|---|---|
| 32 | |
| 33 | |
| 34 | |
| 35 | |
| 36 | |
| 37 | |
| 38 | |
| 39 | |
| 3A | |
| 3B | |
| 3C | |
| 3D | |
| 3E | |
| 3F | |

Half Open Socket Main CB Structure

The following table defines the main CB structure in memory for half-open sockets.

TABLE 16

Half Open Socket Main CB Structure

| Word | Bits | 15 | 12 | 8 | | | | | 4 | | | | 0 |
|---|---|---|---|---|---|---|---|---|---|---|---|---|---|
| 0 | 15:0 | | | remote IP address [15:0] | | | | | | | | | |
| 0 | 31:16 | | | remote IP address [31:16] | | | | | | | | | |
| 0 | 47:32 | | | remote port [15:0] | | | | | | | | | |
| 0 | 63:48 | | | local port [15:0] | | | | | | | | | |
| 1 | 15:0 | local IP index [3:0] | | Connection State [3:0] | | RxACK | SACK | RxTS | WinSc | RxMSS | ACKRq | CBinFF | CBVal |
| 1 | 31:16 | CB Version [3:0] | | TX Interface [3:0] | | IPSEC | MSS Size | | KA | DF | VLANV | Retran | RxURG |
| 1 | 47:32 | | | ACK [15:0] | | | | | | | | | |
| 1 | 63:48 | | | ACK [31:16] | | | | | | | | | |
| 2 | 15:0 | | | SEQ [15:0] | | | | | | | | | |
| 2 | 31:16 | | | SEQ [31:16] | | | | | | | | | |
| 2 | 47:32 | | SA Overhead [7:0] | | | Local WinScale [3:0] | | | | Remote WinScale [3:0] | | | |
| 2 | 63:48 | | | remote MSS [15:0] | | | | | | | | | |
| 3 | 15:0 | /// | VLAN Priority [2:0] | | | VLAN VID [11:0] | | | | | | | |
| 3 | 31:16 | | | remote MAC Address [15:0] | | | | | | | | | |
| 3 | 47:32 | | | remote MAC Address [31:16] | | | | | | | | | |
| 3 | 63:48 | | | remote MAC Address [47:32] | | | | | | | | | |
| 4 | 15:0 | | | Received Timestamp [15:0] | | | | | | | | | |
| 4 | 31:16 | | | Received Timestamp [31:16] | | | | | | | | | |
| 4 | 47:32 | | | Local Timestamp [15:0] | | | | | | | | | |
| 4 | 63:48 | | | Local Timestamp [31:16] | | | | | | | | | |
| 5 | 15:0 | | TTL | | | | | | TOS | | | | |
| 5 | 31:16 | IPSEC Mode [3:0] | | ////////// | | | | | | | Number of SYN/ACK retries [3:0] | | |
| 5 | 47:32 | | | Local IP Address [15:0] | | | | | | | | | |
| 5 | 63:48 | | | Local IP Address [31:16] | | | | | | | | | |
| 6 | 15:0 | | | TX Tunnel AH SA [15:0] | | | | | | | | | |
| 6 | 31:16 | | | TX Tunnel ESP SA [15:0] | | | | | | | | | |
| 6 | 47:32 | | | SA Hash [15:0] | | | | | | | | | |
| 6 | 63:48 | | | SA Hash [25:16] | | | | | | | | | |
| 7 | 15:0 | | | TX Transport AH SA [15:0] | | | | | | | | | |
| 7 | 31:16 | | | TX Transport ESP SA [15:0] | | | | | | | | | |
| 7 | 47:32 | | | Local MSS [15:0] | | | | | | | | | |
| 7 | 63:48 | ///////////////////////////////// | | | | | | | | | | | |

Half Open Socket Main CB Field Definitions

Remote IP Address (32 bits, Word 0x0 [31:0])

This is the IP address of the remote end of the connection. Bits [31:16] of the IP address are stored in Word 0x0 and bit [15:0] are stored in Word 0x1.

Remote Port (16 bits, Word 0x0 [47:32])

This is the port address of the remote end of the connection

Local Port (16 bits, Word 0x0 [63:48])

This is the port address of the local end of the connection

Local IP Index (4 bits, Word 0x1 [15:12])

This is the index of the local IP address to be used for this connection. This value is resolved by the IP module into a full IP address and a corresponding MAC address.

Connection State (4 bits, Word 0x1 [11:8])

This is the current state of the connection and decodes as follows:

TABLE 17

Connection State Decode

| State | Description |
|---|---|
| 0x0 | Closed |
| 0x1 | Listen |
| 0x2 | SYN Received |
| 0x3 | SYN Sent |
| 0x4 | Established |
| 0x5 | Close Wait |
| 0x6 | Last ACK |
| 0x7 | FIN Wait 1 |
| 0x8 | FIN Wait 2 |
| 0x9 | Closing |

TABLE 17-continued

Connection State Decode

| State | Description |
|-------|-------------|
| 0xA | Time Wait (Open CB) |
| 0xB | Time Wait (TW CB) |

RxACK (1 bit, Word 0x1 [7])
This bit indicates that the RX ACK Status Message mode is enabled. In this mode, when an ACK is received that acknowledges all outstanding data, a status message is generated.

SACK (1 bit, Word 0x1 [6])
This bit indicates that the remote end sent the SACK option in its SYN packet RxTS (1 bit, Word 0x1 [5])
This bit indicates that the remote end sent the timestamp option and the Received Timestamp field is valid in the Half Open Annex control block.

WinSc (1 bit, Word 0x1 [4])
This bit indicates that the remote end sent the Window Scale option RxMSS (1 bit, Word 0x1 [3])
This bit indicates that the remote end sent an MSS option, and that the remote MSS field is valid ACKRq (1 bit, Word 0x1 [2])
This bit indicates that an ACK is requested for this socket. It is meant to duplicate the similar bit in the Establish Control blocks, but is not used here.

CBinFF (1 bit, Word 0x1 [1])
This bit indicates that this CB is in the Rx to TX FF queue and therefore cannot be killed yet.

CBVal (1 bit, Word 0x1 [0])
This bit indicates that the Half Open CB is valid.

CB Version (4 bits, Word 0x1 [31:28])
These bits indicate the version of the CB. This field is currently defined to be 0x1.

TX Interface (4 bits, Word 0x1 [27:24])
These bits indicate which interface the originating SYN came in on.

IPSEC (1 bit, Word 0x1 [23])
This bit indicate that the HO CB is being used for an IPSEC protected socket. In this case, a SYN received that does not match this HO CB is discarded.

MSS Size (2 bits, Word 0x1 [22:21])
These bits are used to specify the MSS size to be used in the SYN/ACK packet. Available settings are as follows:

TABLE 18

MSS Size Settings

| MSS Size | Selection |
|----------|-----------|
| 00 | Default MSS (based on local/nonlocal setting) |
| 01 | 2048 |
| 10 | MSS Setting 1 (registers 0x1AC0–0x1AC1) |
| 11 | MSS Setting 2 (registers 0x1AC2–0x1AC3) |

KA (1 bit, Word 0x1 [20])
This bit indicates that the keepalive timer should be used on this socket DF (1 bit, Word 0x1 [19])
This bit is used to specify the Don't Fragment bit in the IP header.

VLANV (1 bit, Word 0x1 [18])
This bit indicates that the VLAN fields are valid.

Retrans (1 bit, Word 0x1 [17])
This bit indicates that a retransmission is needed on this socket.

RxURG (1 bit, Word 0x1 [16])
This bit indicates that the URG bit was set on a received packet.

ACK (32 bits, Word 0x1 [63:32])
This is the ACK number to be used in a transmitted packet.

SEQ (32 bits, Word 0x2 [31:0])
This is the running sequence number used in transmitted packets.

SA Overhead (8 bits, Word 0x2 [47:40])
This field is used to store the IPSEC Overhead (in number of double words) for the CB.

Local WinScale (4 bits, Word 0x2 [39:36])
This field represents the local sliding window scale factor that is used for the connection. Valid values are from 0x00 to 0x0E.

Remote WinScale (4 bits, Word 0x2 [35:32])
This field represents the sliding window scale factor as requested by the remote end in the TCP SYN packet. Valid values are from 0x00 to 0x0E.

Remote MSS (16 bits, Word 0x2 [63:48])
This field represents the MSS that received in the SYN packet for TCP connections. It indicates the largest packet size that the remote end can accept. If no MSS option was received, then this field defaults to 536 (0x0218). This field is not used for UDP connections.

VLAN Priority (3 bits, Word 0x3 [14:12])
This field represents the user priority level used for the VLAN tag. It also represents the service level for the socket during transmission scheduling. The higher the number, the higher the priority (7 is the highest, and 0 is the lowest). The default value for this field is 0x0, and it may be set by software.

VLAN VID (12 bits, Word 0x3 [11:0])
This field represents the VLAN Identification used in VLAN tag frames. The default value for this field is 0x000, and is settable by software. For connections initiated from a peer, this field is set by the VID received in the opening SYN packet.

Remote MAC Address (48 bits, Word 0x3 [63:16])
These fields represent the destination MAC address for packets being transmitted on this socket. When the socket is first established, the ARP cache is queried for this address. After it is resolved, the address is stored here so that further ARP cache queries are avoided. If the CB is created as a server socket, then this address is taken from the destination MAC address contained in the SYN packet.

Received Timestamp (32 bits, Word 0x4 [31:0])
This is the timestamp included in a received packet.

Local Timestamp (32 bits, Word 0x4 [63:32])
This is the timestamp of the last packet transmitted for this socket.

TTL (8 bits, Word 0x5 [15:8])
This is the TTL to be used for the connection. When the SYN/ACK is being generated, this parameter is provided by the IP Router, and stored in this location.

When the socket transitions to the Established state, this information is passed to the open control block.

TOS (8 bits, Word 0x5 [7:0])

This is the TTL to be used for the connection. When the SYN/ACK is being generated, this parameter is provided by the IP Router, and stored in this location. When the socket transitions to the Established state, this information is passed to the open control block.

Number of SYN/ACK Retries (4 bits, Word 0x5 [19:16])

This field keeps track of the number of SYN/ACK retries sent for a particular socket. If the number of retries reaches the programmed maximum, then the socket is deprecated.

TX Transport ESP SA Handle (16 bits, Word 0x7 [31:16])

This field is used to store the TX Transport ESP SA handle for the CB (if applicable).

Local MSS (16 bits, Word 0x7 [47:32])

This field is used to store the local MSS value used in the connection. It is needed for window size adjustments to avoid the Silly Window Syndrome.

Time Wait CB Structure

The following table defines the CB structure in memory for sockets in the Time_Wait state.

TABLE 20

Time Wait CB Structure

| | 31 | 28 | 24 | 20 | 16 | 12 | 8 | 4 | 0 |
|---|---|---|---|---|---|---|---|---|---|
| 0 | remote IP address [31:0] ||||||||||
| 1 | Remote Port [15:0] |||| Local Port [15:0] |||||
| 2 | IP Index [3:0] | ConnState [3:0] | AX\|SA\|TS\|WS\|MS\|AR\|CF\|CV | CBVer [3:0] | CB Interface [3:0] | | KA\|DF\|VL\|RE\|UR |||
| 3 | ACK Number [31:0] ||||||||||
| 4 | SEQ Number [31:0] ||||||||||
| 5 | IPSEC MODE | Sock Type | LWinScale [3:0] | RWinScale [3:0] | Local Window [15:0] |||||
| 6 | Priority | | VID [11:0] || Remote MAC Address [47:32] |||||
| 7 | Remote MAC Address [31:0] ||||||||||
| 8 | Local IP address [31:0] ||||||||||
| 9 | Remote Timestamp [31:0] ||||||||||
| A | TW Creation Timestamp [31:0] ||||||||||
| B | Tunnel AH Handle [7:0] ||| Forward Link [23:0] |||||||
| C | Tunnel AH Handle [15:8] ||| |||||||
| D | Tunnel ESP Handle [7:0] ||| Forward Age Link [23:0] |||||||
| E | Tunnel ESP Handle [15:8] ||| Reverse Age Link [23:0] |||||||
| F | Transport ESP Handle [15:0] ||||| Transport AH Handle [15:0] |||||

IPSEC Mode (4 bits, Word 0x5 [31:28])

This field is used to indicate which IPSEC modes are active for the socket. Decodes for this field are shown below.

TABLE 19

IPSEC Mode Bit Definitions

| Bit | Definition |
|---|---|
| 0 | Tunnel AH |
| 1 | Tunnel ESP |
| 2 | Transport AH |
| 3 | Transport ESP |

Local IP Address (32 bits, Words 0x5 [63:32])

This field is used to store the destination IP address received in the SYN packets. It represents the local IP address for the socket connection.

TX Tunnel AH SA Handle (16 bits, Word 0x6 [15:0])

This field is used to store the TX Tunnel AH SA handle for the CB (if applicable).

TX Tunnel ESP SA Handle (16 bits, Word 0x6 [31:16])

This field is used to store the TX Tunnel ESP SA handle for the CB (if applicable).

SA Hash (31 bits, Word 0x6 [63:32])

This field is used to store the SA Hash for the CB.

TX Transport AH SA Handle (16 bits, Word 0x7 [15:0])

This field is used to store the TX Transport AH SA handle for the CB (if applicable).

Time Wait CB Field Definitions

Remote IP Address (Address 0x00, 32 bits)

This 32-bit field represents the remote IP address for the connection. For client sockets, this field is set by the application. For server sockets, this field is filled in by the IP address received in the SYN packet or the IP address in the received UDP packet.

Remote Port (Address 0x01 [31:16], 16 bits)

This field represents the remote port number for the connection. For client sockets, this field is always specified by the application. For server sockets, this field is always filled in with the port number received in the SYN or UDP packet.

Local Port (Address 0x01 [15:0], 16 bits)

This field represents the local port number for the connection. For client sockets, this field can either be specified by the application or automatically generated by the network stack. For server sockets, this field is always specified by the application.

IP Index (Address 0x02 [31:28], 4 bits)

This field represents the index in the network stacks IP address table for the IP address of the host interface for the socket, and is filled in by the network stack hardware.

ConnState (Address 0x02 [27:24], 4 bits)

This field indicates the current state of the connection, and decodes as follows:

TABLE 21

Socket State Decode Table

| State | Description |
| --- | --- |
| 0x0 | Closed |
| 0x1 | Listen |
| 0x2 | SYN Received |
| 0x3 | SYN Sent |
| 0x4 | Established |
| 0x5 | Close Wait |
| 0x6 | Last ACK |
| 0x7 | FIN Wait 1 |
| 0x8 | FIN Wait 2 |
| 0x9 | Closing |
| 0xA | Time Wait (Open CB) |
| 0xB | Time Wait (TW CB) |

RX (Address 0x02 [23], 1 bit)

This bit indicates that the RX ACK Status Message mode is enabled. This mode has no meaning for TW CB's.

SA (Address 0x02 [22], 1 bit)

This bit indicates that the Selective ACK option (SACK) should be used with this socket (0=Do not use SACK, 1=Use SACK).

TS (Address 0x02 [21], 1 bit)

This bit indicates that the Timestamp option should be used with this socket (0=Do not use timestamp option, 1=Use timestamp option).

WS (Address 0x02 [20], 1 bit)

This flag indicates that the Sliding Window option has been successfully negotiated for the TCP socket (0=Do not use WS option, 1=WS option enabled). This bit is not used for UDP sockets.

MS (Address 0x02 [19], 1 bit)

This bit indicates that the remote MSS field in the CB is valid. The MSS is located in Word 5 [15:0].

AR (Address 0x02 [18], 1 bit)

This bit is set when an ACK packet is to be transmitted on a particular socket. It is cleared when the ACK packet has been transmitted.

CF (Address 0x02 [17], 1 bit)

This bit indicates that the current CB is in the RX to TX FIFO Buffer queue so it cannot be depreciated yet. Once the ACK for the socket is transmitted, the TCP transmit block moves the Open CB to a Time_Wait CB.

CVI (Address 0x02 [16], 1 bit)

This bit indicates that the CB contains valid information. Prior to deprecating any CB, this bit is always cleared.

CBVer (Address 0x02 [15:12], 4 bits)

These bit indicate the version of CB, and is used by the on-chip processor to differentiate CBs in future versions of the hardware. This field is currently defined as 0x1.

CB Interface (Address 0x02 [11:8], 4 bits)

These bit are used to specify a particular physical interface for the socket and is used in multiport architectures. For single-port architectures, this filed should be left at 0x0.

KA (Address 0x02 [4], 1 bit)

This bit indicates that the keepalive timer should be used with this socket (0=don't use the keepalive timer, 1=use the keepalive timer).

DF (Address 0x02 [3], 1 bit)

This bit represents the state of the DF bit in the IP header for the socket. When set, the packet is not fragmented by any hop. This bit is used for path MTU discovery.

VL (Address 0x02 [2], 1 bit)

This bit indicates whether VLAN tags are included in the outgoing Ethernet frames or not. If it is asserted, then four bytes of VLAN tag information made up by cb_tx_vlan_priority and cb_tx_vid, and the VLAN tag Identification (fixed value) are included following the Ethernet Address fields.

RE (Address 0x02 [1], 1 bit)

This flag is used to indicate a timeout condition, and that a retransmission is required. It is cleared when the data are retransmitted.

UR (Address 0x02 [0], 1 bit)

This bit indicates that urgent data were received. It remains asserted until the application has read (or indicated that it has read) past the received urgent data pointer.

ACK Number (Address 0x03, 32 bits)

This is the running ACK number for TCP connections. It represents the expected SEQ number in received TCP PSH packets. When a TCP data packet is received, then SYN number is checked against this number. If it matches or if the SEQ number received+the length of the packet covers this number, then the data is accepted. This number is updated automatically by the network stack, and is not used for UDP connections.

SEQ Number (Address 0x4, 32 bits)

This is the running SEQ number for TCP connections. It represents the SEQ number to be used in TCP packets, and is updated by the network stack automatically. This field is not used for UDP sockets.

IPSEC Mode (Address 0x5 [30:27], 4 bits)

This field is used to indicate which IPSEC modes are active for the socket. Decodes for this field are shown below.

TABLE 22

IPSEC Mode Bit Definitions

| Bit | Definition |
| --- | --- |
| 0 | Tunnel AH |
| 1 | Tunnel ESP |
| 2 | Transport AH |
| 3 | Transport ESP |

Sock Type (Address 0x05 [26:24], 3 bits)

This field indicates the type of socket represented by the control block according to the following table.

TABLE 23

Socket Type Decode Table

| Sock Type | Description |
| --- | --- |
| 000 | Reserved |
| 001 | UDP (Normal) |
| 010 | TCP Client |
| 101 | UDP (Raw) |
| 110 | TCP Server |

LWinScale (Address 0x05 [23:20], 4 bits)

This field represents the local sliding window scale factor that is used for the connection. Valid values are from 0x00 to 0x0E.

RWinScale (Address 0x05 [19:16], 4 bits)

This field represents the sliding window scale factor as requested by the remote end in the TCP SYN packet. Valid values are from 0x00 to 0x0E.

Local Window (Address 0x05 [15:0], 16 bits)

This field represents the 16 bits of Window that are advertised in the TCP local window field.

Priority (Address 0x06 [30:28], 3 bits)

This field represents the user priority level used for the VLAN tag. It also represents the service level for the socket during transmission scheduling. The higher the number, the higher the priority (7 is the highest, and 0 is the lowest). The default value for this field is 0x0, and it may be set by software.

VID (Address 0x06 [27:16], 12 bits)

This field represents the VLAN Identification used in VLAN tag frames. The default value for this field is 0x000, and is settable by software. For connections initiated from a peer, this field is set by the VLAN identification received in the opening SYN packet.

Remote MAC Address (Addresses 0x06 [15:0]-0x07, 48 bits total)

These fields represent the destination MAC address for packets being transmitted on this socket. When the socket is first established, the ARP cache is queried for this address. After it is resolved, the address is stored here so that further ARP cache queries are avoided. If the CB is created as a server socket, then this address is taken from the destination MAC address contained in the SYN packet. Bits [47:32] of the address are stored in CB address 0x6.

Local IP Address (Address 0x8, 32 bits)

This field represents the local IP address of the socket connection.

Remote Timestamp (Address 0x9, 32 bits)

This is the timestamp included in a received packet.

TW Creation Timestamp (Address 0xA, 32 bits)

This is the timestamp of when the CB entered the Time Wait state.

Tunnel AH Handle (Address 0xB [31:24], Address 0xC [31:24], 16 bits)

This is the Tunnel AH SA handle for the CB. It is valid when the Tunnel AH (TA) bit in the CB is also set.

Forward Link (Address 0xB [23:0], 24 bits)

Link to the next CB in the search chain.

Tunnel ESP Handle (Address 0xD [31:24], Address 0xE [31:24], 16 bits)

This is the Tunnel ESP SA handle for the CB. It is valid when the Tunnel ESP (TE) bit in the CB is also set.

Forward Age Link (Address 0xD [23:0], 24 bits)

Link to the next CB by age in the search chain.

Reverse Age Link (Address 0xE [23:0], 24 bits)

Link to the previous CB by age in the search chain.

Transport AH Handle (Address 0xF [15:0], 16 bits)

This is the Transport AH SA handle for the CB. It is valid when the Transport AH (NA) bit in the CB is also set.

Transport ESP Handle (Address 0xF [31:16], 16 bits)

This is the Transport ESP SA handle for the CB. It is valid when the Transport ESP (NE) bit in the CB is also set.

TCP Congestion Control Support

Overview

The IT10G implements Slow Start, Congestion Avoidance, Fast Retransmit, Fast Recovery Algorithms, Window Scaling, as well as re-ordering of out-of-order packets in hardware. In addition, the IT 10G supports a Round Trip Time TCP option which enables more then one segment to be timed at a time. These features are needed for high-speed networks.

Round Trip Time Measurement

The IT10G is capable of measuring Round Trip Times (RTT) in two ways. In the traditional method, a time measurement is taken from a TCP PSH packet to when the ACK for the packet is received. The sequence number of the timed packet is stored in the Sequence Number of Timed Packet field in the CB, and the timestamp for the packet is stored in the Timestamp of Last Transmission field in the CB. When the ACK for the timed packet is received, the delta between the current timestamp and the stored timestamp is the RTT. When the ACK is received, the RTO[1] bit in the socket CB is cleared to indicate that the next packet may be timed.

When the RT option is negotiated for in the opening TCP handshake, then the RT measurement may be taken form each ACK received.

Figure 29:
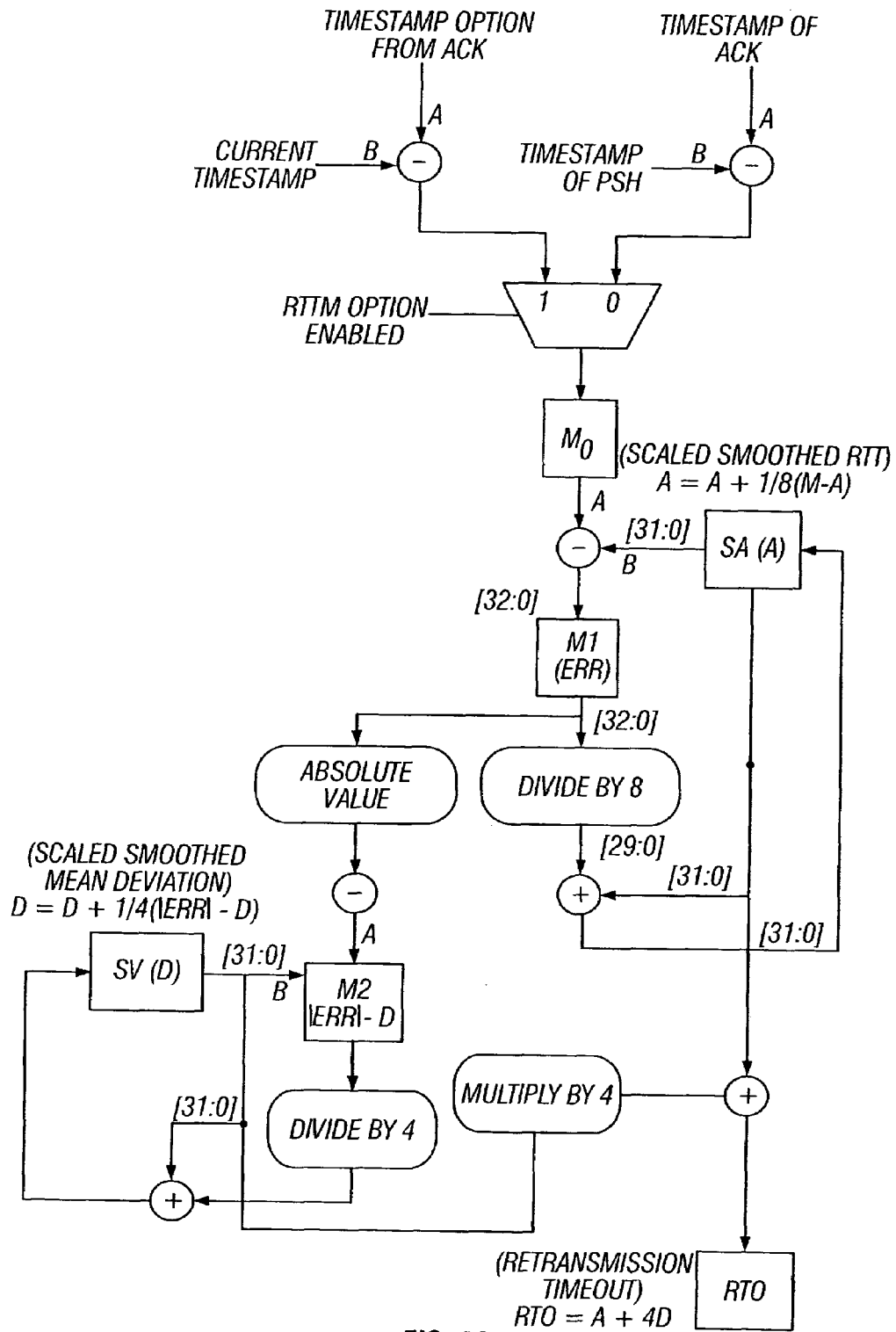
FIG. 29 shows logic according to the invention.

Regardless of the method used to obtain a round trip time measure, the logic flow that takes that value and determines the Retransmission Timeout (RTO) value is the same. This logic is depicted in FIG. 29.

The scaled smoothed RTT, mean deviation, and RTO are all stored in the socket CB.

Slow Start Algorithm

Slow start is a TCP congestion control mechanism first mentioned in RFC1122 and further described in RFC2001 http://www.rfc-editor.org/rfc/rfc1122.txt and http://www.rfc-editor.org/rfc/rfc2001.txt.

Slow Start slowly ramps up the number of data segments in flight at one time. Initially slow start should only let two data segments (corresponding to a current window, cwnd, of twice the maximum segment size, or 2 * MSS) fly before expecting an acknowledgement (ACK). For each successful ACK received the transmitter can increase cwnd by 1 MSS (thus allowing one more segment in flight) until cwnd is equivalent to the receivers advertised window.

Slow start is always started on a new data connection, and sometimes is activated in the middle of a connection when a data traffic congestion event happens. Slow start is used to get things going again.

The network stack supports the Slow Start algorithm for every TCP connection. This algorithm uses a congestion window parameter (cwnd), which is initialized to 1 MSS when the socket is first established.

The Slow Start algorithm dictates that when the socket is initially established, that only one packet can be sent out, and no further data can be transmitted until the ACK for the packet is received. When the ACK is received, the cwnd is then increased by 1 MSS, which allows up to two packets to be transmitted. Each time an ACK is received, the cwnd is increased by 1 MSS.

This continues until cwnd surpasses the advertised window size from the peer. The network stack always sends the minimum of the cwnd and the advertised window. If the network stack receives an ICMP source quench message, then it resets the cwnd back to 1 MSS. The slow start threshold variable (ssthresh) is kept at its same value however.

Congestion Avoidance Algorithm

The network stack keeps sending out the minimum of the cwnd and the advertised window from the peer. The congestion avoidance algorithm also uses the slow start threshold variable (ssthresh), which is initialized to 0xFFFF.

When congestion is detected via a timeout, then ssthresh is set to one-half the current transmit window (minimum of the cwnd and the peer's advertised window). If this value is less then twice the MSS, then this value is used instead. Also cwnd is set to one MSS.

When new data is acknowledged, the cwnd is increased by 1 MSS until it is greater then ssthresh (hence the name). After that, cwnd is increased by 1/cwnd. This is the Congestion Avoidance phase.

Fast Retransmission and Fast Recovery Algorithms

Fast retransmit was first mentioned in RFC122 as an experimental protocol and was formalized in RFC2001, see http://www.rfc-editor.org/rfc/rfc1122.txt and http://www.rfc-editor.org/rfc/rfc2001.txt.

Fast retransmit immediately generates an ACK when an out of order segment is received to allow the sender to quickly fill the hole instead of waiting for standard time out.

Fast retransmit is invoked when a receiver receives three duplicate ACKS. When fast retransmit is invoked the sender tries to fill the hole. A duplicate ACK is considered duplicate when the ACK and window advertisement values in a segment match one another.

When the network stack receives duplicate ACKs it is a strong indication that a packet has been dropped. When n duplicate packets are received, then the dropped segment is immediately retransmitted even though its retransmission timer may not have expired yet. This is the Fast Retransmission algorithm. The number, n, of duplicate ACKs that must be received before the retransmission may be set via the TCP_Dup_ACK register (0x36), and defaults to three.

When the specified number of duplicate ACKs is received, ssthresh is again set to one-half the current window size as was the case with the Congestion Avoidance algorithm, but this time cwnd is set to ssthresh+(3 * MSS). This ensures that we revert back to the Congestion Avoidance algorithm and not Slow Start after receipt of duplicate ACKs. Each time another duplicate ACK is received, cwnd is increased by one MSS. This is the Fast Recovery Algorithm.

When an ACK for new data is received, then cwnd is set to ssthresh.

Retransmission Theory of Operation

Retransmission support in logic resides in three locations: where data is sent, in processing received ACKs, and in the CB Poller Data Transmissions When we send data, the transmission logic looks at the retransmission valid bit in the associated CB. If the bit is not set, implying no valid retransmission time is stored, then the currently stored RTO (in the CB) is added to the current timestamp. The resulting time is the retransmission time for the packet. This time is stored in the CB and the retransmission valid bit in the CB is set.

If the retransmission valid bit was already set in the CB, it means that there are currently outstanding data on the socket and the retransmission time does not need to be updated here.

If the data buffer being sent is due to a timeout and thus is a retransmission, then the retransmission time in the CB is always updated, and the RTO stored in the CB is also adjusted (doubled).

ACK Processing

When the TCP RX module receives ACKs it sends a notification to the TX module, along with the timestamp of the ACK (if included). The TX module uses this information to update the RTO. This update is not done if the ACK was in response to a retransmitted packet. The indication of whether the packet was retransmitted or not is kept in the data buffer header in MTX memory.

If a new RTO is needed after it is calculated, it is stored in the CB. If any outstanding data on the socket is detected, then a new retransmission time is also calculated, by adding the new RTO to the current timestamp, and this is also stored in the CB.

CB Poller

The CB poller cycles through all CBs looking for active blocks. When the CB poller finds an active block, the CB poller examines the retransmission valid bit. If the retransmission valid bit is set, then the CB poller compares the retransmission time. If the CB poller finds that the retransmission time has expired, then the CB poller asserts the retransmit bit in the CB (that is how the data transmitter knows the packet is a retransmitted packet), and places the CB onto one of the priority queues.

MSS Selection

Overview

This section outlines how the MSS option is derived.

Initial Setup

Prior to enabling TCP transactions, the host should set up the following parameters and settings.

The default non-local MSS to be used in registers 0x1A4A-0x1A4B.

The default local MSS to be used in registers 0x1A4C-0x1A4D.

Selection Algorithm

When selecting which of the two MSS values to use for any connection, the TCP engine queries the IP Router. If the destination route is through a gateway, then the non-local MSS is used.

TCP Options

Overview

The following discussion outlines the TCP options supported and their formats. The four options that are supported are:

MSS
Window Scaling
Timestamp
SACK

MSS Option

This option is always sent. The actual MSS value used is determined according to the algorithm already explained. The format of the MSS option is shown in FIG. 30.

Window Scaling Option

This option is always sent in SYN packets as long as the SI_Win_En bit is set in the TCP_Control register. This option is sent in SYN/ACK packets only if the option was included in the SYN packet that generated the SYN/ACK response. The format of the option is shown in FIG. 31. Note that this option is always preceded by a NOP byte so that the option aligns on a four-byte boundary.

Timestamp Option

This option is always sent in SYN packets, if the timestamp option is enabled, and is sent in SYN/ACK packets only if the option was included in the SYN packet that generated the SYN/ACK response, regardless of whether the timestamp option was enabled or not. The format of the option is shown in FIG. 32. Note that the option is always preceded by two NOP bytes so that the option aligns on a four-byte boundary.

Selective ACK (SACK) Option

Selective Acknowledgement (SACK) allows TCP to acknowledge data that contains holes (missing data packets), and allows the retransmission of only lost data, not all data after the drop. This feature is described in RFC2018.

This option is always sent in SYN and SYN/ACK packets as long as the SACK_En bit is set in the TCP_Control register. SACK uses two different TCP Option kinds. One option kind is used in the SYN packets, and the other option kind is used in data packets. The formats of the option are shown in FIGS. 33 and 34.

MTX Buffer Header Formats

Overview

This section describes the header formats that are used at the start of every MTX data buffer. The header contains information on the data contained in the buffer such as the checksum, sequence number, next link, and so forth. The header format is different for TCP and UDP.

Keep Alive Timer for TCP

Overview

This section describes the keepalive timer used for TCP connections. This section contains the theory of operation on how this feature is implemented in the IT 10G network stack.

Keep Alive Parameters

The following parameters are used for the keepalive feature in the network stack:

TABLE 24

Keep Alive Parameters

| Parameter | Description | Default Value |
| --- | --- | --- |
| Keep Alive Enable | Enable bit for the keep alive function. If the feature is not enabled, then an idle socket will stay up until it is closed in the regular manner. | off |
| Keep Alive Time[7:0] | This fields represents the number of minutes that must elapse on an idle connection before a keep alive probe is sent on the socket. | 0x78 (120 minutes or 2 hours) |
| Keep Alive Interval [7:0] | This field represents the time interval in number of minutes between keep alive probes on a single socket. | 0x02 (2 minutes) |
| Keep Alive Retries[3:0] | This field represents the number of keep alive probes that are sent before assuming that the connection has been terminated. | 0x0A (10 retries) |

Theory of Operation

By default, the keepalive timer is disabled for a socket. When the socket is created, the host has the option of setting the Keep_Alive bit in the Socket_Configuration register. If this bit is set, and the socket parameters committed, then the keepalive feature is enabled for that socket.

Once the socket is established, a keep_alive timestamp is kept in its CB (word 0x05). This timestamp represents the time in the future for when the socket is considered idle. Every time a packet is sent on the socket or when a packet arrives on the socket, this timestamp is updated. The updated timestamp is the current running minute counter plus the keep_alive time (as entered by the host via the Keep_Alive_Timer register (0x1A3A).

The CB poller module checks the Keep Alive timestamp once a minute in each CB that has the keepalive feature enabled. If the CB poller module finds a socket whose timestamp matches the current free running minute counter, then the CB poller module schedules a keepalive probe to be sent on the socket. The CB poller module does this by queuing the CB in the data transmission queue and setting the K bit (keep alive retry bit in word 0x0B in the CB). The CB poller module also sets the keep alive retries field in the CB (word 0x13) to 0x1. If the transmission queue is full, then the CB poller module increments the keep_alive timestamp in the CB so it again triggers the CB Poller during the next minute check.

When the data packet generator comes across a CB whose K bit is set, the data packet generator sends out a one byte PSH packet with the sequence number set to one below what the sequence number should normally be set to. The data generator also updates the Keep Alive timestamp in the CB with the current free running minute count plus the keepalive retry interval. This will cause the peer to send an ACK back, if it is still in operation (alive), with the correct expected sequence number.

If the peer is alive and does send a response, then the TCP-RX module clears the K bit in the CB, reset the retry count to 0x0, and updates the keepalive timestamp.

If the peer does not send a response within the keepalive retry interval, then the CB poller again comes across the socket when it is doing its once a minute keepalive timestamp check. If it sees that the K bit is already set, then it increments the keepalive retry counter by one and again reschedules the CB for a data packet transmission.

If the CB poller finds that the number of retries has reached the maximum number, then the CB poller sends a notification to the host computer and deprecates the socket.

If in the course of sending out keepalive probes, the network stack receives a RST packet, then this most likely means that the peer was rebooted (reset or restarted) without properly closing the socket. In this case, the socket is deprecated.

Another possibility is that the network stack receives ICMP error messages in response to the keepalive probe, e.g. network unreachable. This situation may be caused by an intermediate router going down. In this case, the ICMP messages are sent to the on-chip processor. After receiving a number of these ICMP messages, the on-chip processor can read the sockets CB, and see that it is in the keep alive retry state. The on-chip processor can then instigate the CB deprecation process.

TCP ACK Modes

Overview

The following discussion details the TCP ACK modes available in the IT10G network stack. There are two bits that determine in which of four modes the stack is operating. These are the Dly_ACK bit in the TCP_Control1 register and the Host_ACK bit in the Socket_configuration register. The operating matrix is shown in the following table.

TABLE 25

ACK Operating Modes

| Host_ACK | Dly_ACK | Mode | Description |
| --- | --- | --- | --- |
| 0 | 0 | Normal | Data is ACKed as soon as it is received. |
| 0 | 1 | Delayed | Data ACKs are delayed by a specified time. The ACK bit in the CB, which is used by the CB-Poller is set as soon as data is received. |
| 1 | 0 | Host-Normal | Data is ACKed after it is sent to the host, and the host has issued an ACK command for it. |
| 1 | 1 | Host_Delayed | Data ACKs are delayed by a specified time. The ACK bit in the CB, which is used by the CB Poller is set after the data is sent to the host, and the host has issued an ACK command for it. |

Normal ACK Mode

In this mode, data are ACKed as soon as they are received into the MRX DRAM. The TCP receive logic schedules the ACK by placing it in the RX to TX packet FIFO Buffer. The AR bit in the socket CB is not used in this mode. This is the default mode of the TCP module, and is enabled by de-asserting the Dly_ACK bit in the TCP_Control1 register. This is a global TCP setting so it applies to all sockets.

Delayed ACK mode

In this mode, data is not ACKed immediately. Instead, when data arrives for a socket, the TCP receive logic sets the AR bit in the sockets CB. The CB Poller module then periodically examines all active CBs to see which ones have their AR bits set. When the CB Poller finds a set bit, the CB Poller schedules an ACK for that socket. The polling interval for looking for the AR bit may be set via the Del_ACK_Wait register, and is specified in terms of 2 ms timer ticks. The default time interval is 250 ms. This mode is enabled by asserting the Dly_ACK bit in the TCP_Control1 register. It is also a global TCP setting so it applies to all sockets.

Host-Normal ACK Mode

In this mode, data is not ACKed when it is received into the MRX DRAM. Instead, ACKs are only transmitted after the data has been sent to the host computer, and the host computer has acknowledged receipt of the data by issuing an ACK command for the data. When the IT 10G hardware receives the ACK command, it writes the CB, i.e. the socket handle, to the Host_ACK_CB register. This action causes an ACK packet to be scheduled via the RX-TX packet FIFO buffer. The AR bit in the socket CB is not used in this mode. This mode can be enabled on a per socket basis by asserting the Host_ACK bit in the Socket_Configuration register.

Host-Delayed ACK Mode

In this mode, data is not ACKed immediately. Instead, after the data is received, it is transmitted to the host computer, and the host computer acknowledges the data by issuing an ACK command for the data. When the IT 10G hardware receives the ACK command, it writes the CB, i.e. the socket handle, to the Host_ACK_CB registers. This action causes the AR bit in the socket's CB to set. When the CB Poller module checks all AR bits in the next ACK polling cycle, the CB Poller schedules an ACK to be sent out for the socket. Notice that the CB polling cycle specified via the Del_ACK_Wait register only specifies the polling interval for the AR bits, and does not take into account the delay caused by first transmitting the data to the host computer and then waiting for the host computer to acknowledge the data. Therefore, if this mode is used, it is suggested that the ACK polling interval to be set to some value lower then the default 250 ms. The optimum interval is dependent on the host computer turnaround time for issuing the ACK command.

Host Retransmission Mode

Overview

The IT10G network stack is designed to either retransmit TCP data from its local data buffer or from host memory. This discussion details the operations when the network stack is operating in the latter mode. The advantage of retransmitting out of host memory is that the amount of local transmission buffer memory can be kept to a minimum. This is because as soon as data are transmitted on the wire, the MX data buffer blocks are released. The drawback is that it takes more host memory, more host CPU cycles, and greater latency to support host memory retransmissions.

Host Retransmission Mode Enabling

The host retransmission mode can be enabled on a per socket basis by asserting the Host_Retrans bit in the Socket_Configuration2 register. This mode can be used in conjunction with any of the ACK operating modes.

Host Retransmission Mode Theory Of Operations

When operating in host retransmission mode, it is up to the host CPU to keep track of sequence numbers. In each data section that is DMA'ed from host memory, the first 128 bits form the header for the data block.

The host should write this header as the first 128 bits of each data transfer. Bits[127:64] of the header should be the first 64-bit word DMA'ed, followed by bits[63:0] of the header, followed by the first data byte.

When the IT10G hardware generates the data packet, it takes the sequence number for the data buffer header instead of from the socket CB. The IT10G hardware then forms the packet up as usual, and transmits the data packet onto the wire. After the packet has been transferred, the MTX data buffers are freed immediately.

When an ACK for data is received from a peer, the host computer is notified via a status message as to which CB received data, and what the received ACK number was. With this information, the host computer may determine when it is clear to free the data from the host computer memory.

The retransmission timer is still used in the socket CB as under normal conditions. When the retransmission timer expires, a status message is sent to the host computer with the corresponding socket handle. The host computer then schedules a DMA transfer for the oldest data that it has in its memory that has not been ACK'ed yet.

Peer Zero Window Case

Overview

At times, the peer side of a TCP connection may run out of receive buffer space. In this case, the peer advertises a window size of 0x0000. The peer's window is always written to the socket CB by the TCP receive section. When the receive logic detects a window size of 0x0000, it sets the ZW bit in the CB flag word (bit[19] of word 0x02). The next time that data are to be sent on this socket, the TCP transmit logic comes across the ZW bit being set, and instead of sending out the data, sends out a one-byte data packet with an incorrect sequence number. The sequence number is one less then the correct sequence number. This data packet looks like the keepalive probe packet. In response to this incorrect data packet, the peer should send an ACK packet with an updated window size. After the one-byte data packet has been sent, the CB zero_window probe count is incremented by one (bits[27:24] of word 0x13), and the CB zero_win_timestamp (bits [31:26] of word 0x0C) written to when the next zero_window probe should be sent.

Zero_Window Timestamp

This field is used to determine when the next zero_window probe should be transmitted. Every time a zero_window probe is sent, the probe count is incremented, and the timestamp updated. The transmit logic determines the next zero_window timestamp by shifting the zero_window_interval count by the number of probes sent, and then adding this time to the current free running second timer. The resulting timestamp represents the time in the future for when the next probe is transmitted. Therefore, with the default value of three seconds, probes are sent out at 0, 3, 6, 12, 24, 48, and 60 second intervals. Once the interval reaches 60 seconds, it is capped.

In the CB Poller module, the logic polls all active CB ZW bits every X seconds, where X is the zero_window_interval count. When the CB Poller comes across a CB whose ZW bit is set, the CB Poller then reads the zero_window_timestamp and compares the timestamp to the free running second timer. If these match, then a zero-window probe is queued to be sent. Unlike keepalive probes, there is no limit to the number of zero-window probes that may be sent.

Opening of the Window

When a peer's window finally opens, the peer either sends an unsolicited ACK (window announcement), or the peer indicates the opened window in the ACK response to a zero-window probe. The TCP receive logic then updates the peer's window in the CB. The next time that the CB comes up for a zero_window probe, the CB poller sees that the window has opened. The CB Poller then clears the ZW bit, and schedules a regular data transfer. The number of zero_window retries is also reset back to 0x0.

Nagle Operations
Overview

This section describes the IT10G hardware support for the Nagle Algorithm. This algorithm states that when a TCP connection has un-ACKed data in transit, that small segments cannot be sent until the data has been acknowledged.

Nagle Send IBs

Separate Send Instruction blocks are provided for Nagle algorithm use. These instruction blocks (IBs) are similar to the regular non-Nagle IB's except that they have the msb of the IB code asserted. The Nagle SendIB for 32-bit addressing is 0x81 and the code for 64-bit addressing is 0x82. The Nagle Send IBs work in the same way as regular Send IBs except that when they are parsed by the HW, the RxACK bit in the Sockets CB is asserted. Processing of regular Send IBs clears this bit if it is set.

RxACK Bit

This is a bit that resides in the socket CB and may be set via an application by asserting bit [3] in the Socket_Confg1 register. When set, this bit causes an RX_ACK status message to be generated when an ACK is received that acknowledges all outstanding data. This condition is met when the received ACK number matches the SEQ number to be used by the socket. The status message code is 0x16 for Received ACKs.

The RxACK status bit is cleared when a regular Send IB is processed by the IT10G hardware or when an RxACK Status message is sent or by the application manually clearing the bit in the socket CB. The last case is implemented for diagnostic purposes only.

MTX Data Storing
Overview

This section describes the algorithm that the TOE uses to determine the size which data can be stored in an MTX buffer. This affects the size of TCP packets that are transmitted as one MTX buffer corresponds to one TCP packet.

MSS vs. one-quarter MSS (or half the Maximum Peer Window)

If the peer's advertised window ever exceeds 2× the MSS, then the socket MSS size (as stored in CB location 0x05) is used as the sockets determining factor in how many bytes can be stored in an MTX buffer. If the peer's advertised window never reaches the twice-MSS level, then the maximum number of bytes that are stored in an MTX buffer is one-quarter the MSS or one-half the peer's maximum advertised window (depending on the implementation). The bit that keeps this comparison is bit[18] of CB word 0x14.

Packet Overhead

From either the MSS or one-quarter MSS or half PeerMaxWin value (depending on the implementation), the fixed byte overhead is subtracted out. This overhead includes packet header bytes, and IPSEC overheads.

CB Size Limit versus Buffer Size

After the determination of whether to use the MSS or one-quarter MSS or half PeerMaxWin (depending on the implementation) has been made and the packet overhead subtracted out, the logic looks at what sort of buffers are available. If only 128 byte buffers are available, then this may limit the storage size. Also, if, after the above calculations, the data size is still bigger then the big MTX buffer size, then again, the packet size may be limited by the size of the MTX buffer.

IP Router

Figure 35:
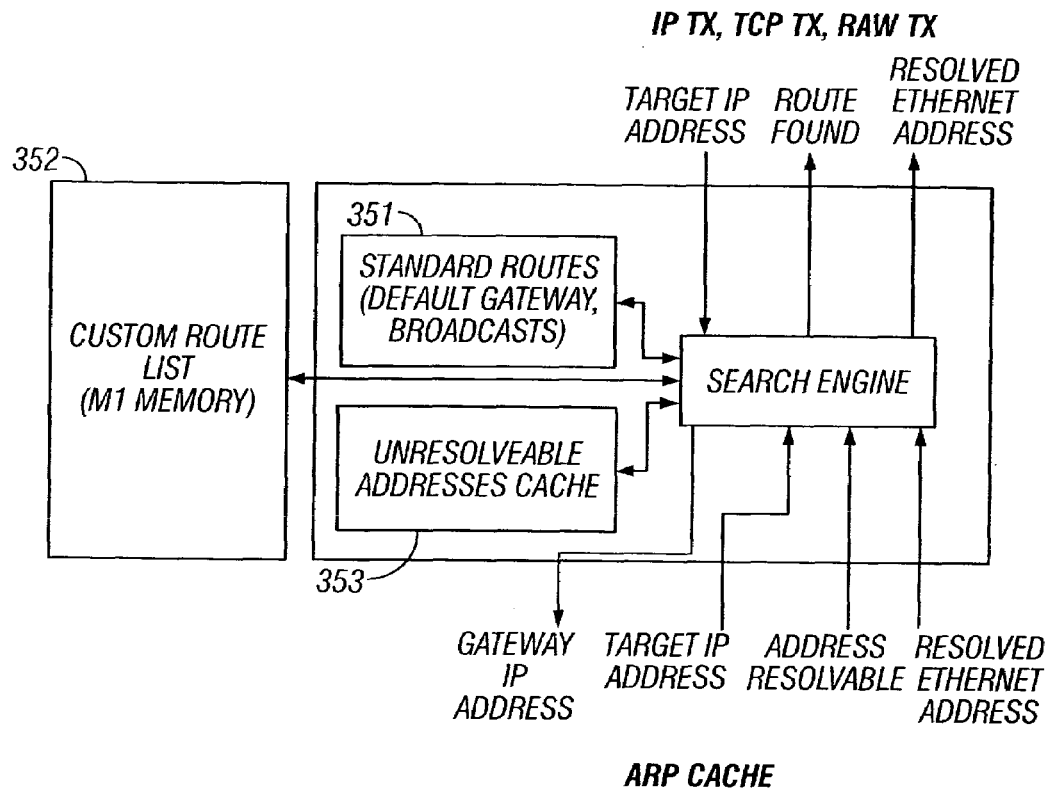
FIG. 35 is a block schematic diagram of an IP Router according to the invention.

IP Router Features
Provides default routing capabilities
Provides routing for multiple host IP addresses
Provides host-specific and network-specific routes
Dynamically updates routes after ICMP redirects
Handles IP broadcast addresses (limited, subnet-directed and network-directed broadcasts)
Handles IP loop back addresses
Handles IP-multicast addresses Module Block Diagram FIG. 35 is a block schematic diagram of the IP Router.

IP Router Theory of Operation
Requesting a route

When the local host wishes to transmit an IP packet, it must determine where to send that packet, either to another host on the local area network, to an external network, or back to the local host itself. It is the task of the IP router, to direct outgoing IP packets to the appropriate host.

When a transmitting module requests a route, the transmitting module passes the destination IP address of a packet to the IP router. The IP router then compares the targeted IP address with a list of destinations stored in the IP route list. If a match is found, the IP router then attempts to resolve an appropriate Ethernet address. The IP router performs this resolution by requesting an ARP lookup for a destination IP address in the ARP cache. If the destination Ethernet address is resolved, the Ethernet address is passed back to the transmitting module, which uses this Ethernet address as the destination of the outgoing Ethernet frame.

Route information is provided by three separate components: the default route registers 351, the custom route list 352, and the unrouteable addresses cache 353. These components are all queried simultaneously when a route request is served.

The Default Route

Packet destinations are can be described as being either local or external. Local destinations are attached to the same local area network as the sending host. External destinations belong to networks separate from the sending host's local area network.

When an outgoing packet destination IP address is found to belong to a host attached to the local area network, the IP router uses ARP to attempt to establish resolve the destination IP address to its corresponding Ethernet address. If a destination IP address is determined to belong to an external network, the IP router must determine which gateway host to use to relay outgoing packets to the external network. Once a gateway host has been selected, outgoing IP packets use the Ethernet address of the gateway host as their destination Ethernet address.

In the event that a route cannot be found for a packet destination IP address, that packet must use the gateway host specified by the default route. The default route is used only when no other routes can be found for a given destination IP address.

To minimize the number of accesses to the ARP cache, the IP router caches the default gateway Ethernet address when the default route is set. The default gateway Ethernet address is cached for a maximum amount of time equal to that of dynamic entries in the ARP cache are allowed to be cached.

Broadcast and Multicast Destinations

When the destination IP address is a broadcast or multicast IP address, an ARP lookup is not needed. Instead, destination Ethernet addresses are dynamically generated depending on the type of IP address. Packets with the destination IP address set to the IP broadcast address (255.255.255.255) are sent to the Ethernet broadcast address (FF:FF:FF:FF:FF:FF). Packets with the destination IP address set to a multicast IP address (224.x.x.x) have their destination Ethernet addresses computed from the multicast IP address.

Static Routes

In addition to the default route, the IP router allows the creation of static routes to map destination IP addresses to specific Ethernet interfaces or gateway hosts. An IP route entry includes a destination IP address, a netmask and a gateway IP address. The netmask is used to match a range of destination IP addresses with the destination IP addresses stored within the IP route entries. The netmask also allows differentiation between routes for specific hosts and routes for networks. The gateway IP address is used when resolving a destination Ethernet address via ARP.

Figure 36:
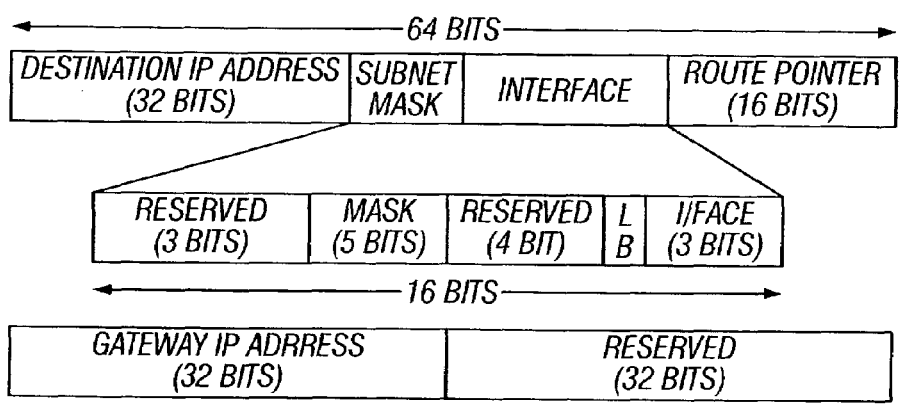
FIG. 36 shows a format of each IP route entry according to the invention.

Because it is possible to have a large number of routes in the IP route list, IP route entries are stored in dynamically allocated memory (called m1 memory in this implementation). Each IP route entry uses 128 bits. The last 32 bits of each entry do not store any data, but are used as padding to align IP route entries along 64-bit boundaries. The format of each IP route entry is shown in FIG. 36.

The IP route list is implemented as a sorted linked-list. As IP routes are added to the IP route list they are ordered according to their netmasks, with the most-specific IP routes appearing at the front of the list and IP routes with the least-specific netmasks going to the end of the list. The route pointer field in an IP route entry contains the m1 memory address where the next IP route entry can be found in m1 memory. The first (most significant) bit of the route pointer field is used as flag to determine if the m1 memory address is valid and there is a route following the current one. If the pointer valid bit of the route pointer field is not asserted, then there are no further IP routes in the IP route list and, the end of the IP route list has been reached.

If a destination IP address is not determined to be a broadcast or multicast IP address, the IP route list is searched for a matching IP route entry. If a match is not found in the IP route list, the default route is used to provide the gateway information.

The IP router also allows for the use of multiple physical and loopback interfaces. Using the interface ID field in the IP route entry, the IP router can direct outgoing packets to a particular Ethernet interface of the IT 10G. The interface ID field is also used for directing ARP requests to the appropriate Ethernet interface.

Loop back Addresses

If the destination IP address belongs to the IT 10G, or is a loop back IP address (127.x.x.x), the outgoing packet is supposed to be fed back to the IT 10G. IP routes for loop back destinations are stored in the IP route list. IP addresses not assigned to the IT 10G may also be configured as loop back addresses. To enable this local redirection, the interface ID field of the IP route entry should be set to 0x8. Otherwise, the interface ID field of the IP route entry should be set to one of the Ethernet interfaces (0x0, 0x1, 0x2, and so forth).

Creating Routes

New IP routes may come from the system interface (the host computer for example). IP routes created by the system interface are static routes, meaning that they remain in the table until they are removed by the system interface. The system interface adds and removes routes via the IP router module register interface.

ICMP redirect messages are transmitted when IP packets are being sent to the incorrect gateway host. An ICMP redirect message normally contains information for the correct gateway host to use for the incorrectly routed IP packets. When an ICMP redirect message is received, the message is processed by the system interface. It is up to the system interface to update the route list via the IP router's register interface, updating an existing IP route or creating a new IP route.

Routing to Hosts on the Local Network

To route packets directly to other hosts on the local Ethernet network, an IP route with the IT 10G subnet mask must be created. Instead of specifying another host as the gateway for this route, the gateway IP address should be set to 0.0.0.0 to indicate that this route results in a direct connection across the local network.

Route Request Signaling

Figure 37:
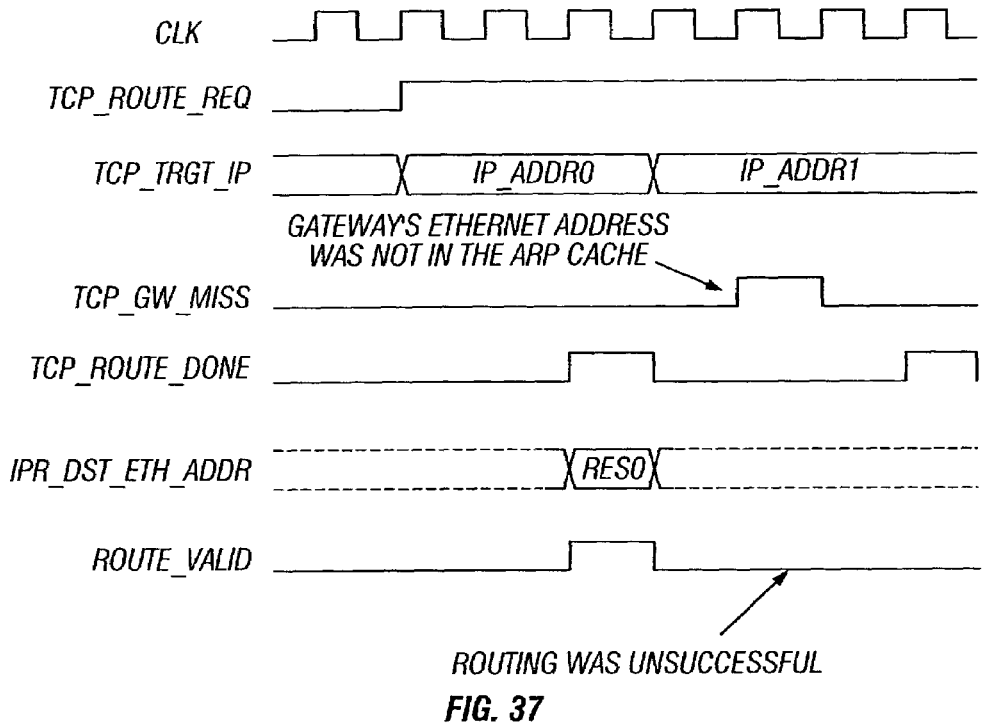
FIG. 37 shows signaling used to request and receive a route according to the invention.

Each transmitting module has its own interface into the IP router for requesting routes. The signaling used to request and receive a route is illustrated in FIG. 37.

When a module is requesting an IP route, the requesting module asserts a route request signal (TCP_Route_Req for example), and provides a destination IP address (TCP_Trgt_IP in FIG. 21) to the IP router. Once the IP router has found a route for the supplied IP address, the IP router asserts a route done signal and outputs a destination Ethernet address. The route_valid signal is used to indicate to the transmitting module if an IP route was found successfully. If the route_valid signal is asserted when the route done signal is asserted, then a valid route was found. If the route_valid signal is not asserted, that means that routing was unsuccessful. This routing failure could be due to several causes such as not having a default route set, or the gateway supplied by the matching IP route entry is down and not responding to ARP requests. In the event of a route failure, it is up to the transmitting module to wait and attempt to resolve the route again later, or to abort the current connection attempt.

When an IP route requires an ARP lookup to resolve the Ethernet address for the IP address of a host or gateway, it is possible for delay to occur if that IP address is not found in the ARP cache. When there is a cache miss, i.e. target IP address does not have an entry in the ARP cache, the ARP cache notifies the IP router of the miss. The IP router then signals to the transmitting module, which requested an IP route, that an ARP cache miss has occurred. At this point, the transmitting module may choose to delay establishing the current connection, or attempt to establish the next connection in the connection queue and request another route. Even if the transmitting module cancels its route request to the IP router, the ARP lookup continues. If the target of the ARP lookup is active and responds to ARP requests from the IT 10G, the resolved Ethernet address of the target IP address is added to the ARP cache for possible later use. Note: the IP router may have multiple outstanding ARP requests.

Displaying Individual Routes

After creating static routes, the user may then read back entries stored in the route table in two ways. If the user knows the target IP address of a given route, the Show_Route command code can be used to display the netmask and gateway of that route.

To display all the entries within the route table, the Show_index command may be used. Using the Route_index register, the system interface may access the routes in order of specificity. More specific (host) routes are displayed first, followed by less specific (network) routes. For example, the IP route entry with route_index 0x0001 would be the most specific route in the IP route list. Note: The default is stored at index zero (0x0000). The Route_Found register is asserted if a route has been found successfully, and the route data is stored in the Route_Trgt, Route_Mask, and Route_Gw registers.

Caching Unresolvable Destinations

When the IP router is unable to resolve the Ethernet address for a destination host/gateway, the router then caches that destination IP address for 20 seconds. If, during that time, the router receives a request for one of these cached unresolvable destinations, the IP router immediately responds to the module requesting the route with a route failure. This caching of unresolvable destinations is intended to reduce the number of accesses into the shared m1 memory, where the ARP cache entries are stored. Caching unresolvable destinations also helps to avoid redundant ARP requests. Note: The amount of time an unresolved address may be cached is user configurable via the Unres_Cache_Time register.

System Exception Handler

Overview

The following discussion details the System Exception handler. This module is called whenever there is data that the IT 10G hardware cannot handle directly. This may be unknown Ethernet type packets, IGMP packets, TCP or IP options, and so forth. For each of these exception cases, the primary parser, when it detects an exception case enables the System Exception handler. The System Exception handler module then is responsible for storing the data, informing the system interface (typically the application running on the host computer) that there is exception data to be handled, and passing the data to the system interface.

Exception Handler Block Diagram

Figure 38:
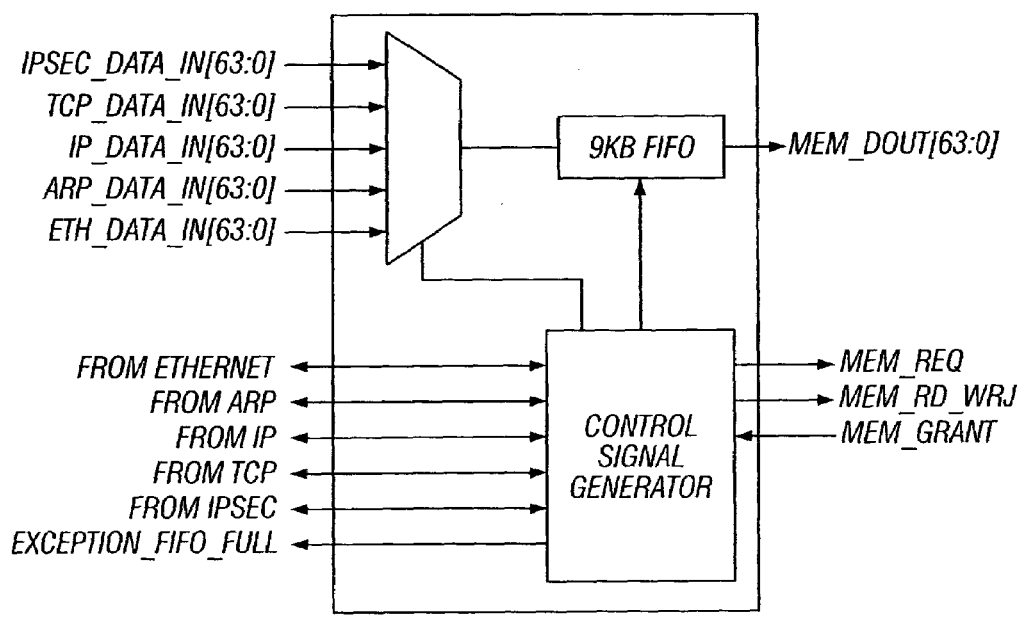
FIG. 38 is a block schematic diagram of an Exception Handler according to the invention.

FIG. 38 is a block schematic diagram of one implementation of an Exception Handler.

Exception Handler Theory of Operation

Exception memory is part of the on-chip processor memory. Each of the source modules, which can generate an exception packet, has their own Exception Buffer Start address and Exception Buffer Length registers. This module serves to FIFO buffer the exception packet and queue it to be stored in the on-chip processor memory. An exception_fifo_full signal is fed back to each of calling modules to indicate that the exception FIFO buffer is full. This module can only service one exception packet at a time. In the event that a subsequent exception packet is received, it is held off until the previous packet is stored in memory.

Because the exception packets are stored in on-chip processor memory, no host computer access is provided through this module.

Memory Allocator 1

Overview

This section describes the memory allocator (malloc1) used to service the IP module, ARP cache, Route Table, and on-chip processor. This Allocator is responsible for first dividing the M1 memory into discrete blocks, and then allocating them upon requests, and putting freed blocks back on a stack.

Theory of Operation malloc1 needs to have two parameters entered prior to starting its operations. These are the total size of the M1 memory block, and the size of each memory block. Only one memory size is supported with this allocator.

After these parameters are entered, the system asserts the M1_Enable bit in the M1_Control register. When this occurs, the allocator will start filling in block addresses starting from the top of the M1 memory block. That is, if the M1 memory block is a total of 4Kbytes deep, and the block size is 512 bytes, then the M1 memory map looks like that shown in FIG. 39.

Four addresses are kept per M1 address location for M1 Block addresses. In addition to keeping the starting block addresses in memory, Malloc1 also contains a 16-entry cache. Upon initialization, the first 16 addresses are kept in the cache. As blocks are requested they are taken off of the cache. When the number of cache reaches zero, then four addresses (one memory read) are read from memory. Likewise, whenever the cache fills with addresses, four addresses are written back to memory. This takes effect only after the allocator reads address from the M1 memory for the first time.

TX/RX/CB/SA Memory Allocator

Overview

This section describes the memory allocators used for the socket transmit (malloctx), socket receive (mallocrx), control block (malloccb), and SA (mallocsa) memories. These allocators are responsible for allocating memory blocks upon requests, putting freed blocks back on a stack, and arbitrating for use of the memories.

Theory of Operation

The mallocs needs to have several parameters entered prior to starting its operations. These are the starting and ending address pointer locations within the MP memory space, and the bitmaps that represent each available blocks within each memory space. Two sizes of blocks are available for the socket data memories; 128 bytes and 2k bytes. The CB memory has fixed 128 byte blocks. All the allocators also utilize an eight entry cache for block addresses for each memory size.

After these parameters are entered, the system asserts the Enable bits in the Control registers. The allocators then can start to allocate and de-allocate memory blocks.

Default Memory Map

Figures 40, 41:
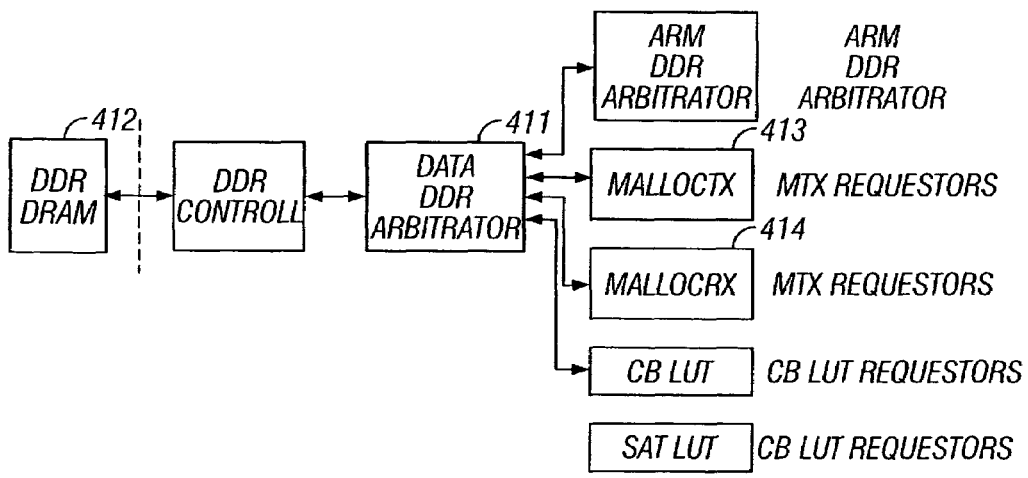
FIG. 40 depicts a sample memory map according to the invention.
FIG. 41 is a block diagram flow for data according to the invention.

FIG. 40 depicts a sample memory map assuming 256 MByte of memory, for the unified Network Stack Data memory, i.e. where MRX and MTX share a common physical memory bank. Although the current implementation employs external DDR DRAM for both MRX and MTX, in alternative implementations it is also possible to locate these memories on-chip or use a different type of memory (SRAM for example).

Network Stack Data DDR Block Diagram

The network stack data DDR DRAM is shared between the Transmit and Receive data buffers and the on-chip processor. The block diagram flow for the data is shown in FIG. 41.

The Data DDR DRAM Arbitrator 411 is responsible for arbitrating the access to the shared DDR DRAM between the different resources. The entire DDR DRAM 412 is also memory mapped into the on-chip processor's memory space.

MTX DRAM Interface and Data Flow

Overview

The following discussion overviews the interface between the malloctx module and the Data DDR Arbitration module. It depicts the data flow, lists interface signals, and details the timing required.

Data Flow

Figure 42:
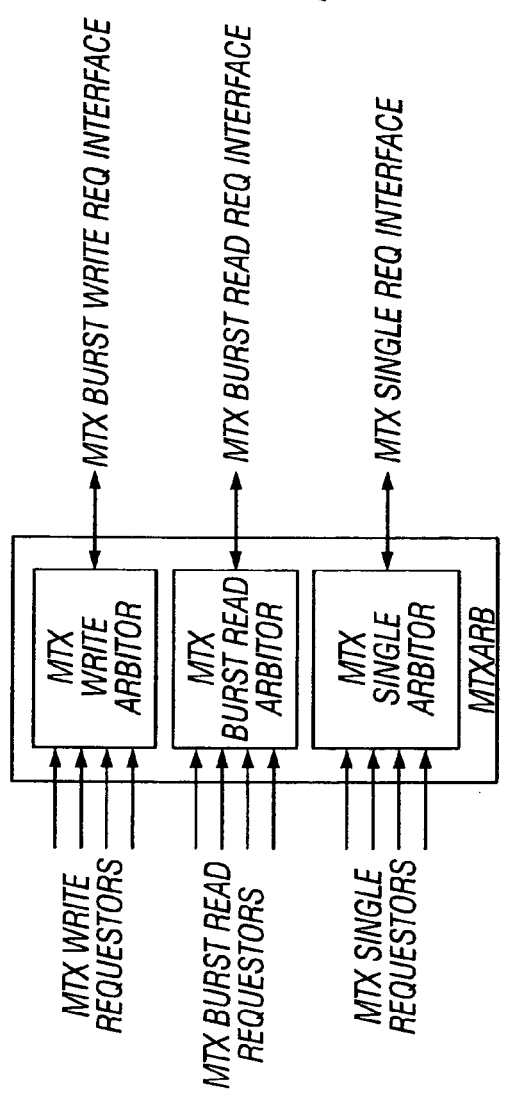
FIG. 42 is a block diagram of the mtxarb sub unit according to the invention.

Three different access types are supported for MTX DRAM. These are burst writes, burst reads, and single access. The malloctx 413 arbitrates requests from different sources for each of these cycle types, but all three cycle could be requested from the Data DDR Arbitrator simultaneously. A block diagram of the mtxarb sub unit is shown in FIG. 42.

Data written to MTX memory are first written to a FIFO buffer, and then burst written into DDR DRAM.

RX DRAM Interface and Data Flow

Overview

This section describes the interface between mallocrx 414 and the receive socket data DRAM controller. It describes the data flow, lists interface signals, and details the timing required.

Data Flow

For the receive DRAM, the highest priority is given to data being written to memory. This is because the network stack must keep up with data being received from the network interface. Writes to the DRAM first go into a FIFO buffer. When all data is written to the FIFO buffer, then the controller burst writes it to the DRAM. For jumbo frames, the TCP receive logic breaks the burst write requests into 2K size chunks.

For data that is to be burst read from the DRAM, the DRAM controller reads the memory, and writes the requested data into a pair of ping-pong FIFO buffers that feed the PCI controller. These FIFO buffers are needed to transition the data rate from the DRAM clock to the PCI clock domain.

Network Stack DDR Block Diagram

Figure 43:
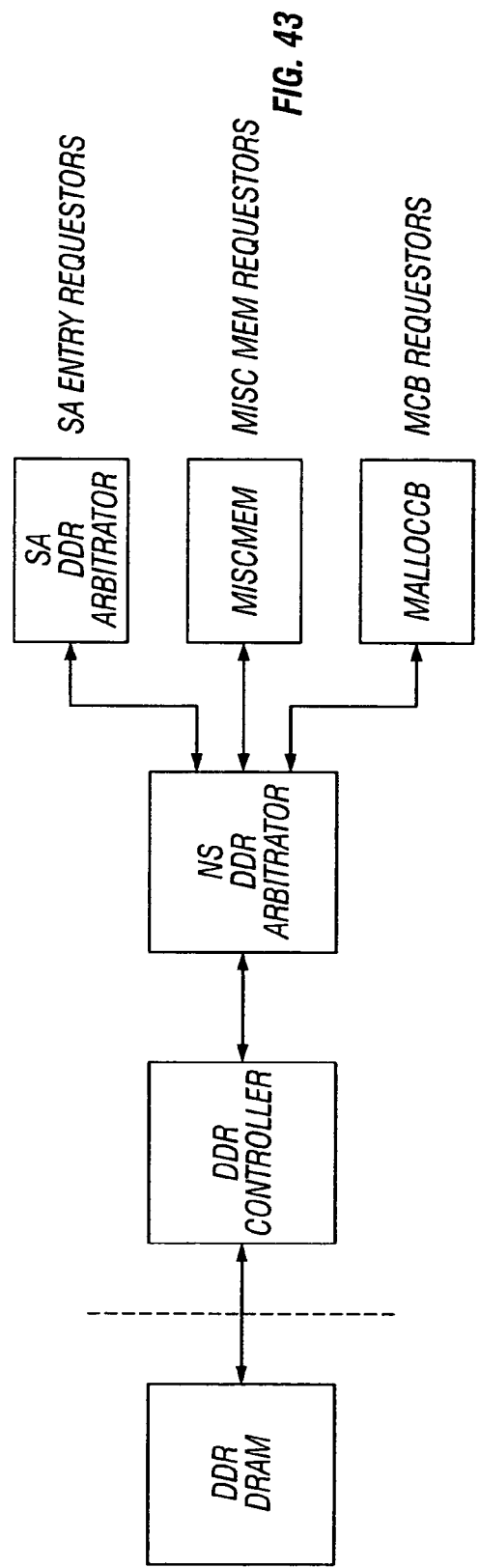
FIG. 43 is a block diagram flow for data according to the invention.

The network stack DDR is shared between the CB, Miscellaneous, and SA memories. The block diagram flow for the data is shown in FIG. 43.

The NS DDR Arbitrator is responsible for arbitrating the access to the shared DDR between the different resources.

MCB DRAM Interface and Data Flow

Overview

This section describes the interface between the malloccb module and the NS DDR Arbitration module. It depicts the data flow, lists interface signals, and details the timing required.

Data Flow

Figure 44:
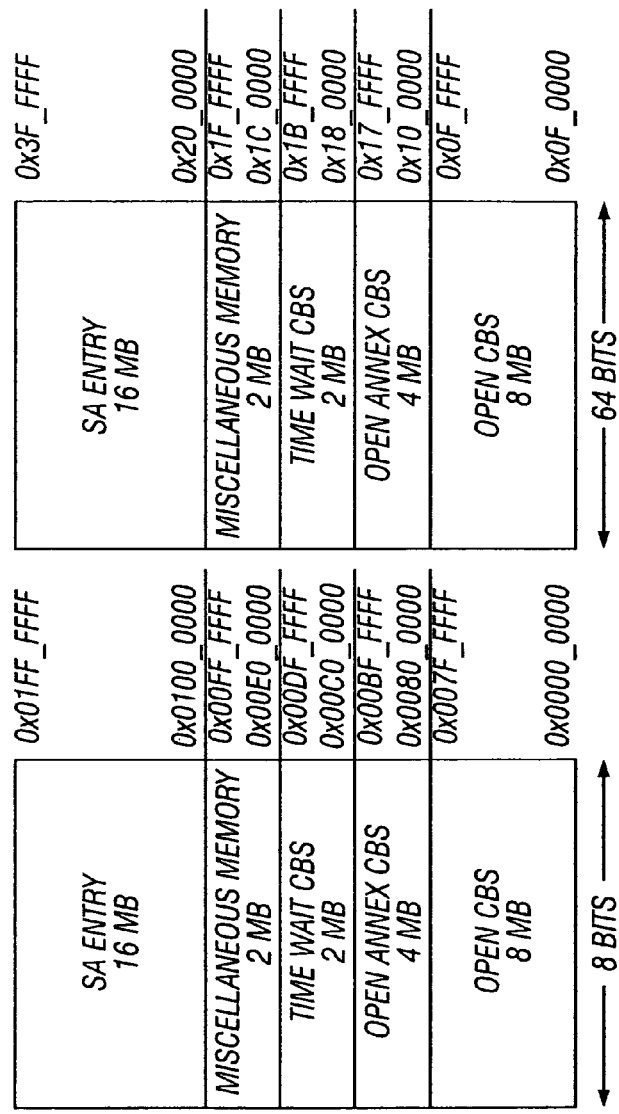
FIG. 44 is a block diagram of the mcbarb sub unit according to the invention.

Two different access types are supported for MCB DRAM. These are burst reads and single accesses. The malloccb arbitrates requests from different sources for each of these cycle types, but both cycles could be requested from the NS DDR Arbitrator simultaneously. A block diagram of the mcbarb sub unit is shown in FIG. 44.

Network Stack Memory Map

Figure 45:
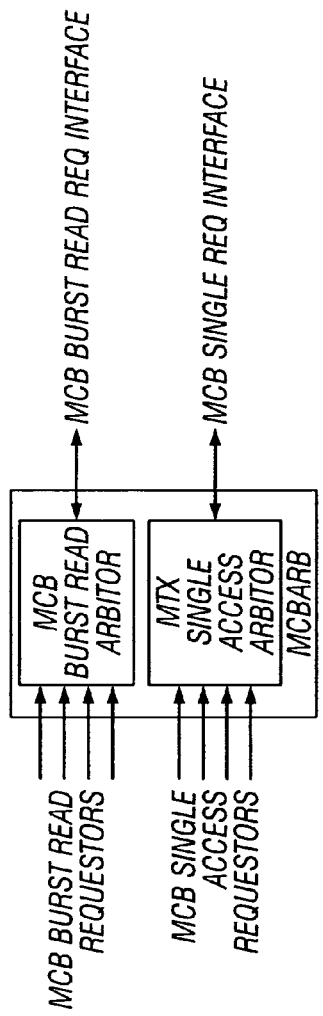
FIG. 45 depicts a default memory map for the network stack according to the invention.

FIG. 45 depicts the default memory map for the network stack. Addresses shown are byte addresses.

Miscellaneous Memory

Overview

The following discussion details the 512K-byte miscellaneous memory bank. This memory is used for the purposes listed below:

Half Open Control Blocks (Main)
TCP Port Authorization Table
UDP Source Port Usage Table
TCP Source Port Usage Table
Time Wait Control Block Allocation Table
Established Control Block Allocation Table
TX Memory Block Allocation Tables (for both 128 and 2K byte blocks)
RX Memory Block Allocation Tables (for both 128 and 2K byte blocks)
FIFO bufer for TCP RX to TX packets
Socket Data Available Bitmap
Server Port Information
SA Entry Allocation Table
Memory Organization and Performance The Miscellaneous Memory is shared with the CB memory. Most resources access the data in 256-bit words to minimize on accesses.

Definition of Stored Data

Half Open Control Blocks

These are the control blocks for half-open TCP connections. Each control block is 64 bytes in size, and there are a total of 4K control blocks. Therefore, the total number of bytes needed for the Half-Open control blocks is 4K×64=256K bytes.

TCP Port Authorization Table

This table keeps track of which TCP ports are authorized to accept connections. We keep one bit of each of the 64K possible ports. Therefore this table uses 64K/8=8K bytes. In an alternative implementation, the TCP Port Authorization Table and the UDP and TCP Source Port Usage Tables may be kept on the host computer.

UDP Source Port Usage Table

This table keeps track of which UDPP ports are available for source ports used for locally initiated connects. We keep one bit of each of the 64K possible ports. Therefore this table uses 64K/8=8K bytes. This table should not include local UDP service ports as well as those ports which may be used TCP Source Port Usage Table This table keeps track of which port numbers are available for source ports used for locally initiated connections. We keep one bit of each of the 64K possible ports. Therefore this table uses 64K/8=8K bytes.

Time Wait Control Block Allocation Table

This is an allocation table for Time Wait Control blocks. We keep one bit for each of the 32K Time Wait control blocks. Therefore, this allocation table uses 32K/8=4K bytes. This module uses the full 16 bit data bus.

Established Control Block Allocation Table

This is an allocation table for Established Control Blocks. We keep one bit for each of the 64K control blocks. Therefore, this allocation table uses 64K/8=8K bytes TX Socket Data Buffer Block Allocation Table This table is made up of a 2-Kbyte block allocation table and a 128-Kbyte block allocation table, that are used for the dynamically allocated Transmit Data buffer memory. The number of blocks of each type is configurable, but the size of both of the allocation tables combined is fixed at 72 Kbytes. This allows for a maximum of 475K 128 byte blocks. At this level, the number of 2-Kbyte blocks is 98K.

RX Socket Data Buffer Block Allocation Table

This table is made up of a 2-Kbyte block allocation table and a 128K byte block allocation table, that are used for the dynamically allocated Receive Data buffer memory. The number of blocks of each type is configurable, but the size of both of the allocation tables combined is fixed at 72 Kbytes. This allows for a maximum of 475K 128-byte blocks. At this level, the number of 2-Kbyte blocks is 98K.

TCP RX FIFO Buffer

This FIFO Buffer is used to keep track of packet transmission requests from the TCP Receive Logic to the TCP Transmit logic. Each TCP RX FIFO Buffer entry is made up of some control flags, and a Control Block address, for a total of four bytes (four flags, a 26-bit address, and two unused bits). This TCP RX FIFO Buffer is 1024 words deep, and therefore requires 1024×4=4 Kbytes.

Socket Data Available Bitmap

This bitmap represents which of the 64K sockets has data ready to be sent to the host system. We keep one bit for each of the sockets. Therefore, this bitmap requires 64K/8=8K bytes.

SA Entry Allocation Table

This is an allocation table for SA Entries. We keep one bit for each of the 64K SA Entries. Therefore, this allocation table uses 64K/8=8K bytes Server Port Information This database is used to store parameter information for TCP ports that are opened in the LISTEN state. Because these server ports do not have CBs associated with them until they are opened, the port specific parameters are kept in this area. Each port entry is made up of 2 bytes, and there are 64K possible ports. Therefore, this database requires 64K×2=128K bytes.

Miscellaneous Memory Map

The memory map used for the miscellaneous memory is configurable. The default settings are shown in FIG. 46. Note: Blocks are not to scale.

MiscMem Theory of Operation

Module Initialization

There is little that the CPU needs to initialize prior to activating the miscellaneous memory arbitrator. If the default memory map is to be used, then the CPU can enable the arbitrator by asserting the MM_Enable bit in the MiscMem_Control register.

If a non-default memory map is to be used, then all the base address registers should be initialized prior to enabling the arbitrator. It is the responsibility of the host computer software to ensure that the base addresses programmed do not cause any overlapping memory areas. No hardware checking for this is provided.

CPU Access

The CPU can access any location in the miscellaneous memory. It does this by first programming in an address into the MM_CPU_Add registers (0x1870-0x1872), and then reading or writing a byte to the MM_CPU_Data register (0x1874). The address registers auto-increments every time the data register is accessed.

MIB Support

Overview

This section describes the MIB support built into the IT 10G network stack. It contains register definitions, theory of operations, and an overview of what MIBs are used for.

SNMP and MIB Introduction

SNMP is a management protocol that allows SNMP management stations to get statistics and other information for network-connected devices and also allows a device to be configured. The software that runs on a device is called an Agent. The Agent runs on top of a UDP socket and handles requests from an SNMP management station. The Agent can also send traps to the SNMP Management Station when certain events occur on the device. The SNMP RFCs document a set of standard information objects that when grouped together, are called a Management Information Base (MIB). Vendors can also define there own MIB's that they may support in addition to the applicable standard MIBs defined in the RFCs.

The standard MIBs define information that most devices of the types specified should provide. Some of the information can be handled completely by the SNMP Agent software; the rest require some level of support from the operating system, drivers and devices. SNMP support takes place in all three of our major deliverables, the Hardware, Embedded Software, and Driver.

In most cases hardware support is limited to statistical information collection for certain counters that are relevant to the networking layers we have implemented in hardware. Interrupts can also be triggered on certain events. The embedded software development also supports certain counters for the layers implemented in software, such as ICMP, Exception handling, etc. In addition, the embedded software can query the databases created by the hardware to be able to report on things such as ARP table entries, TCP/UDP Socket States and other non-counter statistical data. Driver support is focused around interfacing the embedded platform to an API that can return the relevant objects to the SNMP agent and to allow an SNMP Agent some level of configuration.

MMU and Timer Modules

Overview

The following discussion provides an overview of the general-purpose timers and MMU used in the system.

CPU Timers

Four general purpose 32-bit timers that can either be cascaded from the previous timer, or be independent are provided. All timers are capable of being operated in single shot or loop modes. In addition, a clock prescaler is provided that can divide down the main core clock prior to it being used by each of the timers. This allows minimum code changes for different core clock frequencies.

Timer Test Mode

Each of the individual timers can be put into a test mode by asserting the Timer_Test bit in the corresponding Timer control registers. When this mode is activated the 32 bit counter increments at different rates depending on the three lsb's of the 8 bit Clock Divider setting.

On-chip Processor MMU

The on-chip processor uses an MMU to break up the 4-GByte memory space of the processor into different regions. Each region can individually specified with a base address and an address mask. The regions may also overlap, but in that case the data read back from the shared memory area is unpredictable.

On-chip Processor DRAM Interface and Data Flow

Overview

This section describes the interface between the on-chip processor and the Network Stack (NS) Data DDR Arbitration module. It depicts the data flow, lists interface signals, and details the timing required.

Data Flow

Three different access types are supported for the on-chip processor DRAM. These are burst writes, burst reads, and single accesses. In addition, a lock can be applied so that consecutive single accesses may be made by the on-chip processor without relinquishing the DRAM. The on-chip processor memory arbitrator arbitrates requests from different sources for each of these cycle types, but all three cycle could be requested from the NS DDR Arbitrator simultaneously. It is assumed that only the on-chip processor itself uses the locking feature as it needs to be enabled via a register bit.

Instruction/Status Block Theory Of Operations

Overview

The following discussion outlines the theory of operations for Instruction Block (IB's) and Status Blocks (SBs) passing between the Host, on-chip processor, and Network Stack. It also covers the concept of MDLs.

Figure 47:
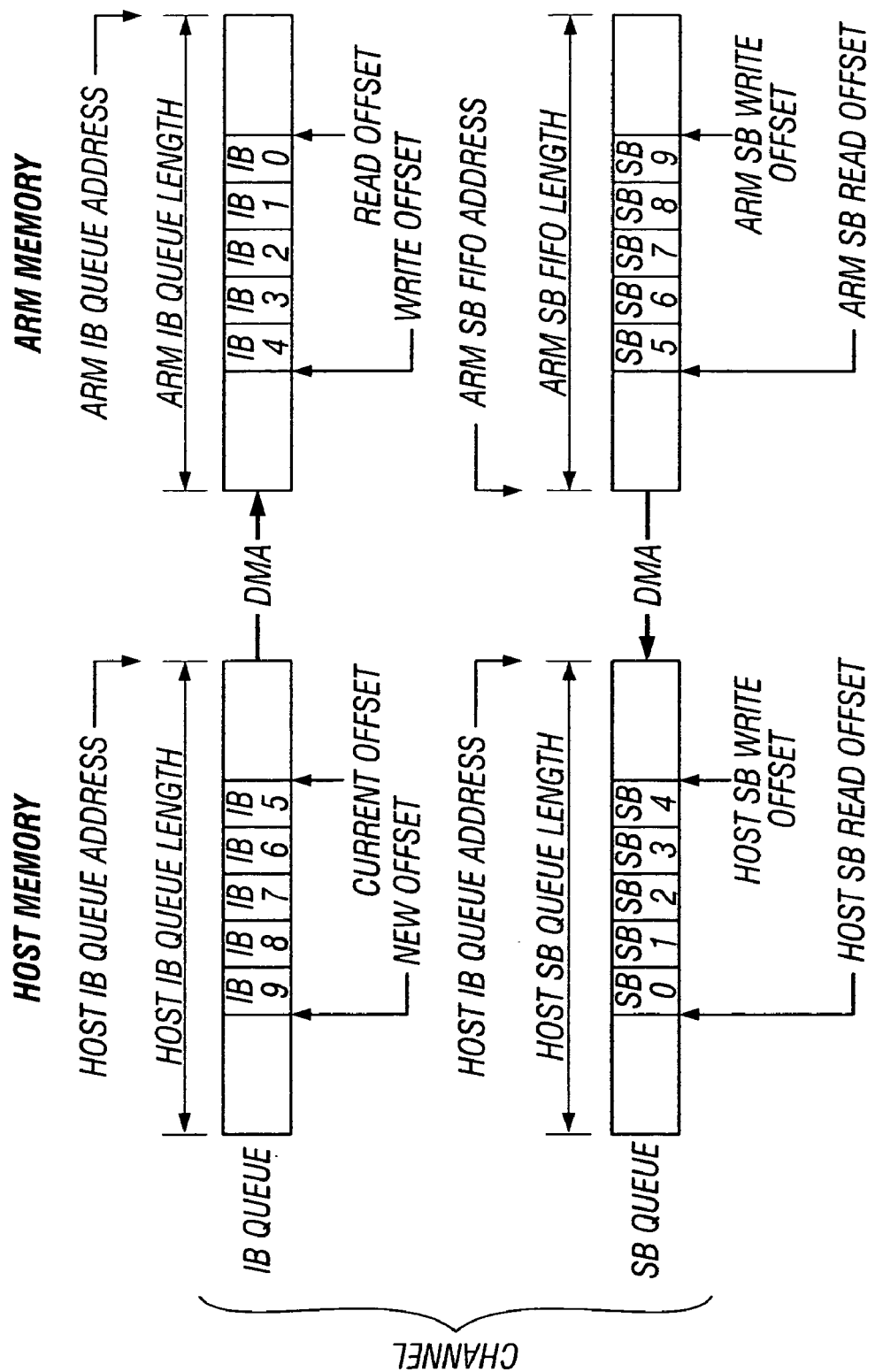
FIG. 47 shows a matching IB and SB queue which together form a Channel according to the invention.

Individual IBs and SBs are concatenated into queues. There are IB queues and SB queues. Each queue has a host computer component and an on-chip processor component. Also, each IB queue has an associated SB queue. A matching IB and SB queue together form a Channel. This is depicted in FIG. 47.

NOTE: All Status and Instruction queue lengths should be multiples of 16 bytes and be DWORD aligned.

Figure 48:
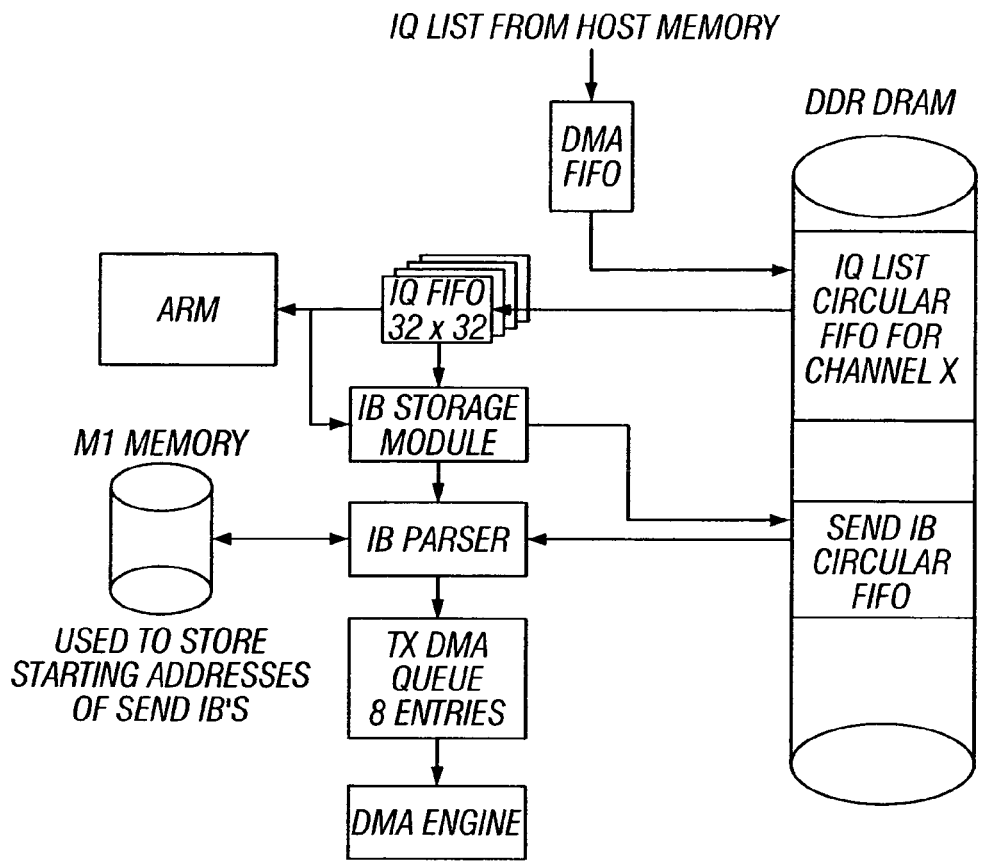
FIG. 48 shows processing flow for an Instruction Block queue according to the invention.

The preferred embodiment supports four channels. For each queue (both IB and SB), there is a Queue Descriptor. These descriptors detail where the queues reside (in both Host and on-chip processor memories), along with the length of the queue, and the read and write offset pointers. Each queue is treated as a circular FIFO buffer. The parameters that define each queue are split into registers in the Host register interface for parameters that configure host memory utilization, and registers in the global network stack register space that define the on-chip processor memory utilization. The format for the queue descriptors is shown in the following tables. The address offsets listed here are relative to the start of the queue descriptor registers The processing flow for Instruction Block queue is depicted in FIG. 48. It also shows the relationship with the IB Parser module.

SB Passing

Figure 49:
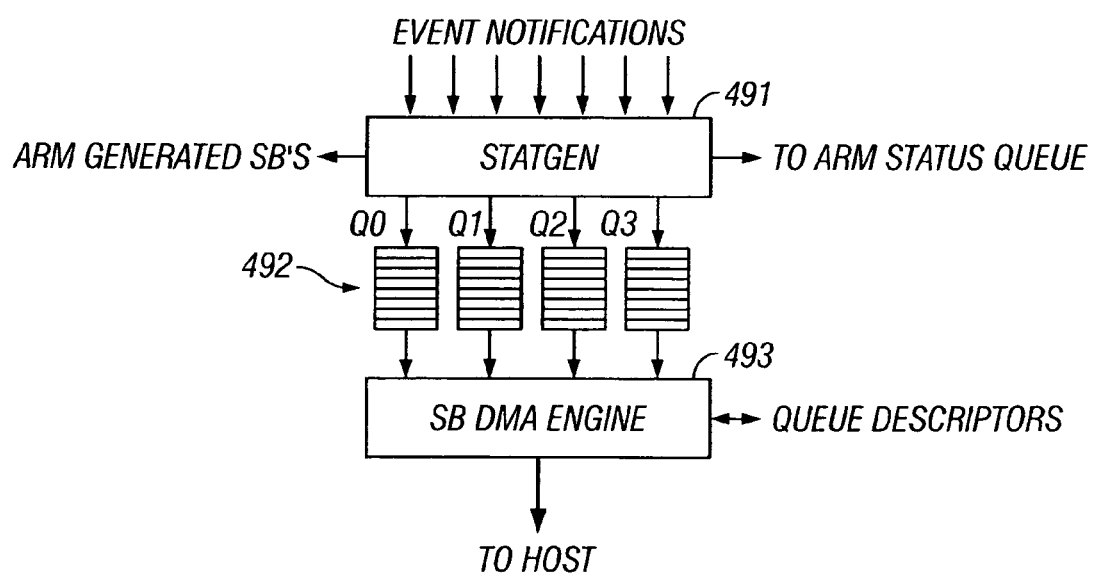
FIG. 49 is a block diagram depicting data flow fo ar Status block passing between a network stack, an on-chip processor, and a Host according to the invention.

The block diagram depicting the data flow for Status block passing between the network stack, the on-chip processor, and the host computer is shown in FIG. 49.

The SB timer threshold is the major interrupt aggregation mechanism in the Integrated network adapter hardware. Interrupt aggregation reduces the number of interrupts between integrated network adapter and the host computer and interrupt reduction or aggregation of interrupts increases data throughput.

The HW is capable of sending general SBs to the on-chip processor and socket specific SBs directly to the host computer. The host computer status messages include socket establish, RX DMA, CB_Create, and Socket_RST status messages.

SB's from HW to the Host

When socket specific events occur, the owner of the CB is determined by examining the HS bit in the socket CB structure. If the socket belongs to the host computer, then the CB channel number is also read from the CB. The channel number is sent along with the event notification to the HW status message generator (the statgen module) 491.

The statgen module forms the appropriate SB and places the SB into one of four DMA FIFO buffers 492. These FIFO buffers physically reside in the on-chip processor memory, and are specified by the the on-chip processor SB FIFO buffer address and the on-chip processor SB FIFO buffer length SBs from HW to the On-Chip Processor When non-socket specific events occur, e.g. exception Ethernet packets, the statgen module generates the appropriate SB and sends it to the one status message queue defined in the on-chip processor memory. An interrupt may be generated to the on-chip processor at this time if the statgen_int is enabled. There is only one status message queue defined from the hardware to the on-chip processor, and all SBs go to this one queue.

The SB queue actually resides in the on-chip processor memory. As entries are written into this memory area, they are pulled automatically into a register FIFO buffer for the on-chip processor to read via the STAT_READ_DATA registers (network stack global registers 0x005C-0x005F). The on-chip processor can also poll to see how much data is available by reading the STAT_FIFO_FILLED register at 0x005A. This register returns the number of double words available in the queue.

SBs from the On-Chip Processor to the Host Computer

When the on-chip processor needs to send an SB to one of the SB queues in the host, it sends it via the statgen hardware module. In this case the on-chip processor generates the SB in its memory, and then programs the starting address for this SB, the channel # for the SB, and the length of the SB to send to the statgen module. The HW then transfers the SB (or SBs) into the appropriate SB queue to the host. In this way, SBs from the on-chip processor and HW are intermingled in the same SB queues that feed the SB DMA engine 493.

The on-chip processor can be notified that SB has been transferred into the appropriate SB queue either via a interrupt or polling a status bit. Prior to writing any parameters for this function, the on-chip processor should make sure the statgen module has completed transferring any previous SB request, i.e. the on-chip processor should make sure the SB bit is not asserted in the statgen command register.

MDL Handling

MDLs (Memory Descriptor Lists) are first DMA'ed from Host computer memory into the on-chip processor memory in the DDR DRAM. The on-chip processor passes back an MDL Handle to the host, based on the MDLs DDR Address.

SendMDL32/64 IBs that include the MDL Handle, an offset into the MDL, and a transfer length are then parsed by the IB Parser and do the following.

Read the first entry in the MDL and figure out if the Offset specified falls within this entry. It makes this determination by comparing the offset with the length of the first MDL entry.

If it does not fall within the first MDL entry then it reads the next MDL entry. When it finally finds the correct MDL entry, it queues a TX DMA transfer using the addresses in the MDL. The transfer could span multiple MDL entries from the point where the offset starts.

When the on-chip processor gets the IB, the on-chip processor programs the offset. into the socket CB. When the CB gets this information then it can DMA the data. Alternatively, if the host computer knows the offset ahead of time then we can program the offset into the CB ahead of time.

The Transfer threshold which specifies how many bytes must be DMA'ed before an RX DMA status message is generated is still applicable in MDL mode.

Instruction Blocks and Status Messages

Overview

The following discussion details the Instruction block and status message formats. The host uses IB's to pass commands to the IT 10G hardware, and the IT 10G hardware uses status blocks to pass information to the on-chip processor and the host computer.

Instruction Block Structure

The only IB that the hardware parses directly is the various forms of a Send_Command.

HW Parsed Instructions

These instructions are used to request the IT 10G hardware to transmit data, close or post receive parameters on a given socket. There are 4 forms of the SEND instruction to handle TCP, UDP, and 32 bit and 64 bit host computer memory addressing.

iSCSI Support

One embodiment of the IT10G uses the host computer to assemble an iSCSI PDU header, however an alternative embodiment uses the IT 10G hardware and on-chip processor to assemble and process the iSCSI PDUs. Both embodiments are described below.

iSCSI

Overview

This section describes the hardware support for iSCSI in the IT 10G using the host computer to assemble the iSCSI PDU header. The IT 10G hardware offloads the calculation of the iSCSI CRC for transmit and receive, and the hardware performs iSCSI framing using Fixed Interval Markers (FIM) for transmit. Framing is not currently supported for receive.

Theory of operation

The iSCSI protocol is defined in the IETF iSCSI Internet draft, which is the normative document for the definition of the hardware function. The iSCSI protocol encapsulates SCSI commands (the SCSI commands are in command descriptor blocks, or CDBs) in protocol data units (PDUs) carried in a TCP/IP byte stream. SCSI commands are documented in several standards. The hardware accepts iSCSI header segments and iSCSI data segments from the host iSCSI driver and prepares iSCSI PDUs for transmission. The hardware receives iSCSI PDUs, calculates the iSCSI CRCs, and passes the results to the host iSCSI driver.

The hardware is principally concerned with the external format of the iSCSI PDU, which contains iSCSI header segments and an iSCSI data segment. The iSCSI PDU consists of a required basic header segment (BHS), followed by zero or more additional header segments (AHS), followed by zero or one data segments. The iSCSI CRCs are optional and included in an iSCSI PDU as a header digest and a data digest. The described implementation allows the iSCSI header and data to be separated and copied to the host computer memory, without requiring additional memory copies on the host computer.

iSCSI Transmit

Overview

Figure 50:
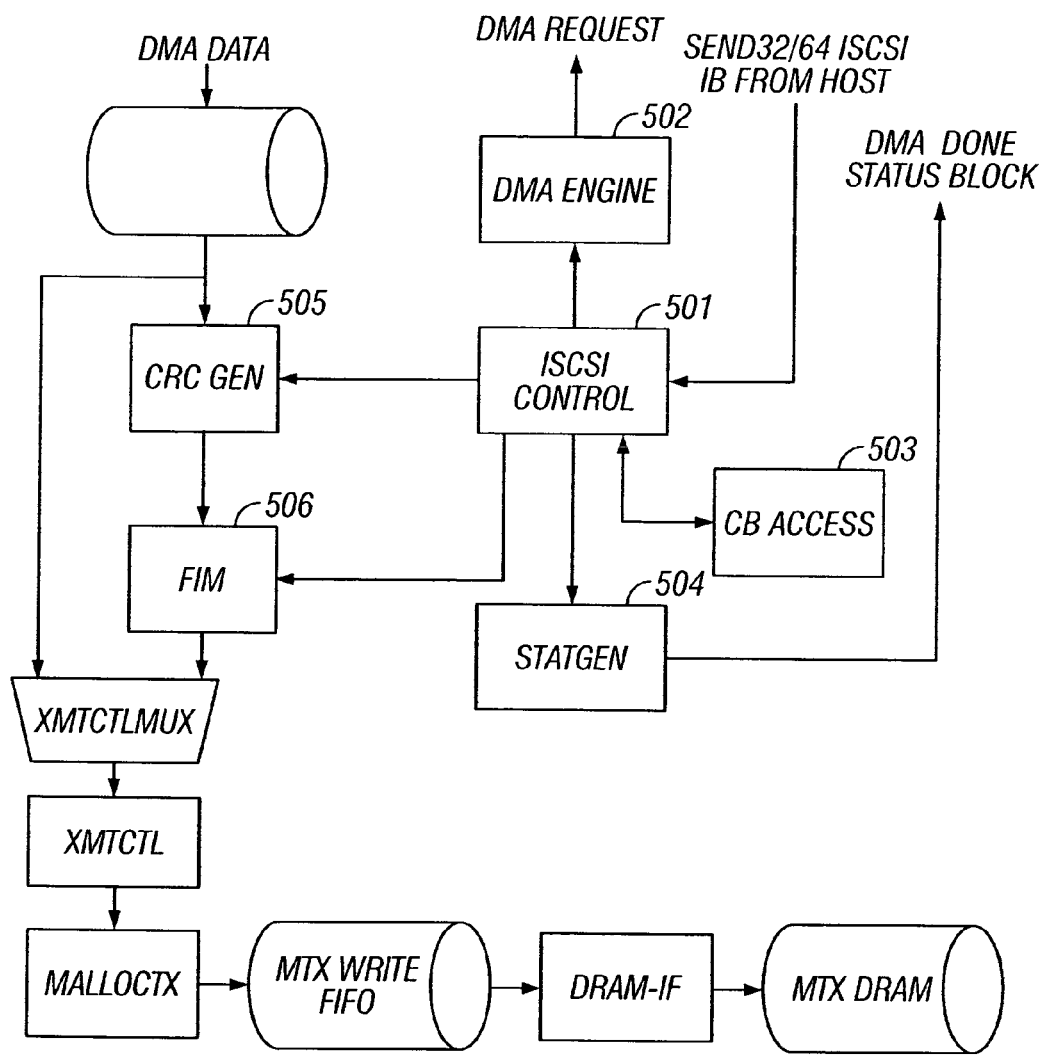
FIG. 50 is a block diagram of a iSCSI transmit data path according to the invention.

A block diagram of the iSCSI transmit data path is shown in FIG. 50.

iSCSI Control Module

The iSCSI control module 501 receives control signals from the TX DMA engine module 502, the CB access module 503, and the Statgen module 504.

The iSCSI control module provides control signals to the CB access module, the iSCSI CRC calculation module 505, and the FIM insertion module 506. The iSCSI control module calculates the length of the iSCSI PDU, including any iSCSI CRC words and any markers, and provides the iSCSI PDU length, including any iSCSI CRC words and any markers, to the XMTCTL MUX module.

The host iSCSI driver assembles a complete iSCSI PDU header in host memory. The host iSCSI driver then creates a TCP send 32 iSCSI IB or a TCP send 64 iSCSI IB depending on whether 32-bit addresses or 64-bit addresses are required. The host iSCSI driver then sends the TCP send iSCSI IB, which is received by the on-chip processor. The effect of the host iSCSI driver sending a TCP send iSCSI IB to the on-chip processor is to instruct the iSCSI control module to initiate a DMA transfer of an iSCSI PDU to a linked list of buffers in the host computer memory.

An iSCSI PDU, including the BHS, any AHS, and any data segment, is transferred using a TCP send 32 iSCSI IB or a TCP send 64 iSCSI IB.

It is difficult to design the iSCSI CRC calculation module, which must insert the iSCSI CRC at the end of the iSCSI PDU header segments or at the end of the iSCSI PDU data segment unless an iSCSI PDU is completely contained in a single DMA transfer.

The overhead of using a single IB for each iSCSI PDU when iSCSI PDUs may be as small as 48 bytes (the BHS) is not much more than the overhead of coalescing iSCSI PDUs for a single DMA transfer and then separating the iSCSI PDUs for processing again.

The first transfer block must be a complete iSCSI PDU header or headers, i.e. a BHS followed by zero, one, or more AHS, and all of the header or headers are contained in the first transfer block.

It is necessary for the first transfer block to be a complete iSCSI PDU header or headers in order for the CRC calculation module to be able to insert the iSCSI header CRC at the end of the iSCSI PDU headers.

The iSCSI control module should check that the TCP send 32 iSCSI IB or TCP send 64 iSCSI IB contains at least one transfer block. This is a necessary condition for correct operation. It is an error if this condition is not met and the module should fail gracefully.

The iSCSI control module initiates a DMA transfer of an iSCSI PDU by making a request to the DMA engine module for permission to perform a DMA transfer. When the iSCSI control module request to perform a DMA transfer has been granted, the iSCSI control module is given locked access to the DMA engine. The DMA engine is locked until all the transfer bocks in the iSCSI IB have been serviced. All transfer blocks in the iSCSI IB are serviced when all iSCSI header and iSCSI data information has been transferred from host memory to the hardware by DMA. The DMA engine signals the iSCSI control module when all iSCSI header and iSCSI data information has been transferred from host memory to the hardware by DMA.

The iSCSI control module is given locked access to the DMA engine in order to make it easier to implement the FIM and CRC operations, taking account of the iSCSI login phase.

Two bits in the iSCSI IB, iSCSI CRC select bit 1 and iSCSI CRC select bit 0, are set by the host iSCSI driver to signal the iSCSI control module if the iSCSI CRC calculation module should calculate the iSCSI CRC for the iSCSI header or iSCSI data, both, or neither. These two iSCSI CRC select bits may take on any combination of 1 and 0.

The iSCSI IB contains a set of address and length pairs, known as transfer blocks, which correspond to a linked-list (LL) of buffers in host memory. The linked-list of buffers in host memory store the iSCSI header and iSCSI data information. The transfer blocks that are included in the TCP send iSCSI IBs provide the iSCSI control module information on where to find the iSCSI header and iSCSI data via this linked-list of buffers. The first transfer block in each iSCSI IB points to the iSCSI header in host memory and the remaining transfer blocks in the iSCSI IB point to the iSCSI data in host memory.

The iSCSI control module takes the iSCSI PDU length, including CRC words, but excluding markers, and calculates the length of the iSCSI PDU including any CRC words and any markers. The XMTCTL MUX module needs the iSCSI PDU length, including CRC and markers, to provide the XMTCTL module with the length of the data input to XMTCTL module.

The XMTCTL MUX module needs the PDU length, including any CRC words and any markers, before storing the iSCSI PDU in MTX buffers.

The iSCSI control module calculates the length of the iSCSI PDU by using the iSCSI PDU length, including any CRC words, but excluding any markers, that is included in the TCP send 32 iSCSI IB or TCP send 64 iSCSI IB.

The calculation of PDU length, including any CRC words and any markers, uses the following information:
FIM interval, the marker interval in bytes
Current FIM count, the number of bytes since the last marker was inserted, stored in the socket CB
PDU length, including CRC words, but excluding markers, included in the TCP send 32 iSCSI IB or TCP send 64 iSCSI IB The calculation of PDU length, including any CRC words and any markers, using two counters, the PDU length counter and the marker counter, is equivalent to the following:
1. Initialize the marker counter to zero
2. Initialize the PDU length counter to the current FIM count
3. Check the PDU length counter against the PDU length, including any CRC words, but excluding any markers
4. If the PDU length counter is greater than the PDU length, including any CRC words, but excluding any markers, exit loop
5. Add the FIM interval to the PDU length counter, increase the marker counter by one
6. Go to step 3
7. Calculate the PDU length, including any CRC words and any markers, by adding the length of markers, which is calculated from the marker count Alternative FIM algorithm:
1. Initialize total_marker_length to zero
2. initializer length_counter to next marker (FIM_interval-current_FIM_count)
3. If length_counter>PDU_length goto step 7
4. increment total_marker_len by marker_size 5. length_counter=length_counter+FIM_interval
6. Goto step 3
7. xmitctl gets total_marker_len+PDU size Note we must place the ending marker if a marker falls exactly after the PDU and must make sure that we handle the case that the current FIM count=0 correctly.

Figure 51:
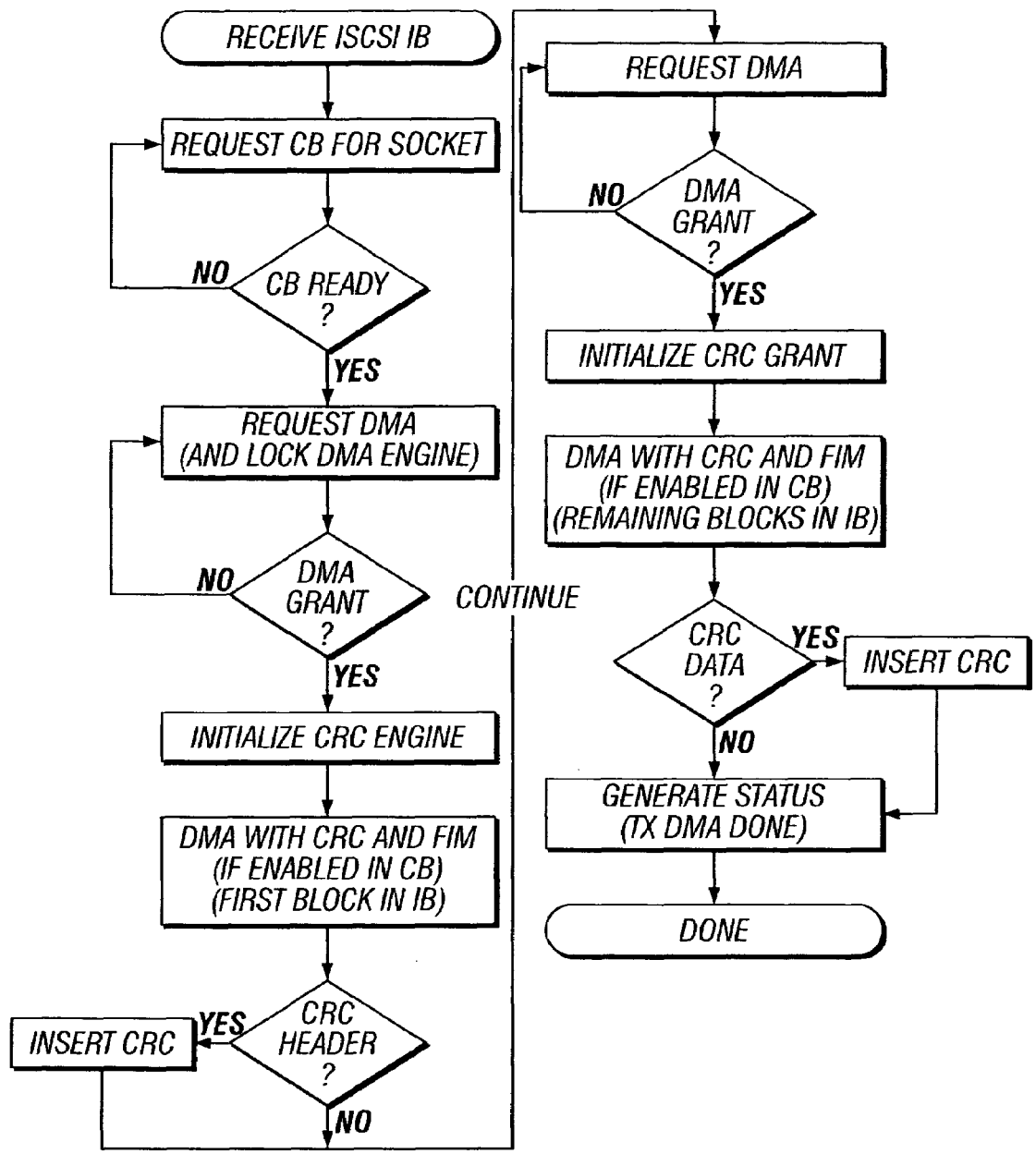
FIG. 51 shows an iSCSI Transmit Flow Chart according to the invention.

For the above calculation:
FIM interval comes from the CB
Current_FIM_count comes from the CB
total_FIM_length is a temporary variable for the FIM insertion module
length_counter is a temporary variable for the FIM insertion module
marker_size is the total size of a FIM marker in bytes
FIG. 51 shows an iSCSI Transmit Flow Chart.

iSCSI CRC Calculation Module

The DMA TX module provides an iSCSI PDU to the iSCSI CRC calculation module that consists of iSCSI header segments and an iSCSI data segment.

The output from the iSCSI CRC calculation module, which is a PDU that now includes any inserted CRC words, is provided to the FIM insertion module.

The iSCSI CRC calculation module calculates the iSCSI CRC value for both iSCSI PDU headers and iSCSI PDU data.

The CRC calculation module inserts the iSCSI CRC at the end of the iSCSI PDU header or at the end of the iSCSI PDU data, or both, or neither. The calculation of the iSCSI CRC is controlled and indicated by iSCSI CRC select bit 1 and iSCSI select bit 0 in the TCP send iSCSI IBs.

The input to the CRC calculation module is BHS, followed by zero, one, or more AHS, in the first transfer block, followed by zero or one data segments, in the second or following transfer blocks.

The DMA engine must signal the iSCSI calculation module at the boundaries of the transfer blocks. The iSCSI calculation module must know where the first transfer block begins and ends, and where the last transfer block ends. The iSCSI header CRC is always inserted in the iSCSI PDU at the end of the first transfer block, if header CRC is enabled. The iSCSI data CRC is always inserted in the iSCSI PDU at the end of the last transfer block, if data CRC is enabled.

It is critical that the first transfer block in the IB is a complete iSCSI header (BHS plus zero, one, or more AHS).

FIM Insertion Module

The FIM insertion module inserts fixed-interval markers (FIM) into the iSCSI PDUs, which is equivalent to inserting fixed-interval markers into the iSCSI transmit stream.

The FIM insertion module only inserts markers when the FIM insertion module is active. The FIM insertion module is active only when the FIM bit is set in the CB that corresponds to the current iSCSI socket (the iSCSI socket CB).

The FIM insertion module must be able to keep track of the count of the number of four-byte words in each iSCSI stream, including any CRC bytes that may be inserted by the iSCSI CRC calculation module, for each iSCSI socket. The FIM insertion module keeps track of the number of four-byte words by storing two FIM values in the iSCSI socket CB: the FIM interval and the current FIM count. Each of these fields, the FIM interval and current FIM count, is measured in four-byte words.

The FIM interval and current FIM count can be stored in 16-bit fields.

If FIM interval or current FIM count overflow there should be a graceful failure mechanism.

To enable iSCSI connection setup including the iSCSI login phase, the insertion of markers, if markers are used, is started only at the first marker interval after the end of the iSCSI login phase. However, to enable the marker inclusion and exclusion mechanism to work without knowledge of the length of the iSCSI login phase, the first marker is placed in the iSCSI PDU stream as if the marker-less interval had included markers. Thus, all markers appear in the iSCSI PDU stream at byte locations given by the formula:

$$[(MI+8) * n-8]$$

where MI=FIM (marker) interval, n=integer number.

As an example, if the marker interval is 512 bytes and the iSCSI login phase ended at byte 1003 (the first iSCSI placed byte is 0) the first marker is inserted after byte 1031 in the stream.

The iSCSI PDU stream is defined in the iSCSI Internet draft, but the term used in the Internet draft is TCP stream. FIM uses payload-byte stream counting that includes every byte placed by iSCSI in the TCP stream except for the markers themselves. It also excludes any bytes that TCP counts but that are not originated by iSCSI.

The host iSCSI driver initializes the FIM interval and initial FIM count in the iSCSI socket CB by generating an iSCSI FIM interval command block. The on-chip processor receives the iSCSI FIM interval command block. The on-chip processor writes the FIM interval to the socket-specific TX_FIM_Interval register and to the FIM interval field in the iSCSI socket CB. The on-chip processor writes the initial FIM count to the socket-specific TX_FIM_COUNT register and to the current FIM count in the iSCSI socket CB.

The host iSCSI driver controls the FIM state in the iSCSI socket CB by generating an iSCSI set FIM state command block. The on-chip processor receives the iSCSI set FIM state command block. The on-chip processor then writes the FIM state to the FIMON bit in the iSCSI socket CB.

After the initialization of the FIM interval, the initial FIM count, and FIM state, the FIM insertion module is in the initialized state waiting for an iSCSI IB.

It is an error to attempt to change the FIM state or initial FIM count, or the FIM interval for the current iSCSI socket while the FIM insertion module is active.

When the FIM insertion module is in the state waiting for an iSCSI IB and an iSCSI IB is received, the FIM insertion module reads the FIMON bit and current FIM count in the socket CB. If the FIMON bit in the iSCSI socket CB is set, the FIM insertion module is active. If the FIM insertion module is active, the FIM insertion module sets the FIM interval counter to the current FIM count from the iSCSI socket CB. If the FIM insertion module is not active, the FIM insertion module returns to the state waiting for an iSCSI IB.

The FIM insertion module is now in a state counting each four-byte word of data received from the CRC calculation module. After each four-byte word in the iSCSI PDU is received by the FIM insertion module, including any CRC bytes inserted by the iSCSI CRC calculation module, the FIM insertion module decrements the FIM interval counter by one. The FIM insertion module then returns to the state counting each four-byte word.

When the FIM insertion module, while in the state counting each four-byte word, completes scanning data from an iSCSI socket, the FIM insertion module saves the current FIM interval counter value to the current FIM count in the current iSCSI socket CB. The FIM insertion module completes scanning data from an iSCSI socket when all the transfer bocks in the iSCSI IB have been serviced. At this point the FIM insertion module is in a state waiting for an iSCSI IB.

While in the state counting each four-byte word, the FIM interval insertion module inserts a marker in the iSCSI PDU when the FIM interval counter reaches zero. After inserting a marker in the iSCSI PDU the FIM insertion module resets the FIM interval counter to the FIM interval, read from the socket CB, and then returns to the state counting each four-byte word.

A marker contains the next iSCSI PDU start pointer, which is equal to the number of bytes to skip in the iSCSI stream until the next iSCSI PDU header. The FIM insertion module must calculate the next iSCSI PDU start pointer for each marker. To calculate the next iSCSI PDU start pointer the FIM insertion module must count the number of bytes in the current PDU, measure from the start of the current iSCSI PDU, up to the marker insertion point, which is the current iSCSI PDU byte count. To count the number of bytes in the current iSCSI PDU, the FIM insertion module uses an iSCSI PDU byte counter. In addition to the current iSCSI PDU byte count the FIM insertion module must know the start position of the next iSCSI PDU header relative to the start of the current PDU header. The difference between the start of the next iSCSI PDU header and the start of the current iSCSI PDU header is equal to the current iSCSI PDU length. The FIM insertion module calculates the next iSCSI PDU start pointer as follows:

Next iSCSI PDU start pointer=current iSCSI PDU length−current iSCSI PDU byte count The next iSCSI PDU start pointer is 32-bits long.

The iSCSI Internet draft defines a negotiated maximum value for the PDU data segment size, MaxRecvPDUDataSize, from 512 bytes to ((2**24)-1) bytes (16777216-1 bytes or about 16Mbytes).

The current iSCSI PDU length (measured in bytes) should be at least 25 bits in length.

There are several methods to provide the FIM insertion module with the iSCSI PDU length, including any CRC words, but excluding any markers. One way to provide the FIM module with the PDU length is for the iSCSI host driver to calculate the PDU length.

The iSCSI host driver calculates the current iSCSI PDU length, excluding iSCSI PDU header CRC or iSCSI PDU data CRC, as the sum of 48 bytes (BHS length)+TotalAHSLength+DataSegmentLength.

The TotalAHSLength and DataSegmentLength must already be calculated in software as they are contained in the BHS.

The host iSCSI driver then calculates of the current iSCSI PDU length, including any CRC words, but excluding markers. The current iSCSI PDU length, including any CRC words, but excluding markers, is equal to the iSCSI PDU length, excluding iSCSI PDU header CRC or iSCSI PDU data CRC, plus four bytes if iSCSI PDU header CRC is enabled, plus four bytes if iSCSI data CRC is enabled.

The host iSCSI driver inserts the current iSCSI PDU length, including any CRC words, but excluding markers, in the TCP send 32 iSCSI IB or a TCP send 64 iSCSI IB. See the descriptions of the TCP send 32 iSCSI IB and TCP send 64 iSCSI IB.

XMTCTL Mux Module

The XMTCTL mux module receives TCP data from the DMA TX FIFO buffer and iSCSI data from the FIM insertion module.

The XMTCTL mux module provides data to the XMTCTL module from either the DMA TX FIFO buffer or from the FIM insertion module.

Function: The XMTCTL mux module is responsible for multiplexing data inputs to the XMTCTL module.

The XMTCTL mux module provides the length of the data to the XMTCTL module.

The length of the iSCSI data must include any CRC bytes inserted by the CRC calculation module.

The length of the iSCSI data must also include any markers inserted by the FIM insertion module.

The XMTCTL module uses the size of the input data to break the data into appropriate sizes for TCP packets, based on the MSS and so forth. The XMTCTL module produces appropriate size packets that will be stored in the MTX memory buffer. Each MTX buffer corresponds to a separate TCP packet.

The XMTCTL mux module provides the data to the XMTCTL module in a 128-bit wide format. Data is passed to the XMTCTL module using a dav/grant handshake.

iSCSI Receive

Overview

The receive DMA engine includes the iSCSI receive data path. The receive DMA data path calculates the iSCSI CRC and pass the ending iSCSI CRC to the host iSCSI driver via the RX DMA status with iSCSI CRC message.

iSCSI Receive Theory of Operation

The hardware offloads the calculation of the iSCSI CRC. The host iSCSI driver controls the receive data path to ensure correct operation of the iSCSI CRC mechanism.

The iSCSI CRC information is transferred between hardware and the host iSCSI driver in two places. The ending iSCSI CRC is part of the RX DMA status with iSCSI CRC message sent from hardware to the host iSCSI driver. An iSCSI CRC seed is part of both the TCP receive iSCSI 32 IB and the TCP receive iSCSI 64 IB sent from host iSCSI driver to the hardware.

The host iSCSI driver must post the correct size buffers in the TCP receive iSCSI 32IB or TCP receive iSCSI 64 IB to keep the iSCSI CRC calculation mechanism operating correctly.

During the iSCSI login phase the host iSCSI driver treats the iSCSI socket in the same manner as a normal TCP socket. When the iSCSI login phase is complete, the iSCSI connection enters the full-feature phase.

When the iSCSI connection enters the full-feature phase, the connection is ready to transfer iSCSI PDUs that may contain iSCSI CRC information in either the iSCSI header or in iSCSI data or both.

The RX DMA engine sends the ending iSCSI CRC calculated via the RX DMA status with iSCSI CRC message from the scatter-gather list specified by the TCP receive iSCSI 32 IB or TCP receive iSCSI 64 IB.

Once the iSCSI login phase is complete, the host iSCSI driver posts receive buffers of the correct size for the iSCSI PDU header. The host iSCSI driver then parses the iSCSI PDU header. The host iSCSI driver then posts receive buffers of the correct size for the iSCSI PDU data segment, if there are data segments. The host iSCSI driver continues to post buffers of the correct size for each subsequent iSCSI PDU data segment. The DMA engine calculates the iSCSI CRC for each iSCSI PDU header segment and iSCSI PDU data segment.

In the case of an iSCSI PDU header the host iSCSI driver posts a buffer of the iSCSI basic header segment (BHS) size (48 bytes) plus, if header CRC has been negotiated during the iSCSI login phase, the size of the iSCSI PDU CRC (four bytes). The BHS is then transferred by DMA, including the trailing iSCSI PDU header CRC, if present.

When the DMA transfer of the BHS is complete the RX DMA status with iSCSI CRC message contains the final iSCSI CRC remainder calculated by the hardware. The host iSCSI driver then receives the RX DMA status with iSCSI CRC message containing the final iSCSI CRC remainder calculated by the hardware. The host iSCSI driver then checks the ending iSCSI CRC in the RX DMA status to make sure that its value matches the expected remainder for this iSCSI polynomial. If header CRC was not negotiated during the iSCSI login phase the host iSCSI driver ignores the ending iSCSI CRC remainder returned in the RX DMA status with iSCSI CRC message.

A BHS may be followed by additional header segments (AHS). Byte four of the BHS contains TotalAHSLength, the total length of the AHS. In the case of an iSCSI PDU header that contains AHS and is therefore more than 48 bytes in length, the host iSCSI driver generates additional TCP receive iSCSI 32 IBs or TCP receive iSCSI 64IBs for the AHS.

If iSCSI CRC is enabled the host iSCSI driver seeds the calculated iSCSI CRC value using the iSCSI CRC seed field in the TCP receive iSCSI 32 IB or TCP receive iSCSI 64 IB. The use of the iSCSI CRC seed field allows the rest of the iSCSI PDU header CRC to be checked correctly.

In cases where a continuation of the iSCSI CRC calculation is not needed the iSCSI CRC seed in the TCP receive iSCSI 32 lB or TCP receive iSCSI 64 IB must be set to zero.

Figure 52:
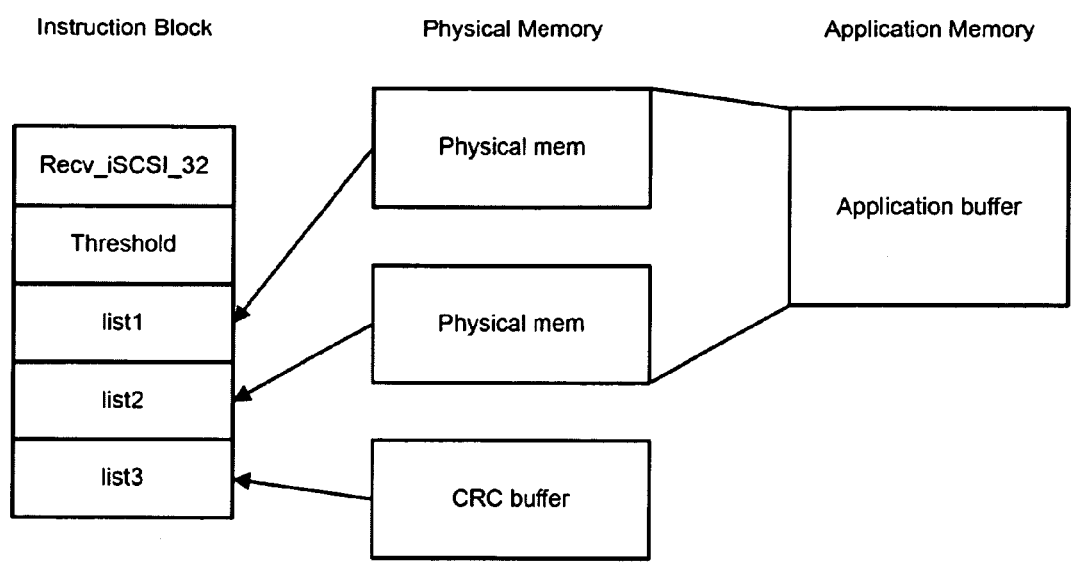
FIG. 52 shows use of a four-byte buffer according to the invention.

When requesting an iSCSI CRC for the data section of the iSCSI PDU the host iSCSI driver must specify an extra four-byte data buffer to store the iSCSI CRC. This four-byte data buffer is inserted as the final transfer block, effectively adding an extra four bytes to the end of the linked-list, in the TCP receive iSCSI 32 IB or TCP receive iSCSI 64 IB. The four-byte data buffer allows the iSCSI CRC for the iSCSI PDU data segment to be transferred outside the iSCSI PDU data stream. The use of the four-byte buffer is illustrated in FIG. 52.

RX DMA Theory of Operation

The host driver knows that there is RX data available when it receives an RX DAV status message from the hardware. This RX DAV status message notification is the same as regular TCP connections. The CB Handle in the RX DAV status message points to an iSCSI-related CB. The host driver then allocates a buffer to store the RX data; the total link-list buffer size should be equal to how much data the host driver expects to receive, plus CRC if expected, see FIG. 52. Also, the total buffer size must always be aligned on a dword boundary, since iSCSI PDUs are expected to be in that format. The host driver must also initialize the CRC Seed to 32'hffffffff.

When a RX DMA operation is taking place, the hardware first extracts an iSCSI CRC seed from the socket CB annex. The hardware also extracts the Host Retransmit (HR) bit from the Main CB Structure. The HR bit indicates to the other hardware whether or not this is an iSCSI socket. The hardware then calculates a new CRC while transferring data.

The data stream may or may not contain the expected iSCSI CRC value for either PDU header or data segment. If the data stream does not contain an iSCSI CRC digest, then the iSCSI CRC calculated by the hardware is stored back into the CB Annex as a running iSCSI CRC. An RX-DMA Status message may or may not be generated. If the RX-DMA status message is generated, the status message contains this running iSCSI CRC. If the data stream contains an iSCSI CRC digest at the end, then the iSCSI CRC hardware calculates the iSCSI CRC over the PDU segment, including the iSCSI CRC digest (this is the expected iSCSI CRC value). If the PDU segment is uncorrupted and if the iSCSI CRC Digest is correct, then the final iSCSI CRC value, calculated by the hardware, is always equal to a fixed iSCSI CRC remainder.

Once all of a posted buffer list has been filled the Statgen module generates an RX DMA status with iSCSI CRC message that includes the ending iSCSI CRC remainder.

The on-chip processor is responsible for processing the TCP receive iSCSI 32 IB or TCP receive iSCSI 64 IB. During the processing of the IBs the on-chip processor will write the iSCSI CRC seed, which could be 32'hffffffff to signify the start of a new CRC calculation, or an iSCSI CRC seed from a previous RX DMA status message, to the socket CB annex. Writing the iSCSI CRC seed in this manner sets up the correct value of the iSCSI CRC.

For the other non-iSCSI mechanisms that use standard receive32 and receive 64 lbs and that rely on the RX DMA engine the CRC mechanism can be ignored and the CRC seed is meaningless and can be skipped.

Before the RX DMA operation takes place, the peer sends one or more TCP packets that contain data payloads that are eventually transferred by DMA to host memory. Depending on how the peer's network stack operates, this payloads may be split up into non-dword aligned boundaries, even though iSCSI requires all PDU to align itself on dword boundaries. The DMA operations directly coincide to the size of each TCP packet's payloads. If the payloads are non-dword aligned, then the DMA operation is non-dword aligned, yet it may be needed to calculate CRC through this non-dword aligned data stream. The problem is that the iSCSI CRC hardware expects all data to be dword aligned.

When the iSCSI CRC hardware comes across this corner case, it continues to calculate the iSCSI CRC through the non-aligned data stream. When it reaches the end, it stores the non-double word aligned 1-3 bytes into the CB Annex. It also stores the number of bytes that are valid. For example, if the data stream is 15 bytes long, the hardware stores the last three bytes and the number of bytes valid is three. If the data stream is 32 bytes long, then the number of bytes valid is 0 because this data stream is dword aligned. The information stored in the CB Annex is retrieved and inserted in front of the next DMA transfer.

iSCSI Instruction Blocks

The TCP send iSCSI instruction block (IB) is used to send an iSCSI PDU using an iSCSI socket. The length of the TCP send iSCSI 32 IB is variable as this IB can contain one or more transfer blocks that are used for a DMA transfer. A transfer block consists of an address (header or data) and a transfer length pair.

The iSCSI CRC select bit 1 and iSCSI CRC select bit 0 determine the calculation of the iSCSI CRC by the iSCSI control module. If the iSCSI CRC select bit 0=1, the iSCSI control module calculates the iSCSI CRC over the iSCSI header. If the iSCSI CRC select bit=1, the iSCSI control module calculates the iSCSI CRC over the iSCSI data. The iSCSI CRC calculation can be performed by the iSCSI CRC calculation engine over both iSCSI header and iSCSI data, only iSCSI data, only iSCSI header, or neither.

The iSCSI Total DMA Length, is the length of the entire data that needs to be DMAed by iSCSI Send block. It does not include the CRC length that needs to be calculated.

The address and transfer length pair in the first transfer block in the TCP send iSCSI 32 IB point to the iSCSI header in host memory. The second and any further transfer blocks in the TCP send iSCSI 32 IB point to the iSCSI data in host memory.

An iSCSI PDU, including the BHS, any AHS, and any data segment, is transferred using a TCP send 32 iSCSI IB or a TCP send 64 iSCSI IB.

The first transfer block of the TCP send iSCSI 32 IB must be a complete iSCSI PDU header or headers, a BHS followed by zero, one, or more AHS, and all of the header or headers must be contained in the first transfer block of the TCP send iSCSI 32 IB.

Saying the same thing a different way for emphasis: The host iSCSI driver must include any iSCSI data segment with the iSCSI header segments in the TCP send iSCSI 32 IB. The iSCSI data segment must be in a separate transfer block in the TCP send iSCSI 32 IB than the iSCSI header segments.

The host memory address in each transfer block in the TCP send iSCSI 32 IB is 32bits. If 64-bit addresses are required, the TCP send iSCSI 64 IB should be used.

The format for the TCP send iSCSI 32 IB with three transfer blocks drawn explicitly is shown below:

The CRC select bit 0 and CRC select bit 1 are stored in a separate word in the IB rather than with the unused portion of the first transfer block to make the processing of each transfer block similar.

The TCP receive iSCSI 32 IB is used to post a buffer to be used for receive on an iSCSI socket.

The length of the TCP receive iSCSI 32 IB is variable as this IB can be made up of an arbitrary number of transfer blocks that are used for a DMA transfer. A transfer block in the TCP receive iSCSI 32 IB consists of an address and a transfer length pair.

The iSCSI CRC seed is used to seed the iSCSI CRC engine before the DMA and iSCSI CRC calculation has started. The iSCSI CRC seed must be set to 32'hffffffff if the iSCSI CRC is requested. If iSCSI CRC is not requested, the seed value set is irrelevant.

Clarification: There is no need to set the iSCSI CRC seed to zero if iSCSI CRC calculations are not required.

The address length for each transfer block in the TCP receive iSCSI 32 IB is 32 bits. For 64-bit addressing the TCP receive iSCSI 64 IB should be used.

Alternative iSCSI Implementation

The preceding description detailed operation of the IT 10G using the host computer to assemble the iSCSI PDU header. An alternative embodiment allows the IT10G hardware and the on-chip processor to assemble and process the iSCSI PDUs. This alternative embodiment is described next.

This section describes the hardware support for iSCSI using the on-chip processor. From a high level, the hardware offloads CRC and Fixed Interval Markers (FIMs) for transmitted packets. For the received data paths, the ability to DMA the PDU headers to either the on-chip processor or the host computer, and to DMA the data section of the PDU to the host is supported, along with CRC checking. This allows the iSCSI header and data to be separated and copied to the host computer memory, without requiring additional memory copies on the host computer.

Header Storage Unit (HSU)

For iSCSI PDUs that are transmitted, the on-chip processor is responsible for building the headers for the packets in its memory. The on-chip processor will receive iSCSI Instruction blocks (IBs) from the host computer to indicate what sort of iSCSI PDU to generate. In the cases where there is SCSI data associated with a PDU, then a link-list of buffers is also provided via the IBs.

Once the on-chip processor has generated the PDU header, it uses the HSU module to transfer the header from the on-chip processor memory to MTX memory (transmit data buffers). The HSU will also calculate the CRC for the header if necessary.

If there is no SCSI data associated with the PDU, then as soon as the HSU module is enabled, it will begin transferring data from the on-chip processor memory to MTX memory. The CRC is also calculated and FIMs inserted if necessary.

If there is SCSI data to be transferred in the PDU, two modes of DMA are provided; One-Shot and Link-List. If the Link List mode is used, then the HSU will retrieve the first link list (LL) entry and request a host DMA transfer. When the DMA engine indicates back the HSU that the first transfer is complete, the HSU will begin transferring the header from ARM memory to MTX memory. The data just DMA'ed is appended to the end of the header. Also during this time, the next LL entry is retrieved and a DMA is requested. Once the HSU has been granted a host DMA transfer, then it will be given locked access to the DMA engine (at least on the TX side) till all entries in the LL have been serviced. This is to make the FIM and CRC logic easier to implement in the data paths.

CRC Calculation Module

This module is responsible for calculating the CRC value for both PDU headers as well as data sections. The CRC is then appended to the corresponding field. Data feeding this module can either come from the on-chip processor memory via the HSU (for header data), or from the DMA TX FIFO (for SCSI data). The output from the CRC calculator is fed to the FIM module.

FIM Insertion Module

This module is responsible for inserting FIMs into the PDU. It receives the initial offset, interval count, and PDU length from the HSU unit. When inserting the FIMs, some repacking of data will be necessary. Another function of this module is to determine the overall length of the PDU to be transmitted. This length is the programmed length of the PDU+any CRC bytes+any FIMs. This length is then passed to the XMTCTL module which is responsible for breaking the PDU into the appropriate size TCP packets.

XMTCTL Mux Module

This module is responsible for muxing data inputs to the XMTCTL module. Data can either be straight from the DMA TX FIFO buffer or from the FIM Insertion module. With either path, the mux logic indicates the total length of the packet as well as provides the data in a 128 bit wide format. Data is passed to the XMTCTL module using a dav/grant handshake.

iSCSI Receive Support

Overview

Figure 53:
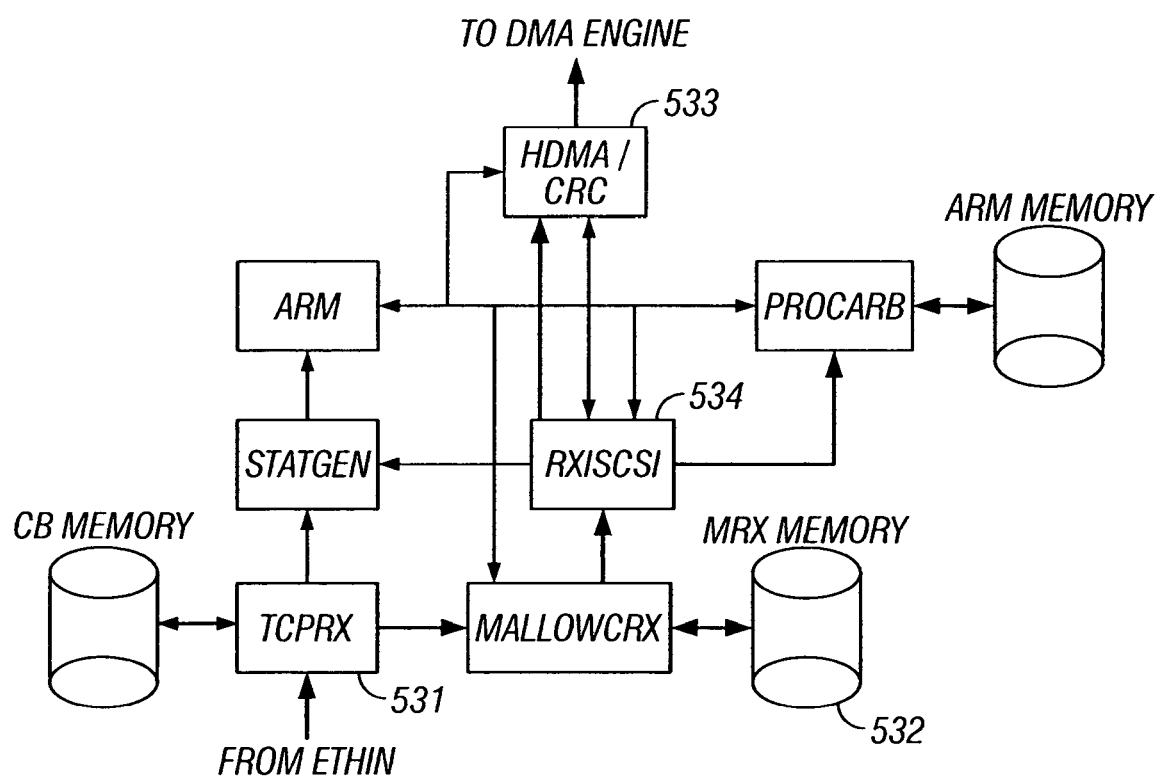
FIG. 53 is a block diagram of a iSCSI receive data path according to the invention.

A block diagram of the iSCSI receive data path is depicted in the FIG. 53.

TCPRX Module

This module 531 is responsible for parsing received TCP packets. When an iSCSI packet arrives, it is initially treated like any other TCP data in that it is stored in MRX memory in either 128 byte or 2K byte buffers. A bit in the socket's CB (the AS bit in WORD 0xD, bit[30]) indicates whether this socket is owned by the host or by the on-chip processor. If the socket is owned by the on-chip processor, then the data are not automatically DMA'ed to the host. Instead, a status message is generated and sent to the on-chip processor via the normal network stack status message queue.

On-Chip Processor Access to MRX Memory

When the on-chip processor is notified that it has received iSCSI data on a socket, it can read the data in MRX via the CPU address and data registers in the mallocrx register set. It is expected that the on-chip processor is mainly reading the MRX memory 532 to determine the type of PDU received from the header in it. If the on-chip processor decides to move the header to its memory it uses the LDMA module. If it decides to DMA and PDU data to the host, it uses the HDMA module 533.

RXISCSI Module

When the on-chip processor wants to move data from MRX memory to its own local memory, it uses the RXISCSI module 534. The CRC for the data is optionally checked during this transfer. When the operation is complete, an interrupt or status message is generated.

Figure 54:
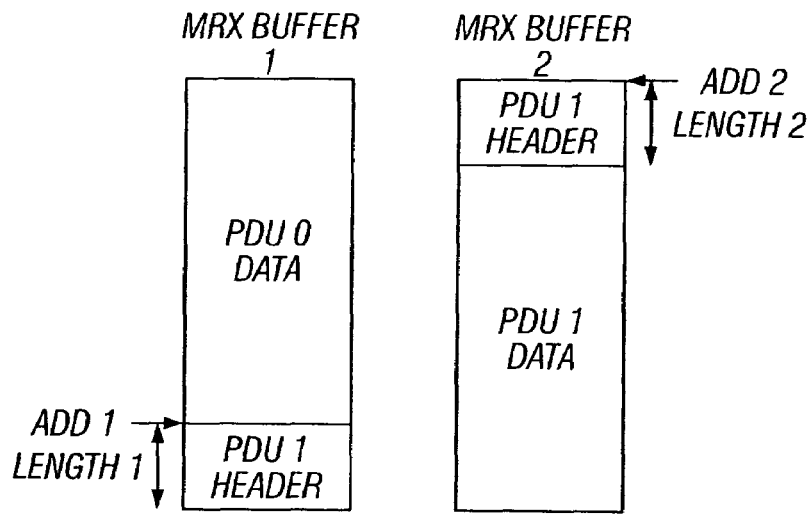
FIG. 54 shows a transfer split into two requests according to the invention.

If data spans multiple MRX buffers, then the transfer must be split into two requests. An example of this is shown in FIG. 54.

In this case, the first transfer should be programmed with Add 1 as the MRX source address and Length 1 as the transfer length. The LAST___BLK bit should also not be set for the first transfer. When the operation is complete, a partial CRC result is also returned in the status message. The on-chip processor then programs the local DMA (LDMA) with Add 2 and Length 2 and the LAST___BLK bit set to complete the header transfer. If the operations are back to back, then the CRC seed need not be programmed. Otherwise, the CRC partial result returned in the status message should be programmed as the CRC seed for the second transfer. In the case where only the CRC bytes remain in the second buffer, then a transfer of length 0 should be used with the CRC checking enabled.

On-Cip Processor Initiated HDMAs

When the on-chip processor wants to send received SCSI data to the host, it programs the host DMA (HDMA) engine with the starting addresses in both MRX and host memories along with the length of the transfer. Alternatively, the on-chip processor can specify a location in its memory where a link list of buffers are located.

The link list can contain up to 255 entries. During the DMA transfer, the HDMA module can optionally be programmed to check the CRC value. If this option is enabled, then the DMA transfer length should not include the CRC bytes. Also, when CRC checking is requested, an optional CRC starting seed may be programmed.

Figure 55:
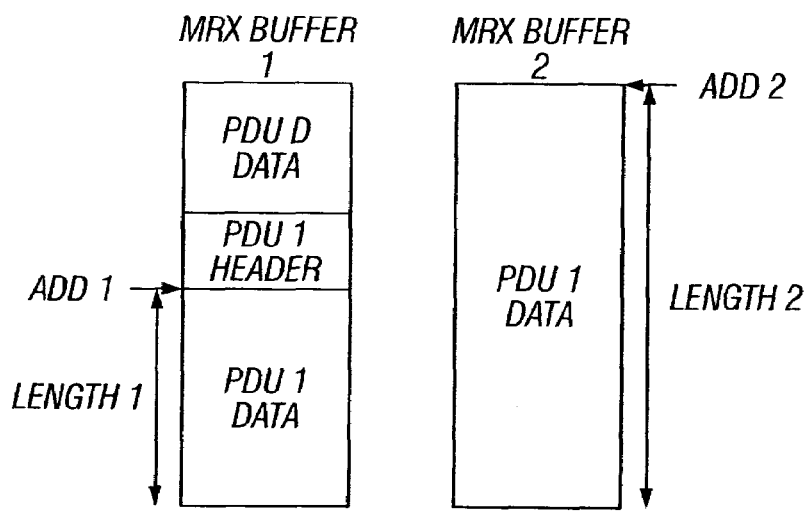
FIG. 55 shows a DMA transfer to a host split into separate requests according to the invention.

If the SCSI data is split across multiple MRX buffers, then the DMA transfer to the host must be split into separate requests. This situation is depicted in FIG. 55.

In this case, the HDMA should first be programmed with Add 1 as the starting MRX memory address and Length 1 as the transfer length. The Last_Host_BIk bit should also not be set for the first transfer. When the DMA operation is complete a status message is generated. If CRC checking was also requested, then the status message also returns the partial checksum value. The on-chip processor then programs the HDMA engine with Add 2 and Length 2 and set the Last_Host_BIk bit to complete the data transfer. If these two transfers are back-to-back, then the CRC seed value need not be programmed. Otherwise, the partial CRC result returned in the status message is programmed as part of the second DMA transfer request. In the case where only the CRC bytes remain in the second buffer then a transfer of length=0 and CRC_En=1 should be used.

On-Chip Processor Releasing of MRX Buffers

For on-chip processor owned sockets, the on-chip processor is responsible for releasing MRX buffers that are no longer in use back to the MRX buffer de-allocator. It does this by writing the base address for the block to be released into either the MRX__128_Block_Add or MRX__2K_Block_Add registers and then issuing the release command to the corresponding MRX_Block_Command register.

IPSec Support Architecture

Overview

The following discussion details the support that is implemented in hardware for IPSEC. This implementation assumes a separate module to handle the computational aspects of encryption, decryption, and authentication functions of the protocol, all of which are well-known and understood. The implementation also assumes that any key exchange protocols, which are well-known and well understood, used, such as IKE, are handled as applications on the host computer. It is, of course possible to also integrate the key exchange functions.

This discussion breaks down the IPSEC support into transmit and receive sections. This is done because outside of sharing a common security association (SA) Block, the two modules operate independently of one another.

IPSec Features:
- Anti-replay support on a per-SA basis
- Null, DES, and 3DES algorithms, and AES 128-bit algorithm in cipher-block chaining (CBC) mode
- Null, SHA-1 and MD-5 authentication algorithms
- Variable-length encryption keys up to 192 bits
- Variable-length authentication keys up to 160 bits
- Jumbo frame support
- Automatic handling of SA expiration on the basis of both time and total data transferred
- IPsec Policy Enforcement
- IPsec exception handling, including exception-packet generation, and status reporting IPSec Protocols and Modes:
- Transport AH
- Transport ESP
- Transport ESP+AH
- Tunnel AH
- Tunnel ESP
- Tunnel ESP+AH
- Transport AH+Tunnel AH
- Transport AH+Tunnel ESP
- Transport AH+Tunnel ESP+AH
- Transport ESP+Tunnel AH
- Transport ESP+Tunnel ESP
- Transport ESP+Tunnel ESP+AH
- Transport ESP+AH+Tunnel AH
- Transport ESP+AH+Tunnel ESP
- Transport ESP+AH+Tunnel ESP+AH Security Association Block Format (SA)

A dedicated memory structure is used to store information on each IPSEC connection. There are separate blocks for AH and ESP protocols and for both RX and TX SA's (RX SA's cover data received by and TX SA's cover data transmitted). Therefore, a socket connection that uses both AH and ESP for both sending and receiving data requires multiple SA blocks. AH requires 1 SA Block, and ESP requires two blocks (ESP-1 and ESP-2). The total number of socket connections that may be secured is dependent upon the total amount of memory provided for the SA blocks.

Tx data path can support Tunnel and Transport mode in single pass. In worst-case scenario, six SA Blocks can be linked together if both AH and ESP are used in both tunnel and transport modes. For transmitted data, the socket CB contains a pointer to either the Tunnel/Transport TX AH or Tunnel/Transport TX ESP-1 SA. In cases where both protocols are used for transmitted data, the CB contains a link to the TX AH SA, which in turn contains a link to the TX ESP-1 SA.

Rx data path does not support AH and ESP decryption in single pass. Rx data path does not support Tunnel and Transport modes in single pass. Encrypted packet is iteratively decrypted. For received data, the RX_SA_LUT contains a pointer to either the RX AH or RX ESP-1 SA.

Figure 56:
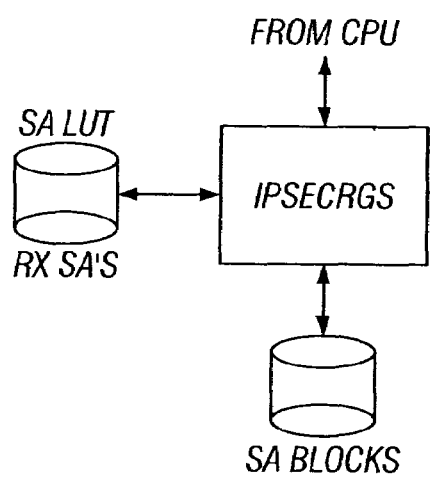
FIG. 56 shows SA Block Flow according to the invention.

FIG. 56 shows SA Block Flow.

A Creation for Client Sockets

When an application needs to create an IPSEC protected client socket, it should perform the following sequence.

Write all the applicable SA parameters to the IPSEC SA specific registers. This may need issuing of multiple write commands. SA handle is inserted into the RX SA LUT.

IPSEC returns the new SA handle

Write this SA handle in Socket specific register

Write all the applicable socket parameters to the TCP socket specific registers, including setting of the IPSEC bit in the Socket Configuration 2register Issue the commit_socket command A link to the TX SA is stored in the Open CB. The socket is now ready for use.

SA Creation for Server Sockets

When an application needs to create an IPSEC protected server socket, it should perform the following sequence.

Write all the applicable SA parameters to the IPSEC SA specific registers. This may need issuing of multiple write commands. SA handle is inserted into the RX SA LUT IPSEC returns the new SA handle Write this SA handle in Socket specific register Write all the applicable socket parameters to the TCP socket specific registers, including setting of the IPSEC bit in the Socket Configuration 2register Issue the commit_socket command The commit socket command, in addition to creating the Server Port Information table entry, also creates a HO CB. The HO CB has the IPSEC bit set in it. This bit prevents the HO CB from being reused by another incoming SYN that happens to decode to the same HASH. TX SA Handle is stored in the HO CB. The socket is now ready for use.

Note: In this case, as mentioned above, the HO CB does not get overwritten when a SYN with the same HASH is received. The HO CB is deprecated when the socket transitions to the Established state and an Open CB is created. However, in the case where a socket fails to reach the established state, it is the responsibility of the Host to manually deprecate the HO CB. It does this by entering the HO CB handle into the HO_CB_Handle register, and then issuing the Deprecate_HOCB command. The host in this situation should deprecate the associated SA blocks.

SA Linking

SA Block has Link Valid bit and Link field, which point to another SA. CPU can use this field to link multiple SA, if needed. CPU should perform following sequence to Link SA Blocks:

Configure SA_Link register with SA Block to be linked

Set Link_Val bit in CFG1 register

Configure SA_Handle register with SA Block getting linked.

Issue "Update SA" command.

SA Deprecation/De-allocation

Tx or Rx SA blocks are not deprecated automatically, when CBs are deprecated. CPU has to keep track of which SA Blocks are not in use and issue "Invalidate SA" command to deprecate/de-allocate those SA blocks.

When SA is expired, HW generates interrupt, if not masked. Expired SA Blocks are not de-allocated from the memory. This event also generates the status message, which contains SA handle of the expired SA. CPU can use this handle to update this SA or CPU can issue an "Invalidate SA" command to deprecate/de-allocate that SA Block.

TX AH Transport SA Block Format

FIG. 57 shows TX AH Transport SA Block Format.

TX ESP-1 Transport SA Block Format

FIG. 58 shows TX ESP-1 Transport SA Block Format.

TX ESP-2 Transport SA Block Format

FIG. 59 shows TX ESP-2 Transport SA Block Format.

TX AH Tunnel SA Block Format

FIG. 60 shows TX AH Tunnel SA Block Format.

TX ESP-1 Tunnel SA Block Format

FIG. 61 shows TX AH Tunnel SA Block Format.

TX ESP-2 Tunnel SA Block Format

Figure 62:
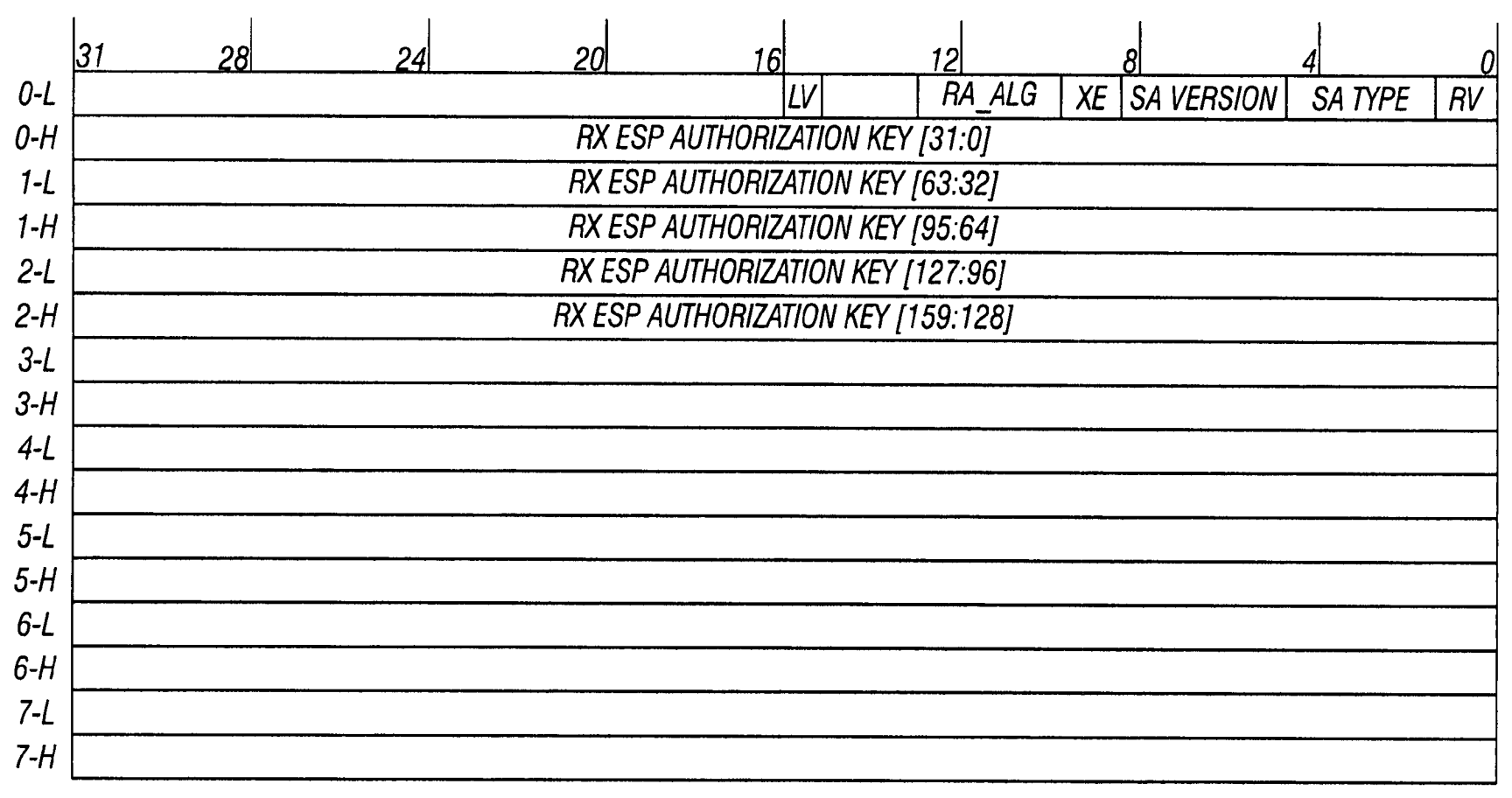

FIG. 62 shows TX ESP-2 Tunnel SA Block Format.

RX AH SA Block Format

FIG. 63 shows RX AH SA Block Format.

RX ESP-1 SA Block Format

FIG. 64 shows RX ESP-1 SA Block Format.

RX ESP-2 SA Block Format

FIG. 65 shows RX ESP-2 SA Block Format.

Security Association Block Field Definitions

SA Type

These bits are used to specify the type of SA Block the block represents, and are provided for diagnostic support. The decoding is shown in the following table.

TABLE 26

SA Type Decodes

| SA Type | Description |
| --- | --- |
| 00000 | Reserved |
| 00001 | TX AH Tunnel |
| 00010 | TX ESP-1 Tunnel |
| 00011 | TX ESP-2 Tunnel |
| 00100 | TX AH Transport |
| 00101 | TX ESP-1 Transport |
| 00110 | TX ESP-2 Transport |
| 01001 | RX AH |
| 01010 | RX ESP-1 |
| 01011 | RX ESP-2 |

All other decodes not shown in the above table are reserved for future use.

SA Version

These bits specify the version number of the SA and are provided for diagnostic purposes. The current version for all SA Block types is 0x1.

XV, RV (Transmit/Receive SA Valid)

These bits indicate that the SA Block is valid and can be used.

XA, RA (Transmit/Receive Authentication Enable)

These bits indicate that authentication is enabled for this protocol and should be used for packets on this socket. The corresponding Authentication algorithm and key fields are also valid. For TX/RX AH SA's, this bit should always be set. For TX/RX ESP SA's, it is optional.

XA_ALG, RA_ALG (Transmit/Receive Authentication Algorithm)

These bits indicate the algorithm to be used for authentication. The possible choices are listed in the following table.

TABLE 27

Authentication Algorithm Selections

| XA_ALG/ RA_ALG | Authentication Algorithm |
| --- | --- |
| 000 | Null Authentication |
| 001 | MD5 |
| 010 | SHA-1 |

All decodes not shown are reserved for future use.

XE, RE (Transmit/Receive Encryption Enable)

These bits indicate that encryption should be used for packets on this socket, and indicates that the Encryption key and Encryption Algorithm fields are valid. This bit is only defined for TX/RX ESP SA's.

XE_ALG, RE_ALG (Transmit/Receive Algorithm)

These bits indicate the algorithm to be used for encryption. The possible choices are listed in the following table.

TABLE 28

Encryption Algorithm Selections

| XE_ALG | Encryption Algorithm |
|---|---|
| 000 | Null Encryption |
| 001 | DES |
| 010 | 3DES |
| 011 | AES-128 in CBC Mode |

All other decodes not shown are reserved for future use.

RAR (Receive Anti-Replay Enable)

This bit indicated that Anti-Replay algorithm should be used for received packets.

XTV, RTV (Transmit/Receive Timestamp Valid)

These bits indicate that the timestamp field is valid in the SA, and that when the timestamp expires, the SA Block should be considered stale.

XBV, RBV (Transmit/Receive Byte Count Valid)

These bits indicate that the byte count limit field is valid in the SA, and that when the byte count reaches this value that the SA Block should be considered stale.

XSV, RSV (Transmit/Receive Sequence Limit Valid)

These bits indicate that when the sequence number field wraps past 0xFFFFFFFF that the SA Block should be considered stale.

Note: If none of the xTV, xBV or xSV bits is set, then the SA Block is deemed perpetual, and never expires.

RDC (Receive Destination IP Check Enable)

This bit indicated that the Destination IP address of any packet must match this SA's Destination IP Address field.

RSC (Receive SPI Check Enable)

This bit indicated that the SPI field of an IPSEC header being processed must match this SA's Destination IP Address field.

RTR (Receive Timestamp Watermark Limit Reached/Disabled)

If this bit is not set then timestamp watermark checking could be performed. When it causes a status message, this bit is set, so that further watermark status messages are not sent.

LV (Link Valid)

This bit indicates that a SA Block is linked to this SA. When this bit is valid Link field contains SA handle for the next SA Block.

SPI Number

This is the SPI associated with the protocol. For TX SA's this SPI is included in the protocol header. For RX SA's this SPI is compared against the corresponding fields in the received data packets.

Sequence Number

This is the sequence number associated with the protocol. Because AH and ESP SA's may expire at different times, the Sequence number may be different between the two protocols. For TX SA's, this sequence number is reset to 0x00000000 when the SA is created and incremented by one for each packet that is transmitted using the SA Block. For received packets, this field represents the last Sequence number received on the socket, and is used to check for packet replays.

Authorization Key

This parameter is the key used for the authentication for the protocol. If the key is less then 160 bits, it is lsb justified.

Encryption Key

This parameter is the key used for the encryption of IPSEC packets, and is only defined for TX/RX ESP SA's. For algorithms that use less then 192 bits, the key should be lsb justified.

Timestamp

This is the timestamp in the future of when the SA Block is considered stale. It is initialized when the SA is created. When a packet is sent out or received, the current free running millisecond timestamp is compared to this time. If the time matches or is greater then this timestamp, then the SA Block is considered stale.

Byte Count

This parameter is set when the SA is initialized. It determines the maximum number of bytes that may be sent out using the SA Block. HW uses this as an initial number for a decrementing counter. HW decrements this byte count as packets are transmitted or received for this SA. When byte count reaches zero, SA is considered stale. The xBV bit should be set if this limit is to be used.

Link

This field points to the next SA Block associated with the socket.

IPSEC Module

IPSEC is divided into following four major modules.

IPSECX

IPSECR

IPSECREGS

IPSEC Memories

IPSECX contains transmit data path logic the IPSEC. Data and control packets are transferred first into internal IPSECX memory. Encryption Engine reads these packets, encrypts them and writes back these packets into IPSECX memory. These packets are then forwarded to Ethernet transmitter for transmission.

IPSECR contains receive data path logic the IPSEC. Any incoming packet is parsed for IPSEC type packet. If packet is an IPSEC packet, then it is transferred to internal IPSECR memory. Decryption Engine decrypts this packet and writes back this packet to IPSECR memory. This packet is read and injected back to the network stack. This time this packet is decrypted, so parser does not identify as an IPSEC packet, but it is identified as normal TCP/IP packet.

IPSECREGS contains programmable registers for CPU. By programming these registers, CPU can create, update or delete a SA. This module provides indirect memory accesses to internal memories for diagnostic purposes.

IPSEC uses two SRAMs as depicted into following diagram. Both memories can hold packet of 9 KB size. IPSEC Memory sizes are as follows:

IPSECX Memory: 592 X 32bits X 4 Dual Port (9472 Bytes)

IPSECR Memory: 1168 X 32bits X 2 Dual Port (9344 Bytes)

Figure 66:
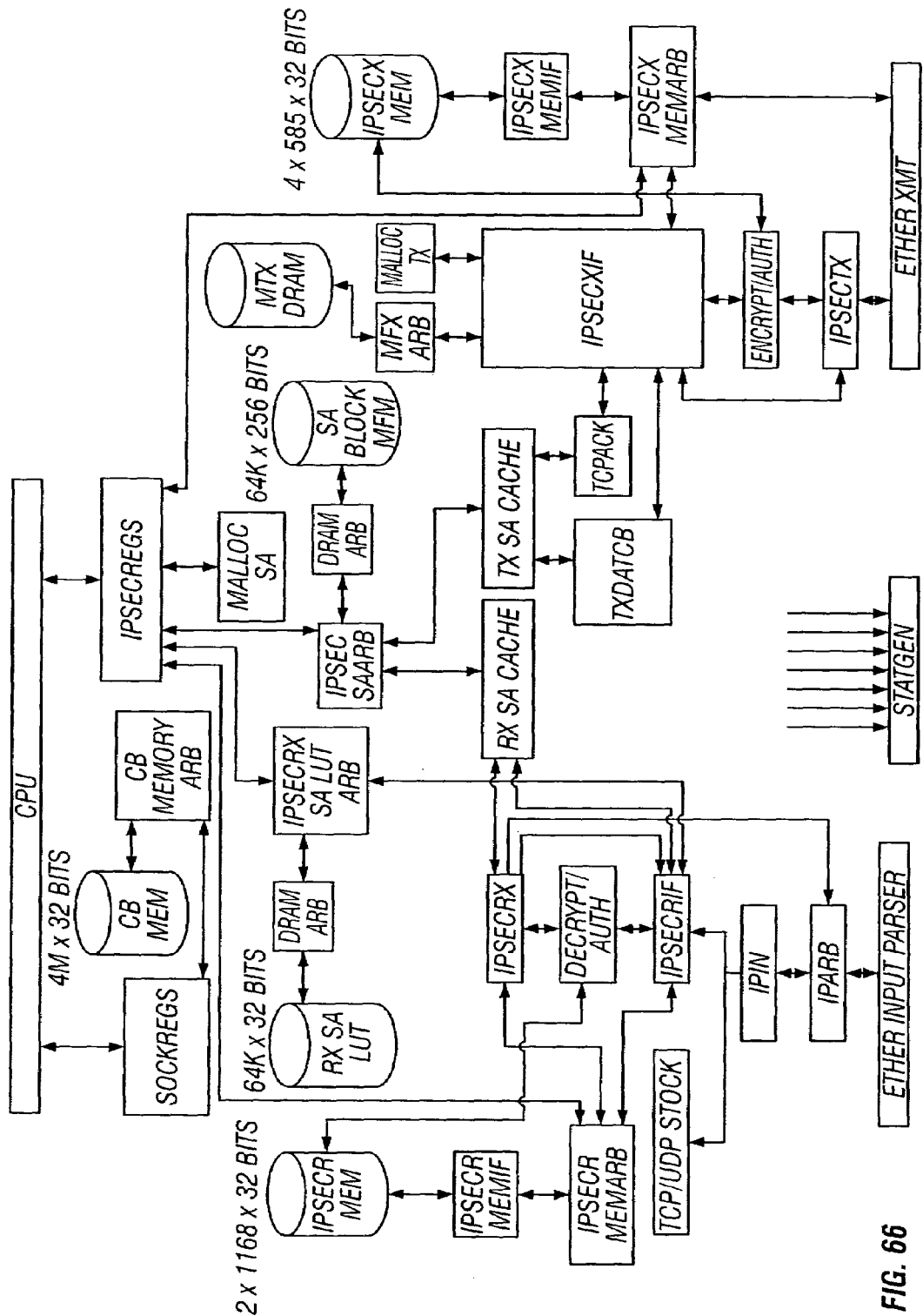
FIG. 66 is a block diagram that depicts the overall flow for the IPSEC logic according to the invention.

FIG. 66 is a block diagram that depicts the overall flow for the IPSEC logic.

IPSEC Transmit Data Paths (IPSECX)

Overview

Figure 67:
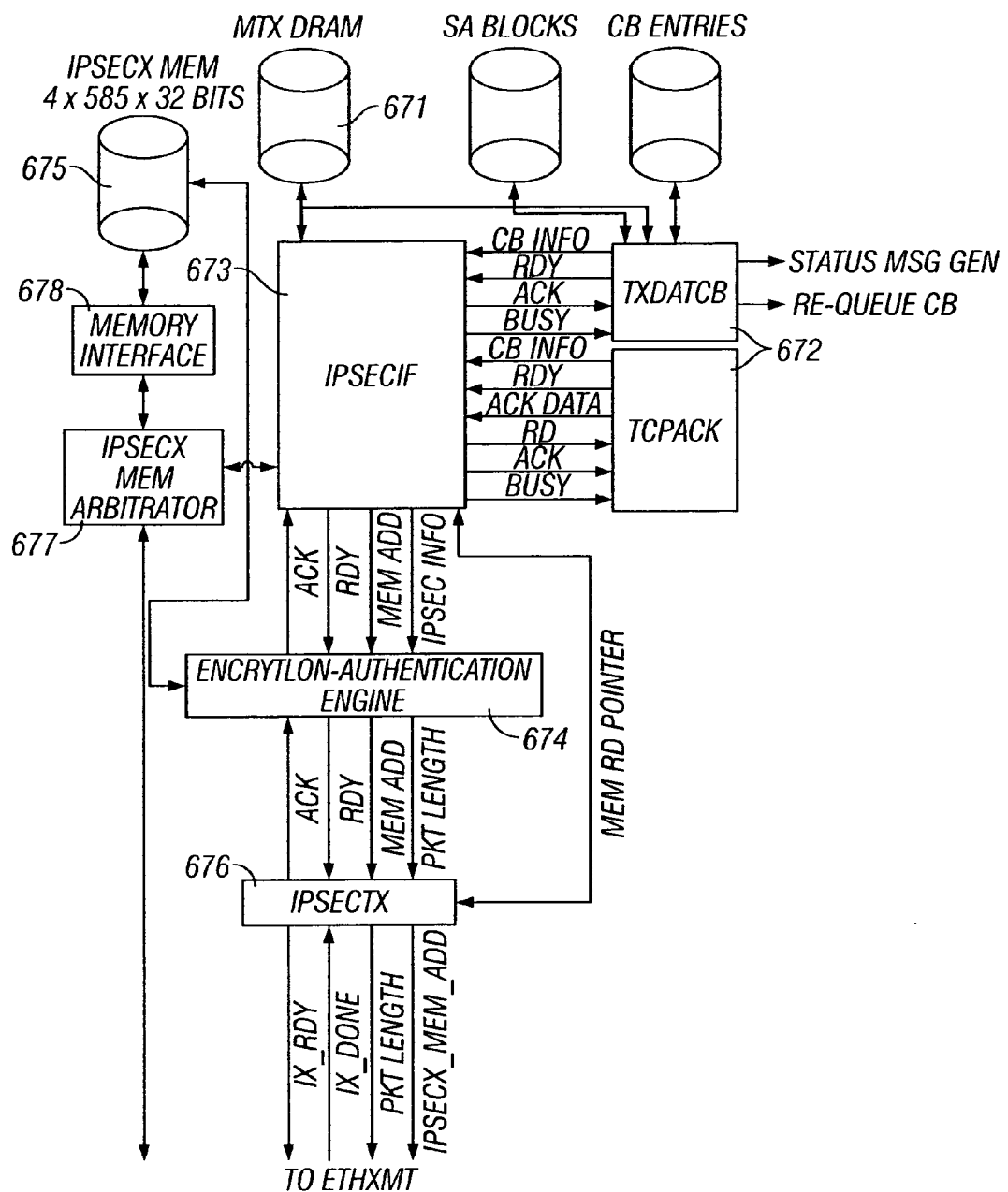
FIG. 67 is a block diagram outlining the data flow according to the invention.

The following discussion details the transmit IPSEC data path. The IPSEC encryption/authentication engine operates on packets that have been preformed prior to the engine being called. A block diagram outlining the data flow is depicted in FIG. 67.

Data Flow for IPSEC Transmitted Packets
TXDATCB/TCPACK

The transmit data for an IPSEC protected socket is first stored in the MTX DRAM 671 in the same manner as normal sockets. The TXDATCB/TCPACK module 672 is then responsible for forming the Ethernet, IP, TCP, and any IPSEC headers for the packet. This module reads information from the appropriate SA Block to determine which headers and what the format of the headers needs to be. Each socket has a CB structure associated with it. The CB contains state information on each socket. Within the CB structure, there are pointers of SA Blocks to be used. For sockets that needs multiple SA Blocks, that CB contains pointers to all AH and ESP1 SA Blocks.

The TXDATCB/TCPACK module writes the packet's header into a buffer in MTX DRAM. If it sees that the packet requires IPSEC processing then it signals to the IPSECXIF module 673 that there is a packet ready for processing. If at the beginning of the header generation process, the TXDATCB/TCPACK module notices that the IPSECXIF block is full, then it places the packet back in the transmission queue to be processed later.

TCPACK

Besides data packets, TCP utility packets (ACKs, SYNs, FINs) can also be encrypted. These packets come from the TCPACK module. Although not shown in the above data path in FIG. 67, this module also accessed the CB and SA memories.

Note: RST packets that are generated due to no local socket being available are never IPSEC protected. The only RST packets that may be protected are those used for abortive closes or in response to an illegal SYN/ACK received in response to a SYN. Both of these RST packets are formed by the TCPACK module and not the regular RST packet queue.

IPSECXIF

This module is responsible for transferring the packet from MTX DRAM (via TCPDATCB) or TCPACK and into the IPSECX internal memory. This internal memory is organized as 576×128 bits. Upon getting a packet from TXDATCB or TCPACK, this module begins transferring the data to the IPSEC memory. It also gets the applicable information for the SA from SA registers to pass it to the Encryption engine. A Read pointer is fed back from IPSECTX to prevent this module from over-writing current packets within the IPSECX memory.

ENCRYPTION/AUTHENTICATION ENGINE

This module 674 is responsible for encrypting and adding authentication to the packet. It takes the parameters provided by the IPSECXIF module, and processes the packet stored in the IPSECX memory 675. If both authentication and encryption is needed on a packet, it is assumed that this module is before both features before passing the packet to the IPSECTX module. The encrypted data should be written to the same memory location as the source packet. When the processing is done, it signals to the IPSECTX module that a completed packet is ready for transmission. The encryption engine runs entirely in the dram_clk domain.

This module may be comprised of two parallel and identical encryption engines. In that case, they are serviced in alternating order. Also, when the encrypt_rdy indicator is sent to IPSECTX, the packet presented should be in the same order as they were presented to the encryption engine.

IPSECTX

This module 676 is responsible for taking the processed packet from the encryption engine and scheduling it for transmission. When it gets a ready indication from the encryption engine, it registers the starting address and packet length information. It then sends a transmission request to the Ethernet transmission arbitrator. The Ethernet transmission arbitrator reads the packet data directly from IPSECX memory and sends it to the MAC's transmit buffer. When the entire packet has been read out, it strobes ipsectx_done. Upon receiving this indication, the IPSECTX module updates its ipsectx_rd_add. This bus is passed back to IPSECXIF to indicate that more memory has been freed.

IPSECX Memory Arbitrator (IPSECX MEMARB)

This module 697 is responsible for arbitrating accesses to the IPSECX memory bank. This module runs in the dram_clk domain.

IPSECX Memory Interface (IPSECX MEMIF)

Figure 68:
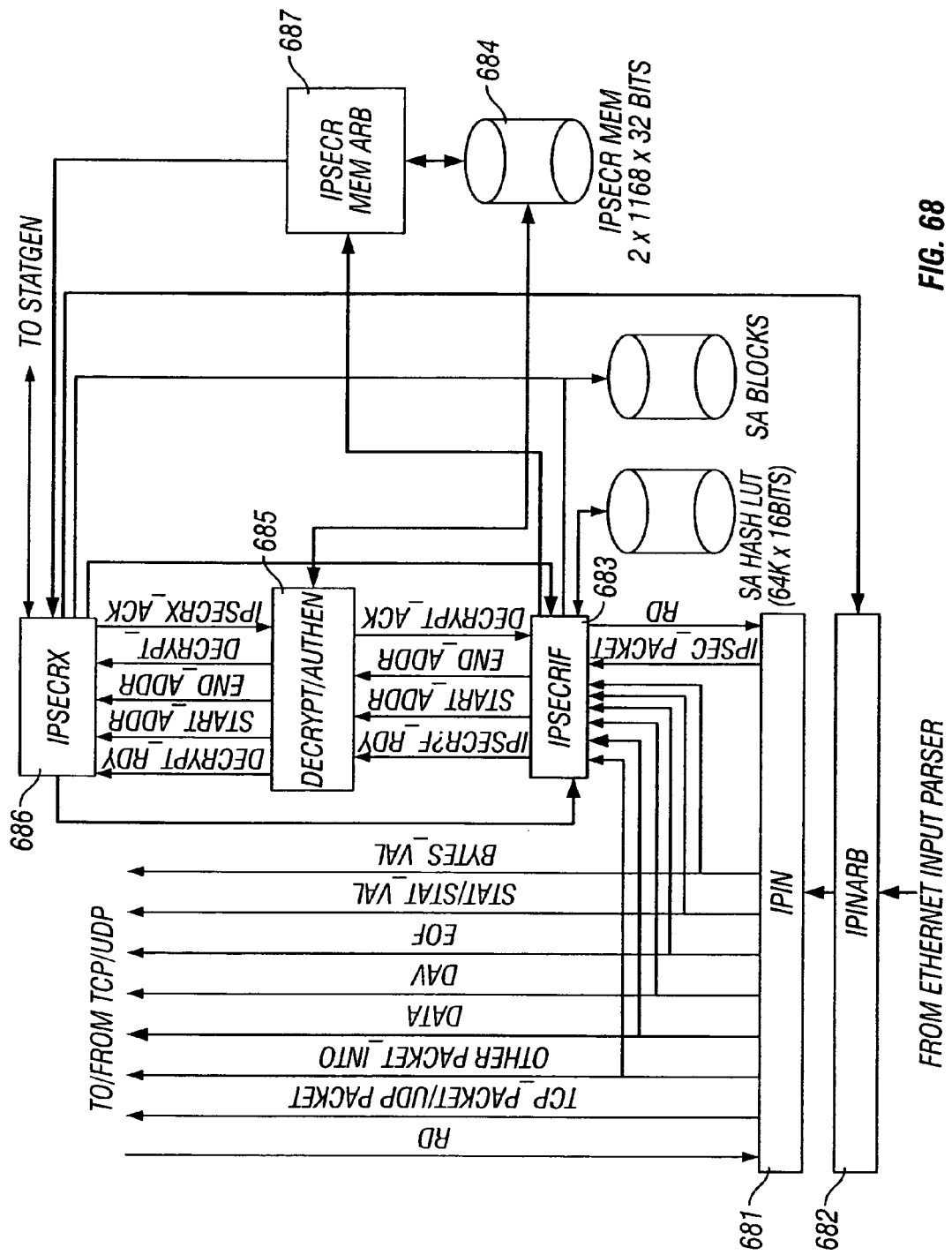
FIG. 68 is a block diagram showing data path flow for received IPSEC packets according to the invention.

This module 678 provides interface to dual port RAM. This module is glue between SRAM and other logic accessing the RAM. This module may need to change if RAM model is changed. This module operates entirely on dram_clk domain IPSEC Receive Data Paths (IPSECR)
Overview The block diagram in FIG. 68 depicts the data path flow for received IPSEC packets. It forms the basis for the discussions that follow.

Data Flow for IPSEC Received Packets
IPIN

The received data for an IPSEC protected socket is first parsed in the IPIN module 687. Within the outermost IP header is the protocol field that indicates the protocol type of the next header. If it detects that the protocol is 0x50 (ESP) or 0x51 (AH), it then completes packet including outermost IP header to the IPSECRIF module.

If the received packet is fragmented, then it is treated like any other fragmented IP packet, and sent to the exception processor. When the packet is complete, it is injected back into the bottom of the IP stack via the IPINARB module 682.

IPSECRIF

When IPIN indicates to this module 683 that an IPSEC packet has been received, it starts to store the packet into IPSECR memory 684. The packet is stored starting with the header immediately following the outermost IP header. The IPSECRIF module also parses the SPI, source IP address, and AH/ESP setting to perform a LUT lookup to find the correct RX SA Block. When it gets the LUT value, it reads the SA Block to see if its parameters match the received packet's parameters. If they do match, then we have the appropriate SA. If it does not then, then the packet is dropped and the event logged.

When the correct SA Block is found, the receive SA parameters are read and stored. The sequence number(s) is checked to see if it is valid, if the anti-replay feature is enabled for this SA. If it is good, then the SA parameters, along with the starting memory address in IPSECR memory for the packet, are passed to the Decryption module 685. If the sequence number is invalid, then the packet is dropped and the event logged. Sequence numbers and Sequence bitmaps are not updated at this time however. The purpose of doing the anti-reply check at this point is to prevent a bad packet from being needlessly decrypted and authenticated. The anti-reply updating is handled in the IPSECRX module 686 after the packet has been authenticated.

DECRYPTION/AUTHENTICATION

This module 685 is responsible for decrypting and authenticating the IPSEC packet. When a packet is available, the IPSECRIF module indicates this to the decryption engine by asserting the ipsecrif_rdy signal. The IPSECRIF module also provides the starting address for the packet. If the packet fails authentication, then it is discarded and the event is logged. If the authentication passes, then the packet is decrypted, if required. The decrypted packet is written back to the same IPSECR memory location as the original packet. The Decryption engine then indicates that a packet is ready to be received to the IPSECRX module by asserting decrypt_rdy. If a packet requires both authentication and decryption, it is assumed that both functions are complete prior to handing the packet off to the IPSECRX module.

This module may be comprised of two parallel and identical decryption engines. In that case, they are serviced in alternating order. Also, when the decrypt_rdy indicator is sent to IPSECRX, the packet presented should be in the same order as they were presented to the decryption engine.

Note: The Decryption/Authentication engine runs off of the DRAM clock.

IPSECRX

This module 686 is responsible for taking the decrypted/authenticated packet and injecting it back into the stack. For tunnel mode packets, the processed packet can be injected directly back via IPINARB. For transport mode packets, an IP header is created and pre-pended to the start of the packet. Doing this allows us to re-use the TCP checksum and interface logic inside of IPIN for all packets.

This module is also responsible for updating the receive SA Block for the packet. The new sequence number and bitmap for the SA, along with the SA handle is passed to this module from the Decryption engine. This module updates the timestamp and bytes count received. If it finds that any of the parameters have reached with their limits, then the SA is invalidated and a status message is sent to the exception processor.

IPSECR Memory Arbitrator (IPSECRMEMARB)

This module 687 is responsible for arbitrating accesses to the IPSECR memory bank. This module runs in the dram_clk domain.

IPSECR Memory Interface (IPSECR MEMIF)

This module provides interface to dual port RAM. This module is glue between SRAM and other logic accessing the RAM. This module may need to change if RAM model is changed. This module operates entirely on dram_clk domain

IPSEC LUT

This LUT is organized as 128K by 17 bits. Each word is made up of a 16 bit SA handle and a 1 bit valid indicator. Physically, the LUT is contained within the MTX DRAM bank.

IPARB

This module arbitrates the traffic coming from Ethernet Input Parser and IPSECRX.

IPSEC Anti-Replay Algorithm

This is the algorithm to be used to check for anti reply checking. This algorithm uses a 32-bit window to check for the last 32 sequence numbers. The msb of the bit map represents the oldest sequence number, and the lsb represents the current sequence number. This algorithm is used for both AH and ESP protocols.

LAST_SEQ: Last received sequence number. This is stored in the SA Block SEQ: Sequence number of received packet. BITMAP: 32-bit bitmap representing the last 32 sequential sequence numbers.

Figure 69:
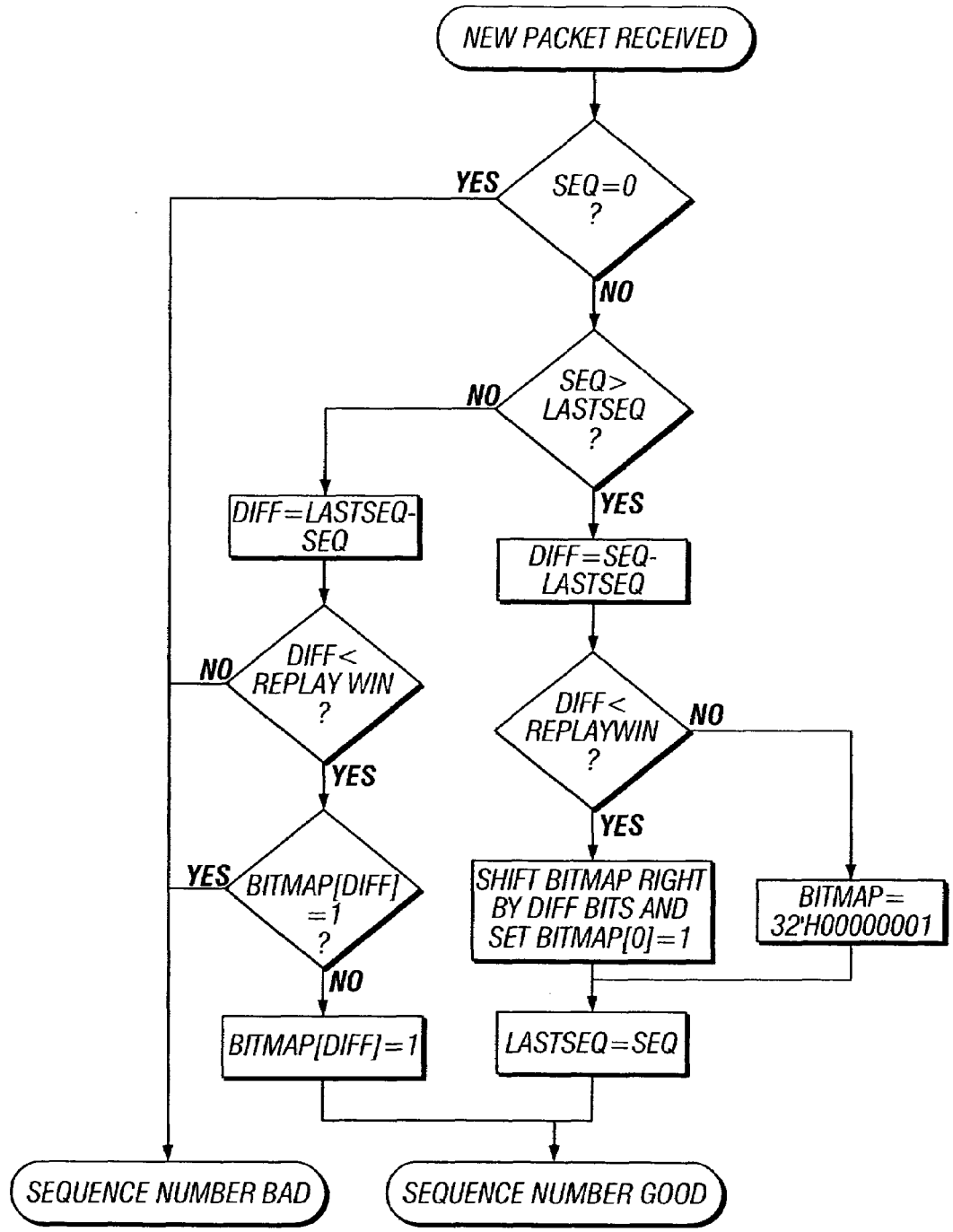
FIG. 69 is a flow diagram that shows the IPSEC Anti-Replay Algorithm according to the invention.

FIG. 69 is a flow diagram that shows the IPSEC Anti-Replay Algorithm.

IPSEC Registers (IPSECREGS)

Overview

This module provides interface to CPU and contains programmable registers. This module also creates, updates or invalidates the SA when CPU issues proper command. It provides indirect access to following memories for diagnostic purposes.

IPSECX
IPSECR
RX SA LUT
SA Block

IPSEC SA Status Message

For both receive and transmit SA blocks, a status message is generated to the on-chip processor whenever an Block becomes invalid. Blocks may become invalid due to the sequence number reaching 0xFFFF, or the timestamp or byte count reaching their limits.

SA Block to DRAM Interface and Data Flow

Overview

The following discussion overviews the interface for SA Block accesses via the NS DDR Arbitration module. It depicts the data flow, lists interface signals, and details the timing required.

Data Flow

Three different access types are supported for SA Blocks These are burst writes, burst reads, and single reads. The ipsecsarb module arbitrate requests from different sources for access to the SA memory.

SA LUT

Overview

The IPSEC receive logic uses a LUT to find the proper SA Block. The LUT is 32K deep by 16 bits. Each LUT Block contains the SA Block handle. If SA handle has value 0, it's considered invalid.

SA LUT to DRAM Interface

The following discussion overviews the interface between the SA LUT and the Data DDR Arbitration module. It depicts the data flow, lists interface signals, and details the timing required.

Data Flow

The SA LUT only does single read and write accesses to the DRAM. The accesses are always in WORDs. Because each LUT Block is only 16 bits, only the bottom 16bits of the WORD are passed to the SA LUT memory interface. Reads and writes never occur in the same LUT access cycle.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. An integrated network adapter for decoding and encoding network protocols and processing data, comprising:
a hardwired data path for processing streaming data;
a hardwired data path for receiving and transmitting packets and for encoding and decoding packets;
a plurality of parallel, hardwired protocol state machines;
a hardwired transport offload engine (TOE);
a processor integrated with said TOE;
a module that provides optimized hardware support for any of Network Address Translation (NAT), IP masquerading, and port forwarding via port range registers that forward all packets of a specified type UDP or TCP that fall in a programmable range of ports to an exception path;

wherein each protocol state machine is optimized for a specific network protocol;
wherein said protocol state machines execute in parallel; and
means for scheduling shared resources based on traffic;
wherein said port range registers enable certain ranges of ports to be used for network control operations and said port forwarding.

2. An integrated network adapter embodied in a single integrated circuit, said network adapter comprising:
a hardwired transport offload engine (TOE);
a processor integrated with said TOE;
a physical layer module (PHY);
a media-access layer module (MAC); an IPsec processing engine integrated with said TOE; an upper-level protocol (ULP) for offload processing, said ULP integrated with said TOE; and
a module that provides optimized hardware support for any of Network Address Translation (NAT), IP masquerading, and port forwarding via port range registers that forward all packets of a specified type UDP or TCP that fall in a programmable range of ports to an exception path;
wherein said port range registers enable certain ranges of ports to be used for network control operations and said port forwarding.

3. The network adapter of claim 2, wherein said ULP implements an iSCSI protocol.

4. The network adapter of claim 3, wherein said ULP offloads the calculation of the iSCSI CRC for transmit and receive.

5. The network adapter of claim 3, wherein said ULP performs iSCSI framing using Fixed Interval Markers (FIM) for transmit.

6. The network adapter of claim 3, wherein said TOE accepts iSCSI header segments and iSCSI data segments from the host iSCSI driver and prepares ISCSI PDUs for transmission 7. The network adapter of claim 3, further comprising:
an ISCSI driver resident on a host computer; and
wherein said host iSCSI driver communicates with said TOE.

8. The network adapter of claim 7, wherein said TOE receives iSCSI Protocol Data Units (PDU), calculates iSCSI CRCs, and passes the iSCSI CRCs to said host iSCSI driver.

9. The network adapter of claim 8, wherein said host iSCSI driver seeds a calculated iSCSI CRC value using an iSCSI CRC seed field in an iSCSI Instruction Block (IB).

10. The network adapter of claim 7, wherein said host iSCSI driver assembles a complete iSCSI Protocol Data Unit (PDU) header in host memory, creates an iSCSI Instruction Block (IB), and sends the iSCSI IB to said TOE.

11. The network adapter of claim 10, wherein an iSCSI IB contains a set of address and length pairs, known as transfer blocks, which correspond to a linked-list of buffers in host computer memory.

12. The network adapter of claim 11, wherein said host iSCSI driver adjusts buffer size of a final transfer block when receiving iSCSI data to account for CRC bytes and still allows correct separation of iSCSL header and data segments.

13. The network adapter of claim 7, wherein an iSCSI Protocol Data Unit (PDU), including its corresponding Basic Header Segment (BHS), any Additional Header Segment (AHS), and any data segment, is transferred between said host iSCSI driver and said TOE using an iSCSI Instruction Block (IB).

14. The network adapter of claim 7, wherein said host iSCSI driver splits iSCSI Protocol Data Unit (PDU) header and data segments on receive by posting receive buffers of the correct size for the iSCSI PDU header and, if there are data segments, posting receive buffers of the correct size for the iSCSI PDU data segment.

15. The network adapter of claim 14, wherein said host iSCSI driver posts correctly sized buffers for any Additional Header Segments (ARS) received by using instruction blocks.

16. The network adapter of claim 7, wherein said TOE and said host iSCSI driver interface at the iSCSI PDU level.

17. The network adapter of claim 7, wherein said TOE separates header and data segments of iSCSI Protocol Data Units (PDU) without requiring additional memory copies in the host computer's memory by DMAing PDU headers to either said integrated processor or the host computer and DMAing PDU data sections to the host computer.

18. The network adapter of claim 2, wherein said TOE performs IPsec anti-replay support on a per-SA basis.

19. The network adapter of claim 2, wherein said TOE implements IPSec null, DES, 3DES algorithms, and AES 128-bit algorithm in cipher-block chaining (CBC) mode.

20. The network adapter of claim 2, wherein said TOE implements IPsec null, SHA-1 and MD-5 authentication algorithms 21. The network adapter of claim 2, wherein said TOE implements IPsec variable-length encryption keys.

22. The network adapter of claim 2, wherein said TOE implements IPsec variable-length authentication keys.

23. The network adapter of claim 2, wherein said TOE implements IPsec jumbo frame support.

24. The network adapter of claim 2, wherein said TOE implements IPsec automatic handling of Security Association (SA) expiration on the basis of both time and total data transferred.

25. The network adapter of claim 2, wherein said TOE implements IPsec Policy Enforcement.

26. The network adapter of claim 2, wherein said TOE implements IPsec exception handling, including exception-packet generation and status reporting.

27. An integrated network adapter, comprising:
a hardwired data path for receiving and transmitting packets and for encoding and decoding packets;
at least one hardwired protocol state machine;
at least one communication channel between said network adapter and a host computer;
a scheduler for scheduling shared resources based on traffic;
a hardwired transport offload engine (TOE);
a processor integrated with said TOE; and
a module that provides optimized hardware support for any of Network Address Translation (NAT), IP masquerading, and port forwarding via port range registers that forward all rackets of a specified type UDP or TCP that fall in a programmable range of ports to an exception path;
wherein said port range registers enable certain ranges of ports to be used for network control operations and said port forwarding.

28. The network adapter of claim 27, wherein said at least one communication channel employs instruction blocks (IBs) and status messages (SMs) to transfer data and control information.

29. The network adapter of claim 27, further comprising:
at least one threshold timer for controlling communication via said at least one communication channel;
wherein data are transferred at selected threshold interval.

30. The network adapter of claim 29, wherein said timer threshold comprises an interrupt aggregation mechanism for reducing a number of interrupts between said network adapter and said host computer and for increasing data throughput.

31. The network adapter of claim 27, further comprising:
a module for establishing at least one data threshold for controlling communication via said at least one communication channel;
wherein data are transferred when data levels reach a selected threshold.

32. The network adapter of claim 27, further comprising:
an interrupt aggregation mechanism for optimizing data throughput of said processor and TOE.

33. The network adapter of claim 27, further comprising:
a module that provides optimized hardware support for TCP Selective Acknowledgement (SACK);
wherein TCP acknowledges missing data packets and retransmits said missing data packets, but only said missing data packets.

34. The network adapter of claim 27, further comprising: a module that provides optimized hardware support for TCP fast retransmit.

35. The network adapter of claim 34, wherein said TCP fast retransmit immediately generates an ACK when an out of order segment is received to allow a sender to fill a hole quickly, instead of waiting for a standard time out.

36. The network adapter of claim 34:
wherein said TCP fast retransmit is invoked when a receiver receives three duplicate ACKS;
wherein a sender tries to fill a hole when said TCP fast retransmit is invoked; and
wherein a duplicate ACK is considered duplicate when ACK and window advertisement values in a segment match one another.

37. The network adapter of claim 27, further comprising:
a module that provides optimized hardware support for TCP window scaling.

38. The network adapter of claim 27, wherein a window scaling operation is based on three variables, which comprise:
at least one bit for enabling window scale;
at least one bit for setting a scaling factor; and
a parameter for determining a scaling value.

39. The network adapter of claim 27, further comprising:
a module that provides optimized hardware support for iSCSI header and data CRC generation and checking.

40. The network adapter of claim 27, further comprising:
a module that provides optimized hardware support for iSCSI fixed-interval marker (FIM) generation.

41. The network adapter of claim 27, further comprising:
a module that provides optimized hardware support for TCP dump mode, wherein said TCP dump mode supports diagnostic programs and packet monitoring programs.

42. The network adapter of claim 41, wherein when said TCP dump mode is enabled all received packets are sent to said host as exceptions and all outgoing TCP/UDP packets coming from a hardware stack are looped back as exception packets.

43. The network adapter of claim 42, further comprising:
a driver copying said exception packets for a network monitor, and for re-injecting RX packets and sending TX packets as raw Ethernet frames.

44. The network adapter of claim 27, further comprising:
a module that provides optimized hardware support for host ACK mode;
wherein a TCP ACK is only sent when said host has received data from a TCP segment to provide data integrity where data may be corrupted as they are passed between said host computer and said network adapter.

45. The network adapter of claim 44, wherein said host ACK mode waits for a DMA of an MTX buffer that contains a data segment to complete before sending an ACK.

46. The network adapter of claim 27, further comprising:
a module that provides optimized hardware support for TCP timestamps to allow TCP to calculate a Round Trip Time Measurement (RTTM) better, and to support Protect Against Wrapped Sequences (PAWS).

47. The network adapter of claim 27, further comprising:
a module that provides optimized hardware support for TCP PAWS to protect against old duplicate segments corrupting TCP connections.

48. The network adapter of claim 27, further comprising:
a module that provides optimized hardware support for TCP host retransmit mode to allow retransmission of data directly out of a host's memory buffers, instead of out of buffers located in said network adapter.

49. The network adapter of claim 27, further comprising:
a module that provides optimized hardware support for random initial sequence numbers.

50. The network adapter of claim 27, further comprising:
a module that provides optimized hardware support for dual stack mode; and
a hardware TCP/IP stack integrated into said network adapter that works in cooperation and in conjunction with a software TCP/IP stack in said host;
wherein said network adapter supports co-existence of said software TCP/IP stack running in parallel using a same IP address as said network adapter.

51. The network adapter of claim 50, further comprising:
a module for supporting SYN status message mode;
wherein any received SYN generates a status message back to said host;
wherein SYN/ACK is not generated by said network adapter until said host sends a proper instruction block back to said network adapter; and
wherein if said SYN status message mode is not enabled on said network adapter, then SYN/ACKs are generated automatically by said network adapter, and SYN received status messages are not generated.

52. The network adapter of claim 50, further comprising:
a module for supporting suppression of RST messages from said network adapter when a TCP packet is received that does not match a network adapter control block database;
wherein, instead of automatically generating a RST, said network adapter hardware sends a packet to said host as an exception packet to allow said software TCP/IP stack in said host to handle said packet as an exception packet.

53. The network adapter of claim 27, further comprising:
a module that provides optimized hardware support for IP ID splitting to allow said host and said network adapter to share an IP address without overlapping IP ID's.

54. The network adapter of claim 27, further comprising:
a module that provides optimized hardware support for filtering of data packets to restrict, accept, or take special action on certain types of packets.

55. The network adapter of claim 54, wherein said filtering can take any of the following attributes:

accept a programmed uni-cast address;
accept broadcast packets;
accept multicast packets;
accept addresses within a range specified by a netmask; and
allow a promiscuous mode that accepts all packets.

56. The network adapter of claim 27, further comprising: a module that provides optimized hardware support for virtual local area network (VLAN).

57. The network adapter of claim 56, wherein said VLAN module comprises any of:
an element for stripping incoming packets of their VLAN headers;
an element for generating VLAN tagged outbound packets;
an element for generating VLAN parameters from incoming SYN frames; and
an element for passing VLAN tag information for exception packets and UDP packets.

58. The network adapter of claim 27, further comprising:
a module that provides optimized hardware support for jumbo frames.

59. The network adapter of claim 27, further comprising:
a module that provides optimized hardware support for Simple Network Management Protocol (SNMP).

60. The network adapter of claim 27, further comprising:
a module that provides optimized hardware support for management information base (MIB).

61. The network adapter of claim 27, further comprising:
a module that provides optimized hardware support for network adapter operation in legacy modes;
wherein all network traffic are sent to said host regardless of traffic type; and wherein said network adapter operate as if a hardware TCP/IP stack were not present therein.

62. The network adapter of claim 27, further comprising:
a module that provides optimized hardware support that allows IP fragmentation to be handled in either of hardware and software;
wherein IP fragmented packets that are passed up as exception packets and reassembled in a software driver are re-injected via an IP injection mode back into said network adapter.

63. The network adapter of claim 27, further comprising:
a module that provides optimized hardware support for IP injection that allows IP packets to be injected into a TCP/IP stack in said network adapter.

64. The network adapter of claim 63, said IP injection module further comprising:
cone or more injection control registers for injecting an IP packet into said network adapter TCP/IP stack;
wherein said one or more injection control registers allow said host to inject an IP packet into said network adapter TCP/IP stack.

65. The network adapter of claim 27, further comprising:
a module that provides optimized hardware support for multiple IP addresses.

66. The network adapter of claim 27, further comprising:
a module that provides optimized hardware support for a debug mode;
wherein, when a test and control bit is enabled in said network adapter, all IP packets are sent as exceptions to said host.

67. The network adapter of claim 27, further comprising:
a module that provides optimized hardware support for TCP time wait state.

68. The network adapter of claim 27, further comprising:
a module that provides optimized hardware support for a variable number of connections.

69. The network adapter of claim 68, wherein when said network adapter accepts a connection that equals a network adapter maximum capacity, a next SYN is passed up to said host as an exception packet to allow said host to handle said connection.

70. The network adapter of claim 27, further comprising:
a module that provides optimized hardware support for User Datagram Protocol (UDP).

71. The network adapter of claim 27, further comprising:
a module that provides optimized hardware support for TTL (time to live) to limit an IP packet life on to a selected number of hops.

72. The network adapter of claim 27, further comprising:
a module that provides optimized hardware support for TCP keepalive to allow an idle TCP connection to stay connected and not time out by periodically sending a keep alive packet across a link.

73. The network adapter of claim 27, further comprising:
a module that provides optimized hardware support for TCP type of service (TOS) for use by routers to prioritize an IP packet.

74. An integrated network adapter, comprising:
a hardwired data path for receiving and transmitting packets and for encoding and decoding packets;
at least one hardwired protocol state machine;
at least one communication channel between said network adapter and a host computer;
a scheduler for scheduling shared resources based on traffic;
a module that provides optimized hardware support for TCP slow start;
wherein said TCP slow start slowly ramps up a number of data segments in flight at one time by:
initially only allowing two data segments that correspond to a current window, cwnd, of twice a maximum segment size (MSS) fly before expecting an acknowledgement (ACK); and
increasing said cwnd by one MSS for each successful ACK received, to allow one more segment in flight, until said cwnd is equivalent to a receiver's advertised window.

75. The network adapter of claim 74, wherein said TCP slow start is always started on a new data connection; and
wherein said TCP slow start may be activated in the middle of a connection when a data traffic congestion event occurs.

76. An integrated network adapter, comprising:
a hardwired data oath for receiving and transmitting packets and for encoding and decoding packets;
at least one hardwired protocol state machine;
at least one communication channel between said network adapter and a host computer;
a scheduler for scheduling shared resources based on traffic;
a hardwired transport offload engine (TOE);
a processor integrated with said TOE; and
a module that provides optimized hardware support for flexible and programmable memory error checking and correction (ECC);
wherein said ECC module uses at least one extra bit to store an encrypted ECC code with data in a packet;
wherein when said data are written to memory, said ECC code is also stored;
wherein when said data are read back, said stored ECC code is compared to an ECC code which would have been generated when said data were written;

wherein if said ECC codes do not match, a determination is made as to which bit in said data is in error; wherein said bit in error is flipped and a memory controller releases said corrected data;

wherein errors are corrected on-the-fly, and corrected data are not placed back in said memory;

wherein if same corrupt data are read again, operation of said ECC module is repeated.

77. An integrated network adapter, comprising:
a hardwired data path for receiving and transmitting packets and for encoding and decoding packets;
at least one hardwired protocol state machine:
at least one communication channel between said network adapter and a host computer;
a scheduler for scheduling shared resources based on traffic;
a hardwired transport offload engine (TOE);
a processor integrated with said TOE; and
a module that provides optimized hardware support for TCP quality of service (OoS);
wherein TCP transmit data flow starts with a Socket Query module, which goes through a transmit data available Bit table looking for entries that have Transmit Data Available bits set, and wherein when said Socket Query module finds such an entry, said Socket Query module puts that entry into one of a plurality of queues according to a socket's User Priority level.

78. An integrated network adapter. comprising:
a hardwired data path for receiving and transmitting packets and for encoding and decoding packets;
at least one hardwired protocol state machine;
at least one communication channel between said network adapter and a host computer;
a scheduler for scheduling shared resources based on traffic;
a hardwired transport offload engine (TOE);
a processor integrated with said TOE; and
a module that provides optimized hardware support for failover;
wherein said failover module comprises: a NO_SYN mode that allows a socket to be created without trying to initiate a connection;
wherein a socket and all its related data structures in said network adapter are created without creating a connection; and wherein NO_SYN mode supports failover from another card or connection migration from a software TCP/IP stack to said network adapter.

79. An integrated network adapter, comprising:
a hardwired data path for receiving packets;
a plurality of parallel, hardwired protocol state machines; and
a scheduler for scheduling shared resources based on traffic;
a hardwired transport offload engine (TOE);
a processor integrated with said TOE; and
a module that provides optimized hardware support for any of Network Address Translation (NAT), IP masquerading, and port forwarding via port range registers that forward all packets of a specified type UDP or TCP that fall in a programmable range of ports to an exception path;
wherein said protocol state machines execute in parallel;
wherein said port range registers enable certain ranges of ports to be used for network control operations and said port forwarding.

* * * * *

UNITED STATES PATENT AND TRADEMARK OFFICE
CERTIFICATE OF CORRECTION

PATENT NO.         : 7,535,913 B2                                       Page 1 of 1
APPLICATION NO.    : 10/456871
DATED              : May 19, 2009
INVENTOR(S)        : Minami et al.

It is certified that error appears in the above-identified patent and that said Letters Patent is hereby corrected as shown below:

In the specification:
　　Col. 34, line 47, please replace "off." with -- off --.

In the claims:
　　Col. 103, line 37, please replace "ISCSI" with -- iSCSI --;
　　Col. 103, line 40, please replace "ISCSI" with -- iSCSI --;
　　Col. 103, line 60, please replace "ISCSL" with -- iSCSI --;
　　Col. 104, line 9, please replace "ARS" with -- AHS --;
　　Col. 104, lines 25-26, please replace "algorithms" with -- algorithms. --;
　　Col. 104, line 55, please replace "rackets" with -- packets --;
　　Col. 107, line 48, please replace "cone" with -- one --;
　　Col. 108, line 47, please replace "oath" with -- path --;
　　Col. 109, line 12, please replace "machine:" with -- machine; --;
　　Col. 109, line 20, please replace "(Oos)" with -- (Qos) --;
　　Col. 109, line 28, please replace "adapter." with -- adapter, --.

Signed and Sealed this
Twenty-fourth Day of May, 2011

David J. Kappos
*Director of the United States Patent and Trademark Office*